US012748129B2

(12) United States Patent
Yang et al.

(10) Patent No.: US 12,748,129 B2
(45) **Date of Patent: *Sep. 29, 2026**

(54) IN SITU MECHANICAL CHARACTERIZATION OF A SAMPLE STRAIN

(71) Applicants: NUtech Ventures, Lincoln, NE (US); UT-BATTELLE, LLC, Oak Ridge, TN (US)

(72) Inventors: Ruiguo Yang, Lincoln, NE (US); Grayson Minnick, Lincoln, NE (US); Nickolay Lavrik, Knoxville, TN (US); Jordan Daniel Rosenbohm, Lincoln, NE (US); Amir Monemian Esfahani, Lincoln, NE (US); Bahareh Tajvidi Safa, Lincoln, NE (US)

(73) Assignees: NUtech Ventures, Lincoln, NE (US); UT-BATTELLE, LLC, Oak Ridge, TN (US)

( * ) Notice: Subject to any disclaimer, the term of this patent is extended or adjusted under 35 U.S.C. 154(b) by 294 days.

This patent is subject to a terminal disclaimer.

(21) Appl. No.: 18/449,597

(22) Filed: Aug. 14, 2023

(65) Prior Publication Data

US 2023/0393170 A1 Dec. 7, 2023

Related U.S. Application Data

(63) Continuation-in-part of application No. 17/473,090, filed on Sep. 13, 2021, now Pat. No. 11,846,611.

(Continued)

(51) Int. Cl.

| | |
|---|---|
| ***G01Q 60/38*** | (2010.01) |
| ***G01N 3/06*** | (2006.01) |

(Continued)

(52) U.S. Cl.

CPC ............... *G01Q 60/38* (2013.01); *G01N 3/08* (2013.01); *G01N 3/06* (2013.01); *G01N 19/04* (2013.01);

(Continued)

(58) Field of Classification Search

CPC G01N 3/08; G01N 3/06; G01N 19/04; G01N 2203/0089; G01N 2203/0286; G01Q 60/26; G01Q 60/28

See application file for complete search history.

(56) References Cited

U.S. PATENT DOCUMENTS

| | | | | |
|---|---|---|---|---|
| 7,752,916 B2 * | 7/2010 | Han | G01N 3/04 73/789 |
| 8,058,613 B2 | 11/2011 | Lou et al. | |

(Continued)

OTHER PUBLICATIONS

Ahmadzadeh et al., Viscoelasticity of Tau Proteins Leads to Strain Rate-Dependent Breaking of Microtubules During Axonal Stretch Injury: Predictions from a Mathematical Model, Biophysical Journal, 2014, 106(5):1123-1133.

(Continued)

*Primary Examiner* — Jonathan M Dunlap

(74) *Attorney, Agent, or Firm* — QUARLES & BRADY LLP

(57) ABSTRACT

A method of measuring a stress-strain curve in a sample, the method including: providing a structure including a first movable island supported by a first beam, a second movable island supported by a second beam, and a gap therebetween connected by a sample, the sample including an initial length; moving the second movable island with a defined displacement; determining a displacement of the first movable island based on moving the second movable island; calculating a difference between the displacement of the first movable island and the defined displacement of the second movable island based on moving the second movable island;

(Continued)

determining an applied strain in the sample based on the difference divided by the initial length of the sample; calculating a force on the sample based on the displacement of the first movable island; calculating a stress on the sample based on the force; and determining the stress-strain curve of the sample by plotting the calculated stress against the applied strain.

20 Claims, 77 Drawing Sheets
(74 of 77 Drawing Sheet(s) Filed in Color)

Related U.S. Application Data

(60) Provisional application No. 63/398,121, filed on Aug. 15, 2022, provisional application No. 63/398,128, filed on Aug. 15, 2022, provisional application No. 63/077,264, filed on Sep. 11, 2020.

(51) Int. Cl.
*G01N 3/08* (2006.01)
*G01N 19/04* (2006.01)
*G01Q 60/26* (2010.01)
*G01Q 60/28* (2010.01)

(52) U.S. Cl.
CPC ................ *G01N 2203/0089* (2013.01); *G01N 2203/0286* (2013.01); *G01Q 60/26* (2013.01); *G01Q 60/28* (2013.01)

(56) References Cited

U.S. PATENT DOCUMENTS

| | | | | |
|---|---|---|---|---|
| 8,499,645 | B2 * | 8/2013 | Chasiotis | D02G 3/22<br>73/831 |
| 9,302,430 | B2 | 4/2016 | Thiel et al. | |
| 9,902,932 | B2 | 2/2018 | Nain | |
| 11,422,075 | B2 * | 8/2022 | Pantano | G01N 3/068 |
| 11,609,084 | B2 * | 3/2023 | Kang | G01N 3/08 |
| 12,415,906 | B2 * | 9/2025 | Tataurova | C08K 3/36 |
| 2006/0059984 | A1 * | 3/2006 | Doktycz | G01Q 60/42<br>73/161 |
| 2010/0088788 | A1 * | 4/2010 | Chasiotis | G01N 19/04<br>850/33 |
| 2011/0317157 | A1 * | 12/2011 | Kang | B81C 99/005<br>356/244 |
| 2016/0195458 | A1 * | 7/2016 | Kikuhara | G01N 1/4077<br>422/534 |
| 2021/0262783 | A1 * | 8/2021 | Kang | G01B 11/16 |
| 2022/0082483 | A1 | 3/2022 | Yang et al. | |
| 2023/0046061 | A1 * | 2/2023 | Mizokuchi | B01L 3/502707 |

OTHER PUBLICATIONS

Bays et al., Vinculin Phosphorylation Differentially Regulates Mechanotransduction at Cell-Cell and Cell-Matrix Adhesions, Journal of Cell Biology, 2014, 205(2):251-263.
Bays et al., Linking E-cadherin Mechanotransduction to Cell Metabolism Through Force-Mediated Activation of AMPK, Nature Cell Biology, 2017, 19(6):724-731.
Bertocchi et al., Nanoscale Architecture of Cadherin-Based Cell Adhesions, Nature Cell Biology, 2017, 19(1):28-37.
Bierkamp et al., Embryonic Heart and Skin Defects in Mice Lacking Plakoglobin, Developmental Biology, 1996, 180(2):780-785.
Bois et al., Pattern Formation in Active Fluids, Physical Review Letters, 2011, 106(2):028103, pp. 1-4.
Broussard et al., The Desmoplakin-Intermediate Filament Linkage Regulates Cell Mechanics, Molecular Biology of the Cell, 2017, 28(23):3156-3164.
Buckely et al., The Minimal Cadherin-Catenin Complex Binds to Actin Filaments Under Force, Science, 2014, 346(6209):1254211, 22 pages.
Cai et al., Mechanical Feedback Through E-Cadherin Promotes Direction Sensing During Collective Cell Migration, Cell, 2014, 157(5):1146-1159.
Casares et al., Hydraulic Fracture During Epithelial Stretching, Nature Materials, 2015, 14(3):343-351.
Charras et al., Tensile Forces and Mechanotransduction at Cell-Cell Junctions, Current Biology, 2018, 28(8):R445-R457.
Chiquet et al., Gene Regulation by Mechanotransduction in Fibroblasts, Applied Physiology, Nutrition, and Metabolism, 2007, 32(5):967-973.
Chu et al., Force Measurements in E-cadherin-mediated Cell Doublets Reveal Rapid Adhesion Strengthened by Actin Cytoskeleton Remodeling through Rac and Cdc42, Journal of Cell Biology, 2004, 167(6):1183-1194.
Cumpston et al., Two-Photon Polymerization Initiators for Three-Dimensional Optical Data Storage and Microfabrication, Nature, 1999, 398(6722):51-54.
Ding et al., Genome Remodelling in a Basal-Like Breast Cancer Metastasis and Xenograft, Nature, 2010, 464(7291):999-1005.
Esfahani et al., Tissue Regeneration from Mechanical Stretching of Cell-Cell Adhesion, Tissue Engineering Part C: Methods, 2019, 25(11):631-640.
Friedrichs et al., A Practical Guide to Quantify Cell Adhesion Using Single-Cell Force Spectroscopy, Methods, 2013, 60(2):169-178.
Frohlich et al., New Techniques for Isolation of Single Prokaryotic Cells, FEMS Microbiology Reviews, 2000, 24(5):567-572.
Gardel et al., Mechanical Response of Cytoskeletal Networks, Methods in Cell Biology, 2008, 89:487-519.
Gumbiner, Regulation of Cadherin-Mediated Adhesion in Morphogenesis, Nature Reviews Molecular Cell Biology, 2005, 6(8):622-634.
Haidekker et al., Analysis of Temporal Shear Stress Gradients During the Onset Phase of Flow Over a Backward-Facing Step, Journal of Biomechanical Engineering, 2001, 123(5):455-463.
Harris et al., Characterizing the Mechanics of Cultured Cell Monolayers, Proceedings of the National Academy of Sciences, 2012, 109(41):16449-16454.
He et al., In Vitro Dynamic Strain Behavior of the Mitral Valve Posterior Leaflet, Journal of Biomechanical Engineering, 2005, 127:504-511.
Hu et al., Size- and Speed-Dependent Mechanical Behavior in Living Mammalian Cytoplasm, Proceedings of the National Academy of Sciences, 2017, 114(36):9529-9534.
Huang et al., Vinculin Forms a Directionally Asymmetric Catch Bond with F-actin, Science, 2017, 357(6352) 703-706.
Jiang et al., Temporal Gradients in Shear, but not Ramp Flow, Stimulate the Proliferation of Osteoblast-Like Cells, Journal of Bone Mineral Research, 2001, 16:S494-S494.
Jodoin et al., Stable Force Balance Between Epithelial Cells Arises from F-actin Turnover, Developmental Cell, 2015, 35(6):685-697.
Jurado et al., α-Catenin Stabilises Cadherin-Catenin Complexes and Modulates Actomyosin Dynamics to Allow Pulsatile Apical Contraction, Journal of Cell Science, 2016, 129(24):4496-4508.
Kadohama et al., Effects of Different Types of Fluid Shear Stress on Endothelial Cell Proliferation and Survival, Journal of Cellular Physiology, 2007, 212(1):244-251.
Kametani et al., Basal-to-Apical Cadherin Flow at Cell Junctions, Nature Cell Biology, 2007, 9(1):92-98.
Kashef et al., Quantitative Methods for Analyzing Cell-Cell Adhesion in Development, Developmental Biology, 2015, 401(1):165-174.
Khalilgharibi et al., The Dynamic Mechanical Properties of Cellularised Aggregates, Current Opinion in Cell Biology, 2016, 42:113-120.
Khalilgharibi et al., Stress Relaxation in Epithelial Monolayers is Controlled by the Actomyosin Cortex, Nature Physics, 2019, 15(8):839-847.
Klein et al., Elastic Fully Three-Dimensional Microstructure Scaffolds for Cell Force Measurements, Advanced Materials, 2010, 22(8):868-871.

(56) References Cited

OTHER PUBLICATIONS

Klein et al., Two-Component Polymer Scaffolds for Controlled Three-Dimensional Cell Culture, Advanced Materials, 2011, 23(11):1341-1345.
Legant et al., Multidimensional Traction Force Microscopy Reveals Out-of-Plane Rotational Moments about Focal Adhesions, Proceedings of the National Academy of Sciences, 2013, 110(3):881-886.
Liang et al., Measurement of Mechanical Tension at Cell-Cell Junctions Using Two-Photon Laser Ablation, Bio-Protocol, 2016, 6(24), 25 pages.
Liu et al., Mechanical Tugging Force Regulates the Size of Cell-Cell Junctions, Proceedings of the National Academy of Sciences, 2010, 107(22):9944-9949.
Lozano et al., Tumor Progression: Small GTPases and Loss of Cell-Cell Adhesion, BioEssays, 2003, 25(5):452-463.
Maiti et al., In Vivo Measurement of Skin Surface Strain and Sub-Surface Layer Deformation Induced by Natural Tissue Stretching, Journal of the Mechanical Behavior of Biomedical Materials, 2016, 62:556-569.
Manibog et al., Resolving the Molecular Mechanism of Cadherin Catch Bond Formation, Nature Communications, 2014, 5:3941, 11 pages.
Marion et al., Acto-Myosin Cytoskeleton Dependent Viscosity and Shear-Thinning Behavior of the Amoeba Cytoplasm, European Biophysics Journal, 2005, 34(3):262-272.
Najor, Desmosomes in Human Disease, Annual Review of Pathology: Mechanisms of Disease, 2018, 13:51-70.
Niessen et al., Tissue Organization by Cadherin Adhesion Molecules: Dynamic Molecular and Cellular Mechanisms of Morphogenetic Regulation, Physiological Reviews, 2011, 91(2):691-731.
Padala et al., Mechanics of the Mitral Valve Strut Chordae Insertion Region, Journal of Biomechanical Engineering, 2010, 132:081004, 9 pages.
Panorchan et al., Probing Intercellular Interactions Between Vascular Endothelial Cadherin Pairs at Single-Molecule Resolution and in Living Cells, Journal of Molecular Biology, 2006, 358(3):665-674.
Panorchan et al., Single-Molecule Analysis of Cadherin-Mediated Cell-Cell Adhesion, Journal of Cell Science, 2006, 119(1):66-74.
Park et al., Differential Effects of Equiaxial and Uniaxial Strain on Mesenchymal Stem Cells, Biotechnology and Bioengineering, 2004, 88(3):359-368.
Perlman et al., Alveolar Expansion Imaged by Optical Sectioning Microscopy, Journal of Applied Physiology, 2007, 103(3):1037-1044.
Priya et al., E-cadherin Supports Steady-State Rho Signaling at the Epithelial Zonula Adherens, Differentiation, 2013, 86(3):133-140.
Priya et al., Bistable Front Dynamics in a Contractile Medium: Travelling Wave Fronts and Cortical Advection Define Stable Zones of RhoA Signaling at Epithelial Adherens Junctions, PLoS Computational Biology, 2017, 13(3):e1005411, 19 pages.
Rakshit, Ideal, Catch, and Slip Bonds in Cadherin Adhesion, Proceedings of the National Academy of Sciences, 2012, 109(46):18815-18820.
Rodriguez-Boulan et al., Organization and Execution of the Epithelial Polarity Programme, Nature Reviews Molecular Cell Biology, 2014, 15(4):225-242.
Slomka et al., Evaluating the Effective Shear Modulus of the Cytoplasm in Cultured Myoblasts Subjected to Compression Using an Inverse Finite Element Method, Journal of the Mechanical Behavior of Biomedical Materials, 2011, 4(7):1559-1566.
Sundfeldt, Cell-cell Adhesion in the Normal Ovary and Ovarian Tumors of Epithelial Origin; An Exception to the Rule, Molecular and Cellular Endocrinology, 2003, 202(1-2):89-96.
Tabdili et al., Cadherin-Dependent Mechanotransduction Depends on Ligand Identity but not Affinity, Journal of Cell Science, 2012, 125(18):4362-4371.
Tambe et al., Collective Cell Guidance by Cooperative Intercellular Forces, Nature Materials, 2011, 10(6):469-475.
Tepass et al., Cadherins in Embryonic and Neural Morphogenesis, Nature Reviews Molecular Cell Biology, 2000, 1(2):91-100.
Thomas, Understanding the Counterintuitive Phenomenon of Catch Bonds, Current Nanoscience, 2007, 3(1):63-77.
Trepat et al., Effect of Stretch on Structural Integrity and Micromechanics of Human Alveolar Epithelial Cell Monolayers Exposed to Thrombin, American Journal of Physiology-Lung Cellular and Molecular Physiology, 2006, 290(6):L1104-L1110.
Vedula et al., Quantifying Forces Mediated by Integral Tight Junction Proteins in Cell-Cell Adhesion, Experimental Mechanics, 2009, 49(1):3-9.
Vishen et al., Soft Inclusion in a Confined Fluctuating Active Gel, Physical Review E, 2018, 97(3):032602, 16 pages.
Waugh et al., Shear Rate-Dependence of Leukocyte Cytoplasmic Viscosity, In Cell Mechanics and Cellular Engineering, pp. 33-44, Springer, New York, NY, 1994.
Yang et al., Techniques to Stimulate and Interrogate Cell-Cell Adhesion Mechanics, Extreme Mechanics Letters, 2018, 20:125-139.
Zhang et al., Review and Perspective on Soft Matter Modeling in Cellular Mechanobiology: Cell Contact, Adhesion, Mechanosensing, and Motility, Acta Mechanica, 2017, 228(12):4095-4122.
Rekštytė, S., et al. "Microactuation and sensing using reversible deformations of laser-written polymeric structures." Nanotechnology 28.12 (2017): 124001.
Ladner, I., et al. "Tensile properties of polymer nanowires fabricated via two-photon lithography." RSC advances 9.49 (2019): 28808-28813.
Pertoldi, L., et al. "Dynamic mechanical characterization of two-photon-polymerized SZ2080 photoresist." Journal of Applied Physics 128.17 (2020).
Esfahani, Amir Monemian, et al. "Characterization of the strain-rate-dependent mechanical response of single cell-cell junctions." Proceedings of the National Academy of Sciences 118.7 (2021): e2019347118.
Monemianesfahani, Amir. "A Single Cell Pair Mechanical Interrogation Platform to Study Cell-Cell Adhesion Mechanics." (2021).

* cited by examiner

A

B

IP-S: Additional Comparison
Designed Dimension
30%, 50 mm/s, --, Water
2 μm/s, 15/20 (1w/3w) μm
30%, 50 mm/s, --, Water
0.2 μm/s, 15/20 (1w/3w) μm
a
b
i
ii
iii
Stress (MPa)
Strain
1w x 2h
3w x 2h
Young's Modulus (MPa)
Yield Strength (MPa)

IN SITU MECHANICAL CHARACTERIZATION OF A SAMPLE STRAIN

CROSS-REFERENCE TO RELATED APPLICATIONS

This application is based on, claims priority to, and incorporates herein by reference in their entirety U.S. Provisional Application Ser. No. 63/077,264, filed Sep. 11, 2020 and entitled, "In Situ Mechanical Characterization of a Single Cell-Cell Adhesion Interface Under Large Strain"; U.S. application Ser. No. 17/473,090 filed Sep. 13, 2021 and entitled "In Situ Mechanical Characterization of a Single Cell-Cell Adhesion Interface Under Large Strain"; U.S. Provisional Application Ser. No. 63/398,121 filed Aug. 15, 2022 and entitled "A Mechanical Characterization Method for Two Photon Polymerized Microfibers in Liquid"; and U.S. Provisional Application Ser. No. 63/398,128, filed Aug. 15, 2022 and entitled "A Multi-Material Platform for Imaging of Single Cell-Cell Junctions under Tensile Load Fabricated with Two Photon Polymerization."

GOVERNMENT SUPPORT STATEMENT

This invention was made with government support under P20 GM113126 and P30 GM127200 awarded by the National Institutes of Health, under 1826135 and 1936065 awarded by the National Science Foundation, and under DE-AC05-000R22725 awarded by the U.S. Department of Energy. The government has certain rights in the invention.

BACKGROUND

Two-photon polymerization has been used to create micro- and nanoscale structures. Complex 3D structures can be fabricated by selectively polymerizing photoresists at the focus of a laser with the ability to produce small features. 3D extracellular environments can be synthesized to have tailored properties including stiffness, porosity, roughness, adhesion propensity, etc. Measurement of the mechanical properties of the samples herein are tested by using two TPP-printed movable plates for actuation and force sensing. These moveable plates are mechanically coupled by some sample and supported by vertical, flexible beams. Understanding the stress, strain, and recovery of different samples can used to predict the long-term industrial application of materials.

Studying cellular behavior in 3D by environment requires knowledge of the mechanics of the scaffold in liquid under physiological conditions. Mechanical studies of on TPP-printed structures and narrow wires have been previously studied, but studies like this had limitations. Herein, the method utilizes two TPP printed-moveable plates for actuation and force-sensing which are mechanically couples by microfibers in a liquid environment.

Adhesive organelles between neighboring epithelial cells form an integrated network to withstand external and internal forces. As part of normal physiology, this integrated network is constantly exposed to mechanical stress and strain, which is essential to normal cellular activities, such as proliferation, migration, differentiation, and gene regulation in the process of a diverse portfolio of functions in tissue morphogenesis and wound healing. A host of developmental defects or clinical pathologies in the form of compromised cell-cell associations will arise when cells fail to withstand external mechanical stress due to genetic mutations or pathological perturbations. Indeed, since the mechanical stress is mainly sustained by the intercellular junctions, mutations or disease-induced changes injunction molecules and components in adherens junctions and desmosomes lead to cell layer fracture and tissue fragility, which exacerbate the pathological conditions. This clinical relevance gives rise to the importance of the understanding of biophysical transformations when cells are subjected to load.

Cell-cell adhesions are often subjected to mechanical strains of different rates and magnitudes in normal tissue function. This is particularly true under large strain conditions which may potentially lead to cell-cell adhesion dissociation and ultimately tissue fracture. However, the rate-dependent mechanical behavior of individual cell-cell adhesion complexes has not been fully characterized due to the lack of proper experimental techniques and therefore remains elusive.

Cells often experience strains of tens to a few hundred percent at strain rates of 10 to 100% $s^{-1}$ in normal physiological conditions. They have many mechanisms to dissipate internal stress produced by external strain to avoid fracture, often via cytoskeleton remodeling and cell-cell adhesion enhancement. The coping mechanisms are different in time scale. Cytoskeleton remodeling can dissipate mechanical stress promptly due to its viscoelastic nature and actomyosin-mediated cell contractility. One study in cell monolayers showed the actomyosin regulated stress relaxation when cells are connected with robust adherens junctions in a biphasic response, with an initial viscoelastic phase within a few seconds and a prolonged response of a few minutes.

Adhesion enhancement at the cell-cell contact is more complex in terms of time scale. Load-induced cell-cell adhesion strengthening has been shown by the increase in the number of adhesion complexes or clustering of adhesion complexes, which occurs on the order of a few minutes to a few hours after cells experience an initial load. Studies also showed that increased load on the cell-cell contact results in a prolonged cell-cell dissociation time, suggesting cadherin bonds may transition to catch bonds in certain loading conditions, which can occur within seconds.

It is generally accepted that stress accumulation in the cytoskeleton network and potentially in the cytoplasm is strain-rate dependent. With the increase in cellular tension, failure to dissipate the stress within the cell layer at a rate faster than the accumulation will inevitably lead to the fracture of the cell layer. To date, there is a lack of understanding about the rate-dependent behavior of the cell-cell adhesion complex, particularly about which of the aforementioned coping mechanisms are at play across the spectrum of strain rates, and about how the stress relaxation by the cytoskeleton coordinates with the enhancement of the cell-cell adhesion under large strains leading to fracture.

To characterize the intricacy of the biophysical and biochemical response of individual cell-cell adhesion complex under large strain, a functional technique needs to fulfill the following requirements. First, it should have a highly sensitive force sensing component that allows easy quantification of pico- or nano-newton forces. Second, it should have the capability to apply mechanical strain or stress in a controlled manner. Third, the testing can be conducted under physiologically relevant conditions, especially allowing the formation of mature cell-cell junctions and cell-ECM adhesions. Several widely used techniques in the quantitative assessment of cell-generated forces include traction force microscopy and elastomer-based micropillar arrays. In addition, micro-scaffolds fabricated by 3D printing have been used to measure cell forces in a 3D microenvironment.

Although these quantification methods provide great insight into the actin-based ECM adhesion networks, they are restricted to static observations and fail to apply desirable mechanical stimuli. Techniques exist to apply mechanical strain to a monolayer of cells, but the stress within an individual cell-cell adhesion cannot be determined. Further, when a load is applied to individual cell-cell junctions, the majority of the studies are carried out on isolated suspended cells where mature intercellular junctions are yet to form, and the focus can only be placed on the separation of the cadherin bonds while the effect of stress relaxation of the cytoskeleton and the cell-ECM interactions are ignored.

SUMMARY OF THE PRESENT DISCLOSURE

The present disclosure provides systems and methods for the design and fabrication of a polymeric microstructure using two-photon polymerization and systems and methods for performing a displacement-controlled tensile test on a sample.

In an embodiment, the disclosure provides a method of measuring a stress-strain curve in a sample. The method includes providing a structure including a first movable island supported by a first beam, a second movable island supported by a second beam, and a gap therebetween connected by the sample wherein the sample has an initial length. The second movable island may be moved with a defined displacement. The displacement of the first movable island may be determined based on moving the second moveable island. The difference between the displacement of the first movable island and the defined displacement of the second movable island is calculated based on moving the second movable island. An applied strain in the sample is determined based on the difference dividing by the initial length of the sample. A force on the sample is calculated based on the displacement of the first moveable island. A stress on the sample is calculated based on the force. The stress-strain curve of the sample is determined by plotting the calculated stress against the applied strain.

In some embodiments, moving the second moveable island includes using atomic force microscopy (AFM). In some embodiments, moving the second moveable island includes using a nanopositioner.

In some embodiments, the structure is developed based on a nanofabricated polymeric structure using two-photon polymerization (TPP).

In some embodiments the first beam has a defined stiffness and the second beam has a defined stiffness.

The present disclosure provides an apparatus for preforming displacement-controlled tensile test of a sample. The apparatus includes a first moveable island supported by a first supporting beam having a first defined stiffness, and a second moveable island supported by a second supporting beam having a second defined stiffness. The first moveable island and the second moveable island defining a junction therebetween having an initial length.

In some embodiments, the apparatus further includes a first sample anchoring structure attached to the first moveable island and a second sample anchoring structure attached to the second moveable island. In some embodiments, the anchor is a confinement for cells. In other embodiments, the anchor is a resin or printing material. In certain embodiments, a sample coupled to the first sample anchoring structure and the second sample anchoring structure is a printed microfiber.

In some embodiments, the first moveable island and the second moveable island are attached to an optically transparent substrate. The optically transparent substrate is optically coupled to an inverted microscope configured to monitor movement of the first moveable island and the second moveable island using digital image correlation (DIC).

In some embodiments, the apparatus is configured to stretch the junction at a controlled strain rate by applying force to the second moveable island using atomic force microscopy (AFM). In some embodiments, the apparatus is configured to stretch the junction at a controlled strain rate by applying force to the second moveable island using a nanopositioner.

In some embodiments, at least a portion of the first movable island or the second moveable island is made using a low autofluorescence resin. In some embodiments, the sample anchoring structure includes a low autofluorescence resin and the method further includes performing fluorescence imaging of the sample attached to the sample anchoring structure.

The present disclosure provides systems and methods for the design and fabrication of a polymeric microstructure using two-photon polymerization and systems and methods for performing a displacement-controlled tensile test of various samples including fibers, epithelial cells, polymers, etc.

The present disclosure provides systems and methods for the design and fabrication of a polymeric microstructure using two-photon polymerization and systems and methods for performing a displacement-controlled tensile test of a pair of adherent epithelial cells. Straining the cytoskeleton-cell adhesion complex system reveals a shear-thinning viscoelastic behavior and a rate-dependent stress accumulation phenomenon that agrees with a linear cytoskeleton growth model. Further, under considerably large strain (>150%), cadherin bond dissociation exhibits rate-dependent strengthening, in which increased strain rate results in elevated stress levels at which cadherin bonds fail. The remarkable tensile strength of a single cell adhesion complex under large strains facilitated by cytoskeleton stress relaxation and cadherin bond strengthening are discussed.

A single cell-cell adhesion interrogation and stimulation platform is developed based on nanofabricated polymeric structures using two-photon polymerization (TPP). This is a platform that allows in situ investigation of stress-strain characteristics of a cell-cell junction through defined strain and strain rate. Two movable islands, supported with beams of known or defined stiffness, are mechanically coupled through the formation of a mature junction between epithelial cells on each island. Integrating the polymeric microstructure with atomic force microscopy (AFM) enables the cell pair to stretch with precisely controlled strain rates, while the deformation of the supporting beams informs the resultant stress accumulated at the cell-cell junction.

The resolution of the sensing beams, capable of resolving the discrete breakage of a few bonds, enables the study of the adhesion failure as a collection of the bond rupture events. With this technique, biophysical phenomena can be revealed at the single cell-cell adhesion interface that was previously not possible to be observed using existing techniques, promoting a paradigm shift in the mechanical characterization of cell-cell adhesions. A single cell pair system behaves like a shear-thinning viscoelastic material under tensile stress, following an active mechanosensing constitutive model. The single cell adhesion complex between an adherent cell pair fails at remarkably large strains in a symmetrical failure pattern with discrete bond ruptures at the edge of the cell-cell contact. Further, the rate-dependent dissociation of cell-cell adhesion complexes is described.

Thus, in one aspect, the disclosure provides a method of measuring a stress-strain curve in a cell-cell adhesion interface, including: providing a structure including a first movable island supported by a first beam, a second movable island supported by a second beam, and a gap therebetween connected by a pair of cells forming a junction, and the pair of cells including a cell-cell adhesion interface having an initial length defined by a distance between nuclei of the pair of cells; moving the second movable island with a defined displacement; determining a displacement of the first movable island based on moving the second movable island; calculating a difference between the displacement of the first movable island and the defined displacement of the second movable island based on moving the second movable island; determining an applied strain in the cell-cell adhesion interface between the pair of cells based on the difference divided by the initial length of the cell-cell adhesion interface; calculating a force between the cell-cell adhesion interface of the pair of cells based on the displacement of the first movable island; calculating a stress in the cell-cell adhesion interface between the pair of cells based on the force; and determining the stress-strain curve of the cell-cell adhesion interface between the pair of cells by plotting the calculated stress against the applied strain.

In some embodiments of the method, moving the second movable island may include moving the second movable island using atomic force microscopy (AFM). In other embodiments of the method, moving the second movable island may include moving the second movable island using a nanopositioner. In various embodiments of the method, the pair of cells may form the junction after culturing of the cells for a period of time. In certain embodiments of the method, calculating a stress in the cell-cell adhesion interface may include: calculating the stress in the cell-cell adhesion interface based on dividing the applied force at the cell-cell adhesion interface by a cross-sectional area of the cell-cell adhesion interface. In some embodiments of the method, the structure may be developed based on a nanofabricated polymeric structure using two-photon polymerization. In particular embodiments of the method, each of the first beam may have a first defined stiffness and the second beam may have a second defined stiffness. In certain embodiments of the method, at least one of the first defined stiffness or the second defined stiffness may be measured by deforming the first beam or the second beam using an AFM probe having a known stiffness. Various embodiments of the method may further include applying a stain to the pair of cells to visualize the cell-cell adhesion between the pair of cells and the focal adhesion points between each of the pair of cells and the structure. In some embodiments of the method, the structure may further include a cell confinement structure, wherein a first portion of the cell confinement structure may be attached to the first movable island and a second portion of the cell confinement structure may be attached to the second movable island, and each of the pair of cells may be disposed within the first portion or the second portion of the cell confinement structure such that the pair of cells forms the junction between them to connect the two movable islands. In particular embodiments of the method, moving the second movable island may include: moving the second movable island in a direction away from the first movable island. In some embodiments of the method, determining a displacement of the first movable island may include: determining a displacement of the first movable island using digital image correction (DIC). In various embodiments of the method, moving the second movable island with a defined displacement may further include: measuring the defined displacement using digital image correction (DIC).

In another aspect, the disclosure provides an apparatus for performing a displacement-controlled tensile test of a pair of cells, including: a first movable island supported by a first supporting beam having a first defined stiffness; and a second movable island supported by a second supporting beam having a second defined stiffness, the first moveable island and the second moveable island defining a junction therebetween having an initial length.

Some embodiments of the apparatus may further include a first cell confinement structure attached to the first moveable island and a second cell confinement structure attached to the second movable island. In various embodiments of the apparatus, a pair of cells may be disposed within the first and second cell confinement structures. In certain embodiments of the apparatus, the first moveable island and the second moveable island may be attached to an optically transparent substrate. In particular embodiments of the apparatus, the optically transparent substrate may be optically coupled to an inverted microscope configured to monitor movement of the first moveable island and the second moveable island using digital image correlation (DIC). In certain embodiments of the apparatus, the apparatus may be configured to stretch the junction at a controlled strain rate by applying force to the second moveable island using atomic force microscopy (AFM). In some embodiments, the apparatus may be configured to stretch the junction at a controlled strain rate by applying force to the second moveable island using a nanopositioner.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings are provided to help illustrate various features of example embodiments of the disclosure and are not intended to limit the scope of the disclosure or exclude alternative implementations.

FIG. 1, panel A is a single cell pair with junctional contacts formed on Islands 1 and 2 (each cell residing on the scaffolds on each island). To apply mechanical strain to the cell-cell junction, an AFM-based manipulation system displaces Island 2. FIG. 1, panel B shows the applied displacement strains the mutual junction between the cells and bends the vertical beam under Island 1; a force-displacement relationship can be established by recording the bending, δ, FIG. 1, panel C shows the structure was fabricated on top of a glass substrate with a height of 280 μm and a thickness of 2 μm for the vertical beams; lateral links and struts were added between the vertical beams to provide stability to the structure; this forms the double "A-shaped" beam structures that support the two movable islands; a bowtie structure was also fabricated on top of each island for cell confinement, the scale bar is 200 μm; FIG. 1, panel D shows procedures for calibrating beam stiffness in which the two islands were spaced 6 μm apart with a spacing of 2 μm between the cell-confining bowties; the space allows the two islands to be physically separated during the TPP crosslinking and allows for the formation of the cell-cell junction; the structure is held with support horizontally under the AFM setup to measure its stiffness, the scale bar is 50 μm, FIG. 1, panel E shows the AFM probe approaches the structure and applies force until a force set point is achieved, it then retracts; the AFM records the applied force, $P_{AFM}$, and vertical displacement of the piezo head, d; the vertical structure displacement, $\Delta x_{act}$, and deflection of the AFM probe, $\Delta x_p$, are also represented and are determined from the AFM output, FIG. 1, panel F shows an averaged force, $P_{AFM}$, vs. displacement, d, plot from the stiffness calibration measurement; both the approach and withdrawal were averaged when extracting the actuating structure stiffness; the inset image was taken during the stiffness measurement and shows the probe applying force onto the structure.

FIG. 2, panel A shows cell deposition onto the fabricated structure and shows the ability to place cells in the opposing bowtie confinement scaffolds; FIG. 2, panel B is a pair of cells formed into a mature cell-cell junction 16 hours after cell deposition and incubation as shown by the expression of E-cadherin GFP; the cell junction spans across the gap between the two movable islands; cells were stained for actin and the nucleus; FIG. 2, panel C demonstrates the biocompatibility of the structures, A431 GFP-tagged E-cadherin cells were deposited and after 16 hours, actin filaments were stained; E-cadherin shows the cell-cell junction formation and actin filaments show that cells spread over the structure; FIG. 2, panel D shows that zyxin and actin were stained to visualize the formation of cell-ECM adhesion (focal adhesion), confirming that cells successfully attach to and grow on the structures; FIG. 2, panel E shows a time-lapse study of cell growth after deposition was performed to find the optimized time for the stretch test; images show that cells do not form a junction before 8 hours, form a mature junction after 16 hours, and begin proliferating after 24 hours; in order to stretch a single cell pair, all experiments were performed around 16 hours after cell deposition; scale bars: FIG. 2, panel A: 100 μm; FIG. 2, panels B-E: 50 μm.

FIG. 3, panels A and B show a stretch test of a single cell pair with a 0.5% $s^{-1}$ strain rate that shows a smooth stress-strain curve with a 50 μm displacement of island 2; the cytoskeleton and the cadherin bonds were stretched to a maximum strain of 221.8% without structural failure; the series of optical images of the cell-cell junction show that cytoskeleton remodeling dominates the response at low strain rate; data in FIG. 3, panel B represents results from 11 tests; the red curve (Rep. test) displays the stress-strain curve corresponding to the test in FIG. 3, panel A; the same applies to the following strain rates; FIG. 3, panels C and D show a stretch test of a single cell pair performed at 5% $s^{-1}$ strain rate with 50 μm displacement of island 2 that shows the cadherin bonds begin to rupture at 39% strain; stiffening helps the junction to partially recover, resulting in a plateau region in the stress-strain curve until it fails at 217.8% strain; since the bond ruptured slowly, the stress at the rupture point is less than the other two strain rates; data in FIG. 3, panel D represents results from 12 tests; FIG. 3, panels E and F show a stretch test of a single cell pair performed at 25% $s^{-1}$ strain rate with 50 μm displacement of island 2 that shows the cadherin bonds begin to rupture at 90% strain; data in FIG. 3, panel F represents results from 7 tests; FIG. 3, panels G and H show a stretch test of the single cell pair at 50% $s^{-1}$ strain rate with 50 μm displacement of island 2 shows the bond ruptured suddenly at its failure point; data in FIG. 3, panel H represents results from 7 tests; scale bars: FIG. 3, panels A, C, E, and G: 50 μm; inset in FIG. 3, panels B, D, F, H: 15 μm.

FIG. 4, panel A is a diagram of the modified standard linear solid (MSLS) model that was used for fitting experimental data; the model consists of two branches, an elastic branch (top) consisting of a linear spring that represents the stiffness of the cell membrane ($E_1$) and a Maxwell branch (bottom) consisting of a spring ($E_2$) and a dashpot ($\eta$), representing the stiffness and viscosity of the intercellular components, respectively; the spring $E_2$ represents the collective modulus of the cytoskeleton (inset of FIG. 4, panel A); the growth model depicts the rate change in the resting length of the spring in the Maxwell branch ($\dot{\varepsilon}_0$) as proportional to the strain rate in that spring ($\dot{\varepsilon}_{S2}$); FIG. 4, panels B and C illustrate stress-strain curves obtained by applying stretch at different strain rates (0.5% $s^{-1}$, 5% $s^{-1}$, 25% $s^{-1}$, and 50% $s^{-1}$), the curves were fitted using the constitutive equation according to the MSLS model; FIG. 4, panels D-F illustrate box plots comparing the values of $E_1$ (FIG. 4, panel D), $\eta$ (FIG. 4, panel E) and $\alpha$ (FIG. 4, panel F) obtained from fitting the modified MSLS model on stress-strain curves for different strain rates; FIG. 4, panel G shows the logarithm of the viscosity of the cytoskeleton decreases linearly with respect to the logarithm of the strain rates, suggesting the rate dependent shear-thinning viscous behavior of cells; FIG. 4, panel H illustrates the stress-strain curves obtained by stretching cells treated with CN01 and Bleb, as well as control, at the rate of 0.5% $s^{-1}$ were fitted using the constitutive equation derived from the MSLS model; FIG. 4, panels I-K are box plots comparing the values of $E_1$ (FIG. 4, panel I), $\eta$ (FIG. 4, panel J) and $E_2$ (FIG. 4, panel K) obtained from fitting the modified MSLS model on stress-strain curves for cells treated with CN01 and Bleb; for each box plot, the number of experiments is indicated on top of each graph; *: $p<0.05$, **: $p<0.01$.

FIG. 5, panel A is a representative force-displacement curve at 5% $s^{-1}$ strain rate that shows a typical response in necking and stiffening in fracture tests, as indicated by the arrows in the plot; three representative regions are shown in the inset; the drop in force between each data point represents the bond rupture events while the slight increase in force represents stiffening; FIG. 5, panels B and C illustrate a region of interest (ROI) of the force-displacement curve (black curve) and junction length (blue curve) that is shown in more detail (FIG. 5, panel B) with the outline of each cell traced in corresponding frames (FIG. 5, panel C); the overlay shows the change in cell-cell junction length and the shape of each cell over the rupture event (dark red in the first frame and light red in the last frame); FIG. 5, panel D shows stress levels at which the initiation of bond rupturing occurs for the tensile tests at different strain rates: 5% $s^{-1}$, 25% $s^{-1}$, and 50% $s^{-1}$; FIG. 5, panel E shows strain levels at which the initiation of bond rupturing occurs for the tensile tests at different strain rates: 5% $s^{-1}$ (n=13), 25% $s^{-1}$ (n=16), and 50% $s^{-1}$ (n=7); FIG. 5, panel F shows average stress-strain curves for tensile tests at 5% $s^{-1}$ on cells with E-Cad siRNA knockdown and control siRNA; FIG. 5, panel G shows stress levels at which the initiation of bond rupturing occurs for the tensile tests at 5% $s^{-1}$ on cells with E-Cad siRNA knockdown (n=6) and control siRNA (n=8); FIG. 5, panel H shows strain levels at which the initiation of bond rupturing occurs for the tensile tests at 1 μm/s on cells with E-Cad siRNA knockdown (n=6) and control siRNA (n=8); *: $p<0.05$; scale bars: inset FIG. 5, panel C: 25 μm.

FIG. 6, panel A is a simplified illustration of the cell-cell adhesion junction with actin filament connected by E-Cad at the cell-cell contact; note that intermediate filaments and desmosomes are considered part of the mechanical contribution except the growth capacity; FIG. 6, panel B shows that at low strain rate, in addition to cadherin enhancement, cytoskeleton alignment and growth compensates the increased stress by the applied strain, and thus total bond rupture does not occur even at very large strain (250%); FIG. 6, panel C illustrates that at an intermediate strain rate, cytoskeleton remodeling through alignment and growth fail to relax all the stress produced by the continuously applied strain, thus the accumulation of stress leads to partial and gradual bond rupture before a full fracture of the cell adhesion complex; FIG. 6, panel D illustrates that at high strain levels, there is simply no time for cytoskeleton remodeling, thus a rapid accumulation of stress leads to a sudden fracture of the cell adhesion complex.

FIG. 7, panel A is a horizontal beam design with 5 parallel beams attached to the sensing island and 1 pair of beams attached to the actuating island; this design had the highest stiffness ($K=1e^5$ N/m) and was not able to measure the junction stress; scale bar=50 μm; FIG. 7, panel B is a horizontal beam design with 3 pairs of beams attached to the sensing and actuating islands, with the width decreased from 5 μm to 2.5 μm and length increased from 80 μm to 150 μm; the new stiffness was 4.6 N/m which is not low enough to measure the junction stress; scale bar=100 μm; FIG. 7, panel C is a horizontal beam design in which the sensing island beams are changed from the straight to the serpentine design which is less stiff, this design had 1.05 N/m stiffness which is still too stiff to measure the junction stress; scale bar=100 μm; FIG. 7, panel D illustrates force versus displacement of different designs plotted to compare and find their stiffness.

FIG. 8, panel A shows the vertical beam design was less stiff compared to the horizontal beam design and more stable during fabrication; the new design had a height of 280 μm and its stiffness was 0.22 N/m, which allows measurement of the junction stiffness; scale bar=50 μm; FIG. 8, panel B shows that the double A-shape design solved the background noise issue but it was not stable during fabrication and collapsed; scale bar=200 μm; FIG. 8, panel C shows the double A-shape design with the supporting truss was the final design because of its stiffness and stability; scale bar=50 μm; FIG. 8, panel D shows the force versus displacement of the vertical beam designs plotted to compare and find their stiffness.

FIG. 10, panel A illustrates 25 μm displacement and sudden release; scale bar: 50 μm; FIG. 10, panel B shows displacement versus time for the 25 μm displacement; scale bar: 25 μm; FIG. 10, panel C illustrates 50 μm displacement and sudden release; FIG. 10, panel D shows displacement versus time for the 50 μm displacement; scale bar: 25 μm.

FIG. 11, panel A shows a cell that is targeted and the microcapillary approaches the cell using the 3D manipulator; FIG. 11, panel B shows a negative pressure applied with the pressure controller to aspirate and hold the cell; FIG. 11, panel C illustrates the manipulator moving the cell to the structure and a positive pressure is applied to deposit the cell on one of the islands; FIG. 11, panels D-F show the same steps performed to aspirate and deposit the second cell on the other island.

FIG. 12, panel A shows four representative frames for the actuating island depicting the initial and displaced markers used for displacement tracking; FIG. 12, panel B illustrates that the corresponding representative frames for the sensing island are shown with the initial and displaced markers; the number of markers is reduced for clarity; in the real calculation, one marker is assigned to each pixel in the ROI; FIG. 12, panel C shows parameter definitions for the strain and stress calculation.

FIG. 13, panel A: Control DMSO; FIG. 13, panel B: CN01; FIG. 13, panel C: Bleb; scale bar: 50 μm.

FIG. 15, panel A illustrates A431 GFP-E-cadherin cells transfected with control siRNA or E-cadherin siRNA; at 48 hours post-transfection, expression levels of E-cadherin protein were determined by immunoblot; actin protein levels were not affected by the transfection of the siRNA; the expected band size is 120 kDa; FIG. 15, panel B illustrates a GFP signal in GFP-tagged E-cadherin cells observed by fluorescence microscopy.

FIG. 16, panel A shows the micro-tensile testing (μTT) platform with two A-shaped vertical beams bridged by microfibers. FIG. 16, panel B,C shows a two-stage dip-in TPP process for a layer-by-layer fabrication of the μTT platform, where panel B shows the writing of the IP-S based vertical beams and panel C shows the writing of the IP-Visio testing fibers in-between. FIG. 16 Panel D is a SEM image of the fabricated structure arrays after the two-stage TPP. Scale bar: 250 μm. FIG. 16, panel E is a SEM image of the fabricated IP-S platform (colored in blue) bridged by the IP-Visio fiber (colored in green). The vertical sensing and actuation beams are 280 μm in height and 15 μm in thickness; and the microfiber is 20 μm in length. Scale bar: 100 μm. FIG. 16, panel F is the stiffness of the sensing beam is calibrated using AFM based force-displacement curves for both air (dark blue curve) and water conditions (light blue curve). The inset shows the diagram and the optical image of the AFM probing process (scale bar: 100 μm). Data is fitted to obtain the stiffness (air-fit, water-fit). FIG. 16, panel G-I is the calculated stiffnesses of the sensing beam in air and water are shown for beams with thickness of 15 μm, 10 μm and 2 μm.

FIG. 17, panel A is a representative sequence of a tensile test consisting of images obtained during the phases of stretch, hold, return, and recovery. The DIC method works by tracking the dumbbell pattern (blue rectangle), the edge of the structure (red line), and the fiber itself (green). FIG. 17, Panel B is a displacement of the actuation structure of the μTT, d, for a set of experiments. Inset shows the overview of the experimental parameters. FIG. 17, panel C shows the displacement of the sensing structure, δ, represented by the left y-axis. The force is found from the displacement, F=kδ, and is represented by the right y-axis. FIG. 17, panel D shows the experimental strains throughout the experiment. The blue curves represent the device strain $\varepsilon_D$=d−δ/$L_o$, defined by the difference between the forcing structure displacement, d, and the sensing structure displacement, δ over the initial length, $L_o$. The strain measured by the deformation of the fiber, fiber strain $\varepsilon_f$, and represented by the green line, captures the fiber deformation. FIG. 17, panel E is averaged stress vs. strain curve of the full experiment. The curve is colored to represent the different parts of the experiment, Stretch, Hold, Return, and Recovery. The stretch and hold portions are obtained from the device strain, while the Return and Recovery portion is obtained from the fiber strain.

FIG. 18, panel A is the main processing controls associated with the TPP process include the laser system, the photo-resin, and the 3D motion system. The figure shows the dip-in method used in the fabrication of the beams and fibers used in the experiments. FIG. 18, panel B is the imaginative figure of the fluidic photo-resin. Associated parameters are listed to the right. FIG. 18, panel C is the Laser Parameter Descriptions: laser wavelength, δ, pulse duration, $\tau_{pulse}$, refraction angle, θ, laser waist, $r_\lambda$, refractive index of the photoresist, $\eta_{PR}$, numerical aperture, NA.

FIG. 19, panel A shows IP-S by stretching the fiber with a displacement of 20 μm in both air and water conditions. FIG. 19, panel B shows IP-Visio by stretching the fiber with a displacement of 10 μm and 20 μm in air and water conditions, respectively. FIG. 19, panels C-E show IP-Visio in water with different writing parameters. Panel C shows the data from fibers with different laser power during writing (70%, 80% and 90%); Panel D shows the data from fibers with different designed writing cross-sections (1×2 $\mu m^2$ and 3×2 $\mu m^2$); Panel E shows the data from fibers with different writing speed (20 mm/s and 10 mm/s).

FIG. 20, panel A shows stress-strain curves (i) as well as Young's modulus (ii), yield strength (iii), and relaxation time (iv) collected under different displacement rates (0.2 μm/s, 2 μm/s, 20 μm/s) on fibers with the same dimension and fabricated with the same set of writing parameters. FIG. 20, panel B shows stress-strain curves of varied strain rate experiments which resulted in failure. FIG. 20, panel C shows fracture strain vs. strain rate evaluation of experiments which resulted in failure. FIG. 20, panels D and E show SEM images of TP-Visio fibers produced under the same conditions. The control fiber, which was not tested (panel D), and a fiber which was strained to failure (panel E). Inset of panel E displays a zoomed in cross section image of the failure point, showing a rough fracture surface. Scale bar: Panel D, 10 μm, Panel E, 10 μm, inset of Panel I, 500 nm.

FIG. 21, panel A shows strain evolution of the shape recovery in air (red) followed by the addition of water (blue). Inset plot (vii) shows the device strain and beam strain during the stretch-return (the first 45 seconds). Inset images (i-vi) show the fiber strain and recovery of the strain with addition of water. FIG. 21, panel B shows the strain recovery for microfibers with three different cross-sections (7.2, 4.4 and 0.7 $\mu m^2$, with test images in inset i, ii and iii) and the fit (dashed line) to obtain the recovery time constant (τ). FIG. 21, panel C shows the scatter plot shows the correlation of the fiber cross-section area and τ calculated in panel B. FIG. 21, panels D-F show strain (panel D) and stress (panel E) evolution and stress-strain relationship (panel F) during the four stretch-recovery tests. FIG. 21, panel G shows calculated Young's modulus (i), yield strength (ii), relaxation time (iii) and recovery time (iv).

FIG. 22, panels A and C show top and side view of the μTT structure (scale bar: 100 μm). FIG. 22, panels B and C shows top and side view fiber measurements (scale bar: 5 μm). Measurements were taken using imageJ. 5-6 equally spaced measurements were taken across the length of the fiber and averaged. FIG. 22, panels E is visualization of finding the area of the fiber. The fiber was designed with rectangular geometry, due to the TPP process the edges were more rounded, thus the shape was approximated as shown. The side view measurements were taken at an angle of 45°, thus corrections were needed to estimate the height.

FIG. 23, panels A-D show substrate sets compared with like sets. It can be observed that trends within single substrates follow that increased laser power, slower writing speeds, and increased design dimension lead to larger fiber areas. However, batch to batch variations induce some deviation with regard to writing parameters and fiber area.

FIG. 24, panel A shows SEM measurements of some key features, including the structure beams, which were all 15 μm. FIG. 24, panel B shows experimental AFM testing. FIG. 24, panel C shows force relaxation of the sensing structure during AFM testing. FIG. 24, panel D shows raw AFM data for the approach curve. The deflection initiation point was selected. FIG. 24, panel E shows fitting of the Structure Deflection to find the structure stiffness. The smoothed AFM deflection curves were used to calculate the structure deflection and were subsequently fit to find the stiffness. FIG. 24, panel F shows geometric considerations used for developing the beam theory model. FIG. 24, panel G shows scale model testing of the structure. FIG. 24, panel H shows Beam theory model predictions. FIG. 24, Panel I shows the fitting of the scale model deflection by using the beam theory with a fit modulus. The modulus values were within 20% of the accepted material property (RGD450, E_fit=1.4 GPa, E_accepted=1.7 GP).

FIG. 25, panel A shows Yield Stress and Modulus are found from the stretch portion of experiments. A point near the yield stress is selected and then a curve is produced to fit from the beginning of the experiment to the yield point. Then the first 15% of the fit curve is used to determine a linear modulus fit. The 2% offset yield strength was then found. FIG. 25, panel B shows the hold portion of the experiment is fit and used to find the stress relaxation time. FIG. 25, panel C shows the recovery portion is fit to find the recovery time (4.4 $\mu m^2$ fiber cross section area).

FIG. 26, panels A and C show Young's Modulus average for water and air experiments, IP-Visio (panel A), IP-S (panel C). It should be noted that the IP-Visio Air condition is likely an under-average estimation of the average modulus (see estimated value in panel E). FIG. 26, panels B and D show Yield Strength average for water and air experiments, IP-Visio (panel B), IP-S (panel D). Again, for IP-Visio, air is likely an underestimate due to limited testing relative to water condition. FIG. 25, panels E and F show IP-Visio (panel E) and IP-S (panel F) total tensile testing averages, for all samples and comparison to nano-indentation value, and a literature value for IP-S.

FIG. 27, panels A-C show comparisons of writing powers (panel A), design dimension (panel B), and writing speed (panel C), on like fibers. For all experiments, Stress-strain curves (i), Young's modulus (ii), and yield strength (iii). Labels: Writing Power, Writing Speed, Design Dimension, Condition, Displacement Rate, Displacement Distance.

FIG. 29, panels A and B show Designed Fiber Dimension, (1w×2h μm vs. 3w×2h μm). For all experiments, Stress-strain curves (i), Young's modulus (ii), and yield strength (iii). Labels: Writing Power, Writing Speed, Design Dimension, Condition, Displacement Rate, Displacement Distance.

FIG. 31, panel A shows three consecutive five-pull and then recovery experiments conducted. That is, induced stress strain and recovery is repeated. The beam strain is overlayed on the device strain, indicating full recovery is not allowed to occur before the next set of straining. FIG. 31, panels B-D show enhanced observation of the second five consecutive pulls and recovery experiment. Panel B, Strain vs. Time curve, Panel B, i shows the 5 consecutive multi-pull with the beam strain overlaying the device strain. Panel C shows Stress vs. Time curve, panel C, i shows the consecutive stress peaks associated with each pull. It can be observed that there is a decrease of maximum stress on each pull, which, because stress and strain are coupled, means that there is an increase of strain for each pull. Panel D shows Stress vs. Strain of the five consecutive pull experiment. Beam recovery occurred nominally.

FIG. 33, panels A and B show IP-Visio disk (panel A) and IP-S disk (panel B) imaged under brightfield and fluorescent channels. FIG. 33 panels C and D show A431 cells stained for nucleus, F-actin, and zyxin and imaged on top of IP-Visio (panel C) and IP-S (panel D) disks. FIG. 33, panel E shows average intensity of IP-Visio and IP-S disks with no cells and average intensity of the selected stains for the respective channel of cells off disks.

FIG. 34, panel A shows the working mechanism of SCAμTT platform. Two cells are placed inside the cell confinement region that form a cell-cell junction across the gap between the islands. Island 2 is displaced with an AFM tip, and island 2 is bent under the force in the junction. FIG. 34, panel B shows SEM image of SCAμTT platform fabricated with IP-S. FIG. 34, panel C shows Brightfield image a pair of A431 cells stretched to 20 μm. FIG. 34, panel D shows the Young's modulus of crosslinked IP-S and IP-Visio determined with a nanoindenter. (separate).

FIG. 35, panel A shows two-stage fabrication of hybrid SCAμTT platform, in which IP-S vertical beams are crosslinked first, followed by IP-Visio plates. FIG. 35, panel B is an SEM image of hybrid SCAμTT platform, (IP-S colored in blue, IP-Visio colored in red). FIG. 35, panel C shows fabrication of apertures integrated into the glass slide. FIG. 35, panel D and E show a brightfield image of hybrid SCAμTT platform without (panel D) and with (panel E) integrated apertures. Scale Bars: 100 μm (panel B).

FIG. 36, panels A-C show the fluorescent image of SCAμTT platform fabricated from IP-S (panel A) and hybrid SCAμTT platform without (panel B) and with (panel C) integrated apertures. FIG. 36, panels D-F show the fluorescent and brightfield image overlay of the same three platforms. FIG. 36, panel G shows the average fluorescent intensity of the three platforms within the bowtie confining region. FIG. 36, panel H shows the average fluorescent intensity within bowtie confining region of the hybrid platform without and with integrated apertures compared to background signal obtained from images with no SCAμTT platforms.

FIG. 37, panel A shows (i) The half-angle θ formed from the height of the platform and the diameter of the aperture determine the maximum cone of light that can be captured by a microscope. (ii) If the angle is larger than the half-angle determined by the optics of the image collection system a, signal is not lost. (iii) if the angle is smaller, signal is lost. FIG. 37, panels B and C show the average intensity (panel B) and signal-to-noise (SNR) ratio (panel C) of nuclei imaged on SCAμTT platforms of varying angles, with no aperture representing 90°. FIG. 37, panels D-L show the representative images of cells stained on SCAμTT platforms with a small angle which restricts signal collection (panels D, G, J), a large angle with minimal interference on signal collection (panels E, H, K), and with no apertures (panels F, I, L). Images were captured on a standard fluorescent microscope (panels D-I) and a confocal microscope (panels J-L). FIG. 37, panels M and N show a pair of HaCaT cells stained for F-actin and nucleus and stretched to 50 μm (panel M) and the resulting stress-strain curve (panel N). Scale Bars: 20 μm (D), 20 μm (M) (separate).

DETAILED DESCRIPTION OF THE PRESENT DISCLOSURE

Figure 1:
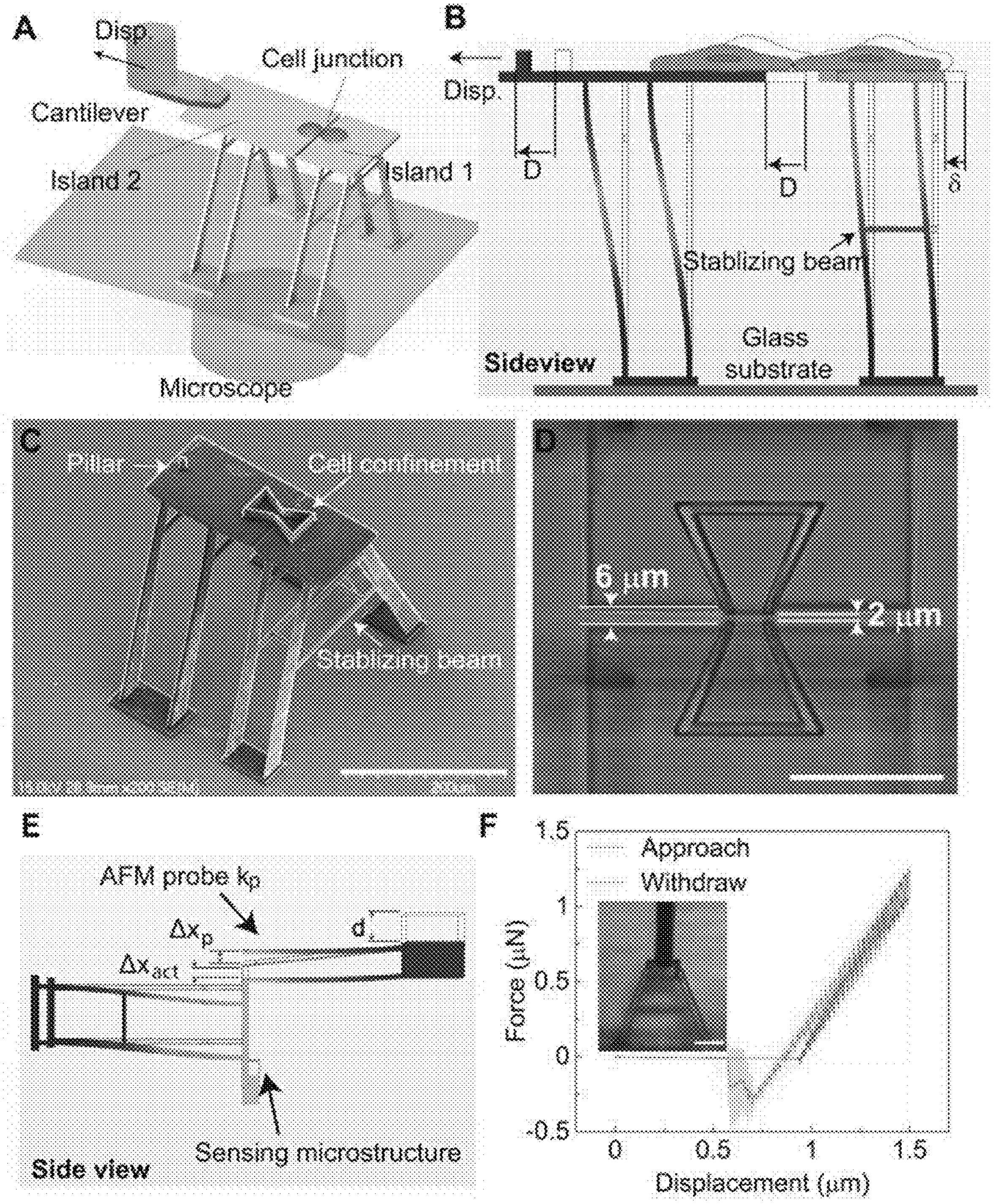
FIG. 1 is a single cell-cell adhesion interface mechanical characterization platform.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

The term "about," as used herein, refers to variation in the numerical quantity that may occur, for example, through typical measuring and manufacturing procedures used for articles of footwear or other articles of manufacture that may include embodiments of the disclosure herein; through an inadvertent error in these procedures; through differences in the manufacture, source, or purity of the ingredients used to make the compositions or mixtures or carry out the methods; and the like. Throughout the disclosure, the terms "about" and "approximately" refer to a range of values±5% of the numeric value that the term precedes.

A Single Cell Adhesion Complex Mechanical Characterization Platform

A microstructure (i.e., a structure with micrometer-scale features) has been designed and fabricated to interrogate the mechanical behavior of the cell-cell adhesion complex under large strain (FIG. 1A). This structure, fabricated from IP-S using TPP, consists of two movable islands on top of vertical "A-shaped" beams with known or defined stiffness. A pair of epithelial cells are deposited onto the movable islands with one on each side. The formation of a mature cell-cell junction between the cell pair (which can be two of the same type of cell or two different kinds of cells) mechanically couples the two islands. To interrogate the mechanical responses of the cell pair, Island 2 is displaced using a nanopositioner from an AFM system by capturing the pillar on it within a through-hole in the AFM probe in a precisely controlled manner, while Island 1 is consequently displaced by the tensional force transmitted through the cell-substrate adhesion and the cell-cell junction. The device is integrated on top of an inverted microscope for monitoring the displacement of the islands, from which the deformation of the supporting beams is determined with digital image correlation (DIC). Island 1, therefore, functions as a force sensor that can be used to measure nano-Newton range forces by relating its displacement to the spring constant of the beam that supports it (FIG. 1B).

Design, Fabrication, and Mechanical Characterization of the Sensing Structures

The stiffness of the beams was designed to be as close to the stiffness of the cell junction (0.01 N/m-0.5 N/m) as possible to acquire the best balance between force-sensing resolution and applied strain to the cell-cell junction, with the ability to measure a stress range of 0-12 kPa and force range of 0-50 nN at the junction. Compared with horizontal beams, vertical beams offer greater control of their length which allows for easy adaptation to this desired stiffness and offers better structural stability during the TPP fabrication process (as discussed below with reference to FIGS. 7 and 8). A set of vertical "A-shaped" beams (280 μm in height, 2 μm in thickness) were designed and fabricated considering different constraints in beam stiffness, beam stability, fabrication limitations, and imaging requirements. To confine the migration of the deposited cells, a bowtie structure was designed and fabricated with one trapezoid on each island. The area of the trapezoid and the length of its opening edge were optimized to preserve the physiological conditions for cell growth (FIG. 1C). The gap between the two movable islands, particularly between the bowtie opening where junction forms, should be kept to a minimum to facilitate junction formation, but a gap distance of less than 2 μm leads to unwanted polymerization of the resin during the fabrication process and tethers the two islands. The gap of the non-bowtie region was increased to 6 μm to reduce the risk of attachment of the islands (FIG. 1D).

To measure the stiffness of the "A-shaped" beam structure, a tipless cantilever probe with a known and thermally tuned stiffness was used to apply force on an isolated sensing structure with beam thickness of 6 μm (FIG. 1E). Using the displacement of the probe and the force measurement from the AFM probe, the deflection of the microstructure and subsequently, the stiffness was determined. For each measurement, the automated detection of the AFM was used to initiate contact between the probe and the structure. Once contact was established, a constant rate of probe displacement was initiated to apply force on the structure until the force set point was achieved. The probe was then retracted until it was no longer in contact with the structure before beginning the process again. This produced the force displacement curve from which a stiffness of the beam can be extracted (FIG. 1F). The calculated beam stiffness is 0.041±0.004 N/m under liquid conditions, which is within the desired range (as discussed below with reference to FIG.

9). TPP printing parameters, including laser power and scan speed, can have significant influence on the measured stiffness. In addition, the use of liquid also significantly reduces the stiffness of polymerized structures. Considering the resolution of DIC of a few tens of nanometers, this sensing beam stiffness can resolve the forces of a few cadherin bonds. Further, the elastic behavior of the sensing beam is confirmed with a stretch-and-release experiment showing negligible plastic deformation (as discussed below with reference to FIG. 10).

Formation of Cell-Cell Adhesion Junctions on the Platform

Figure 2:
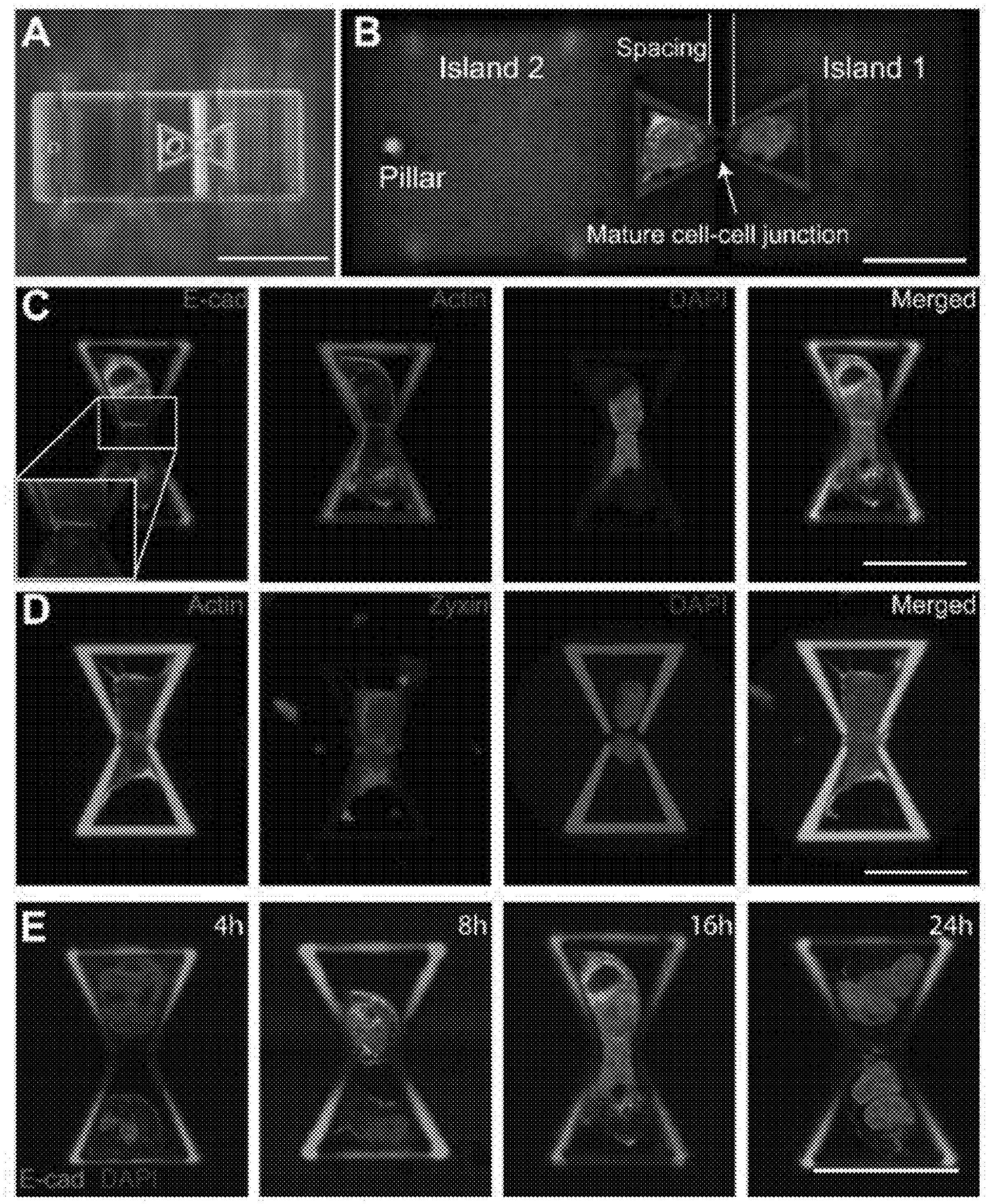
FIG. 2 is a cell-cell adhesion formation and cell growth on the scaffolds.
Figure 11:
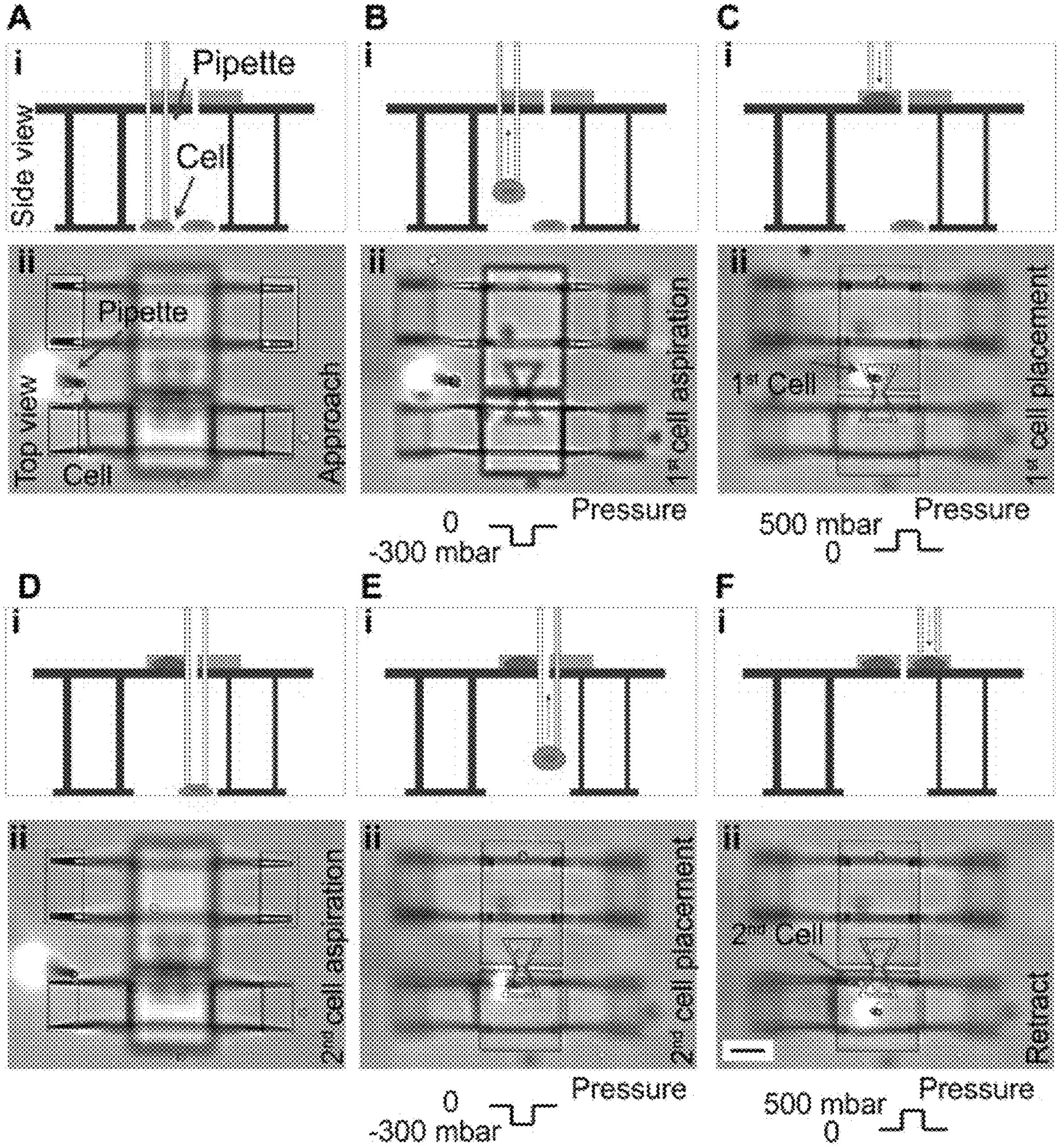
FIG. 11 illustrates a cell deposition procedure.

Cells are deposited into the bowtie structure using an Eppendorf single cell isolation setup which includes a pressure controller, a 3D manipulator, and microcapillary (as discussed below with reference to FIG. 11). To enhance cell attachment to the structure, fibronectin was used as the extracellular matrix (ECM) coating. As shown in FIG. 2A, a pair of A431 cells were successfully deposited and placed inside the bowtie structure. E-cadherin GFP-tagged cells were used, and 16 hours (h) after deposition and incubation, cells were stained for F-actin and nucleus. A mature junction is formed between the A431 cell pair by expressing E-cadherin, which bridges the gap between the two islands and mechanically couples them (FIG. 2B). The immunofluorescence images of these cells on the structure prove the biocompatibility of the polymer. E-cadherin expression shows the cell-cell junction formation and actin staining shows that cells spread on the structure (FIG. 2C). Staining zyxin, a focal adhesion protein, together with actin confirms that cells successfully form focal adhesions on the structure (FIG. 2D). To find the best time for mechanical characterization after cell deposition, a time-lapse study was performed (4 h, 8 h, 16 h, 24 h). The results showed that cells do not form a mature junction before 16 hours. However, they start proliferating after 24 hours, resulting in more than two cells within each bowtie confinement. Therefore, all experiments were conducted around 16 hours after cell deposition and incubation (FIG. 2E).

Displacement-Controlled Mechanical Characterization of the Cell-Cell Adhesion Interface To apply strain to the cell-cell junction, the test platform was placed with deposited cells under the AFM integrated with an inverted microscope. An AFM probe with a through-hole drilled at the front end using a focused ion beam (FIB) is positioned above the micropillar on Island 2 and then lowered to capture it within the through-hole. With this, displacement was applied and displacement rates were tried to investigate the mechanical behavior of the cell-cell junction with obtained stress-strain curves (as discussed below with reference to FIG. 12).

Figure 3:
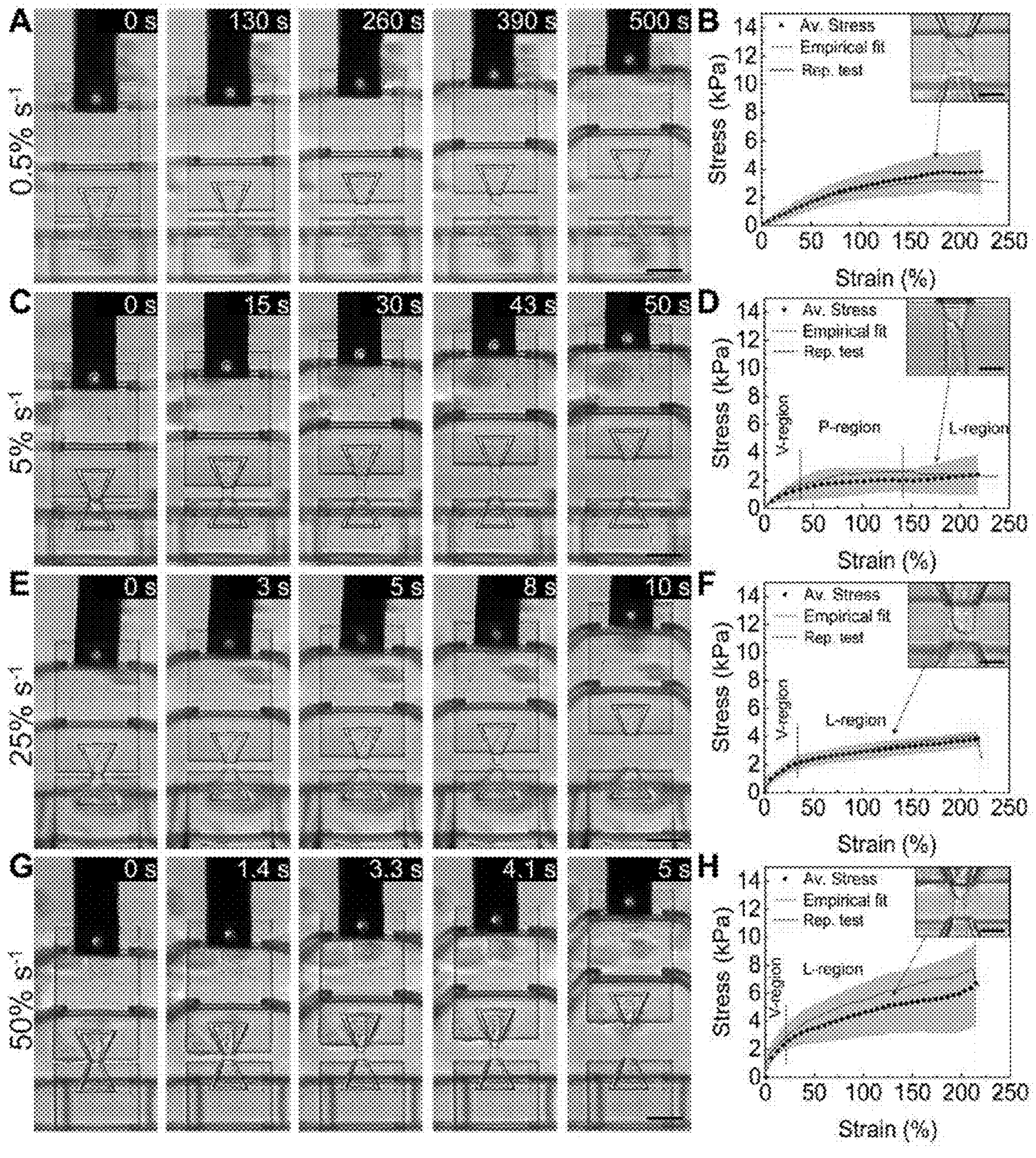
FIG. 3 is a displacement-controlled mechanical characterization of a single cell adhesion complex at different strain rates.

Four strain rates were examined ranging from 0.5% $s^{-1}$ to 50% $s^{-1}$ and different modes of stress relaxation and cell-cell adhesion failure were observed that are strongly strain-rate dependent. A 0.5% $s^{-1}$ strain rate (100 nm/s in displacement rate) was applied and substantially none of the junctions failed at the end of the 50 μm displacement. The stress-strain curve exhibits a typical viscoelastic behavior wherein the stress increases nonlinearly with a decreasing rate as the strain increases. A typical set of time series images shows that there is no sign of rupture in the cell-cell junction, which was elongated to 221.8±8.0% strain and tolerated maximum stress of 3.8±1.6 kPa (FIGS. 3A and 3B). Under a strain rate of 5% $s^{-1}$, cell-cell junctions begin to show some signs of rupture through a gradual necking process seen in the time series images and experience a maximum strain of 217.8±10% and stress of 2.4±1.4 kPa at the point of failure (FIGS. 3C and 3D). The stress-strain curve shows three different regions: a viscoelastic region from 0 to 39% strain, a plateau region from 39% to 142% strain (i.e., necking process), and a linear region up to failure at 217.8% strain. Similar observations can be made from a strain rate of 25% $s^{-1}$ with a less obvious plateau region, a higher stress level at failure, and more rapid and complete junction failure (FIGS. 3E and 3F). The existence of a stress plateau is due to the dissociation of cell-cell adhesion complexes which is able to fully dissipate the stress induced by mechanical stretching. However, the stress can only be partially dissipated when the strain rate further increases and therefore continues to rise as the strain level increases. At a 50% $s^{-1}$ strain rate, the stress-strain curve starts with a viscoelastic region, followed by a linear region up to the rupture point. The intersection of the two regions is at around 2.7 kPa stress (25% strain). A stress level of 6.7±3.01 kPa was observed at the failure point and it failed at 215.1+37.0% strain (FIGS. 3G and 3H). The gradual disappearance of the plateau region from low strain rate to high strain rate tests suggests that stress accumulation at high strain rate due to lagging and inadequate stress relaxation.

Tensile tests demonstrate that the cell pair can withstand a remarkably large strain level before it fails through cell adhesion rupture. At low rates, the cell-cell junction remains largely intact even when the strain is higher than 200%. Comparing with the 50% $s^{-1}$ strain rate, the lower maximum stress under the strain rate of 0.5% $s^{-1}$, where cell-cell adhesion complexes remain largely intact, indicates the existence of another effective stress dissipation scheme inside cells. Considering the dynamic nature of cytoskeletons among all the intracellular structures, the mechanical stress can be dissipated via remodeling and reorganization of their cytoskeletons. However, under high strain rates, the cell pair dissipates stress primarily through the dissociation of cell-cell adhesion complexes and complete breakage occurs at a strain level of ~200%. In addition, all failures occur at the cell-cell contact symmetrically through the rupture of the cell-cell adhesion complex. The image series of the tensile test (FIGS. 3A, 3C, 3E, and 3G) and the zoom-in images of the cell-cell adhesion region (inset of FIGS. 3B, 3D, 3F, and 3H) show decrease in the length of the mutual cell junction until complete separation, suggesting intermediate bond dissociation is accompanying the straining process which leads to ultimate cell adhesion complex failure. The absence of asymmetrical failure, potentially at the cytoskeleton to cell membrane tether at one side of the cell pair, implies that the cell-cell adhesion complex represents the weakest link in the cytoskeleton-cell adhesion-cytoskeleton system. Moreover, the rupture of the cell-cell adhesion complex occurs gradually at lower strain rates, like unzipping a zipper, with localized snap and retraction of cytoskeleton near the failure point at the edge of the cell-cell contact.

Figure 4:
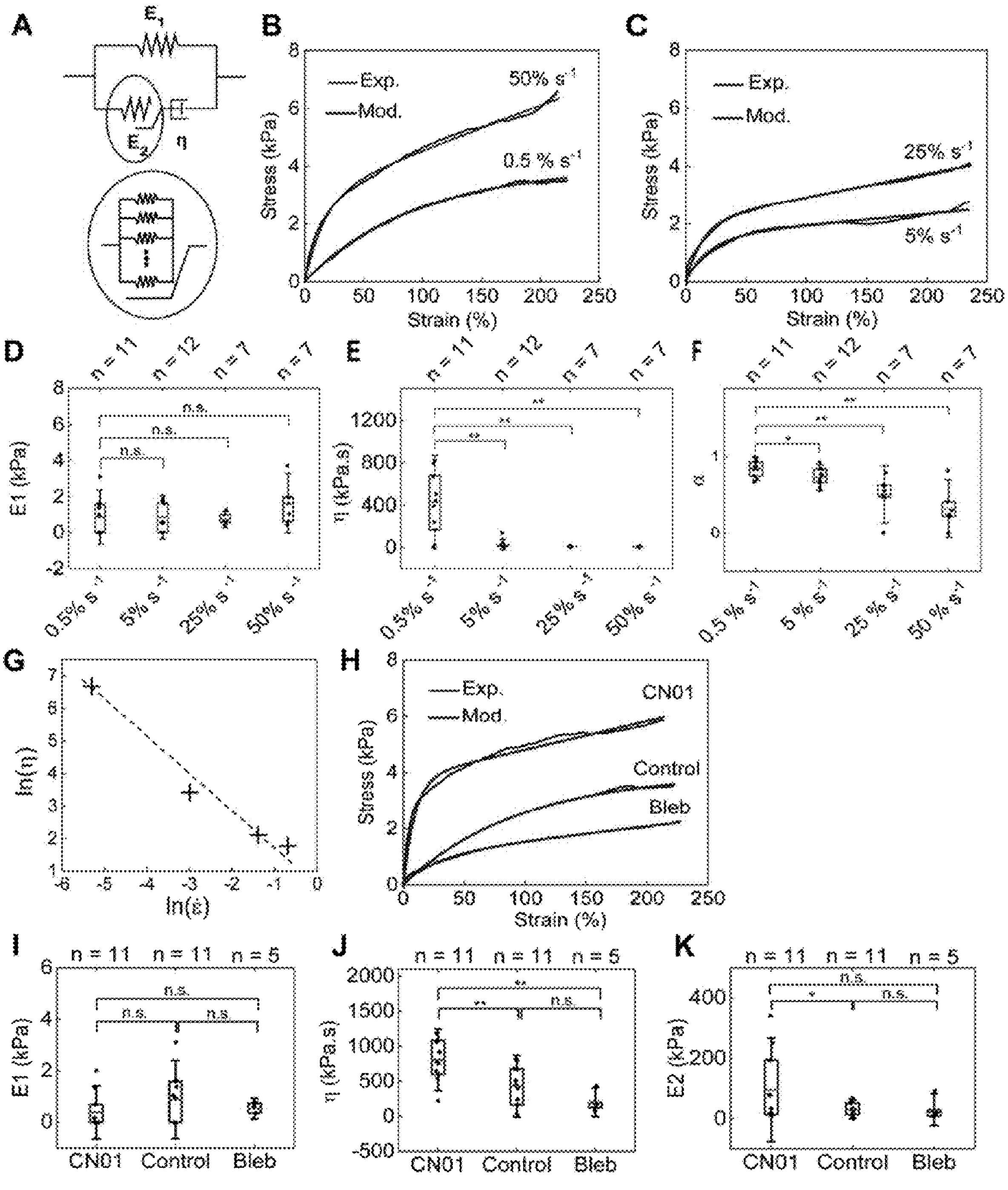
FIG. 4 shows a strain-rate dependent and actomyosin contractility controlled viscoelastic behavior of the cell pair.

A Mechanosensing Constitutive Model for the Viscoelastic Behavior of a Cell Pair The stress-strain relationship from the four types of tensile tests of varied strain rates can be well fitted with an empirical exponential growth function plus a linear function:

$$\sigma = -Ae^{-B\varepsilon} + C\varepsilon,$$

supporting an overall viscoelastic behavior. To delineate the viscoelastic behavior of the cell pair before cell-cell adhesion rupture under the mechanical stretch of different strain rates, a phenomenological constitutive model was developed that effectively incorporates a mechanosensing component to account for the stress dissipation mediated by cytoskeleton remodeling. Briefly, when a pair of cells are stretched, the cell membrane deforms along with their intracellular components. The viscoelastic response of the cell can be modeled using a modified standard linear solid (MSLS) model as shown in FIG. 4A, where the first spring with Young's modulus of E1 represents the cell membrane while the second spring with Young's modulus of E2 and the dashpot with the viscosity of η represent the elastic and viscous elements of intracellular components, respectively. The viscous component is contributed by the combined effect of cytoplasmic and cytoskeleton friction. Further, the cytoskeleton of adherent cells constantly undergoes reorganization through dynamic assembly and disassembly to maintain its mechanical homeostasis in response to the tensile load. Therefore, the elastic element of intracellular components is primarily contributed by the cytoskeleton, and E2 can be considered as the collective moduli of all stress fibers that sustain the load and should be proportional to the number of individual stress fibers within the plane perpendicular to the stretching direction, as demonstrated by the inset in FIG. 4A. The value of $E_2$ should be collectively determined by the cell-cell junction length and cell-cell adhesion complex density. The continuous growth of the cytoskeleton leads to an increase in the resting length of the second spring, which could partially or even completely relax the passive stress ($\sigma_{S2}$) resulting from stretching:

$$\sigma_{S2}=E_2(\varepsilon_{S2}-\varepsilon_0) \tag{1}$$

where $\varepsilon_{S2}$ and $\varepsilon_0$ are the total strain of the second spring and the strain resulting from the continuous growth of the cytoskeleton, respectively. The cytoskeleton growth rate is related to the strain rate of the second spring through a model parameter α:

$$\dot{\varepsilon}_0=\alpha\dot{\varepsilon}_{s2} \tag{2}$$

where 0≤α≤1. When α=0, $\dot{\varepsilon}_0=0$, suggesting that the cytoskeleton does not grow at all, which corresponds to the condition of a very high strain rate stretch. When α=1, Eqn. (2) reduces to $\dot{\varepsilon}_0=\dot{\varepsilon}_{S2}$, indicating that the growth of the cytoskeleton is able to completely release the passive stress, which could occur under an extremely low strain rate stretching. Therefore, the value of α is an effective parameter to indicate the growth level of the cytoskeleton during the stretching test and thus the stress dissipation efficiency. The model predicts the following time-dependent relationship between stress ($\sigma_{tot}$) and strain ($\varepsilon_{tot}$):

$$\dot{\sigma}_{tot}+\frac{(1-\alpha)E_2}{\eta}\sigma_{tot}=[E_1+(1-\alpha)E_2]\dot{\varepsilon}_{tot}+\frac{(1-\alpha)E_1E_2}{\eta}\varepsilon_{tot} \tag{3}$$

Under a constant strain rate condition, Eqn. (3) yields:

$$\sigma_{tot}=E_1\varepsilon_{tot}+\eta\dot{\varepsilon}_{tot}\left[1-\exp\left(-\frac{(1-\alpha)E_2}{\eta}\frac{\varepsilon_{tot}}{\dot{\varepsilon}_{tot}}\right)\right] \tag{4}$$

As shown in FIGS. 4B and 4C, Eqn. (4) is able to robustly capture the viscoelastic responses of cells under different strain rates. Fitting the stress-strain curves obtained in the stretching tests with Eqn. (4) allows a prediction of how $E_1$, $(1-\alpha)E_2$ and η vary with the strain rate. The model predicts that $E_1$ is independent of the strain rate and has an average value of ~1.2 kPa (FIG. 4D), which is consistent with previously reported values. The viscosity η is predicted to monotonically decrease with the strain rate (FIG. 4E), suggesting that the cytoplasm is a shear-thinning material. Such a shear-thinning feature has been identified for the cytoplasm of several other types of cells previously. Plotting the predicted viscosity against the strain rate in a logarithmic scale reveals that the mechanical behavior of the cytoplasm can be approximated as a power-law fluid following the Oswald equation, i.e. $\eta=K\dot{\varepsilon}^{(n-1)}$, with the exponent of n=−0.118 (FIG. 4G). In general, shearing thinning is caused by flow-facilitated disentanglement of polymer chains, which is consistent with the enhanced alignment of cytoskeleton structures after cells are subjected to uniaxial stretching. Since both cells should have similar cytoskeleton structures to start with, the stress dissipation efficiency mediated by the cytoskeleton growth can be compared by assuming that $E_2$ has the same value. The decrease in α from the low strain rate test to the high strain rate test demonstrates that the stress dissipation efficiency decreases with strain rate as a result of a reduced cytoskeleton growth rate (FIG. 4F).

The cell pair was treated with cellular contractility modulators, RhoA Activator I. CN01, and myosin II inhibitor: blebbistatin (Bleb), to examine the impact of actomyosin activity on the mechanical behavior of the cell pair under mechanical stress. Stress-strain curves collected at 0.5% $s^{-1}$ strain rate show a clear contrast between samples treated with CN01, Bleb, and DMSO control. Specifically, CN01 raises the overall stress level compared with controls at the same strain, while Bleb reduces the stress accumulation (FIG. 4H, and further discussed below with reference to FIG. 13). The stress-strain curves were then analyzed using the constitutive model. Membrane stiffness, $E_1$, stays the same for all conditions (FIG. 4I). Enhancement of actomyosin contractility by CN01 significantly increases the viscosity, η, and the elastic moduli of the intracellular components, $E_2$, while Bleb reduces them (FIGS. 4J and 4K). The increase (decrease) in both η and $E_2$ by CN01 (Bleb) is consistent with the enhanced (reduced) stress fiber formation. Collectively, these data confirm that the stress dissipation is facilitated by the actin filament growth during tensile loading conditions.

Cadherins Strengthening Under Rate-Dependent Stretching

Figure 5:
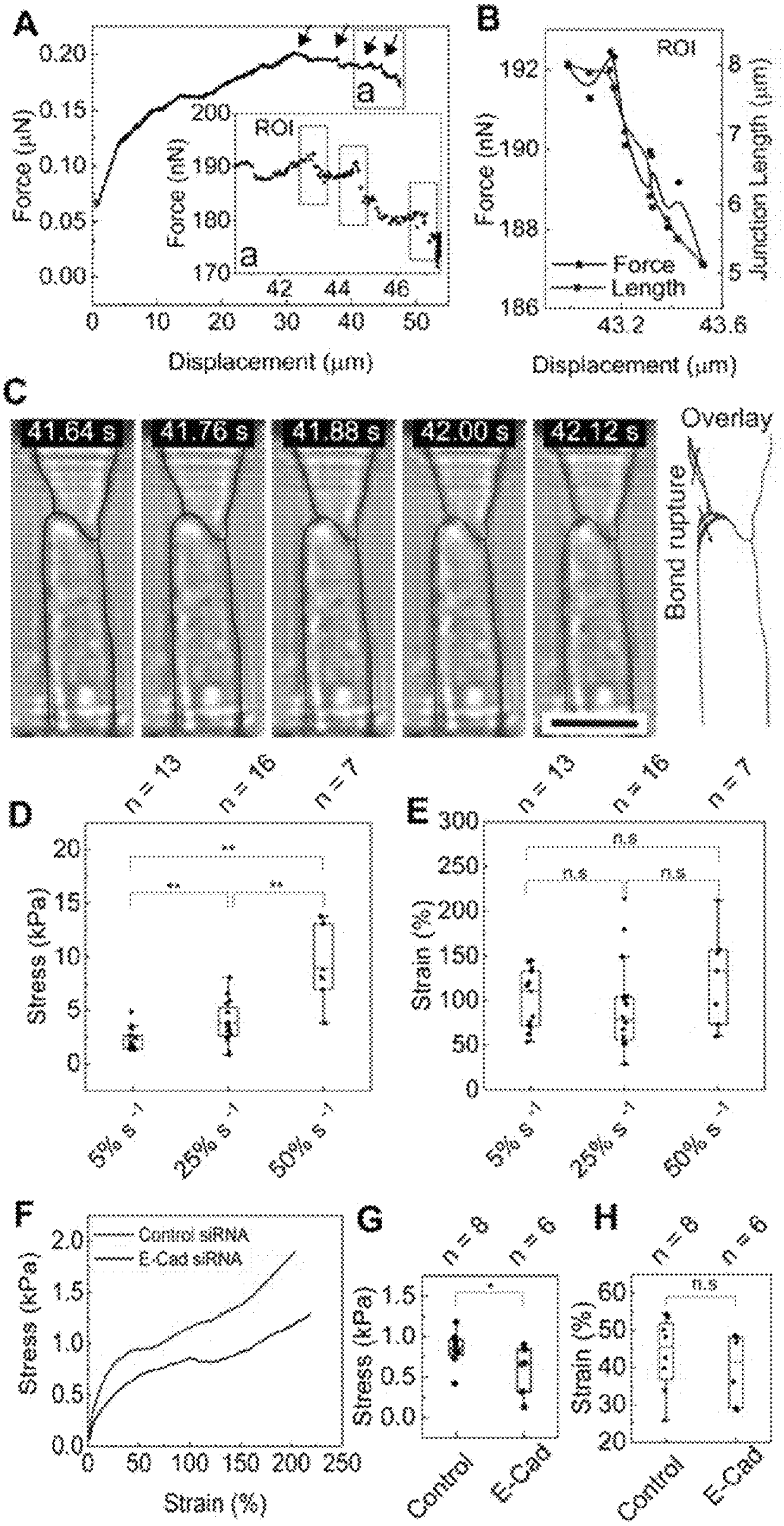
FIG. 5 demonstrates cadherin bond rupture that exhibits rate-dependent behavior during strain-rate controlled stretch.

The necking process can be attributed to the rupture of cell-cell adhesion bonds, which is most apparent under the intermediate strain rate. A few cadherin bonds are ruptured in discrete steps at the edge of the cell-cell junction, which corresponds to a small drop in the measured forces in the force-displacement curve (FIG. 5). To investigate the bond rupture, a representative example of the stretch tests with 5% $s^{-1}$ strain rate with obvious regions of junction rupture followed by stiffening can be selected, which is represented by each drop and rise in the curve (FIG. 5A). The rupture of bonds locally relaxes the stretched cell membrane, consequently leading to a drop of measured force. One representative region of interest (ROI) is plotted, in which a total drop of 5 nN was observed for an approximately 490 nm displacement (FIG. 5B, and as further discussed below with reference to FIG. 14). Correspondingly, a total of ten image frames were captured showing the snap and retraction of the cytoskeleton at the edge of the cell-cell junction (FIG. 5C), and each discrete snap motion corresponds to a small drop in force. Comparing this with the strength of a single cadherin bond of around 40 pN[60], shows that this decline is result of about a few hundred cadherin bonds rupturing in each discrete event with a resolution of a few bonds.

Figure 15:
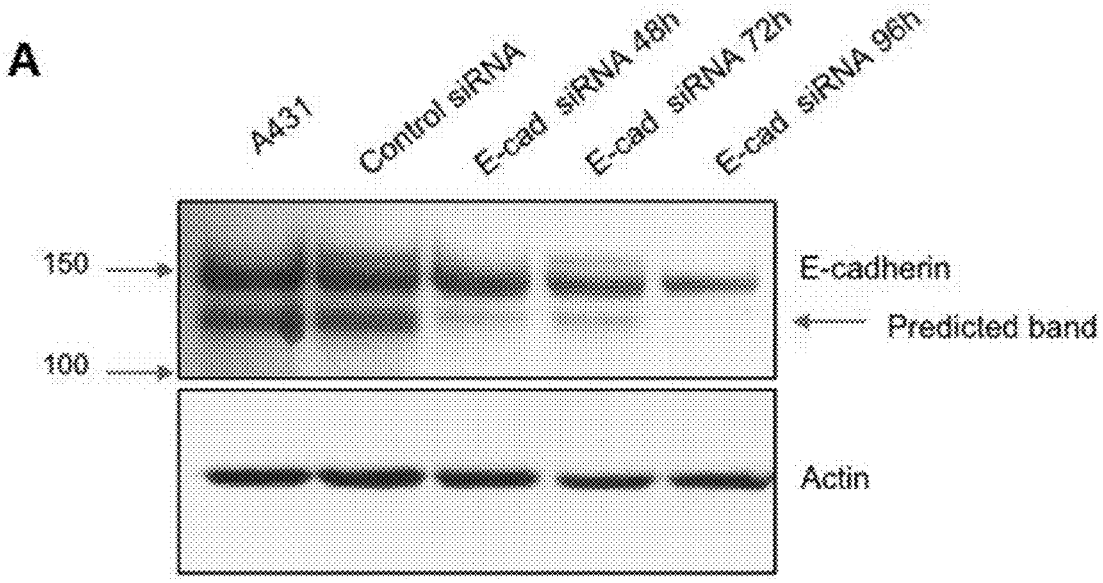
FIG. 15 is a confirmation of E-cadherin siRNA silencing.
Figure 15:
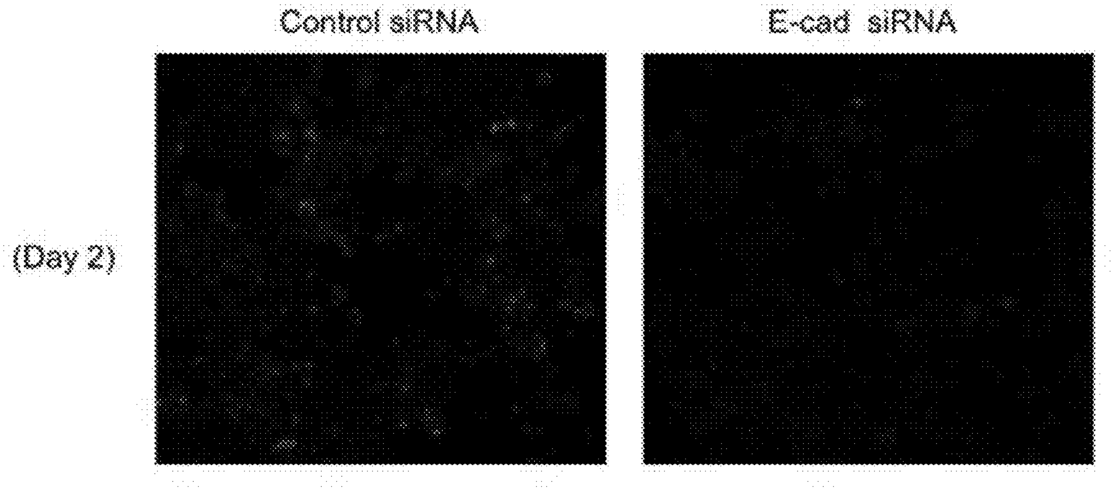

The bond dissociation events also exhibit strong strain-rate dependency. First, at a very low strain rate (0.5% $s^{-1}$), the absence of bond rupture may be attributed to cadherin strengthening. It has been observed that cadherin bond clustering in epithelial cells under tensile load occurs in a time scale of minutes, right in line with the time span of a low-strain-rate tensile test (about 10 minutes). Second, the stress level at which cadherin bonds show initial signs of dissociation, or critical stress, increases significantly with increasing strain rate. As shown in FIGS. 5D and 5E, the initiation of bond rupture events occurs at similar strain levels (101.6%, 92.8%, 126.4%) for the three strain rates (5% $s^{-1}$, 25% $s^{-1}$, and 50% $s^{-1}$, respectively). However, the critical stress is significantly higher for 50% $s^{-1}$ (8.9 kPa) compared with 5% $s^{-1}$ and 25% $s^{-1}$ (2.2 kPa and 3.8 kPa, respectively). In fact, this stress increases exponentially with the strain rate. Considering the time span of a few seconds for a tensile test at 50% $s^{-1}$ strain rate (or 10 μm/s), bond clustering may not be the main contributor to the observed force increase. On the other hand, the observed increase in forces within cadherin bonds agrees well with reports from single molecule force microscopy studies of E-cadherin bonds, which show peak rupture force in cadherin bonds increases logarithmically with loading rate. Knockdown of E-cadherin (E-Cad) by siRNA resulted in a decrease in the stress levels when cadherin bonds start to unbind compared with controls, while the strain levels remain similar (FIGS. 5F-5H, and further discussed below with reference to FIG. 15). This data confirms that reduction in the number of E-Cad bonds decreases the load-bearing potential of the cell-cell junction and that E-Cad bonds play a major role in the rate-dependent strengthening of the cell-cell junction.

Rate Dependent Cell-Cell Adhesion Dissociation Under Large Strain

Figure 6:
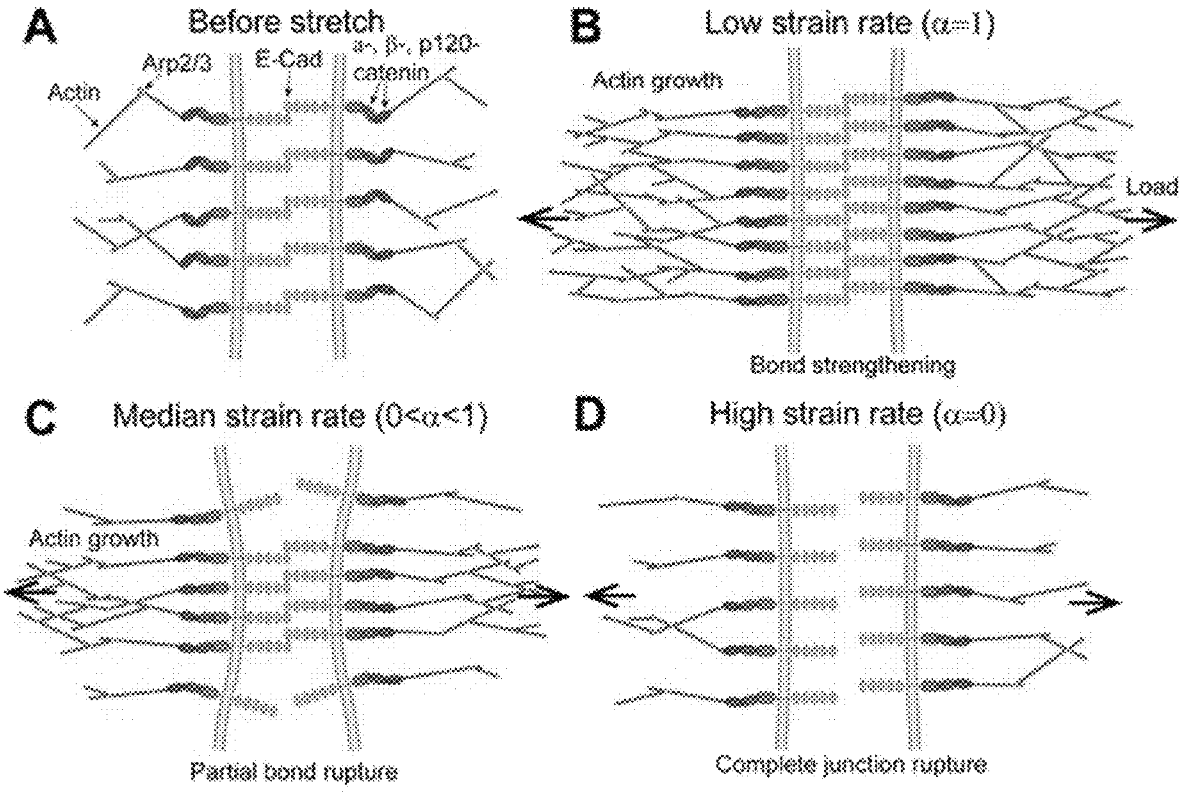
FIG. 6 is an illustration of three modes of cytoskeleton remodeling and cadherin bond rupturing under large strains at different strain rates.

The mechanical stretch at different strain rates reveals three different rate-dependent modes of stress dissipation and failure phenomenon at the cell-cell adhesion complex. First, the viscoelastic behavior of the cell pair at different strain rates depends on a robust intercellular adhesion. At low strain rate levels (such as $\dot{\varepsilon}$=0.5% $s^{-1}$), cell-cell adhesion through cadherin bonds remains intact, allowing continuous remodeling of the cytoskeleton through the alignment of the cytoskeleton to the tensile load direction. More importantly, it leads to the growth of actin filaments ($\alpha$ is high or close to 1), and thus the continuous stress relaxation in the network of the cytoskeleton and the cell-cell adhesion complex (as illustrated in FIGS. 6A and 6B). In addition, the clustering of cadherin bonds may also strengthen the cell-cell adhesion complex. This synergistic process keeps the stress level within the system below the threshold of rupturing a large cluster of cadherin bonds, and thus total bond rupture and tissue fracture do not occur even at very large strain (>200%). Second, at median strain rate (such as $\dot{\varepsilon}$=5% $s^{-1}$), stress relaxation from the cytoskeleton growth fails to catch the increased stress induced by the continuous increase of the applied strain, resulting in a net accumulation of stress. The increase in stress leads to gradual unbinding of cadherin bonds to relax the stress (FIG. 6C). Third, at high strain rate (such as $\dot{\varepsilon}$=50% $s^{-1}$), even a modest amount of cytoskeleton growth does not occur due to the short time span, and the rapid accumulation of stress ruptures all cadherin bonds in a synchronized fashion (FIG. 6D). As discussed earlier, due to the biophysical property of E-cadherin bonds, the stress level at which bond rupture occurs for high strain rate tests is higher. This concerted mechanism of stress relaxation by the actin filament growth and rate-dependent strengthening of E-cadherin bonds may eventually result in the cell-cell adhesion complex failing at similar strain levels at different strain rates.

The platform developed has distinct advantages over AFM-based single-cell force spectroscopy (SCFS) and dual micropipette aspiration (DPA) techniques, which have been previously used to study adhesion mechanics in isolated cell pairs. A major limitation of SCFS is an inability to interrogate mature cell-cell junctions because the system is limited by the adhesive strength between the cell and AFM tip, which is lower than the strength of a mature cell-cell junction. In addition, in SCFS, it is impossible to image the cell-cell junction as the junction moves vertically as it is stretched, leaving the focus plane. A major drawback of DPA is a lack of a mature cell-ECM junction. As the cells are held to the micropipette tip through negative pressure, they do not form a junction, and the sometimes extreme deformation of the cell at the micropipette tip may induce internal biochemical changes which may impact the physiology of the cell-cell junction. In addition, a constant strain rate cannot be achieved because the strain is applied in incremental steps. A common drawback between each of these methods is throughput for interrogating mature cell-cell junctions, as cells would need to be held in place by these devices for a long period of time before a single test could be performed. The design of the device according to an embodiment combines the advantages of each system while eliminating or mitigating these drawbacks. The arrangement of the cells allows for imaging of the cell-cell junction, cells can form strong and mature cell-ECM junctions with the device and cell-cell junctions with each other, and continuous strain can be applied. In addition, throughput for mature cell-cell junction interrogation is increased due to parallel sample preparation and testing, as the equipment for manipulating or stretching cells do not need to be used to hold cells in place during junction maturation. The presence of the mature cell-ECM junction allows for application of large strains as in DPA, whereas the force sensitivity of the beams achieves stress and strain resolution comparable to SCFS. Finally, another technique that has been used to interrogate adhesion molecules, such as cadherins, is single-molecule force spectroscopy. While this technique can accurately measure forces within bonds at a single-molecule level, the internal response from cells to stretching, which is crucial in understanding cell-cell adhesion mechanics, is lost in this experimental setup and fully captured in the design.

Integrated within a microscopy imaging system, the mechanical characterization studies can be combined with fluorescent imaging of cytoskeleton deformation and localization of cadherins and linker molecules when the single cell adhesion complex is subject to a tensile load of varying amplitudes and strain rates. Further, the tensile strength within the cytoskeleton-cell adhesion-cytoskeleton system can correlate with tensional fluorescence resonance energy transfer (FRET) sensors within the cadherin or linker molecules, and this correlation may ultimately delineate the force contribution of each component in maintaining the mechanical integrity of the complex and reveal mechanisms of mechanotransduction in a concerted effort with other cellular elements, such as the cytoskeleton and the cell-ECM adhesion. Despite the promising propositions, a limitation still exists in performing real-time fluorescence imaging with cells on the microstructures due to the strong autofluorescence of the polymer materials used for the TPP fabrication. Research efforts are ongoing to address this critical issue.

In summary, a polymeric microstructure was fabricated using TPP for displacement application and force sensing to examine the rate-dependent mechanical behavior of a single cell-cell adhesion complex. This platform can target the cell-cell contact of a single cell pair and strain their mutual junction, enabling the quantitative assessment of its mechanics at controlled strain rates and the examination of its failure at large strains. The fine resolution of the force sensing beams also enables capturing the dissociation of cell-cell adhesion bonds to reveal its failure mechanism. Displacement-controlled tensile tests reveal that the single cell-cell adhesion complex composed of the cytoskeleton structures from the cell pair and the cadherin adhesion molecules fails at a remarkably large strain level, and the failure process exhibits strain rate-dependent phenomena. This is predominantly facilitated by the relaxation of the actin networks and rate-dependent strengthening of cadherin molecules.

Embodiments of the invention described herein can be incorporated into a variety of applications and disciplines. For example, embodiments of the invention can be incorporated into medical devices to facilitate the study of drug penetration through barriers, diagnostics to study skin and heart diseases and cancer metastasis, and in biomedical engineering applications for predicting deformation and failure in artificial tissues. Accordingly, non-limiting example materials, methods, designs, fabrication, and calculations are discussed below.

Example 1

Cell Culture and Transfection

A431 E-cadherin GFP-tagged cells were cultured in a growth medium composed of Dulbecco's modified Eagle's medium (DMEM) and supplemented with 10% fetal bovine serum (Chemie Brunschwig AG) and 1% penicillin-streptomycin (Invitrogen). The medium included C02-independent growth medium (Gipco) supplemented with 2 mM L-glutamine (Gipco), 10% fetal bovine serum, and 1% penicillin-streptomycin. All solutions were filtered through 0.22 μm pore-size filters before use. Shortly before each experiment, PBS was replaced with 2 ml of the experimental medium. All experiments were performed in a temperature-controlled enclosed chamber at 37° C. Transfection of E-cadherin siRNA (Santa Cruz Biotechnology; SC35242) and control siRNA (Santa Cruz Biotechnology; SC37007) were performed using Lipofectamine RNAiMAX Transfection Reagent (Invitrogen), according to the manufacturer's protocol. The expression of GFP was analyzed by fluorescence microscopy after 48 hours.

E-Cadherin GFP Cell Line

Full-length human E-cadherin fused at its C-terminus to GFP was constructed by first inserting an E-cadherin cDNA into pEGFP-N2 (Clontech, Mountain View, CA) and then inserting the tagged construct into a derivative of the LZRS retroviral expression vector. The final cDNA construct was fully sequenced to ensure no errors were introduced during subcloning.

TPP Fabrication Process 3D models of the micromechanical structures for biological cell mechanical interrogation were compiled in COMSOL using the built-in CAD module. The compiled models were evaluated using the Solid Mechanics module (linear elastic materials approximation). Finite element analysis (FEA) in COMSOL allowed estimation of the spring constant of the flexible beams supporting the microscale plates for cell attachment. Various preliminary designs, including planar structures, were fabricated using TPP stereolithography and tested for stability during fabrication and susceptibility to damage by capillary forces after fabrication. The rationale behind this design is as follows. First, compared to doubly clamped (bridge) structures, singly clamped (cantilever) beams provide a more linear elastic response with significantly lower sensitivity to intrinsic stresses. Second, the parallelogram arrangement of the twin-beam leaf springs improves the leveling of the cell-bearing platforms and the overall mechanical stability of the devices. Furthermore, vertical beams separated by larger distances from the substrate are preferable over horizontal beams closer to the substrate due to the better ability of the former to withstand capillary forces after fabrication. Finally, the thinnest beams that could be reliably fabricated with high accuracy and yield were approximately 2.5 mm thick. This minimum thickness, combined with the targeted stiffness, dictated the width and the length of the beams in the implemented structures.

Figure 7:
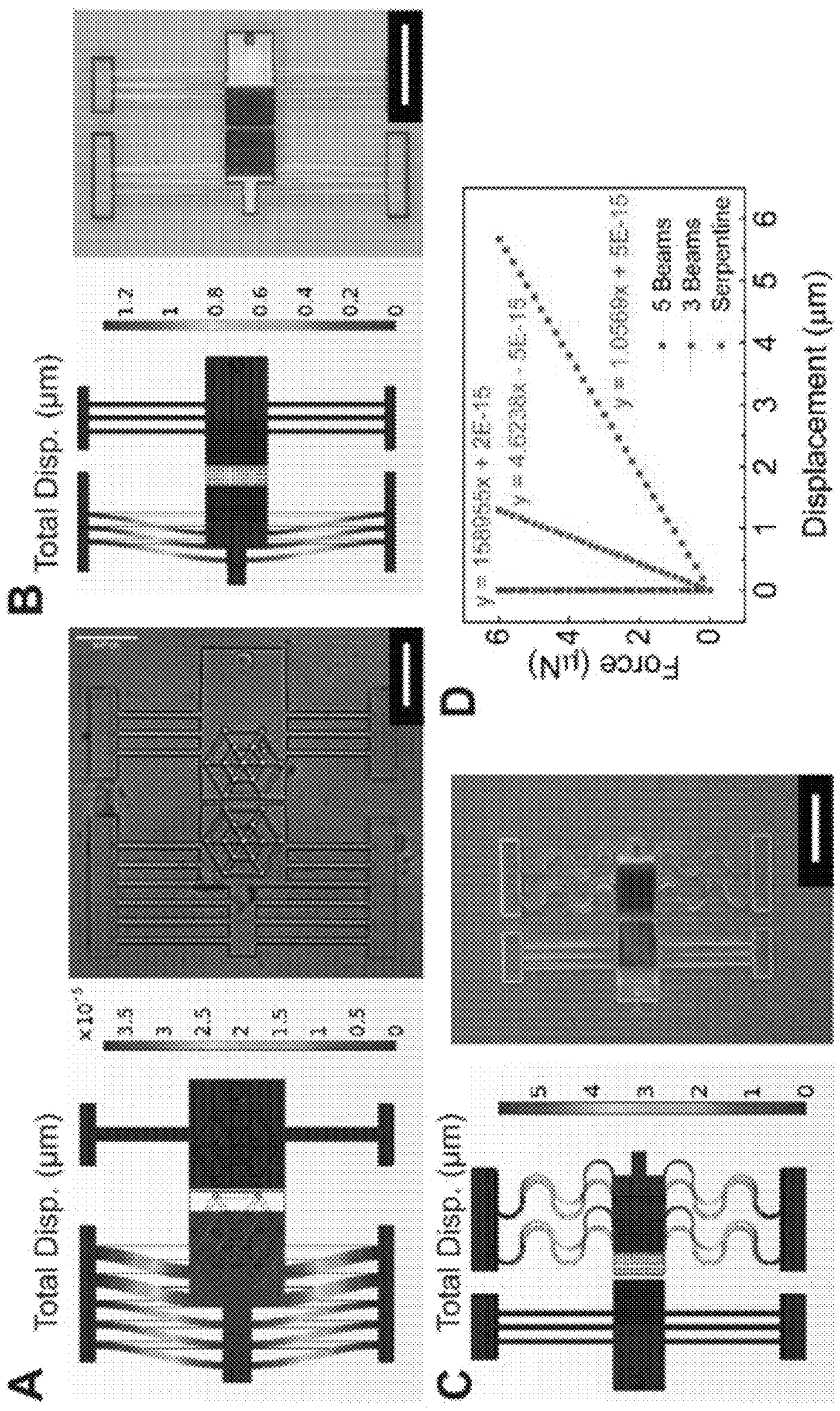
FIG. 7 is a design, simulation, and fabrication of the first generation of a single cell pair stretcher (horizontal)
Figure 8:
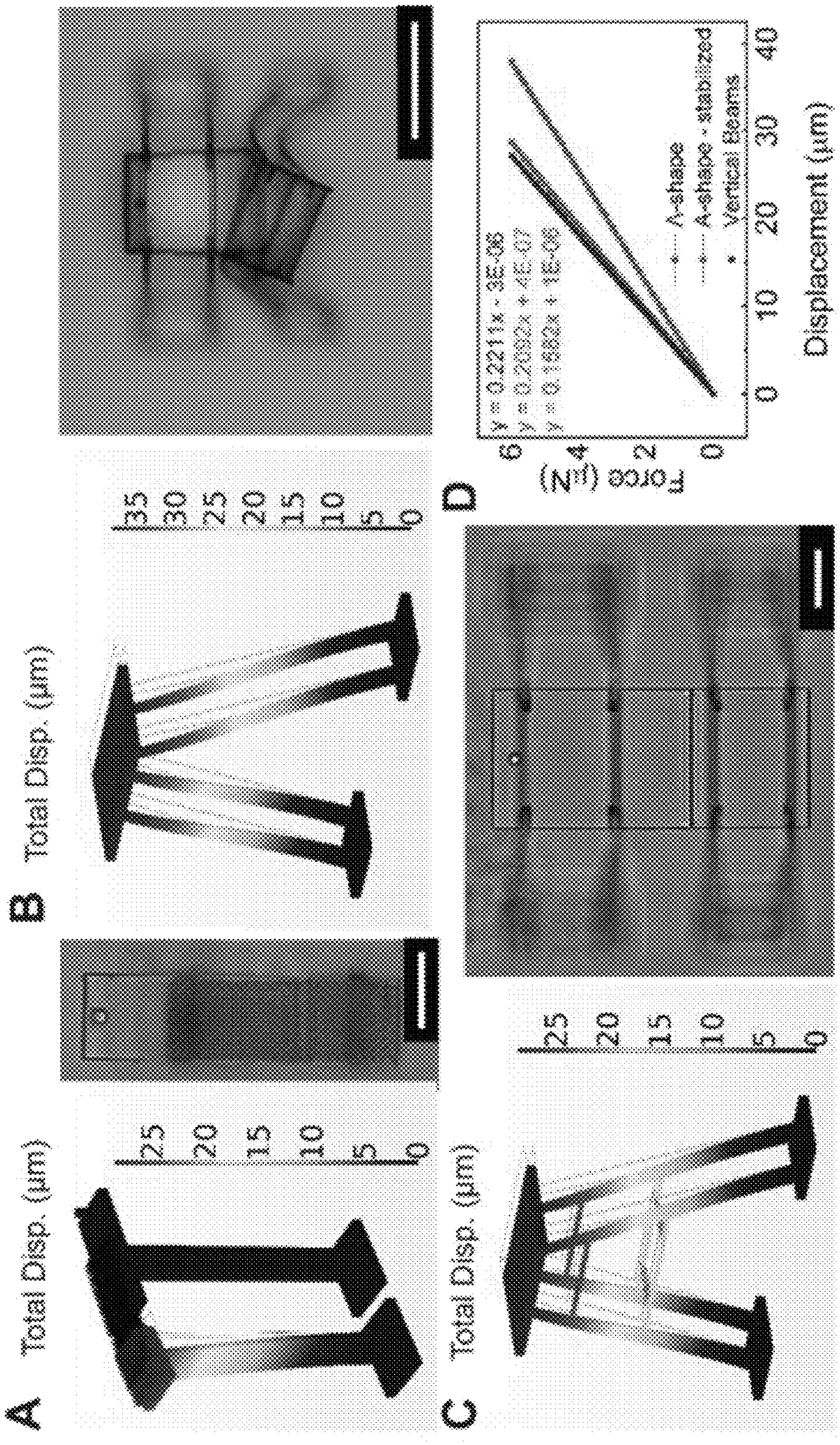
FIG. 8 is a design, simulation, and fabrication of the second generation of the single cell pair stretcher (vertical)

To fabricate the structures shown in FIG. 1, FIG. 7, and FIG. 8, microscale 3D printing based on TPP was used. CAD files in STL format exported from COMSOL 4.2 software were imported into the Describe software (Nanoscribe, GmbH) to compile job files for the Photonic Professional (GT) tool (Nanoscribe, GmbH). The slicing and hatching distances were selected to be 0.4 μm and 0.3 μm, respectively. The vendor-supplied liquid photoresist, IP-S, and a 25× immersion microscope objective were used to print structures in the galvo-scanning mode using the so-called deep-in laser lithography (DiLL) optical arrangement.

Glass coverslips with diameters ranging from 11 to 25 mm and thicknesses of approximately 160 μm were used as substrates in the present study. Prior to 3D printing, the glass substrates were coated with indium tin oxide (ITO) to achieve optical reflectivity of the IP-S/substrate interface sufficient for autofocusing. The ITO layer had a thickness of approximately 50 nm and was deposited using direct current sputtering of an ITO target in an Ar plasma. It was found that mechanical 3D structures printed directly on ITO-coated glass had insufficient adhesion and would detach from the substrate after prolonged soaking or incubation in aqueous solutions. To address this commonly encountered issue of insufficient adhesion between smooth substrates and 3D structures fabricated using TPP, an in-house developed protocol was used in which an additional layer of porous silicon oxide (PSO) was deposited on top of ITO-coated coverslips. PSO with a thickness of approximately 2 μm and a high density of nanopores was found to act as an excellent anchoring layer, eliminating detachment of the 3D printed structures from the substrate during soaking and subsequent experiments in aqueous solutions. For all experiments, arrays of structures (varying from 5×4 up to 6×6) were fabricated on each coverslip, allowing for increased throughput in testing.

Structure Preparation for Fluorescence Imaging

The structures were placed inside of a glass-bottom petri dish, washed with 70% ethanol, and immediately soaked with PBS for 10 minutes until all the ethanol dissolved. The substrate was then submerged in 0.3% volume ratio Sudan Black B (Sigma-Aldrich) in 70% ethanol for one hour to eliminate the autofluorescence of the polymer. To dissolve excessive Sudan Black, the substrate was submerged in 70% ethanol for 1 hour and then soaked with PBS for 10 minutes. The substrate was then coated with fibronectin to enhance the adhesion and growth of the cells on the structures. Fibronectin solution with a concentration of 50 μg/ml in PBS was placed on the substrate and left in the incubator for 2 hours. Finally, the fibronectin solution was removed, and the substrate was washed with PBS two times.

Structure Preparation for Mechanical Characterization

The structures were placed inside of a glass-bottom petri dish, washed with 70% ethanol, and immediately soaked with PBS for 10 minutes until all the ethanol dissolved. The substrate was then coated with fibronectin (50 μg/ml in PBS)

to enhance the adhesion and growth of the cells on the structures. The fibronectin solution was placed on the substrate and left in the incubator for 2 hours. The solution was removed, and the substrate was washed with PBS.

Cell Deposition

Figure 10:
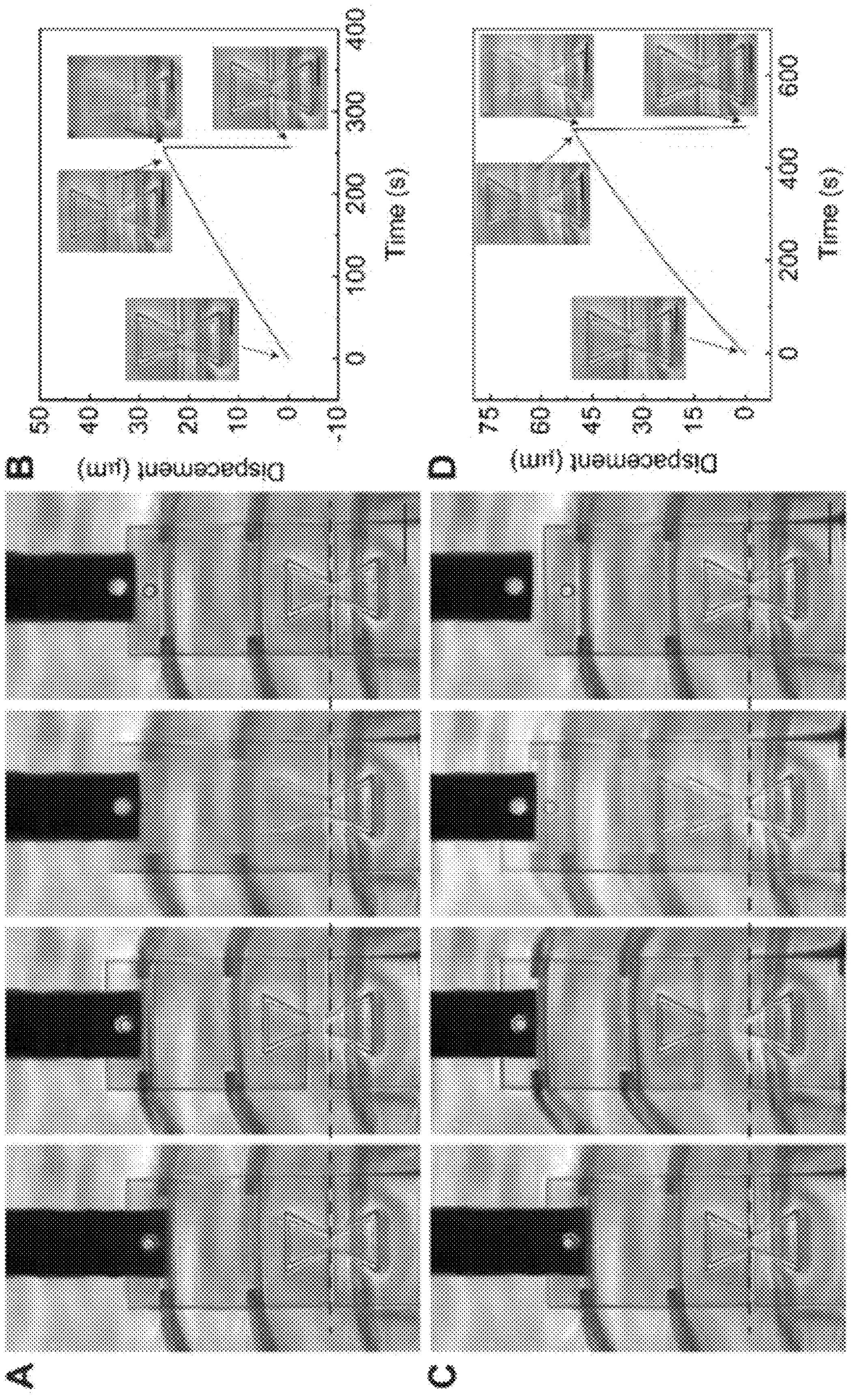
FIG. 10 illustrates elastic deformation of the structure.

An Eppendorf single-cell isolation setup was used to pick up and position cells on the stretching structure. This setup has a microcapillary (Piezo Drill Tip ICSI, Eppendorf) with a tip inner diameter of 6 μm. The microcapillary is connected to a pressure controller (CellTram® 4r Air/Oil, Eppendorf) which can control the inside pressure of the pipette. The micropipette position is controlled with a 3D manipulator (TransferMan® 4r, Eppendorf) on an inverted microscope. First, the microcapillary is positioned just above a cell on the substrate and brought into contact with the cell membrane. Then, a negative pressure is applied, suctioning the cell onto the pipette tip. Finally, the cell is retracted from the surface and positioned on the structure and detached from the pipette tip by applying positive pressure. The same procedure is performed to pick up and position the second cell (FIG. 10).

Etched AFM Probe by Focused Ion Beam (FIB)

To apply displacement to the structure, AFM probes were used. For this purpose, the AFM probe was drilled using FIB etching to make a circular hole with a diameter of 15 μm so that it could capture the pillar (10 μm diameter) on the structure.

Immunofluorescence and Microscopy

The A431 cells were E-cadherin GFP-tagged to visualize the cell-cell junctions. Alexa Fluor™ 657 Phalloidin (Invitrogen) was used to stain the actin filaments and the nuclei were stained with DAPI (Invitrogen). The structures with deposited cells were placed in a glass-bottom petri dish. The cells were washed twice with PBS, pH 7.4, and fixed using 4% formaldehyde solution in PBS for 15 minutes at room temperature, and then washed two times with PBS. Subsequently, they were permeabilized with a solution of 0.1% Triton X-100 in PBS for 15 minutes and then washed twice with PBS. To enhance the quality of the actin fluorescent intensity, 4 drops of Image-iT™ FX Signal Enhancer (Thermofisher) were added and incubated at room temperature with a humid environment for 30 minutes. After removing the solution and washing with PBS, the Phalloidin staining solution with a ratio of 1:100 in PBS was placed on the substrate for 30 minutes at room temperature and then washed with PBS. Next, the DAPI solution with a ratio of 1:1000 with PBS was placed on the substrate and incubated for 10 minutes at room temperature. The solution was removed, and the substrate was washed with PBS. Finally, 3 ml of pure water was added to the petri dish for imaging.

Zyxin staining was performed to visualize the focal adhesion points between cells and the structure. After fixing the cells (see above), the anti-zyxin antibody (Sigma) with a ratio of 1:250 with PBS was added to the sample and refrigerated for 24 hours. The solution was then removed, and the sample was washed with PBS. PBS was replaced by Goat anti-Rabbit IgG (H+L), Superclonal™ Recombinant Secondary Antibody, Alexa Fluor 647 (Thermofisher) and incubated for 1 hour at 37° C. Finally, the sample was washed with PBS and the actin and nuclei staining protocol were performed. Pharmacological treatments modulating cell contractility included 3 μM blebbistatin (Bleb) (Sigma-Aldrich) for 2 h and 1 unit/ml Rho Activator I (CN01; Cytoskeleton, Inc., Denver, CO) for 30 min.

A Nikon Al-NiE upright confocal system (60× water immersion objective) driven by NIS-Elements Confocal image acquisition and analysis program (Nikon software) was used for immunofluorescent imaging of cells on the structures. All image reconstructions and channel alignments were performed within the Nikon software. Zeiss Axio 7 was used for the stretch test. An AFM setup (Nanosurf AG, Switzerland) was installed on the microscope to apply the displacement to the structures.

Cell Lysis, Gel Electrophoresis, and Immunoblotting

A431 GFP-tagged E-cadherin cells were lysed with RIPA buffer (50 mM Tris-HCl, pH 7.4, 150 mM NaCl, 5 mM EDTA, 2 mM dithiothreitol, 1 mM PMSF and 1% Triton X-100) containing a protease inhibitor cocktail (58830; Sigma). Whole-cell lysates were incubated on ice for 30 min and then centrifuged at 14000 g for 20 min at 4° C. Proteins were separated by SDS-PAGE using 8% gels and blotted onto PVDF (polyvinylidene fluoride) membranes. The blots were incubated overnight at 4° C. with anti-E-cadherin (BD Biosciences; 610181), or anti-3-Actin (Santa Cruz Biotechnology; SC-47778). Blots were then washed and incubated with HRP-conjugated anti-mouse (Jackson Immunoresearch), followed by washing and detection of immunoreactivity with enhanced chemiluminescence (Santa Cruz Biotechnology).

Displacement Tracking Using DIC

A modified version of MATLAB digital image correlation (DIC) was used to analyze the frames from the stretch test. The first frame was considered as the reference and the rest of the frames were compared to the reference frame to calculate the displacement of each island. A region of interest with markers within the region was defined for both islands. Then, the MATLAB code calculated the markers' new coordinates with respect to the first frame, from which the displacement of the islands was calculated. The force is defined by the Island 1 displacement multiplied by its stiffness, and the stress is acquired by dividing the force by the junction cross-section (approximately 120 $\mu m^2$). The strain is then calculated as the difference between the islands' displacements divided by the cell-cell junction's initial length (approximately 20 μm).

Design and Simulation of the Single Cell Stretcher Structure

Several generations of the sensing beam structure have been designed, fabricated, and tested, and their stiffness was calculated using COMSOL Multiphysics simulation software. The first generation was a group of parallel horizontal beams. A design with 5 sets of beams was proposed as the first design. After the simulation, the calculated stiffness was $K=1e^5$ N/m, which, compared to biological samples, was too large to measure the stress in the cell-cell junction (FIG. 7A). By reducing the number of beams, decreasing the beam width from 5 μm to 2.5 μm, and increasing the beam length from 80 μm to 150 μm, the stiffness was decreased to 4.6 N/m (FIG. 7B). However, this was still too large to measure stress. Since the maximum printing dimensions of the 3D printer device were reached, the length could not be increased, and due to the structure stability, the width of the beams could not be. A serpentine beam was then proposed to further decrease the stiffness with these geometric constraints in mind. This design further reduced the stiffness of the structure (K=1.05 N/m) but was still too stiff. (FIG. 7C). The force-displacement curves of these designs are compared in FIG. 7D. It is worth mentioning that these stiffness data are all calculated in air.

All of the horizontal beam designs have a stiffness higher than desired values (0.01 N/m-0.5 N/m). So, a vertical beam design was proposed (FIG. 8A). The vertical beam with a height of 280 μm was able to give a stiffness close to a goal (0.22 N/m). However, the beams being exactly underneath the islands creates high-intensity background noise during fluorescent imaging, blocking the signal from cells. Therefore, a double cantilever beam design was utilized by moving the beams' bases to the sides of the islands (Λ-shape). Theoretically, this change resulted in increasing the stiffness, so the design was modified by decreasing the beam thickness from 5 μm to 2.5 μm and increasing its height to 300 μm. With COMSOL simulation, its stiffness is lower than the other beam geometry designs (0.08 N/m); however, it collapsed during fabrication (not shown in the figures). Adding another set of Λ-shape beams (double Λ-shape) to increase stability still resulted in the collapse of the structures (FIG. 8B). Finally, a set of trusses were added horizontally to connect the vertical beams and enhance stability (stabilized A-shape), resulting in stable structures with the stiffness of 0.11 N/m. (FIG. 8C). It is worth mentioning that these stiffness data are all calculated in air.

Beam Stiffness Calculation and Calibration

The modulus of elasticity of the printed material varies with laser power and print speed during TPP fabrication. The modulus of elasticity is very important since it affects the stiffness of the structure which is further used to calculate the force and stress. First, a deflection equation was derived for the actuating beam using beam theory for a fixed and guided beam to find the relation between the applied force and the displacement. Then, data from AFM force spectroscopy experiments on the structure were averaged and used to find the actuating beam stiffness. Finally, from the AFM data and the theoretical model, the sensing beam stiffness is obtained.

Figure 9:
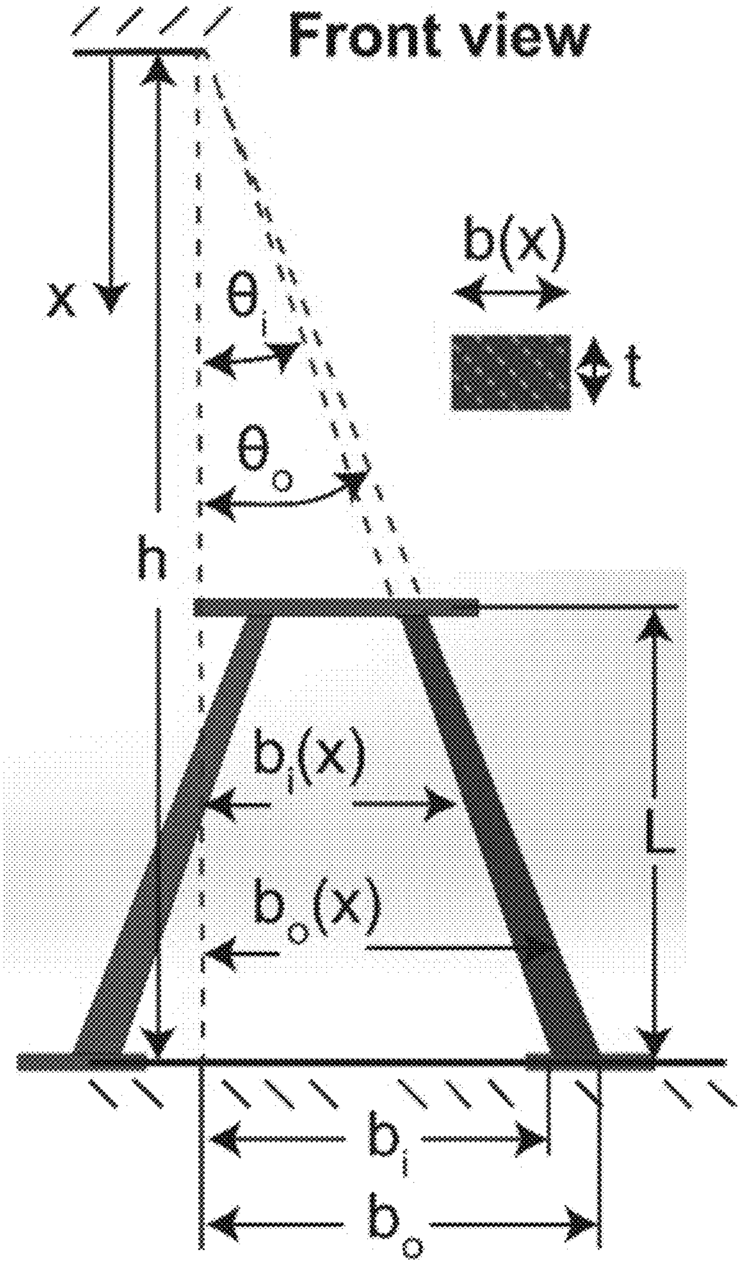
FIG. 9 illustrates geometric definitions of the beam used to derive the theoretical model; h is the height of the point where the tapered beam meets into a point; L is the height of the structure; the beam width, b(x), is determined from the difference of the inner and outer base width, $b_i(x)$ and $b_o(x)$, respectively, which are found from the distance from the point, x, and the inner and outer angles, $\theta_i$ and $\theta_o$; t is the thickness of the beams.

The actuating side of the microstructure is composed of four main beams, two cross beams, and a top plate. The force is assumed to be evenly distributed to every beam. Further, building on this assumption, it was assumed that each beam would deflect the same. Next, because of the crossbar and the coupling it provides on each beam, the torque that could be attributed to the applied force and the horizontal distance from the base to the top of the beam was neglected. Lastly, the top plate maintained that the end of each beam remained parallel, therefore the system was treated as a fixed and guided beam. For the structure, the beam thickness is consistent, butits cross-section varies (FIG. 9). The cross-section length of the beam can be defined as:

$$b(x)=b_o(x)-b_i(x) \tag{5}$$

where $b_o(x)$ and $b_i(x)$ are the length of the outer and inner construction triangles, respectively. The moment of inertia of the beam, I(x), can be expressed as:

$$I(x) = 4*\left(\frac{1}{12}b(x)t^3\right) = \frac{1}{3}b(x)t^3 \tag{6}$$

Here, four is the number of beams. Using the basic differential equations of the deflection curve of the beam, the deflection of the beam, $\delta_{act}$, is derived:

$$-\delta_{act.} = v(x) = \frac{w}{E}\left[\frac{1}{2}Px^2 - Pz\cdot(x\ln(x)-x) - M_B\cdot(x\ln(x)-x) + C_1x + C_2\right] \tag{7}$$

Here, P is the applied force, $M_B$ is the moment produced by the top plate on the end of the beam, E is the modulus of elasticity, w is a constant equal to $$w = \frac{3h}{(b_o - b_i)t^3},$$

z is a structural constant equal to z=h−L, and $C_1$ and $C_2$ are the integration constants that come from the boundary conditions for a fixed guided beam:

$$C_1=Pz\cdot\ln(h)+M_B\ln(h)-Ph \tag{8}$$

$$C_2=Pz\cdot h(\ln(h)+1)+M_B\cdot h(\ln(h)+1)-\tfrac{1}{2}Ph^2-C_1h \tag{9}$$

Finally, the stiffness of the structure can be predicted for a given applied force, and the structural constants by the following equation:

$$k_{act.,theory} = \frac{P}{\delta_{act.}} \tag{10}$$

As mentioned in the paper, a tipless cantilever probe with a known and thermally tuned stiffness, $k_p$, was used to press on the actuating structure (FIG. 1E). AFM uses the deflection of the probe, $\Delta x_p$, and its known stiffness, $k_p$, to calculate the applied force, $P_{AFM}$. The microstructure is also subjected to the same force as it produces a reaction force which causes deflection:

$$P_{AFM}=\Delta x_p\cdot k_p=\Delta x_{act.}\cdot k_{act.}$$

As a result:

$$k_{act.} = \frac{P_{AFM}}{\Delta x_{act.}} = \frac{1}{d/P_{AFM} - 1/k_p} \tag{12}$$

where:

$$\Delta x_{act.} = d - \Delta x_p = d - \frac{P_{AFM}}{k_p} \tag{13}$$

Equation (7) shows that the stiffness is proportional to the cubic thickness, that is:

$$k_{act.}\propto t^3 \tag{14}$$

Therefore, $$k_{sens.} = k_{act.}\cdot\frac{t^3_{sens.}}{t^3_{act.}} \tag{15}$$

FIG. 1F shows the real experiment and the averaged data from AFM experiments. Analyzing the averaged curve together with equation (15) result in ($t_{act}$=6 μm):

$$k_{sensing}(t = 2.5\ \mu m) = 0.162\frac{N}{m}$$

For the higher resolution experiments, the sensing structure with 2 μm beam thickness was used. The stiffness of this structure will be:

$$k_{sensing}(t = 2\ \mu m) = 0.0827\frac{N}{m}$$

Elastic Deformation of the Structure

Since the material used for the structure is a polymer, it is possible that viscoelastic effects during the deformation of the structure may result in a nonlinear, rate-dependent relationship between beam deflection and junction stress. To examine the elasticity of the structure, two experiments were performed with a controlled displacement and release. The first one was a 25 μm displacement and sudden release of the structure and the second one was a 50 μm displacement and sudden release. Since lower strain rates have more impact on the viscoelastic properties of the material, 100 nm/s (0.5% $s^{-1}$) was used for both experiments. FIG. 10 shows the displacement-time plots for the experiments. For the 25 μm displacement, 0.135 seconds after release, and for the 50 μm displacement, after 4.72 seconds, both return to the original position within the resolving power of the DIC, thus ruling out major plastic deformation. Further, the rapid release and return of the 25 μm test demonstrate that the viscoelastic effect can be negligible with this displacement, slightly less so with the 50 μm test. In the cell stretch experiments, the displacement of the sensing island is within 5 μm, in which elastic deformation dominates according to this experiment.

Cell Deposition Procedure

Cell manipulation was performed using the Eppendorf cell isolation system. This setup consists of a microcapillary (Piezo Drill Tip ICSI, Eppendorf) integrated with a pressure controller (CellTram® 4r Air/Oil, Eppendorf) and a 3D manipulator (TransferMan® 4r, Eppendorf), allowing for precise 3D cell manipulation. The inner diameter of the microcapillary was chosen based on the cell diameter (approximately 15 μm). To aspirate and hold a cell on the needle tip, the inner diameter should be less than the cell diameter. Based on available needle sizes from Eppendorf, Piezo Drill Tip ICSI with 6 μm inner diameter was selected. The needle is connected to the capillary and through a tube to the pressure controller. The tube is filled with mineral oil, and a small displacement of the pressure controller cylinder creates positive or negative pressure at the needle tip.

The needle approaches the cell using the 3D manipulator (FIG. 11A). When it touches the cell membrane, a negative pressure is applied to aspirate the cell (FIG. 11B). While the cell is held at the needle tip, it is positioned above Island 1, and a positive pressure is applied to detach the cell from the needle and place it on the surface (FIG. 11C). The same procedures are performed to place the second cell on Island 2 (FIGS. 11D-F). This process is performed inside a temperature-controlled chamber.

Stress-Strain Curve Calculation

Each stretch test was recorded with a screen recorder software (Camtasia) and the movie was divided into frames that were analyzed with a customized DIC-based program to calculate each island's movement. In this method, a region of interest is defined and, within this region, a few markers are placed. The higher the number of markers, the better the resolution of the calculated displacement is. Then, when the coordinates of these markers change, a corresponding red marker appears (FIGS. 12A and 12B). In the first frame, both initial and displaced positions of markers are completely overlapped so just red markers are shown. As the frames continue, the red markers move with the island movement. This method can find changes in the markers' coordinates for each frame and calculate their displacement by comparing their new coordinates to their initial coordinates in the first frame. The output will be a matrix of markers' coordinates for each frame. Then, the displacement of each island is obtained by averaging the displacement of markers in the ROI in each frame. The strain is calculated by dividing the difference of both islands' displacements by the initial length $$\left(\varepsilon = \frac{D - \delta}{L_0}\right).$$

It is assumed that a pair of cells that have a junction in between are attached fully to the substrate and when the force is applied, deformation occurs to half of each cell where cell-ECM adhesion, Therefore, the initial length, $L_0$, is approximately the distance between the two cells' nuclei, which is measured to be approximately 20 μm. D is the forcing island displacement, δ is the sensing island displacement, $L_0$ is the initial length (FIG. 12C). Force is calculated using Hooke's Law, F=kδ, where k is the sensing island stiffness obtained from both the simulation verified by the AFM experiment Stress is defined by dividing the force by the cross-section area. The cross-section area is the junction length multiplied by its depth. The junction length is measured to be approximately 16 μm and the depth is measured to be approximately 10 μm. Strain rate is defined by the displacement rate divided by the initial length (20 μm). After these calculations, a stress-strain curve can be plotted.

CN01, Control DMSO, and Bleb Stretch Test Frames

Figure 13:
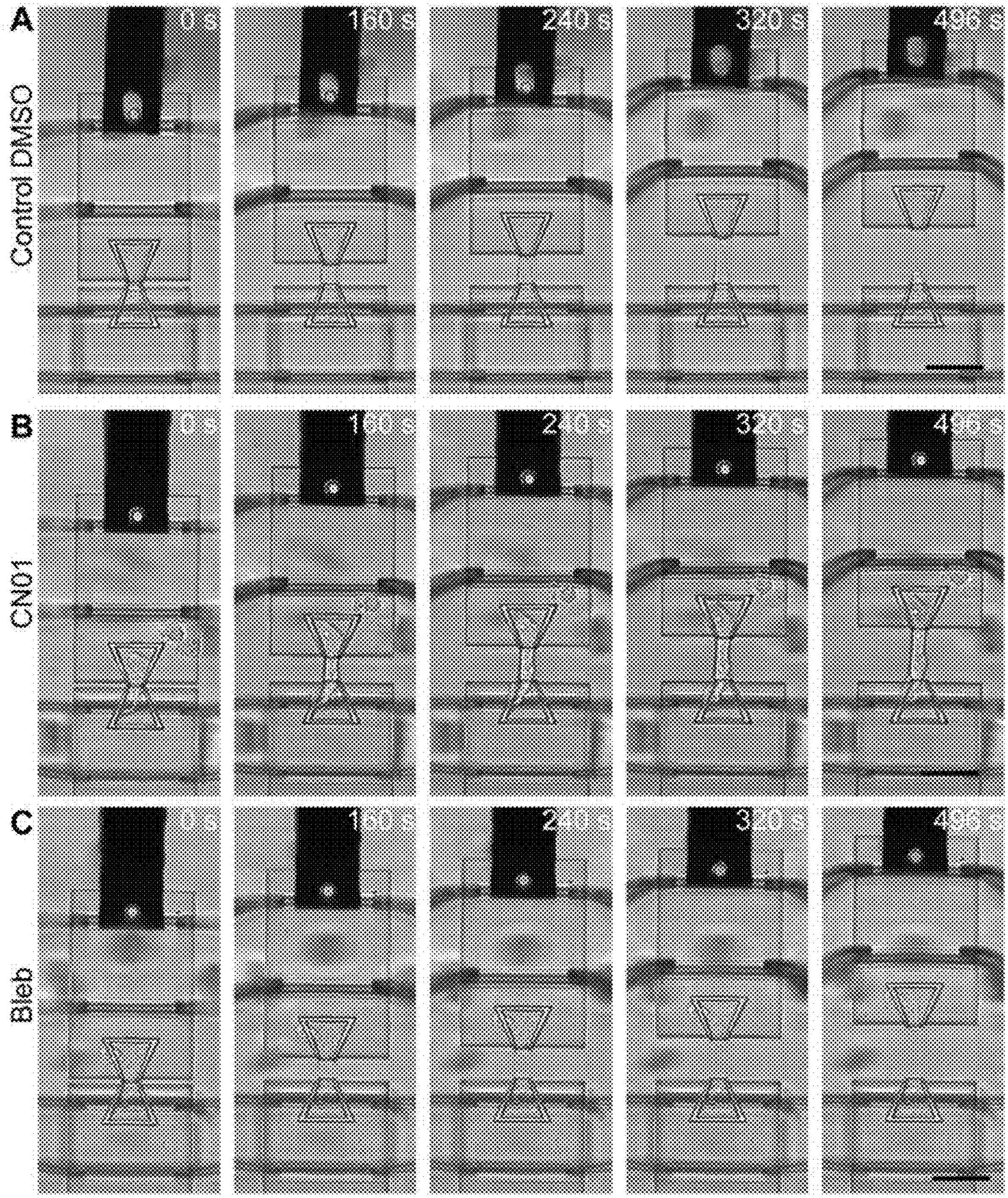
FIG. 13 is a series of frames for CN01, control, and bleb under 0.5% $s^{-1}$ strain rate stretch test.

Investigation of cellular contractility was performed using CN01, control DMSO, and Bleb with a 0.5% $s^{-1}$ (100 nm/s) strain rate, and representative frames are shown in FIG. 13. CN01 increased the stress level and rupture did not occur at this test (FIG. 13B). Control DMSO compared to control at 0.5% $s^{-1}$ showed a sign of rupture because of DMSO (FIG. 13A). Since Bleb inhibits myosin II pathway, the cell-cell adhesion junction ruptured at the initial stages and stress level was low compared to other conditions (FIG. 13C).

Cell-Cell Adhesion Junction Length Calculation

Figure 14:
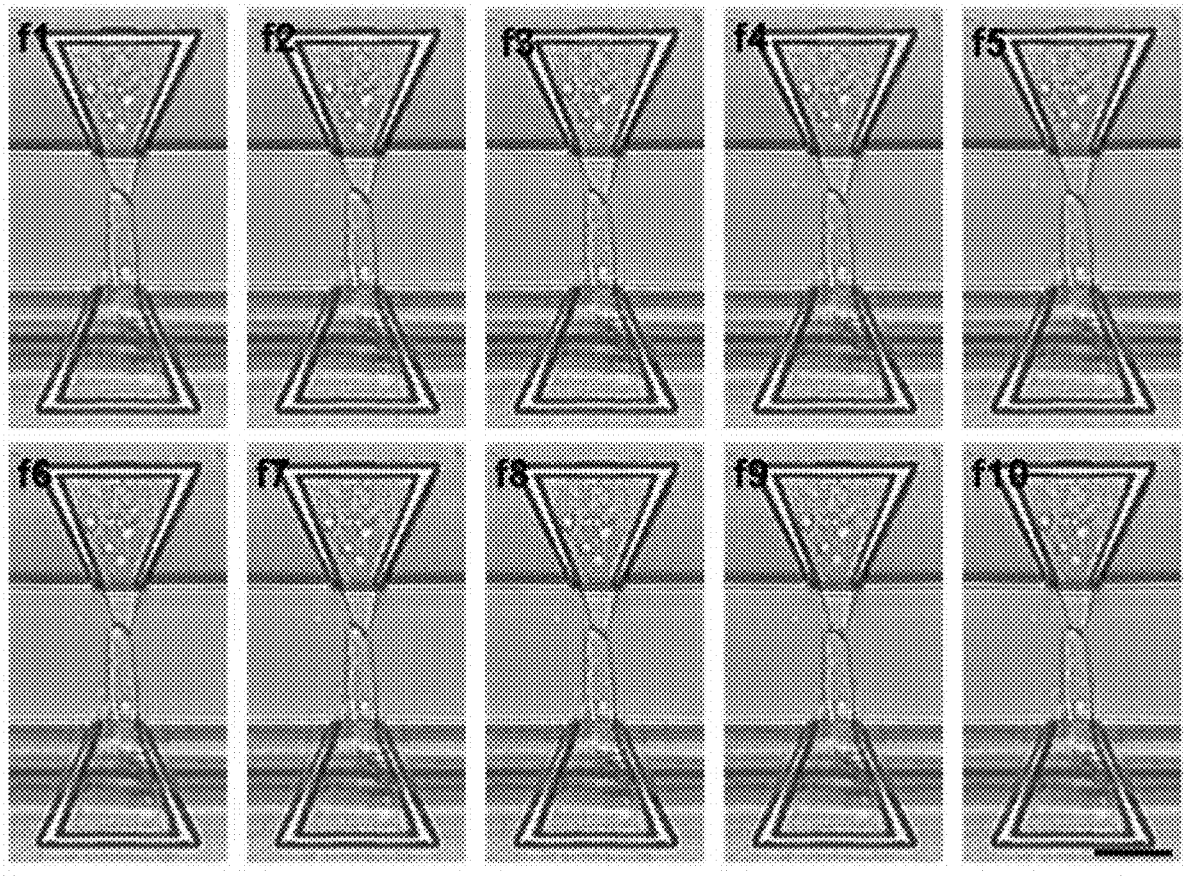
FIG. 14 is a cell-cell adhesion junction length calculation; the cell-cell adhesion junction lengths were calculated using ImageJ software; after defining the scale for each frame, a freehand line was drawn on the junction and its length was captured (f1 to f10); scale bar: 25 μm.

To calculate the junction length, ImageJ (NIH funded software) was used. The scale is assigned to the frames of interest and a freehand line was drawn on the junction (FIG. 14). By analyzing these lines through the software, each length can be measured and tabulated (Table 1).

TABLE 1

Figure 12:
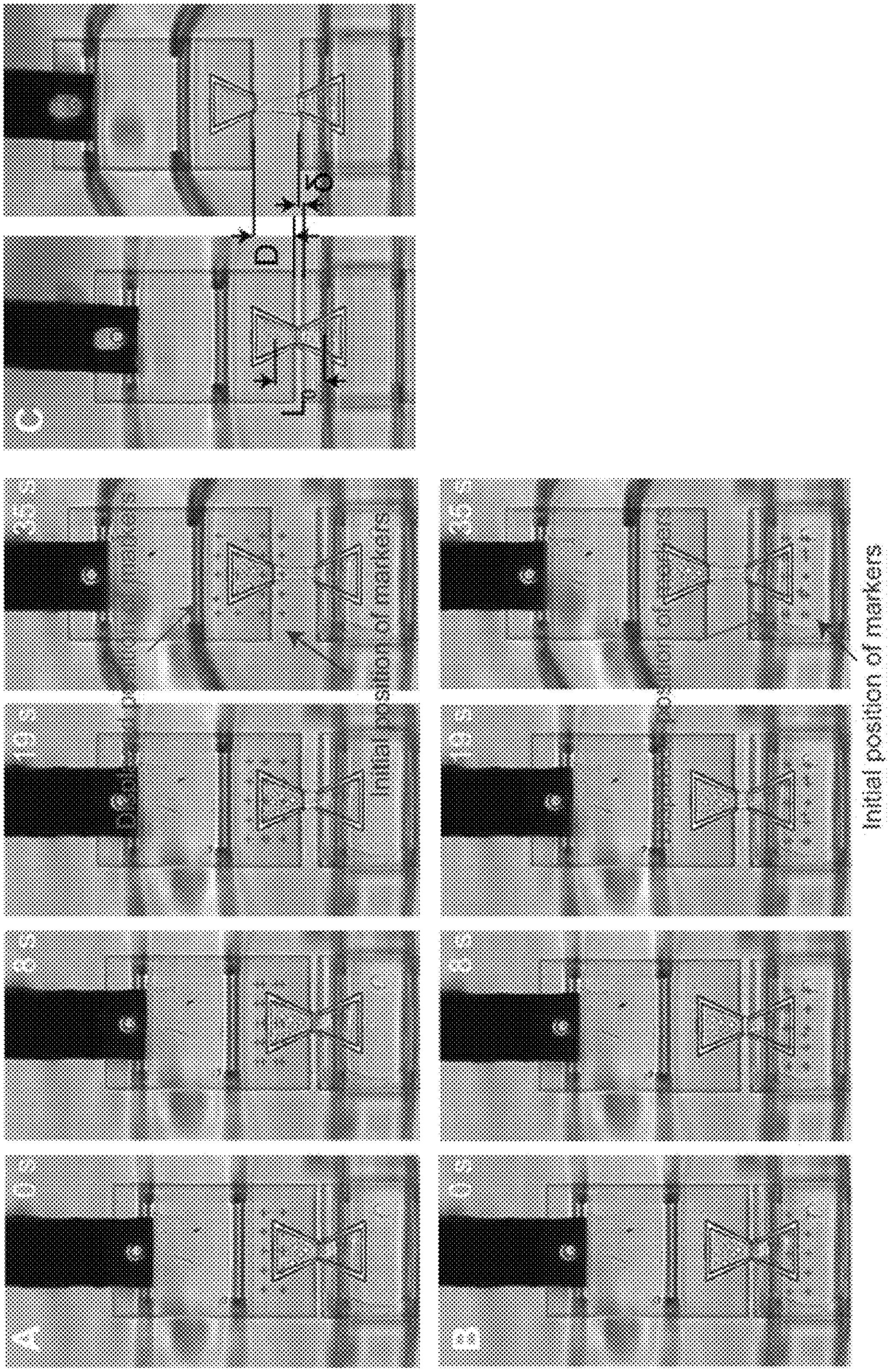
FIG. 12 illustrates a stress-strain calculation.

The corresponding junction lengths to FIG. 12 frames.

| Frame # | Junction length (μm) |
|---|---|
| 1 | 8.019 |
| 2 | 7.889 |
| 3 | 7.931 |
| 4 | 7.673 |
| 5 | 7.043 |
| 6 | 6.698 |
| 7 | 6.121 |
| 8 | 5.789 |
| 9 | 5.513 |
| 10 | 5.147 |

E-Cadherin siRNA Knockdown

To determine the E-cadherin bond effect on the stress-strain curve and bond rupture initiation, E-cadherin siRNA was transfected into A431 GFP-tagged E-cadherin cells. Cells were incubated with E-cadherin siRNA and Lipofectamine RNAiMAX, and with control siRNA and Lipofectamine RNAiMAX as the control sample for 48 h, 72 h, and 96 h. The inhibition in the expression of the E-cadherin protein was confirmed by fluorescence microscopy and immunoblotting. After 48 h, a specific knockdown of E-cadherin expression was visualized by fluorescence microscopy. Immunoblotting shows that the protein levels of E-cadherin were dramatically decreased in A431 GFP-tagged E-cadherin cells compared to control siRNA. These results demonstrate that E-cadherin siRNA can downregulate the E-cadherin expression effectively.

Example 1 References

Each of the following references is incorporated by reference in its entirety for all purposes:

1 Rodriguez-Boulan, E. & Macara, I. G. Organization and execution of the epithelial polarity programme. *Nature reviews. Molecular cell biology* 15, 225-242, (2014).
2 Kadohama, T., Nishimura, K., Hoshino, Y., Sasajima, T. & Sumpio, B. E. Effects of different types of fluid shear stress on endothelial cell proliferation and survival. *J. Cell. Physiol.* 212, 244-251, (2007).
3 Haidekker, M. A., White, C. R. & Frangos, J. A. Analysis of temporal shear stress gradients during the onset phase of flow over a backward-facing step. *J. Biomech. Eng.* 123, 455-463, (2001).
4 Jiang, G. L., White, C. R., Steven, H. Y., Inzunza, M. R. & Frangos, J. A. Temporal gradients in shear, but not ramp flow, stimulate the proliferation of osteoblast-like cells. *J Bone Miner. Res.* 16, S494-S494, (2001).
5 Cai, D. et al. Mechanical feedback through E-cadherin promotes direction sensing during collective cell migration. *Cell* 157, 1146-1159, (2014).
6 Zhang, L., Feng, X. Q. & Li, S. F. Review and perspective on soft matter modeling incellular mechanobiology: cell contact, adhesion, mechanosensing, and motility. *Acta Mechanica* 228, 4095-4122, (2017).
7 Park, J. S. et al. Differential effects of equiaxial and uniaxial strain on mesenchymal stem cells. *Biotechnol. Bioeng.* 88, 359-368, (2004).
8 Chiquet, M., Tunc-Civelek, V. & Sarasa-Renedo, A. Gene regulation by mechanotransduction in fibroblasts. Appl. Physiol. *Nutr. Metab.* 32, 967-973, (2007).
9 Gumbiner, B. M. Regulation of cadherin-mediated adhesion in morphogenesis. *Nat. Rev. Mol. Cell Biol.* 6, 622-634, (2005).
10 Niessen, C. M., Leckband, D. & Yap, A. S. Tissue organization by cadherin adhesion molecules: dynamic molecular and cellular mechanisms of morphogenetic regulation. *Physiol. Rev.* 91, 691-731, (2011).
11 Tepass, U., Truong, K., Godt, D., Ikura, M. & Peifer, M. Cadherins in embryonic and neural morphogenesis. *Nat. Rev. Mol. Cell Biol.* 1, 91-100, (2000).
12 Ding, L. et al. Genome remodelling in a basal-like breast cancer metastasis and xenograft. *Nature* 464, 999-1005, (2010).
13 Najor, N. A. Desmosomes in Human Disease. *Annu. Rev. Pathol.* 13, 51-70, (2018).
14 Bierkamp, C., McLaughlin, K. J., Schwarz, H., Huber, O. & Kemler, R. Embryonic heart and skin defects in mice lacking plakoglobin. *Dev. Biol.* 180, 780-785, (1996).
15 Sundfeldt, K. Cell-cell adhesion in the normal ovary and ovarian tumors of epithelial origin; an exception to the rule. *Mol. Cell. Endocrinol.* 202, 89-96, (2003).
16 Lozano, E., Betson, M. & Braga, V. M. Tumor progression: Small GTPases and loss of cell-cell adhesion. *BioEssays* 25, 452-463, (2003).
17 Maiti, R. et al. In vivo measurement of skin surface strain and sub-surface layer deformation induced by natural tissue stretching. *J Mech Behav Biomed Mater* 62, 556-569, (2016).
18 Padala, M. et al. Mechanics of the mitral valve strut chordae insertion region. *J. Biomech. Eng.* 132, 081004, (2010).
19 He, Z., Ritchie, J., Grashow, J. S., Sacks, M. S. & Yoganathan, A. P. In vitro dynamic strain behavior of the mitral valve posterior leaflet. *J. Biomech. Eng.* 127, 504-511, (2005).
20 Perlman, C. E. & Bhattacharya, J. Alveolar expansion imaged by optical sectioning microscopy. *J Appl Physiol* (1985) 103, 1037-1044, (2007).
21 Monemian Esfahani, A. et al. Tissue Regeneration from Mechanical Stretching of Cell-Cell Adhesion. *Tissue Eng Part C Methods*, (2019).
22 Charras, G. & Yap, A. S. Tensile Forces and Mechanotransduction at Cell-Cell Junctions. *Curr. Biol.* 28, R445-R457, (2018).
23 Singh Vishen, A., Rupprecht, J. F., Shivashankar, G. V., Prost, J. & Rao, M. Soft inclusion in a confined fluctuating active gel. *Phys Rev E* 97, 032602, (2018).
24 Khalilgharibi, N., Fouchard, J., Recho, P., Charras, G. & Kabla, A. The dynamic mechanical properties of cellularised aggregates. *Curr. Opin.* CellBiol. 42, 113-120, (2016).
25 Liang, X., Michael, M. & Gomez, G. A. Measurement of Mechanical Tension at Cell-cell Junctions Using Two-photon Laser Ablation. *Bio-protocol* 6, e2068, (2016).
26 Tambe, D. T. et al. Collective cell guidance by cooperative intercellular forces. *Nat. Mater.* 10, 469-475, (2011).
27 Jodoin, J. N. et al. Stable Force Balance between Epithelial Cells Arises from F-Actin Turnover. *Dev. Cell* 35, 685-697, (2015).
28 Khalilgharibi, N. et al. Stress relaxation in epithelial monolayers is controlled by the actomyosin cortex. *Nat. Phys.* 15, 839-847, (2019).
29 Bertocchi, C. et al. Nanoscale architecture of cadherin-based cell adhesions. *Nat. Cell Biol.* 19, 28-37, (2017).
30 Bays, J. L. et al. Vinculin phosphorylation differentially regulates mechanotransduction at cell-cell and cell-matrix adhesions. *J. Cell Biol.* 205, 251-263, (2014).
31 Bays, J. L., Campbell, H. K., Heidema, C., Sebbagh, M. & DeMali, K. A. Linking E-cadherin mechanotransduction to cell metabolism through force-mediated activation of AMPK. *Nat. Cell Biol.* 19, 724-731, (2017).
32 Kametani, Y. & Takeichi, M. Basal-to-apical cadherin flow at cell junctions. *Nat. Cell Biol.* 9, 92-98, (2007).
33 Priya, R., Yap, A. S. & Gomez, G. A. E-cadherin supports steady-state Rho signaling at the epithelial zonula adherens. *Differentiation* 86, 133-140, (2013).
34 Bois, J. S., Julicher, F. & Grill, S. W. Pattern formation in active fluids. *Phys. Rev. Lett.* 106, 028103, (2011).
35 Priya, R. et al. Bistable front dynamics in a contractile medium: Travelling wave fronts and cortical advection define stable zones of RhoA signaling at epithelial adherens junctions. *PLoS Comput. Biol.* 13, (2017).
36 Jurado, J., de Navascues, J. & Gorfinkiel, N. alpha-Catenin stabilises Cadherin-Catenin complexes and modulates actomyosin dynamics to allow pulsatile apical contraction. *J. Cell Sci.* 129, 4496-4508, (2016).
37 Buckley, C. D. et al. Cell adhesion. The minimal cadherin-catenin complex binds to actin filaments under force. *Science* 346, 1254211, (2014).
38 Manibog, K., Li, H., Rakshit, S. & Sivasankar, S. Resolving the molecular mechanism of cadherin catch bond formation. *Nature Communications* 5, (2014).
39 Huang, D. L., Bax, N. A., Buckley, C. D., Weis, W. I. & Dunn, A. R. Vinculin forms a directionally asymmetric catch bond with F-actin. *Science* 357, 703-706, (2017).
40 Rakshit, S., Zhang, Y. X., Manibog, K., Shafraz, O. & Sivasankar, S. Ideal, catch, and slip bonds in cadherin adhesion. *Proc. Natl. Acad. Sci. U.S.A* 109, 18815-18820, (2012).
41 Ahmadzadeh, H., Smith, D. H. & Shenoy, V. B. Viscoelasticity of tau proteins leads to strain rate-dependent breaking of microtubules during axonal stretch injury: predictions from a mathematical model. *Biophys. J.* 106, 1123-1133, (2014).

42 Gardel, M. L., Kasza, K. E., Brangwynne, C. P., Liu, J. & Weitz, D. A. Chapter 19: Mechanical response of cytoskeletal networks. *Methods CellBiol.* 89, 487-519, (2008).

43 Hu, J. et al. Size- and speed-dependent mechanical behavior in living mammalian cytoplasm. *Proc. Natl. Acad. Sci. U.S.A* 114, 9529-9534, (2017).

44 Casares, L. et al. Hydraulic fracture during epithelial stretching. *Nat. Mater.* 14, 343-351, (2015).

45 Harris, A. R. et al. Characterizing the mechanics of cultured cell monolayers. *Proc. Natl. Acad. Sci. U.S.A* 109, 16449-16454, (2012).

46 Trepat, X. et al. Effect of stretch on structural integrity and micromechanics of human alveolar epithelial cell monolayers exposed to thrombin. *American Journal of Physiology-Lung Cellular and Molecular Physiology* 290, L 1104-L 1110, (2006).

47 Legant, W. R. et al. Multidimensional traction force microscopy reveals out-of-plane rotational moments about focal adhesions. *P Natl Acad Sci USA* 110, 881-886, (2013).

48 Liu, Z. J. et al. Mechanical tugging force regulates the size of cell-cell junctions. *Proc. Natl. Acad. Sci. U.S.A* 107, 9944-9949, (2010).

49 Klein, F. et al. Two-component polymer scaffolds for controlled three-dimensional cell culture. *Adv Mater* 23, 1341-1345, (2011).

50 Klein, F. et al. Elastic Fully Three-dimensional Microstructure Scaffolds for Cell Force Measurements. *Advanced Materials* 22, 868-+, (2010).

51 Chu, Y. S. et al. Force measurements in E-cadherin-mediated cell doublets reveal rapid adhesion strengthened by actin cytoskeleton remodeling through Rac and Cdc42. *J. Cell Biol.* 167, 1183-1194, (2004).

52 Cumpston, B. H. et al. Two-photon polymerization initiators for three-dimensional optical data storage and microfabrication. *Nature* 398, 51-54, (1999).

53 Yang, R., Broussard, J. A., Green, K. J. & Espinosa, H. D. Techniques to stimulate and interrogate cell-cell adhesion mechanics. *Extreme Mech Lett* 20, 125-139, (2018).

54 Broussard, J. A. et al. The desmoplakin/intermediate filament linkage regulates cell mechanics. *Mol. Biol. Cell*, mbc. E16-07-0520, (2017).

55 Liu, Z. et al. Mechanical tugging force regulates the size of cell-cell junctions. *Proc. Natl. Acad. Sci. U.S.A* 107, 9944-9949, (2010).

56 Frohlich, J. & Konig, H. New techniques for isolation of single prokaryotic cells. *FEMS Microbiol. Rev.* 24, 567-572, (2000).

57 Slomka, N., Oomens, C. W. & Gefen, A. Evaluating the effective shear modulus of the cytoplasm in cultured myoblasts subjected to compression using an inverse finite element method. *Journal of the mechanical behavior of biomedical materials* 4, 1559-1566, (2011).

58 Waugh, R. & Tsai, M. in *Cell Mechanics and Cellular Engineering* 33-44 (Springer, 1994).

59 Marion, S., Guillen, N., Bacri, J.-C. & Wilhelm, C. Acto-myosin cytoskeleton dependent viscosity and shear-thinning behavior of the amoeba cytoplasm. *Eur. Biophys. J.* 34, 262-272, (2005).

60 Panorchan, P. et al. Single-molecule analysis of cadherin-mediated cell-cell adhesion. *J. Cell Sci.* 119, 66-74, (2006).

61 Thomas, W. E. Understanding the counterintuitive phenomenon of catch bonds. *Current Nanoscience* 3, 63-77, (2007).

62 Panorchan, P., George, J. P. & Wirtz, D. Probing intercellular interactions between vascular endothelial cadherin pairs at single-molecule resolution and in living cells. *J. Mol. Biol.* 358, 665-674, (2006).

63 Friedrichs, J. et al. A practical guide to quantify cell adhesion using single-cell force spectroscopy. *Methods* 60, 169-178, (2013).

64 Vedula, S. et al. Quantifying forces mediated by integral tight junction proteins in cell-cell adhesion. *Experimental mechanics* 49, 3-9, (2009).

65 Tabdili, H. et al. Cadherin-dependent mechanotransduction depends on ligand identity but not affinity. *J. Cell Sci.* 125, 4362-4371, (2012).

66 Kashef, J. & Franz, C. M. Quantitative methods for analyzing cell-cell adhesion in development. *Dev. Biol.* 401, 165-174, (2015).

Example 2

In recent years, two-photon polymerization (TPP), or direct laser writing (DLW), has been widely used to create micro- and nanoscale structures such as microfluidic chambers, three-dimensional (3D) tissue scaffolds, cellular mechanical interrogators, and for in vivo implantation, providing a suite of toolboxes for studying cell mechanobiology in 3D. Complex 3D structures can be fabricated by selectively polymerizing photoresists at the focus of a femtosecond-laser, with the ability to produce features of less than 100 nm. Besides the high resolution, these 3D extracellular environments can be synthesized with tailored mechanical properties, such as stiffness, and topographic characteristics, such as porosity, roughness, and adhesion propensity. Coupling this with excellent biocompatibility of the TPP resins and precision surface functionalization, TPP-printed scaffolds enable the study of a host of cellular behavior, such as 3D cell migration, cancer cell invasion, 3D cell extracellular matrix (ECM) adhesion, and stem cell differentiation. They have also been increasingly used to measure forces generated by single cells, affording a new frontier in mechanobiology.

Studying cellular behavior in 3D environments requires knowledge of the mechanics of the scaffolds in liquid and under physiological conditions. This knowledge plays a crucial role in the quantification of cell mechanical behaviors during cellular interaction with the scaffolds and in guiding the selection of TPP writing parameters to generate scaffolds with desired mechanical behavior. However, previous mechanical studies on TPP-printed structures were carried out in air, due to the limitations of conventional micro- and nanoscale mechanical testing methods. For instance, tensile testing of TPP-printed beam-like structures and nanowires has been performed in air using a conventional micro-electro-mechanical systems (MEMS)-based tensile tester, yielding a Young's modulus of a few GPa for an IP-DIP (a proprietary photoresist from Nanoscribe GmbH) nanowire with a diameter of a few hundred nanometers. These values are an order of magnitude higher than reported from a lone mechanical characterization of Ormocomp performed in liquid with AFM indentation. This large discrepancy in measured Young's moduli lends support to the development of a liquid-based mechanical characterization method. In addition, mechanical properties of the TPP-printed structures vary significantly among a large selection of TPP materials, such as acrylates, SU-8 resins, and hydrogels, and their mechanical properties can be significantly modified in the presence of liquid. Moreover, the choice of writing parameters for polymerization, i.e., laser intensity and writing speed, introduces additional variabilities to the mechanical properties of the resulting scaffolds. Finally, a liquid based mechanical characterization method enables quantitative examination of 4D printed microstructures during their shape-morphing process. 4D printing refers to shape-morphing 3D printed structures, and it has been realized in cellular scaffolds. One of the major environmental stimuli that induce shape-morphing is water content, along with temperature, light, and force interactions. Therefore, a precisely defined mechanical testing method in liquid for TPP-printed structures is strongly warranted.

In this contribution, we report a new method for the mechanical characterization of the mechanical properties of TPP-printed microfibers in liquid environment. The method utilizes two TPP-printed movable plates for actuation and force sensing, which are mechanically coupled by microfibers printed in between and supported by vertical flexible beams. The stress-strain relationship of the microfiber is obtained by applying a displacement with a controlled rate to the actuation plate and evaluating the resulting displacement of the sensing plate. With these stress-strain characterizations, we show that the Young's moduli of the TPP-printed microfibers are significantly reduced in liquid as compared to values obtained in air. Moreover, we show that the mechanical behavior of the microfibers can be tailored by controlling the TPP writing parameters, i.e., laser intensity and writing speed. Further, a size-dependent shape memory effect was observed on the microfibers. Plastically deformed microfibers can recover their pre-deformed shapes in water but not in air. Lastly, the viscoelastic behavior of the microfiber is characterized using tensile tests at different strain rates. The reported methods use of a two-step TPP process can be adopted to perform mechanical characterization of a wide spectrum of biomaterials in liquid conditions, paving the way for reaching the full potential of TPP fabricated 3D scaffolds for mechanobiological studies.

Results

A Microscale Tensile Testing (μTT) Device Fabricated by TPP

Figure 16:
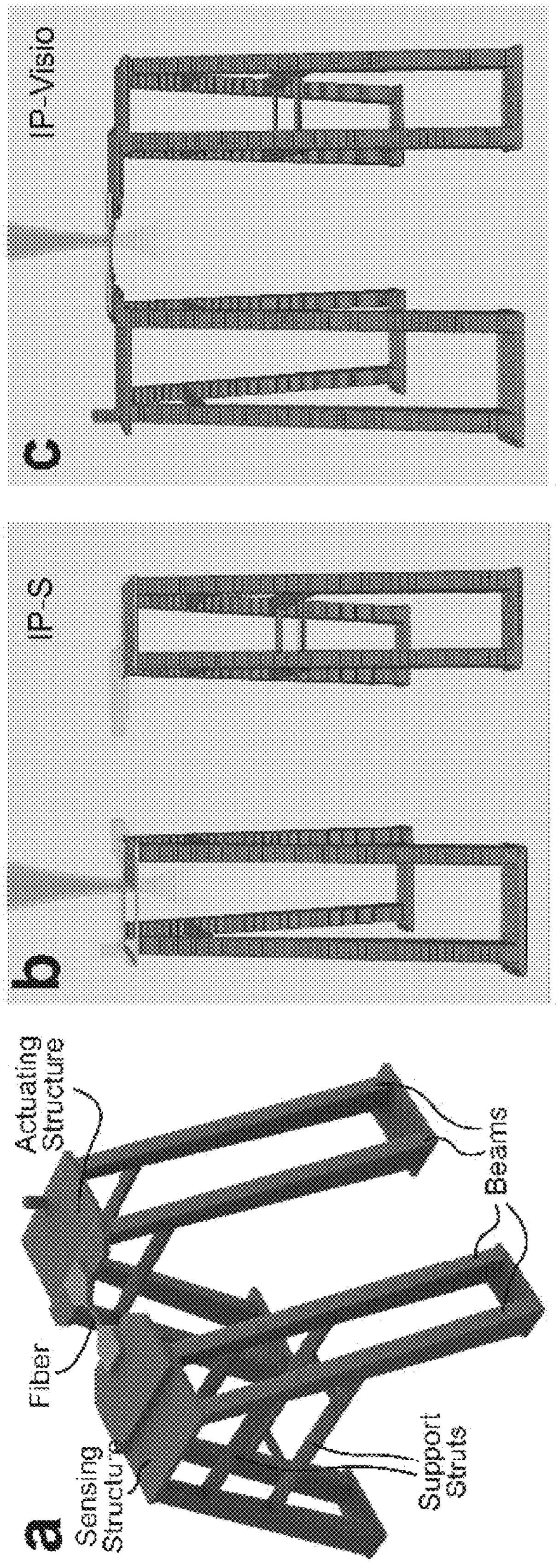
FIG. 16 shows a μTT platform to perform tensile testing of TPP-printed microfibers.
Figure 16:
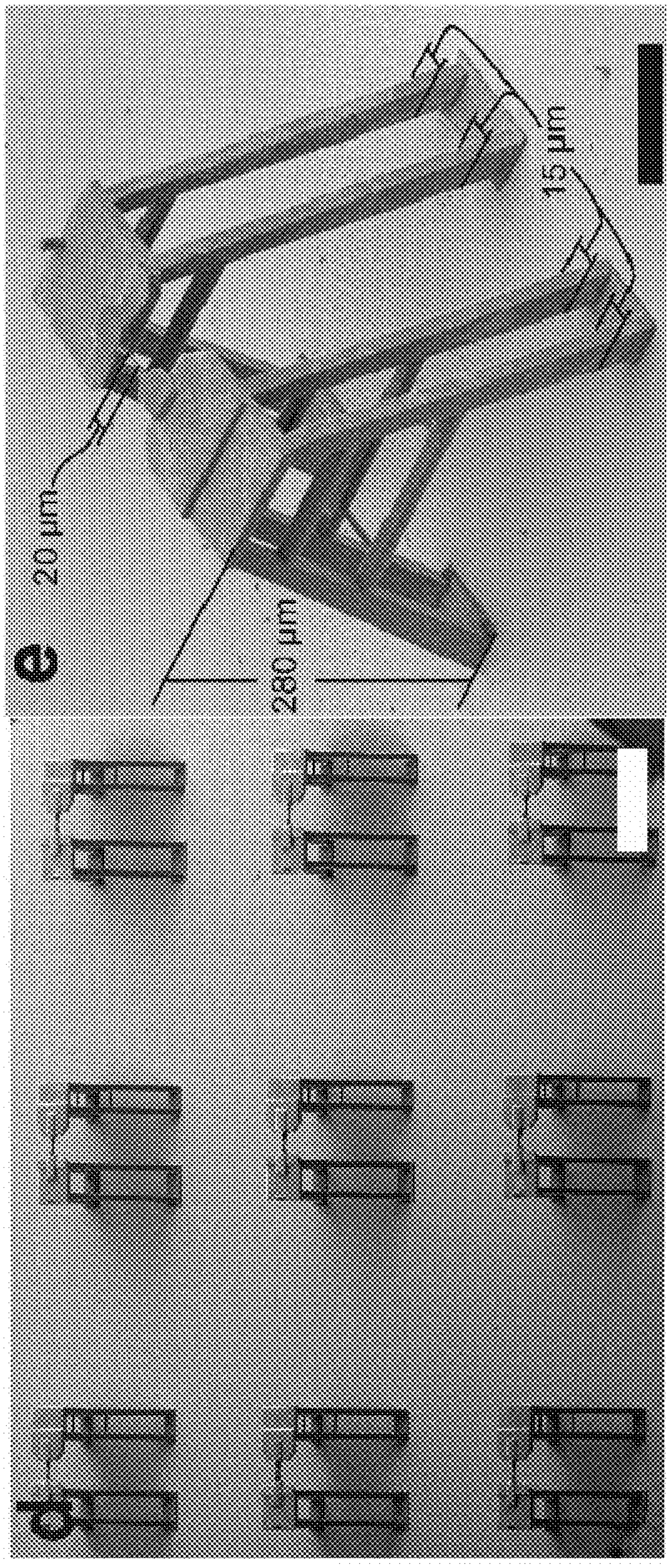
Figure 16:
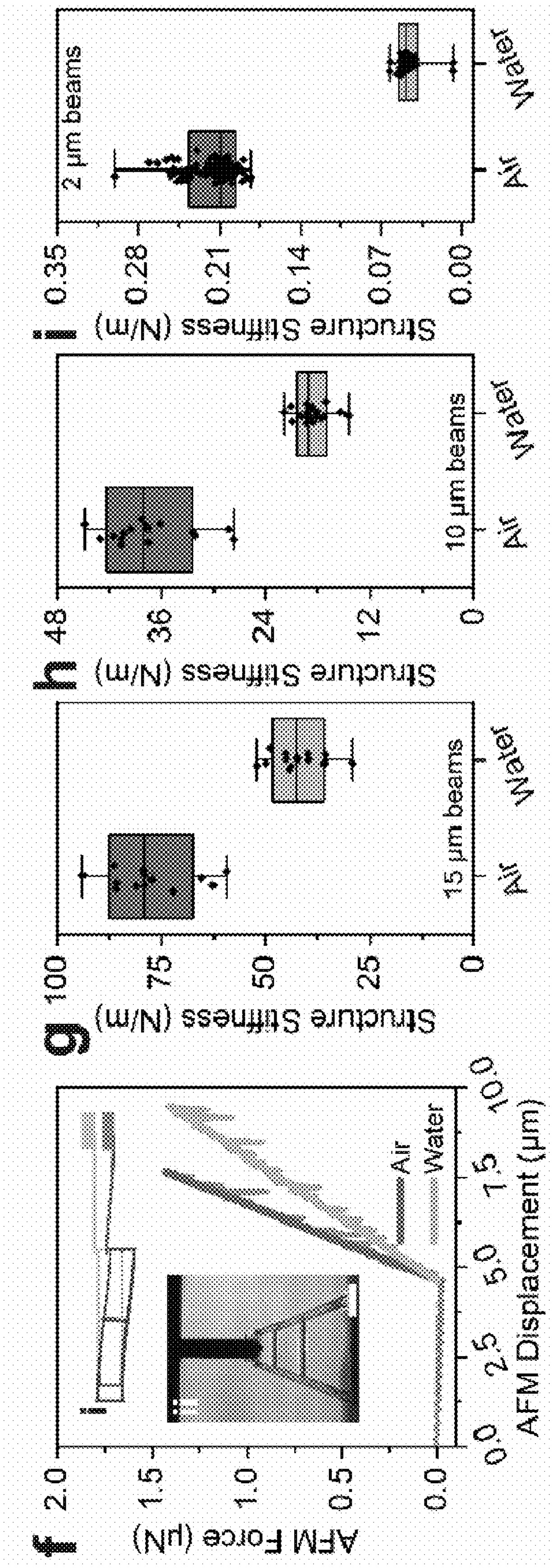

As shown in FIG. 16*a*, fabricated from a two-stage TPP process, the micro-scale tensile testing (μTT) device consists of two horizontally movable testing stages supported by the "A-shaped" vertical trusses at the bottom. One of the stages is called the actuation stage. It is actuated by a piezo controlled atomic force microscope (AFM) through the connection between a pin printed on top of the stage and a hole on the AFM probe. The other stage is termed the sensing stage. By first calibrating stiffness of the supporting truss, the force acting on the sensing stage is determined by the deflection of the stage. The microfibers to be tested are suspended between the two stages. Such μTT devices and microfibers are sequentially fabricated using a two-step TPP process. In the first step, the testing stages and the supporting truss are fabricated from a proprietary resin, IP-S(Nanoscribe GmbH) with DiLL (Dip-in Laser Lithography). For DiLL, a high numerical aperture objective was dipped into a photoresin and a femto-second laser beam was focused within the resin, allowing an aberration free polymerization of the resin. The photoresins consist of a base monomer and photo-initiator. The region where the pulse reaches focus and the volumetric photon-density is high enough to initiate a radical based polymerization reaction is known as the voxel. The testing devices were produced by scanning through voxels in a layer-by-layer fashion on top of a silicon substrate. Next, the microfibers to be tested are fabricated using a second round of TPP processing (FIG. 16*b, c*). After development and removal of un-crosslinked IP-S resin, the structure from the first step was then immersed in another type of printing material, IP-Visio, to produce the microfibers that connect the two stages using TPP. IP-Visio is a proprietary resin from Nanoscribe, with significantly reduced light absorption after polymerization. This provides better imaging quality which makes it an excellent candidate for cellular scaffolds. It has recently attracted wide interest, especially when biological imaging is required. Both IP-S and IP-Visio are acrylate-based resins (see monomer and photo initiator information in the Experimental Section), ensuring that the bonding of the microfibers to the testing device is sufficiently strong for the tensile tests. It is noted that the proposed fabrication method is not limited to the printing of microfibers. More complex structures such as 3D cellular scaffolds can be printed between the movable stages and tested in a similar way.

Figure 22:
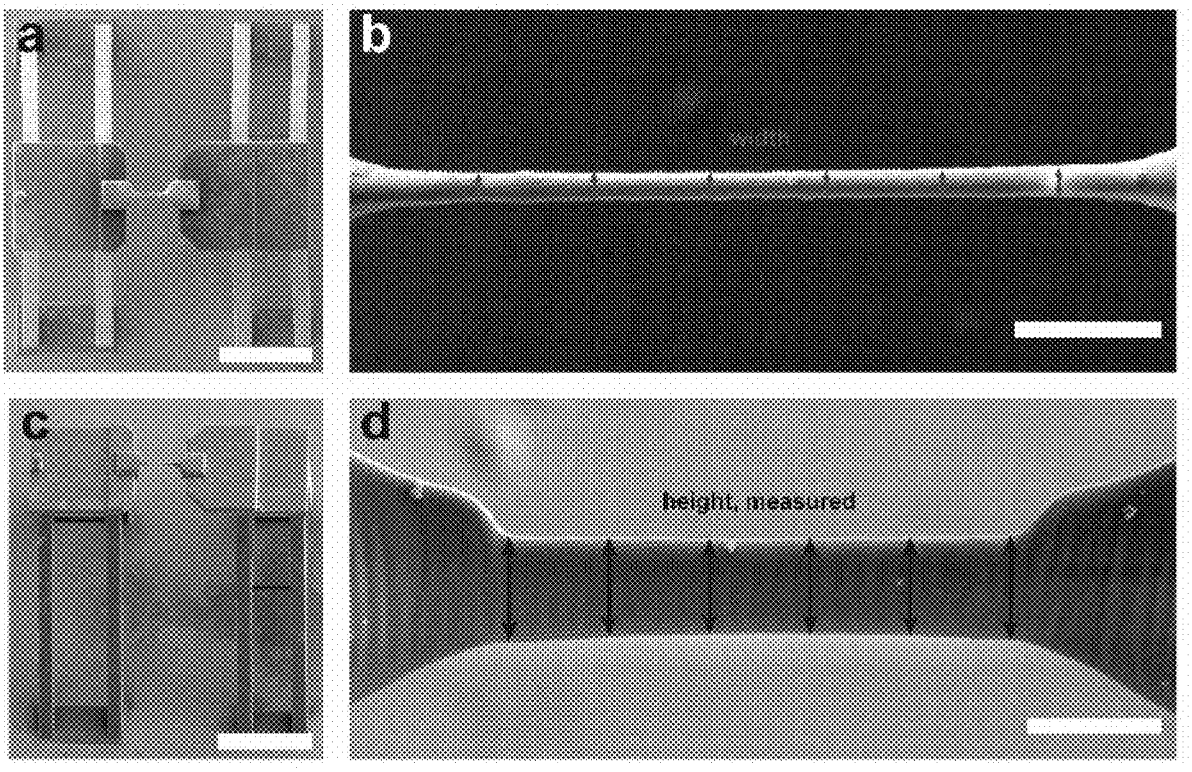
FIG. 22 shows a SEM fiber area measurement method.
Figure 22:
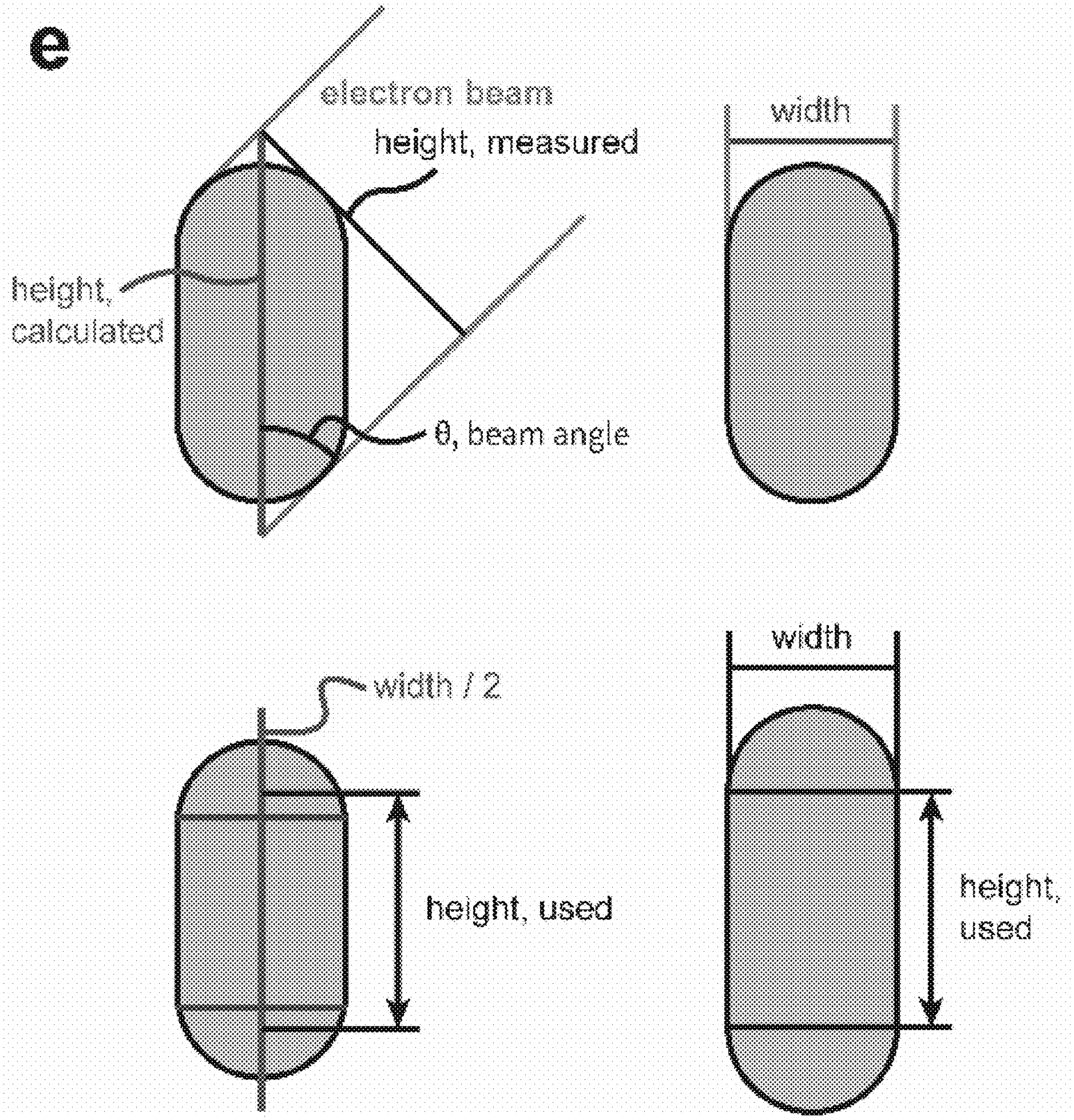
Figure 23:
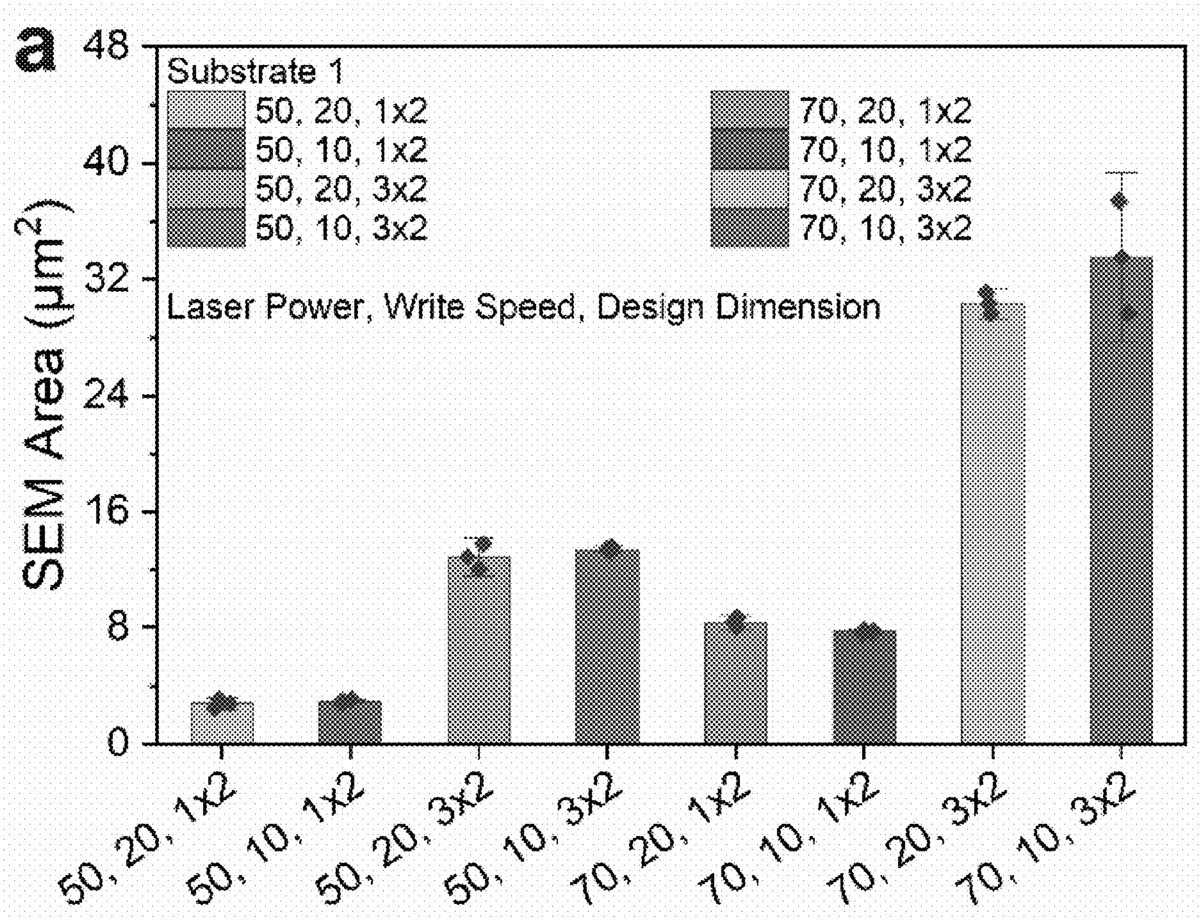
FIG. 23 shows IP-Visio SEM fiber area measurement comparisons. Labels: Laser Writing Power (% max), Laser Writing Speed (mm/s), Fiber Designed Dimension (width× height, m).
Figure 23:
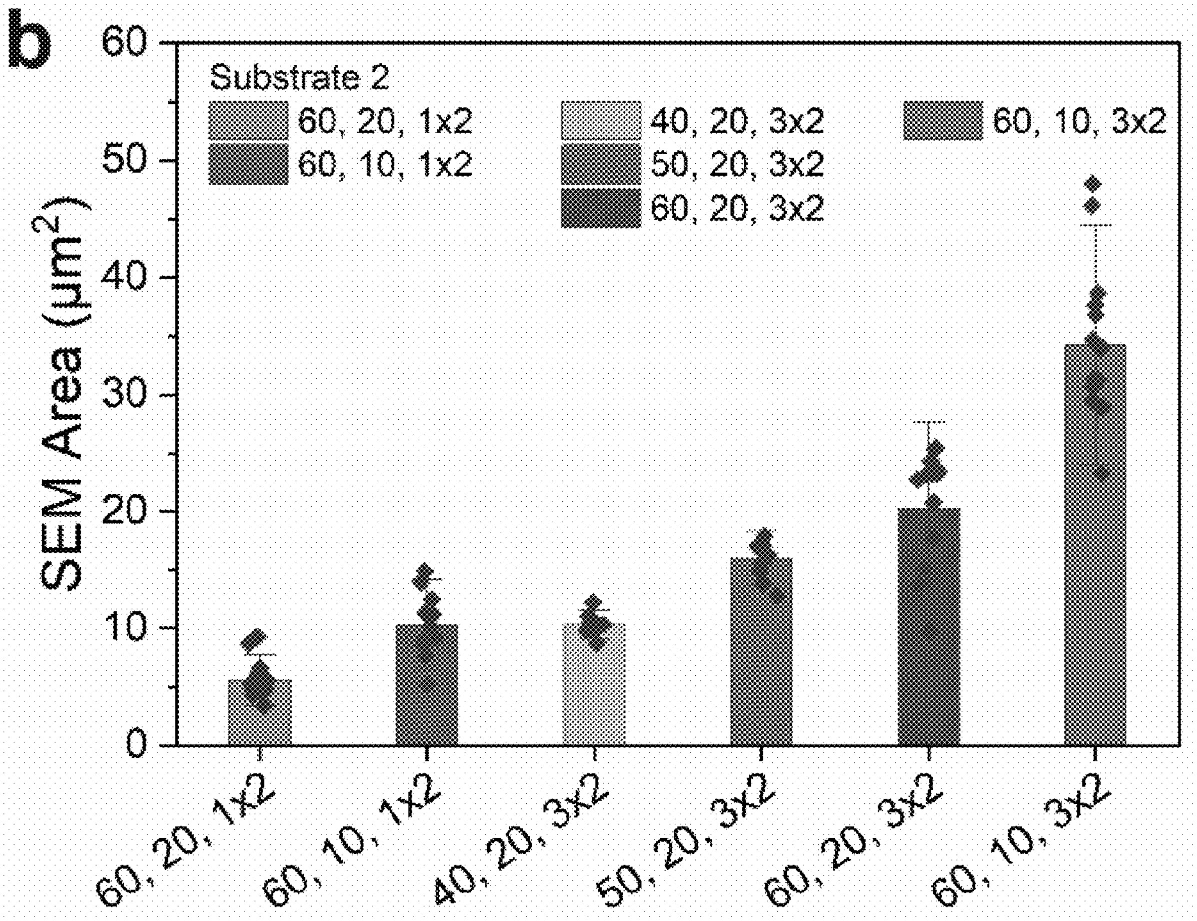
Figure 23:
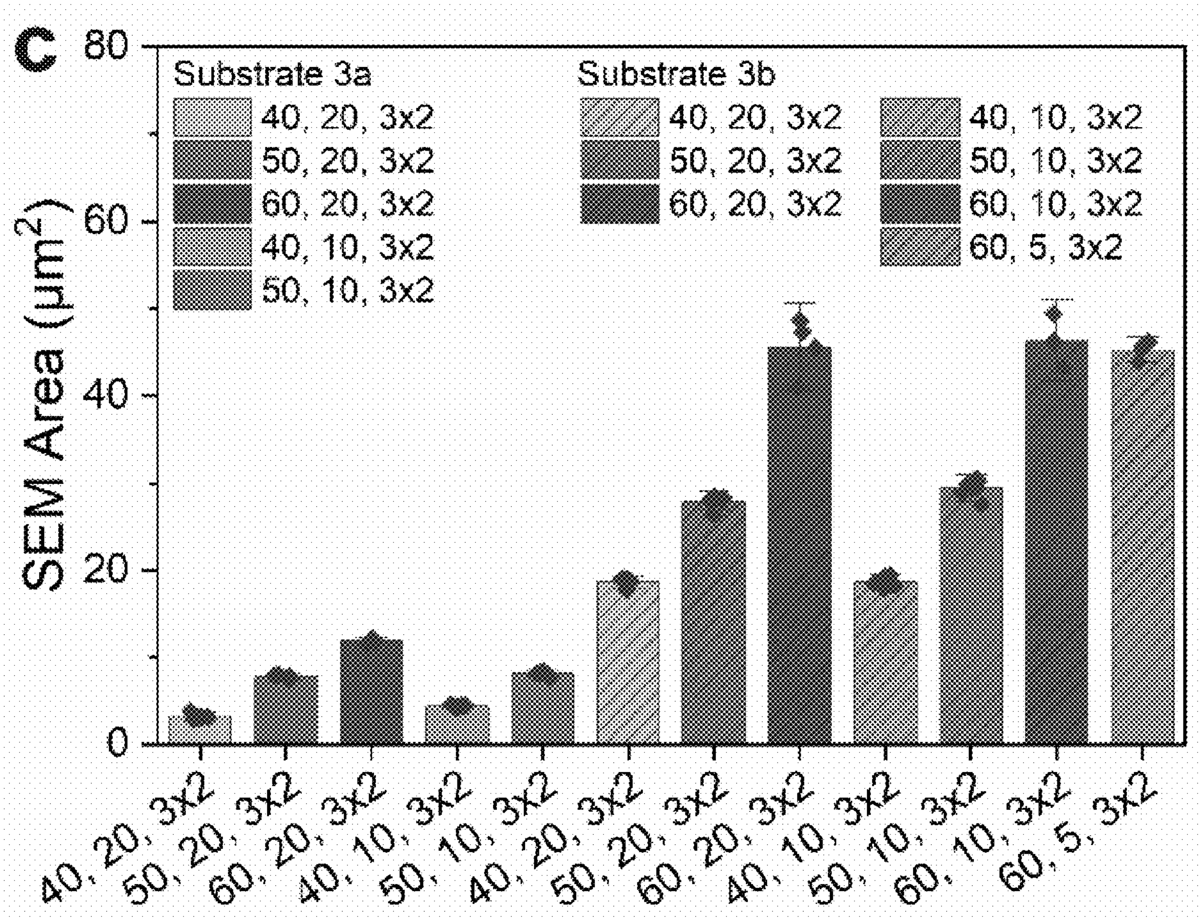
Figure 23:
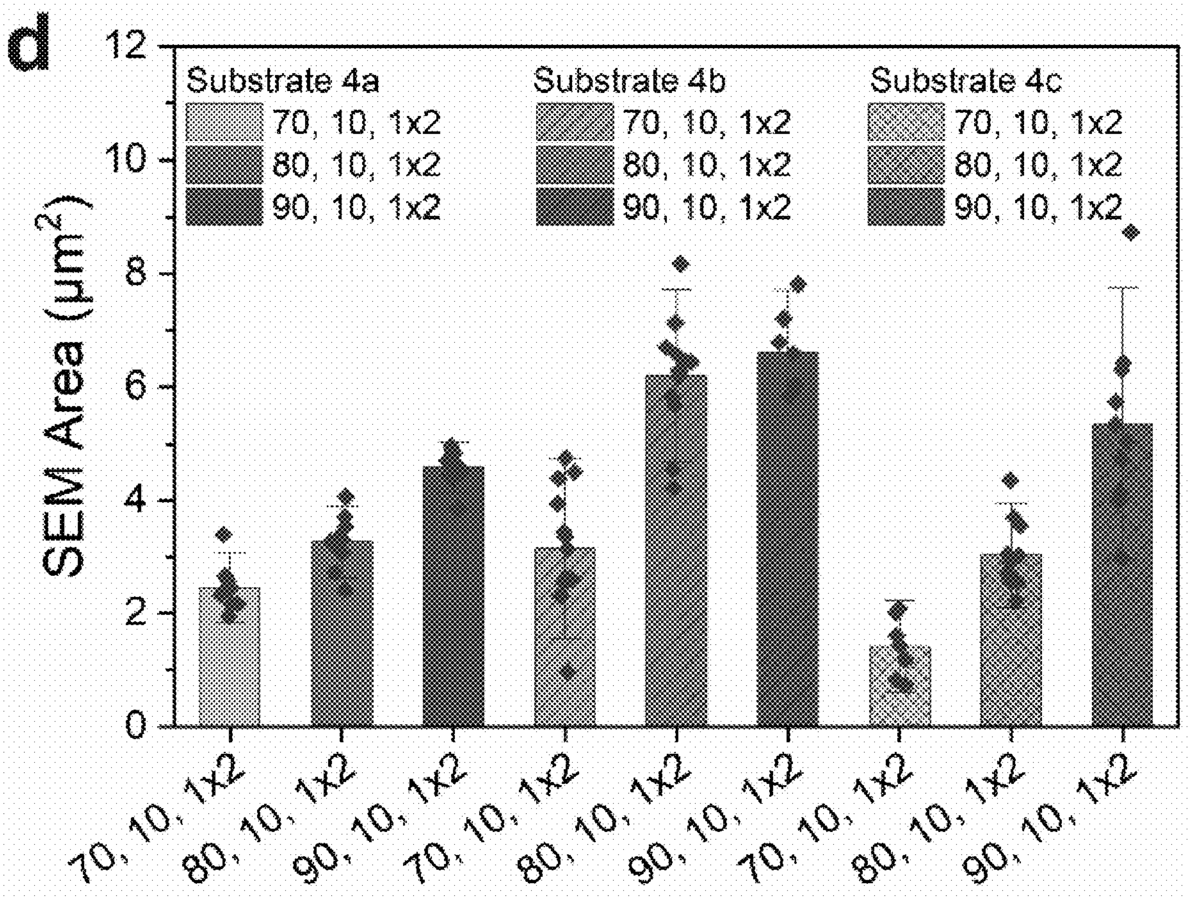

The final structures, consisting of the testing device and microfiber specimens, were examined in a scanning electron microscope (SEM) (FIG. 16*d, e*). FIG. 1*d* shows the arrays of fabricated structures, enabling high throughput tensile testing of a large number of specimens with similar and varied parameters. In the fabrication process, the laser power, the laser writing speed, and the dimensions of the microfiber, as well as the testing device, can be tailored. It is worth noting that we observed higher laser power and slower writing speed correlated to increased fiber cross-section area of fibers designed with the same nominal dimension, as measured from SEM images of IP-Visio fibers (FIG. 22, FIG. 23).

Figure 24:
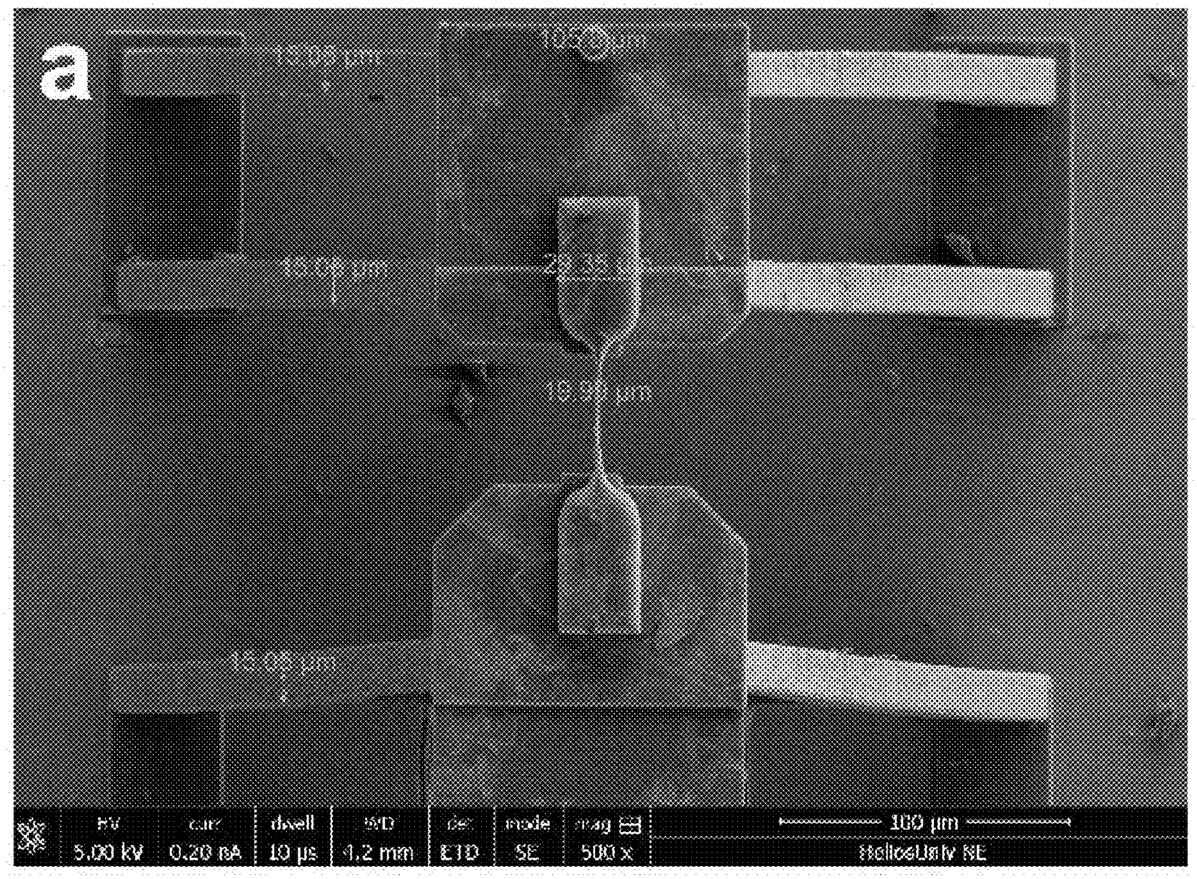
FIG. 24 illustrates μTT sensing structure calibration and beam theory modeling.
Figure 24:
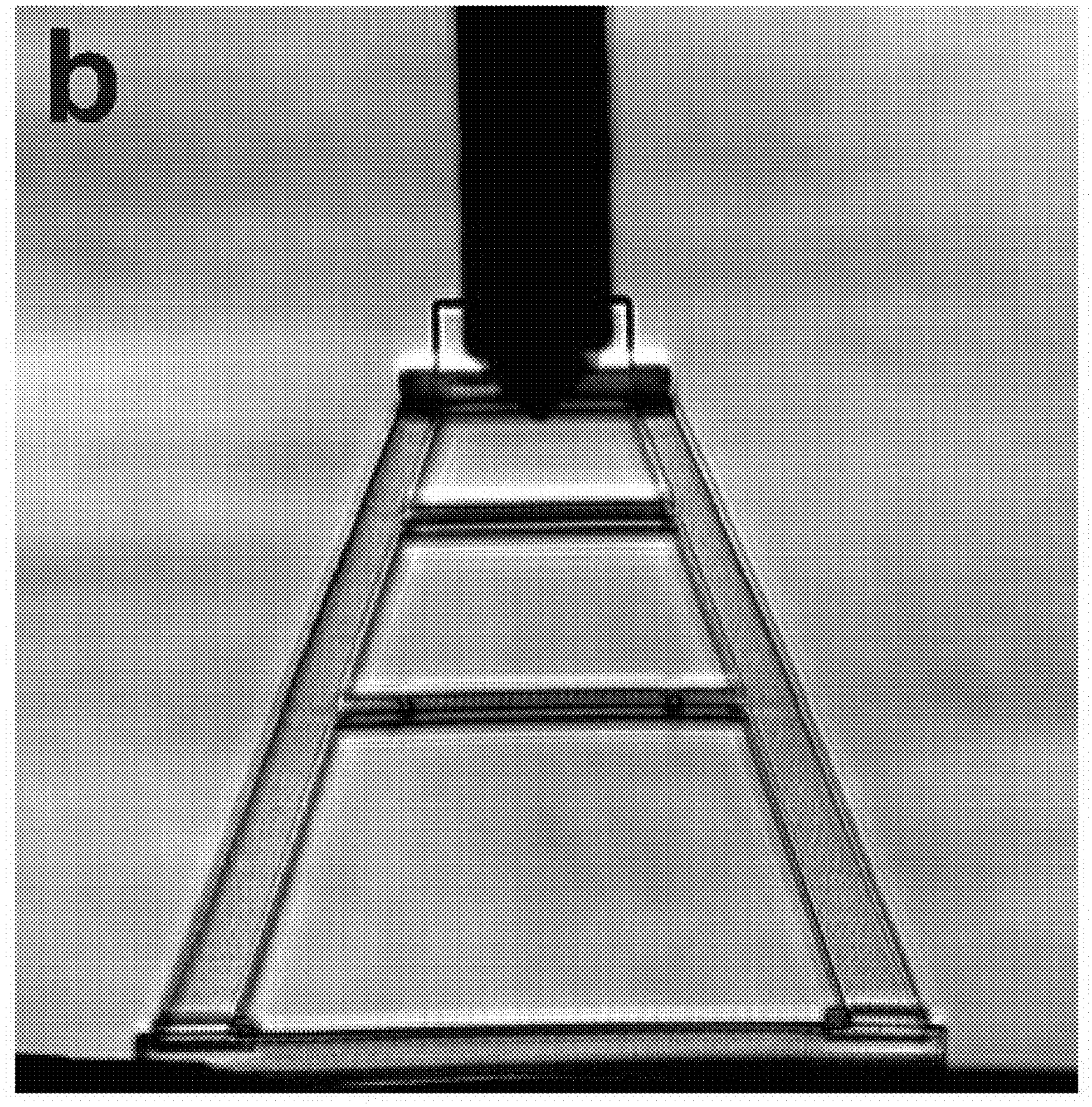
Figure 24:
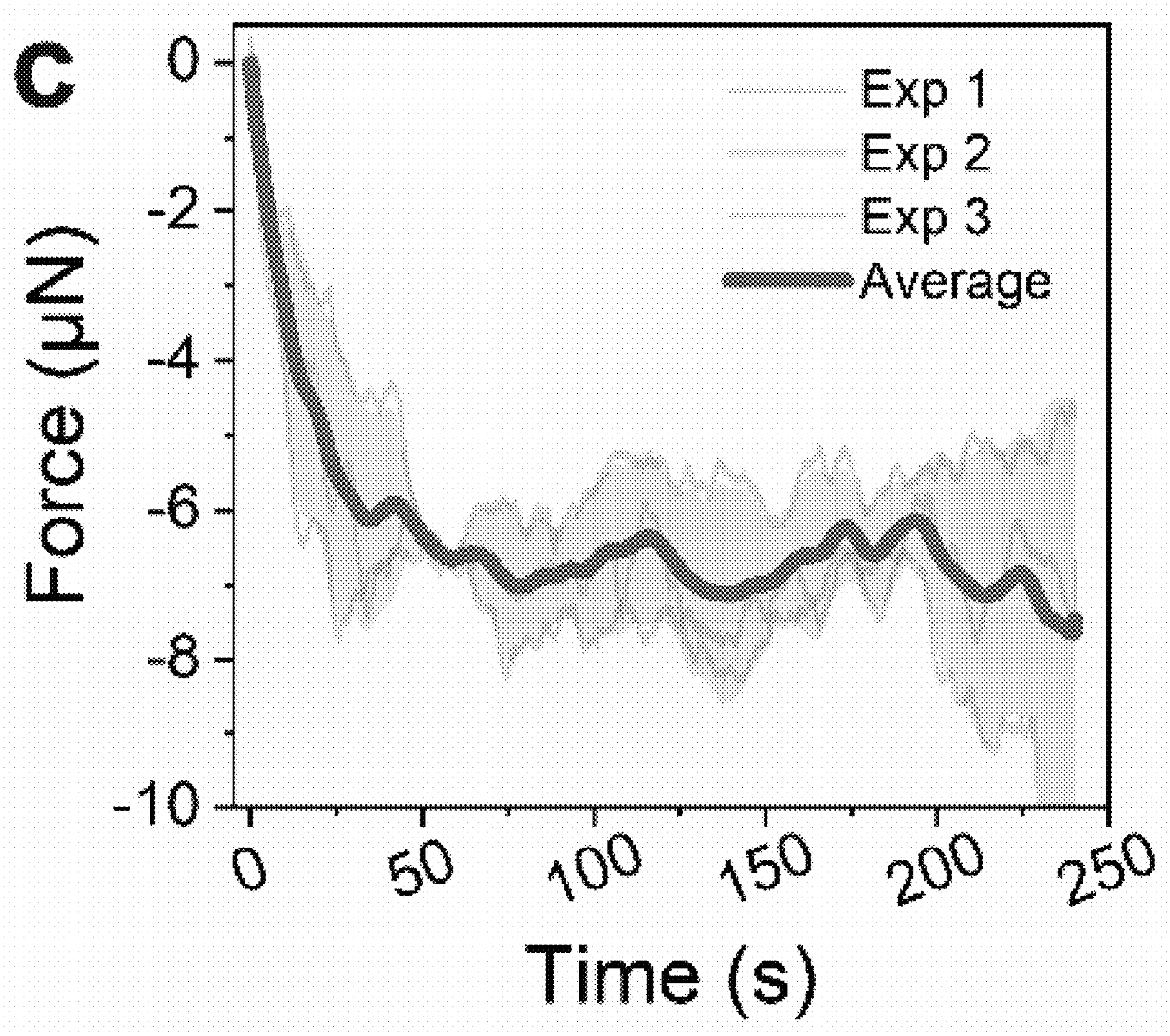
Figure 24:
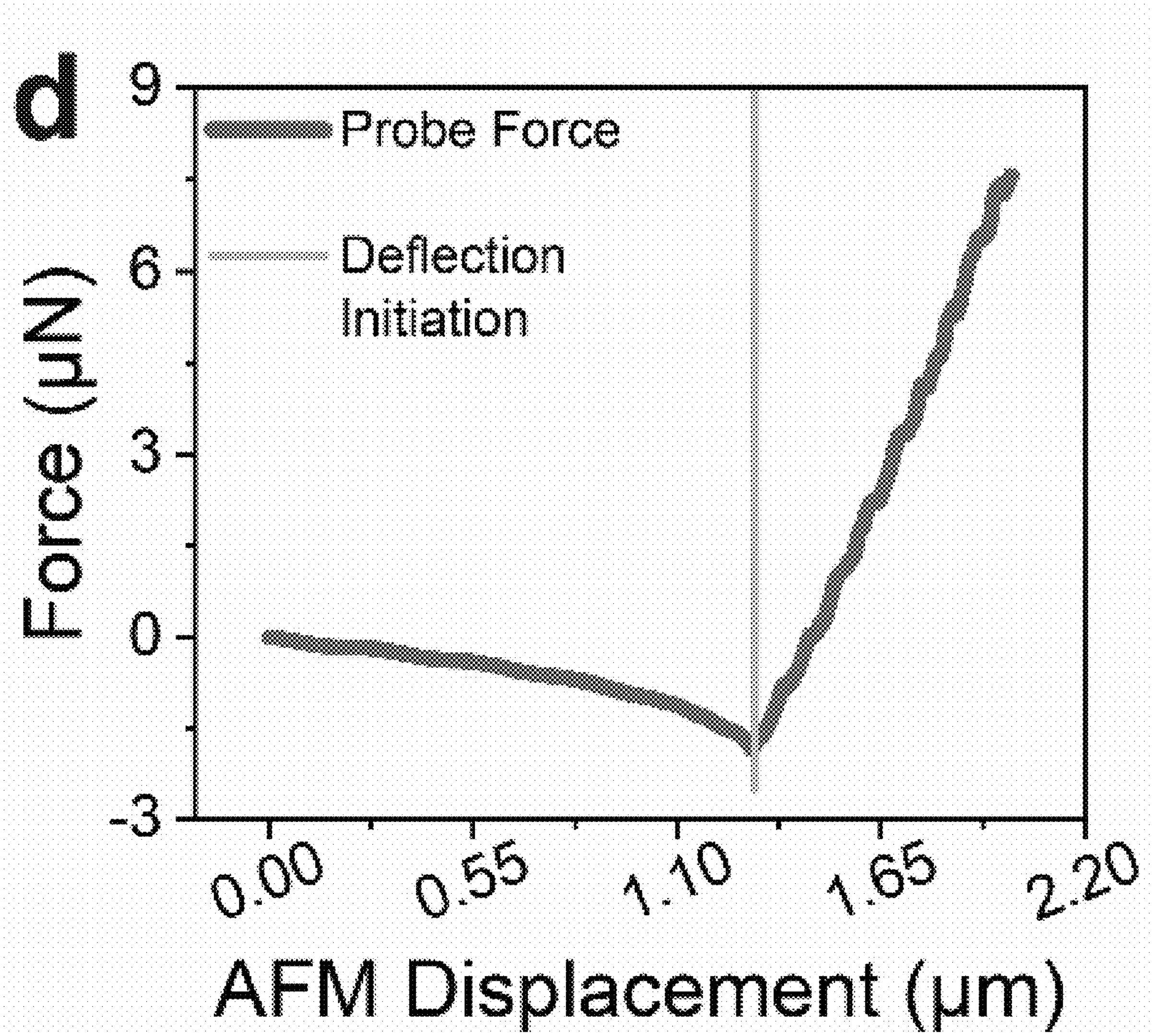
Figure 24:
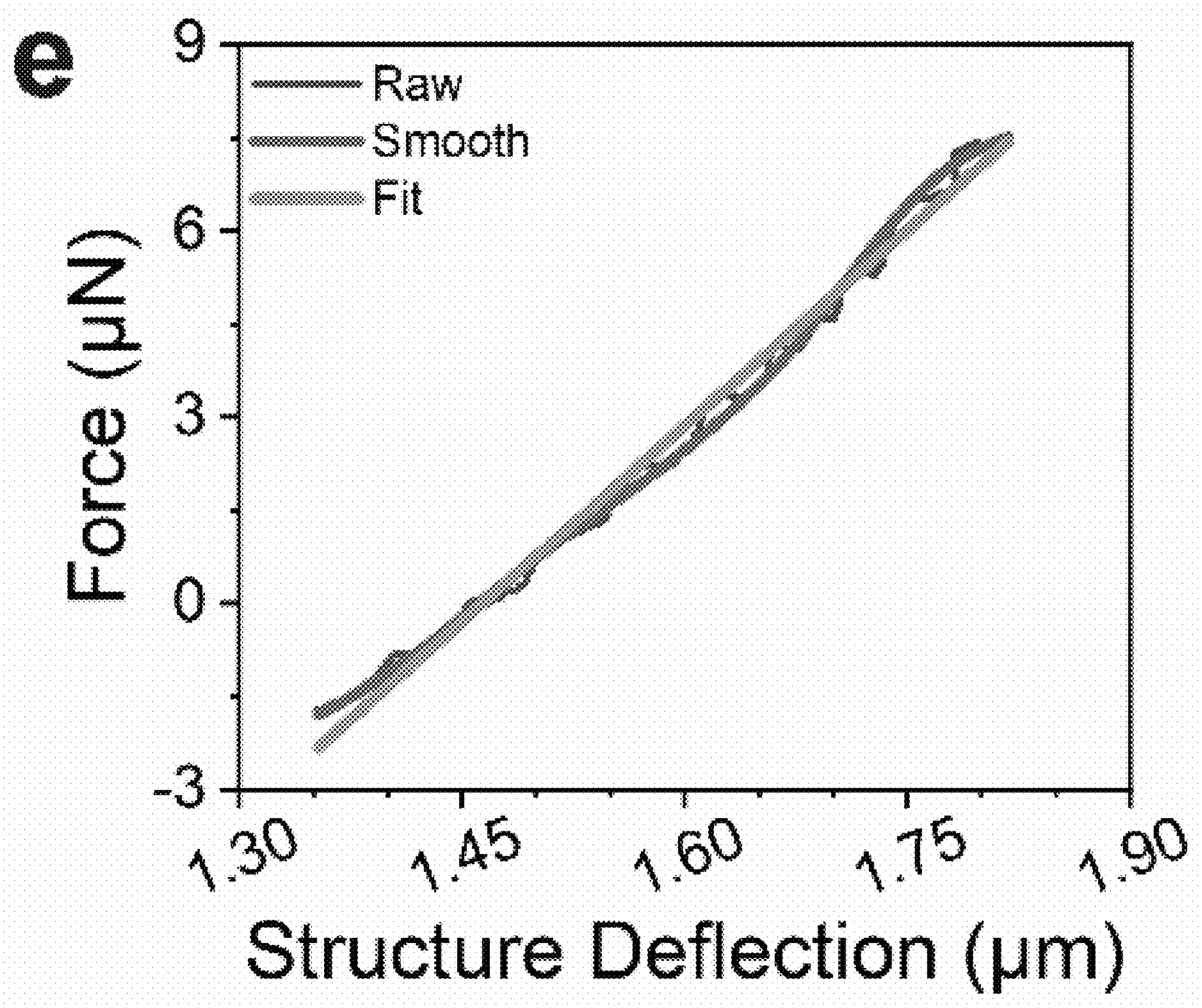
Figure 24:
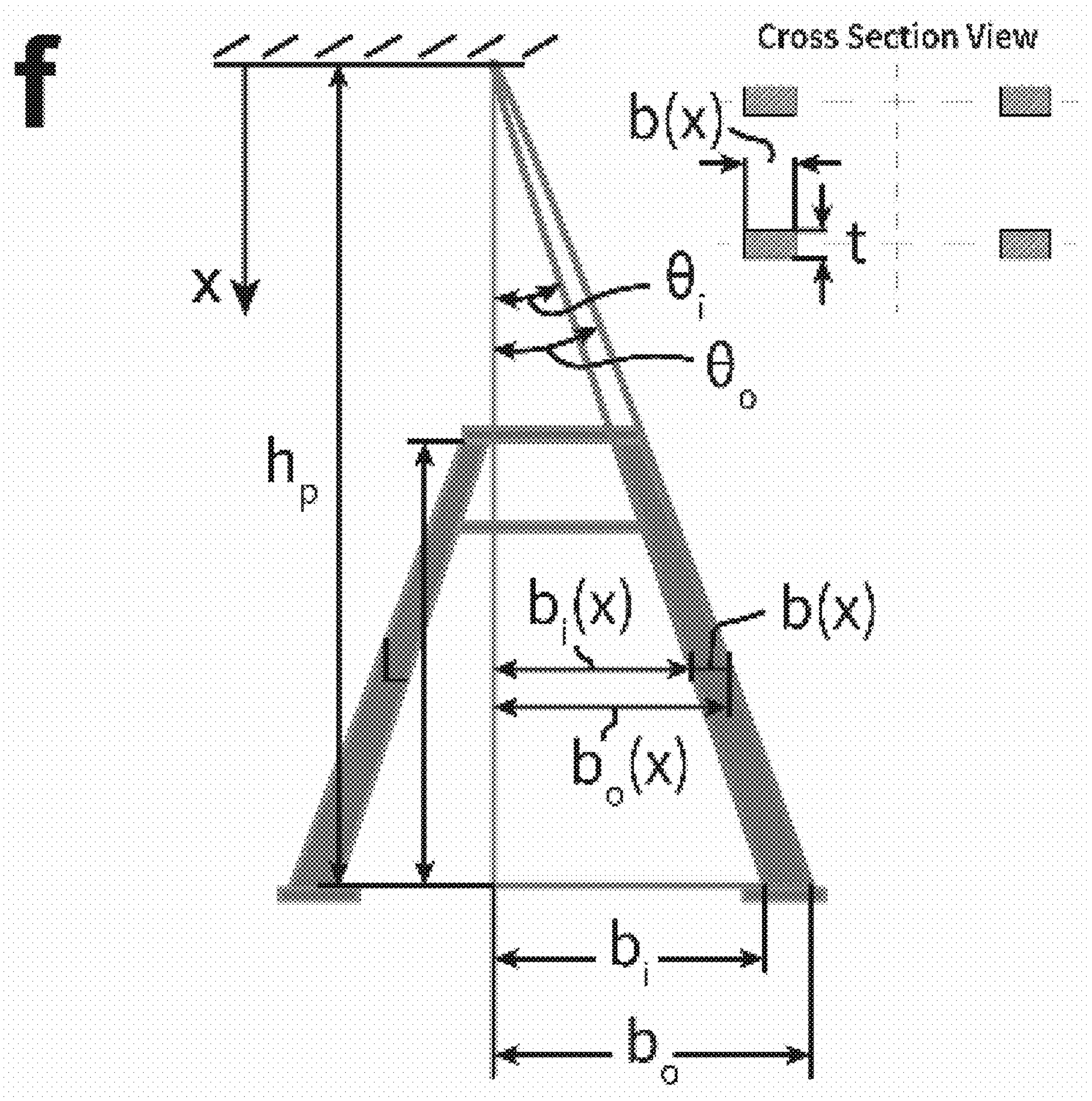
Figure 24:
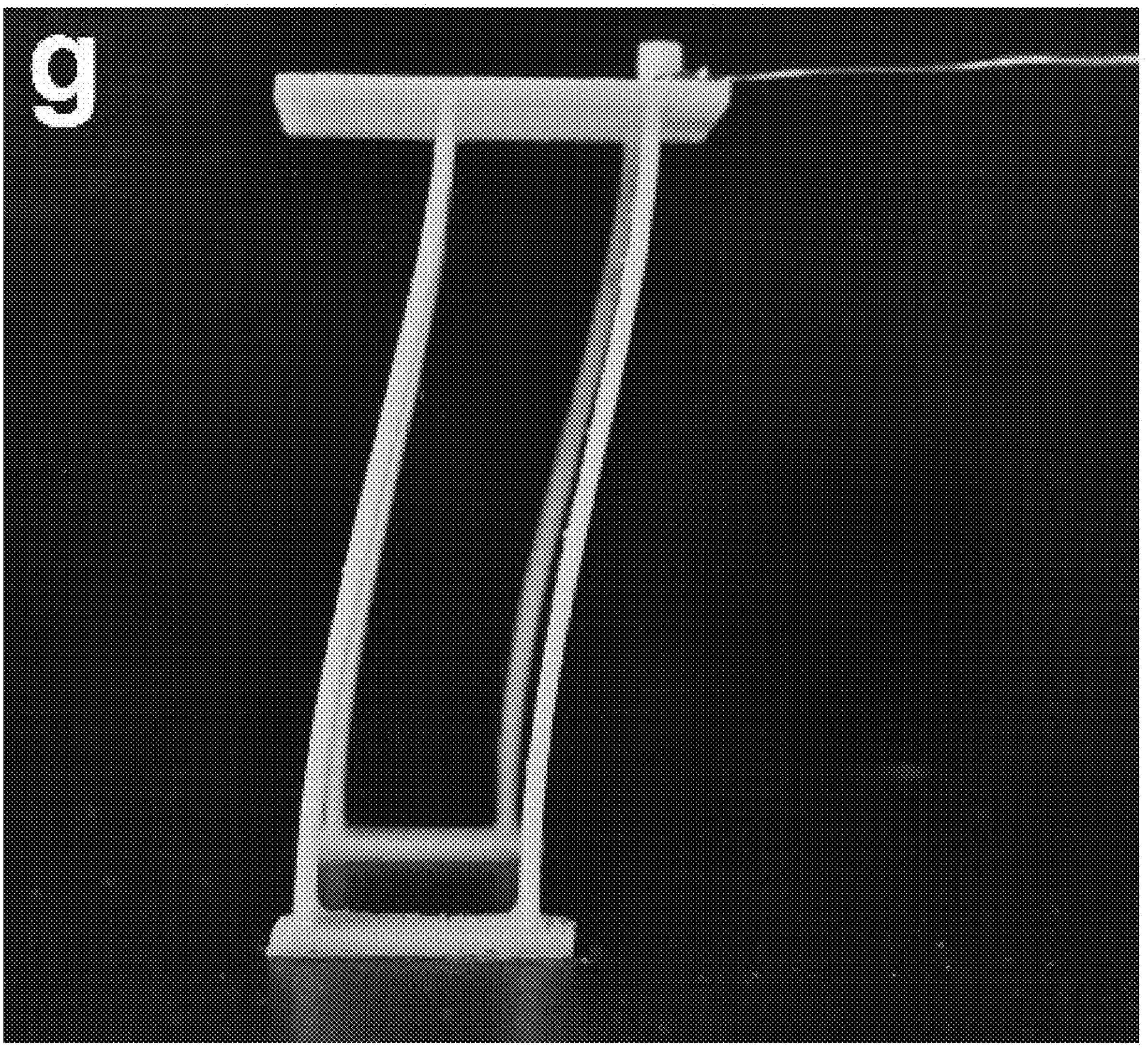
Figure 24:
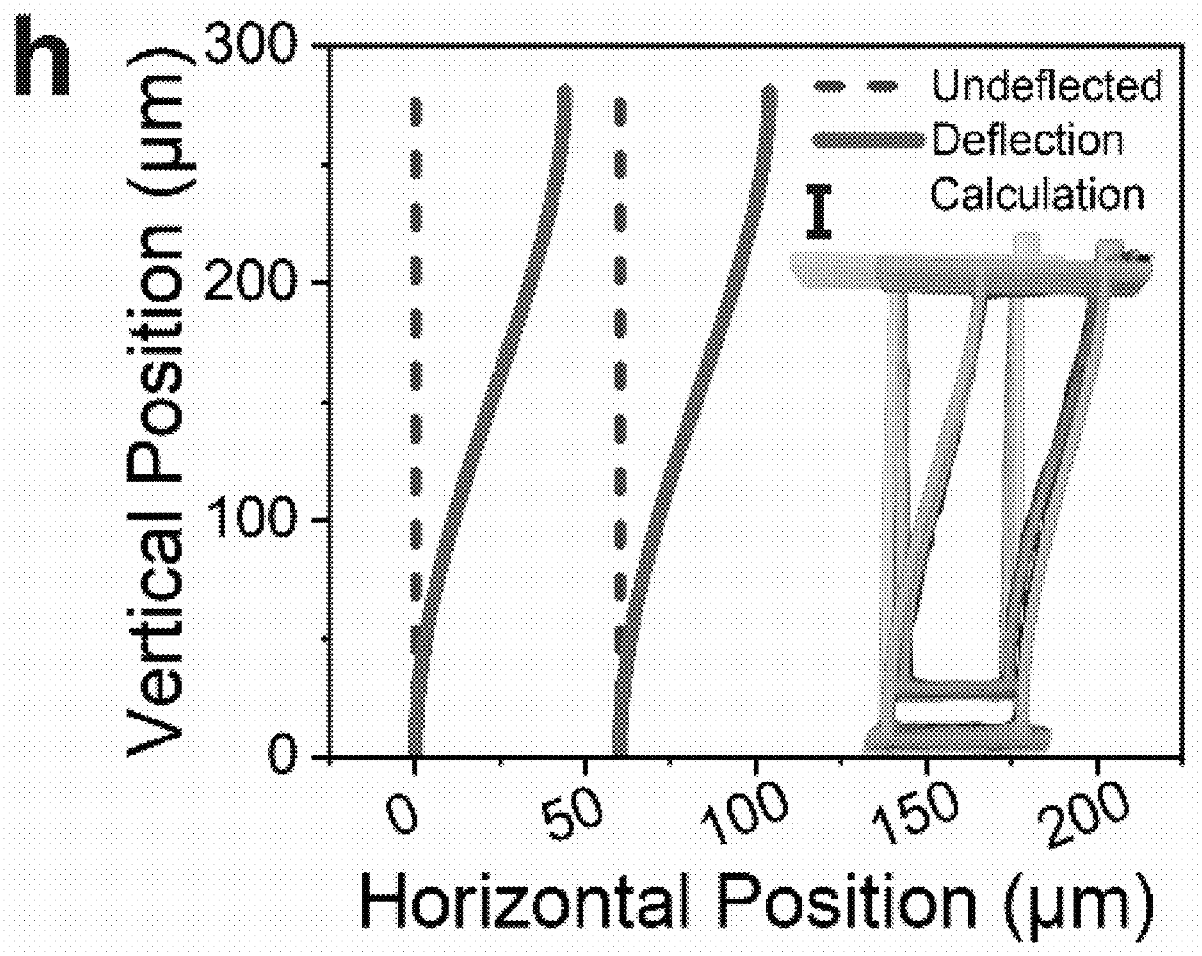
Figure 24:
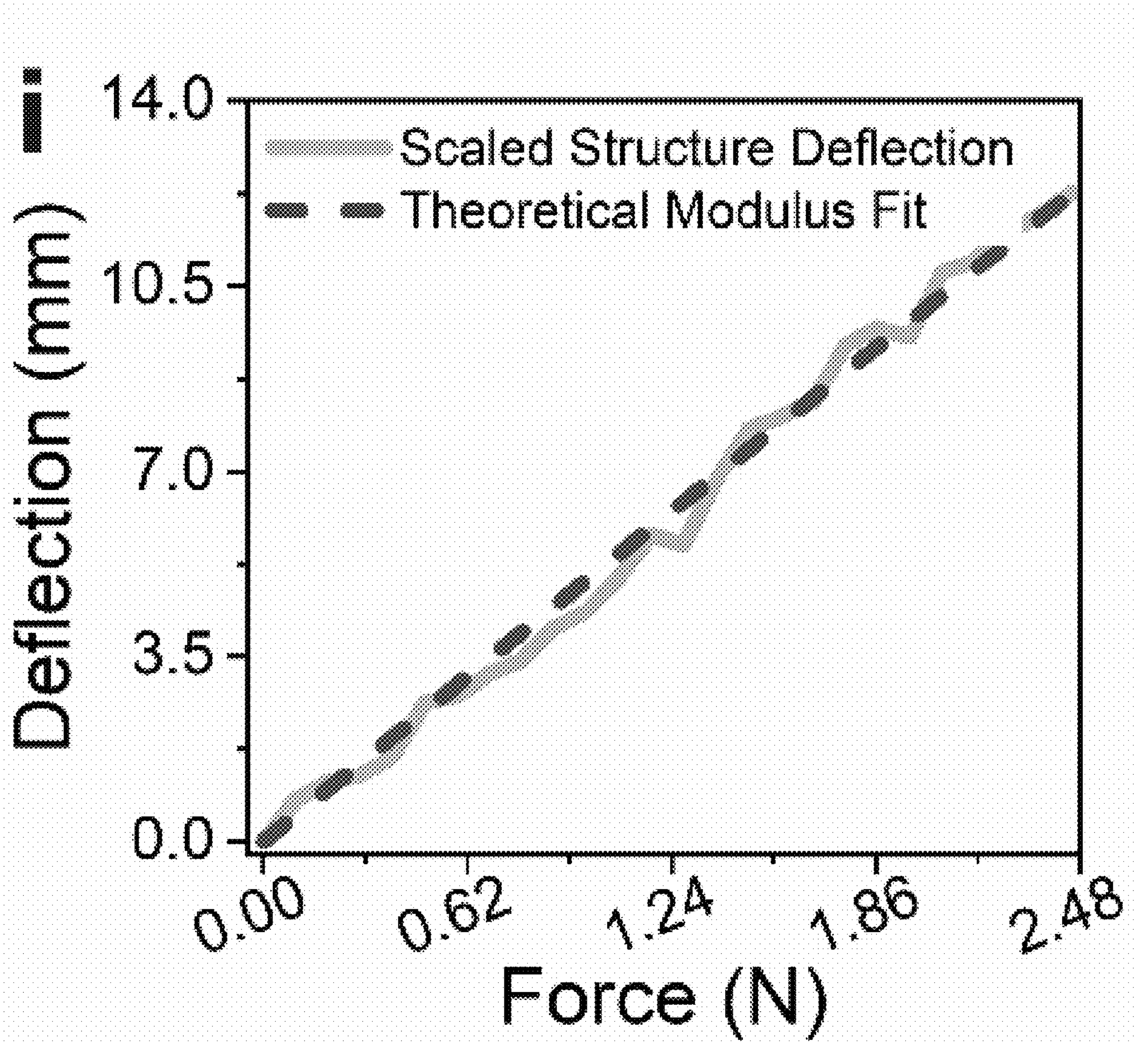

The stiffness of the sensing structure, k, was calibrated using AFM. Briefly, a tipless cantilever probe with a calibrated stiffness, $k_p$, was used to apply a force, $F_{AFM}$, to a sensing stage (FIG. 16*f*, inset i, diagram and ii, experiment image). From the AFM force versus displacement data, the stiffness of the structure could be determined (FIG. 16*f*, FIG. 24). The calibration was performed in both water and air conditions. As expected, the stiffness obtained from air conditions are higher than that from the water condition. For the testing device used throughout the study, which has a height of 280 μm and beam thickness of 15 μm, the measured stiffnesses were found to be 77.5±13% N/m and 42.1±15% N/m under air and water conditions, respectively (FIG. 16*g*). It is worth mentioning that the stiffness can be tailored by varying the height and thickness of the vertical "A-shaped" truss to test fibers of different tensile properties. For instance, structures with a decreased beam thickness of 10 μm resulted in a stiffness of 37.4±13% N/m and 18.7±9% N/m in air and water, respectively (FIG. 16*h*); and structures with 2 μm beam thickness resulted in a stiffness of 0.21±10% N/m and 0.05±17% N/m in air and water, respectively (FIG. 16*i*, Tables 2 and 3). These AFM experimental calibrations were verified using a theoretical model and a 150× scaled up beam structure. It is noted that we consider the viscoelasticity of the thick vertical IP-S beam to have minimal influence on the measured force and stress during the tensile test. This is mainly due to the large size and high Young's modulus value of the vertical IP-S beams used in the study. Our stress relaxation tests, performed using an AFM probe holding a constant displacement on top of the vertical beam, show a relatively small relaxation over a period of 240 seconds compared with that of the IP-Visio sample (FIG. 24*c*).

Method of Tensile Testing in Liquid

Figure 17:
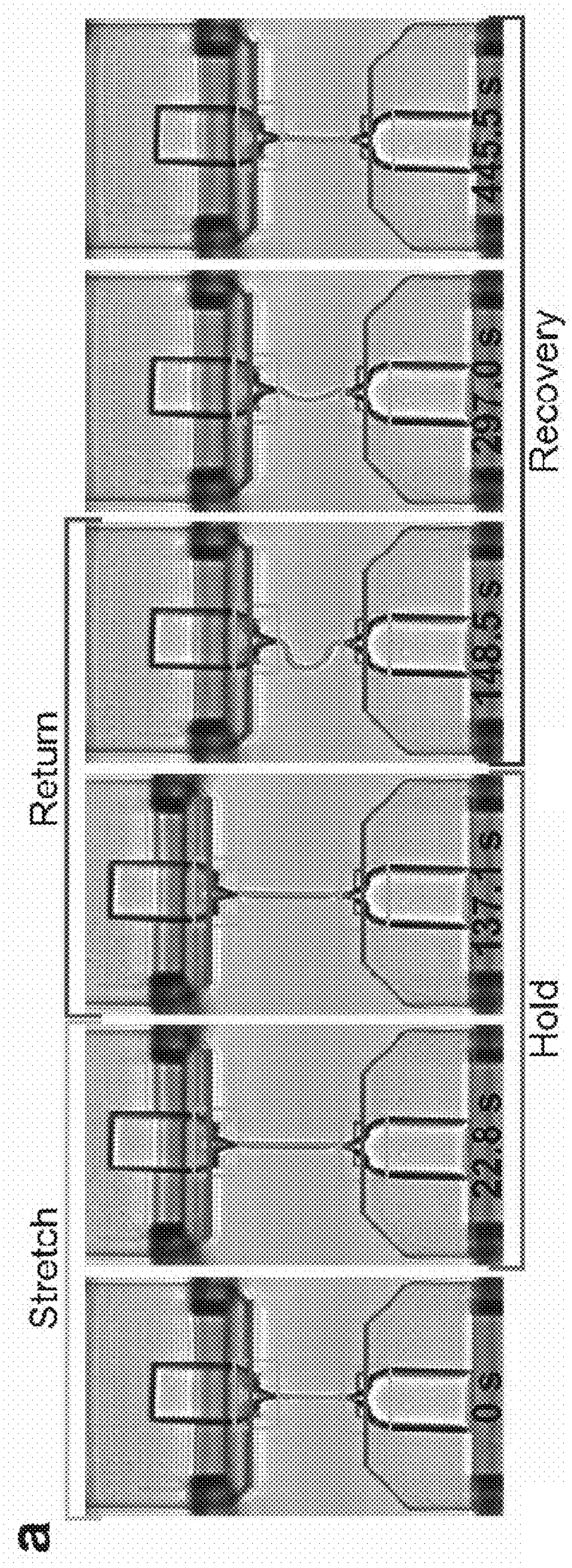
FIG. 17 shows tensile tests on IP-Visio microfibers to obtain the stress-strain relationships.
Figure 17:
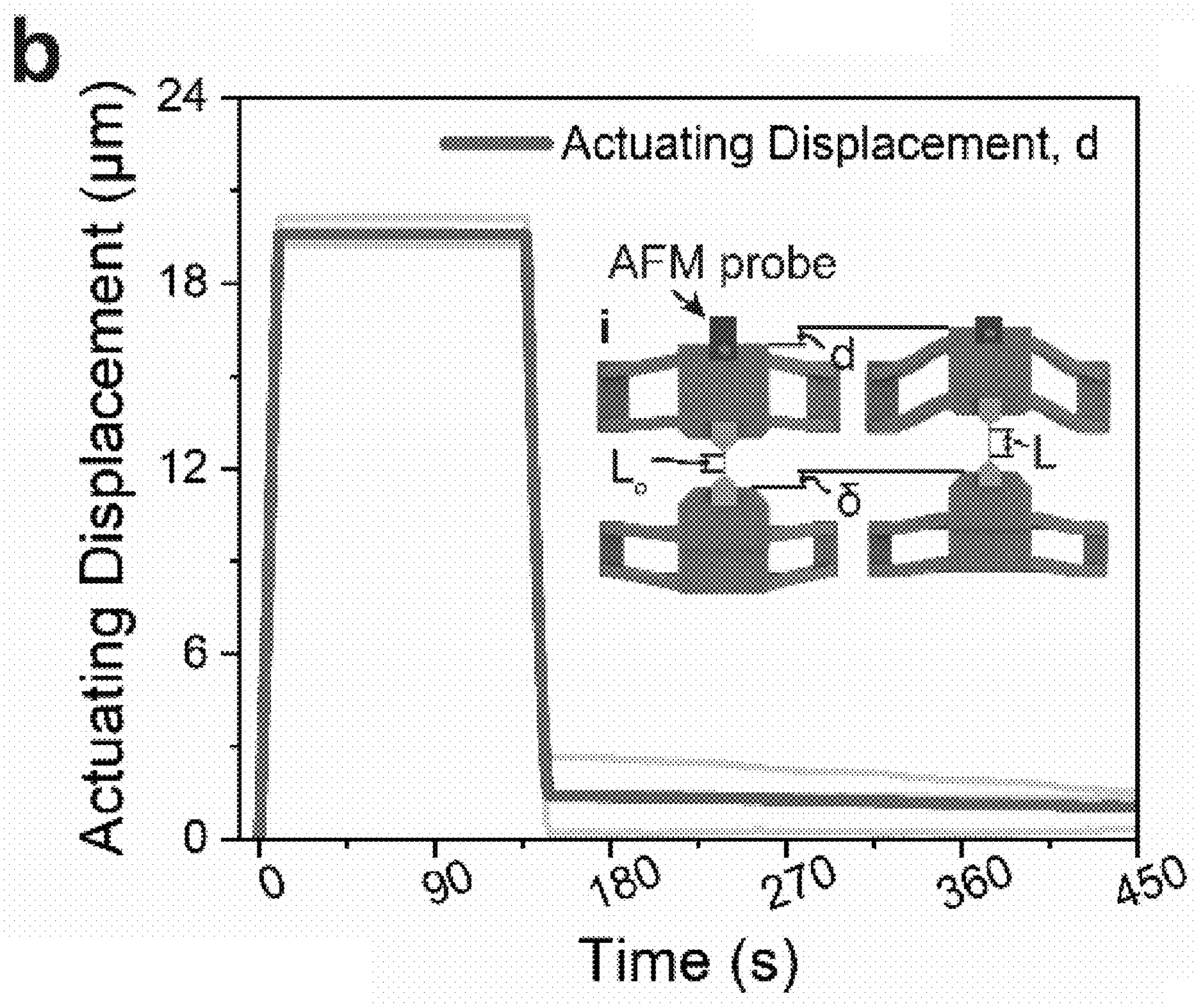
Figure 17:
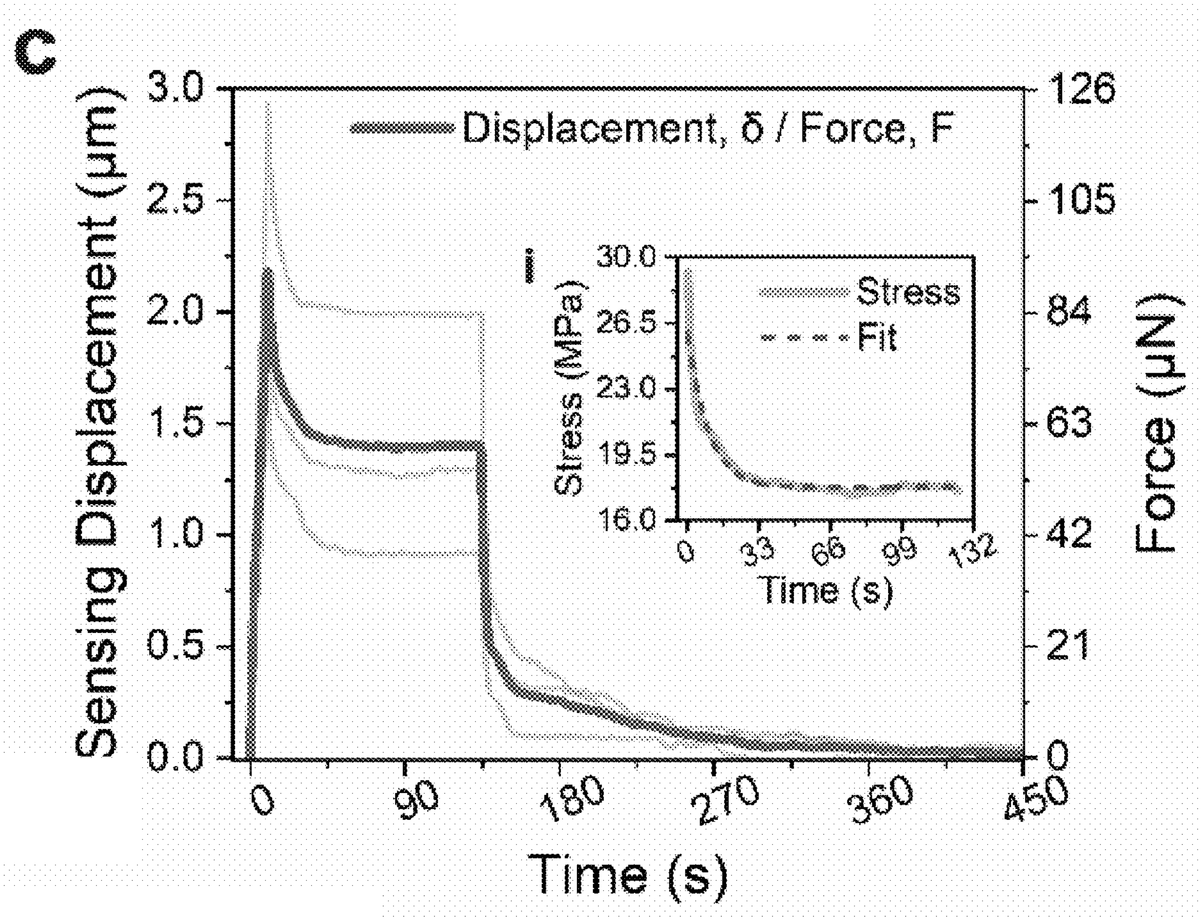
Figure 17:
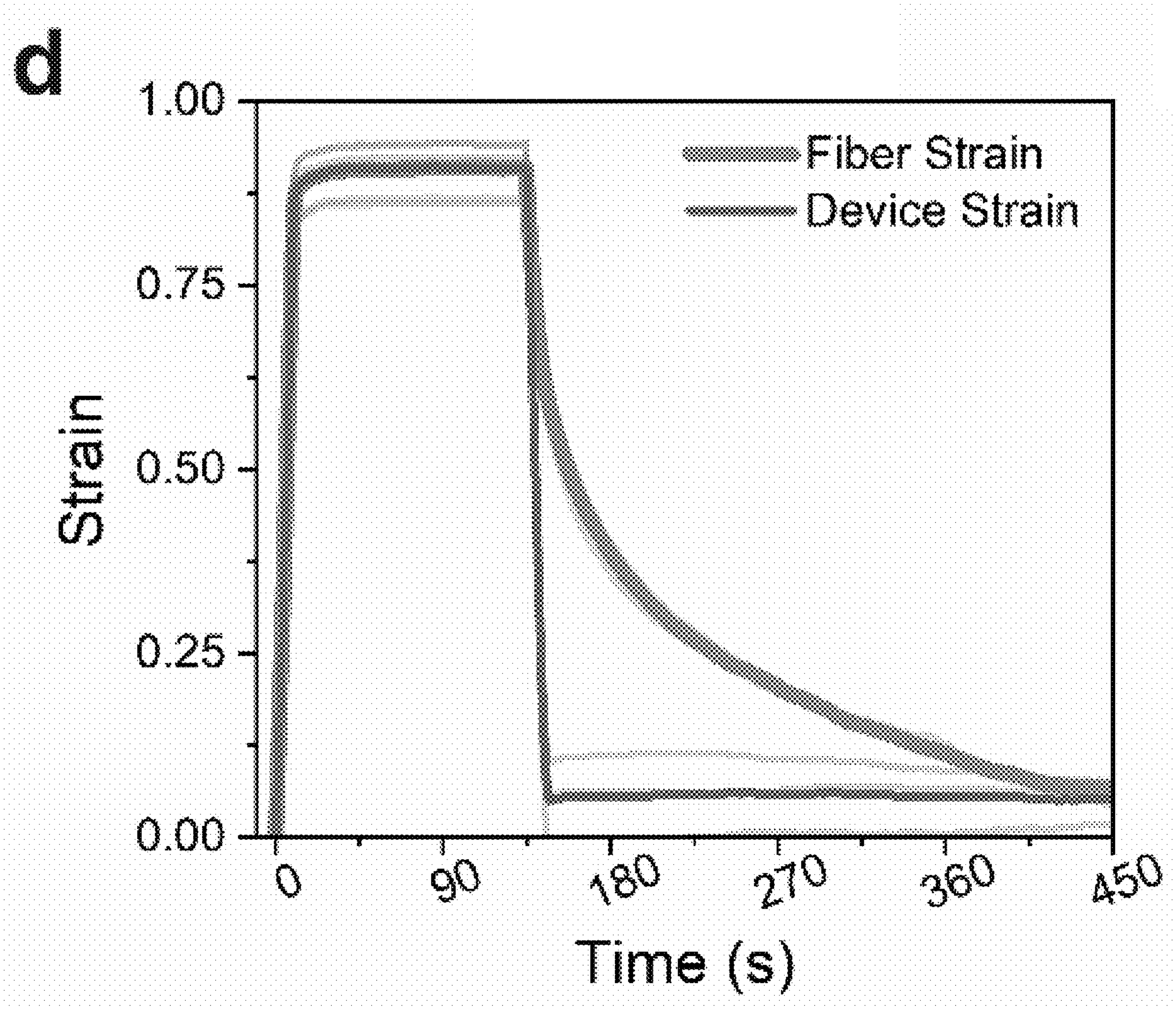
Figure 17:
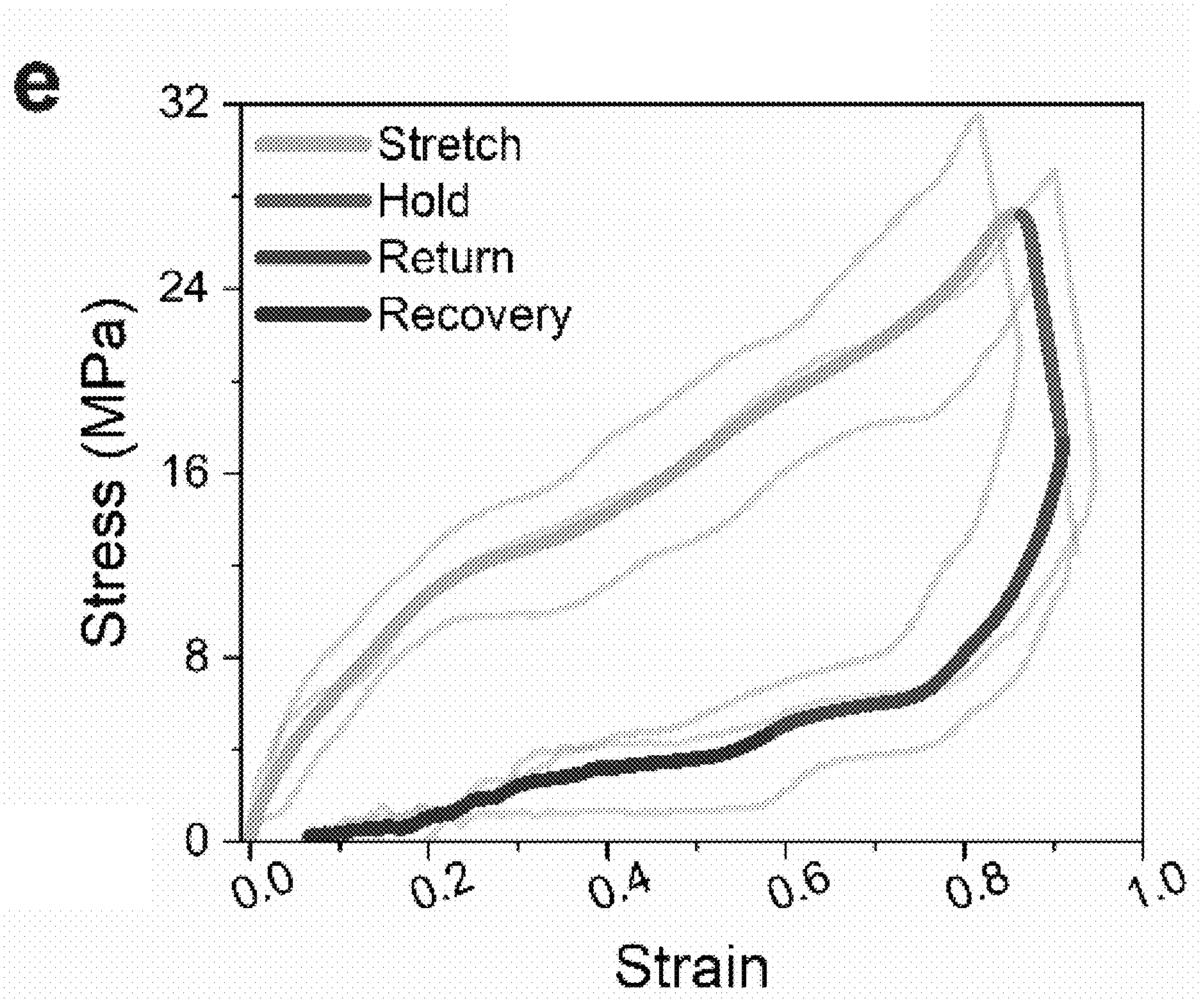

The entire tensile testing setup, including the testing device and the sample along with the AFM probe (attached to the actuation stage with a pin-hole connection), can be completely immersed in liquid to perform tensile tests. The displacement applied to the sample is controlled by the AFM which has a sub-nanometer resolution. The displacements of both stages and the deformation of the microfiber during tensile loading, as shown in a typical sequence in FIG. 17*a*, is analyzed using digital image correlation (DIC). The force acting on the microfiber is obtained from the sensing stage of the testing device. Given the stiffness (k) and displacement (δ) of the sensing stage, the force is calculated by F=kδ. Then, the nominal stress is calculated by dividing the force by the original cross-section area obtained from SEM images. For strain calculation, by strategically setting the DIC grids (blue square windows in FIG. 17*a*), the difference between the bottom line of the top grid and the top line of the bottom grid was used to define the device strain, $\varepsilon_D$. In addition, the green line extracted by image processing overlaid on top of the fiber images in FIG. 17*a* traces the length change of the fiber throughout the entire test. This tracing process produces the calculated strain resulting from the fiber length change, or the fiber strain $\varepsilon_f$.

The working principle of the testing device can be further explained by using a representative experiment described in FIG. 17*a*. In this experiment, a microfiber is deformed in three consecutive steps. First, it is uniaxially stretched by pulling the actuation stage with a pre-defined displacement d, yielding an elongation ΔL, from $L_0$ to L, of the microfiber and a displacement δ on the sensing stage, as shown in FIG. 17*b*. Then, the displacement d is held constant to allow stress relaxation of the microfiber. Finally, the microfiber is unloaded with a retraction of the actuation stage. Based on the equilibrium and compatibility conditions, the relationship between the displacements of the actuation and sensing stages can be written as $d/\delta=k/k_s+1$, where k is the beam stiffness of the supporting truss and $k_s$ is the axial stiffness of the testing sample. When $k \gg k_s$ and $d \gg \delta$, the tensile test can be approximately considered as displacement controlled. In FIGS. 17*b* and 17*c*, the variations of d and δ are plotted as a function of the loading time. The actuation stage is first pulled to 20 μm, accompanied by a maximum displacement of 2.2 μm on the sensing stage. During the hold, the displacement of the sensing stage exhibits an exponential decay due to the stress relaxation of the microfiber. During unloading, the retraction of the loading stage results in buckling of the microfiber, as shown in FIG. 17*a*. Interestingly, the buckled microfiber can recover its original shape when submerged in water over a period of a few minutes. This shape memory effect is further explained in Section 2.4. The shape buckling and recovery lead to the difference of the fiber strain ($\varepsilon_f$) and device strain ($\varepsilon_D$) as shown in FIG. 17*d*. The stress-strain curve obtained from the test is plotted in FIG. 17*e*, which shows a typical nonlinear relationship of polymeric materials. Note that the stress-strain relationship is dependent on the strain rate due to material viscosity. In addition, the viscoelastic behavior is characterized by the stress relaxation during the hold (FIG. 17*c* inset). The characteristic relaxation time, τ, can be obtained by fitting the stress-time curve with the one-dimensional standard linear solid model, namely, $$\sigma = \sigma_0 \exp\left(-\frac{t}{\tau}\right) + B,$$

where $\sigma_0$ is the amplitude of relaxation and B is the residual stress in microfibers.

Mechanical Properties of TPP-Printed Microfibers from Tensile Testing

Figure 18:
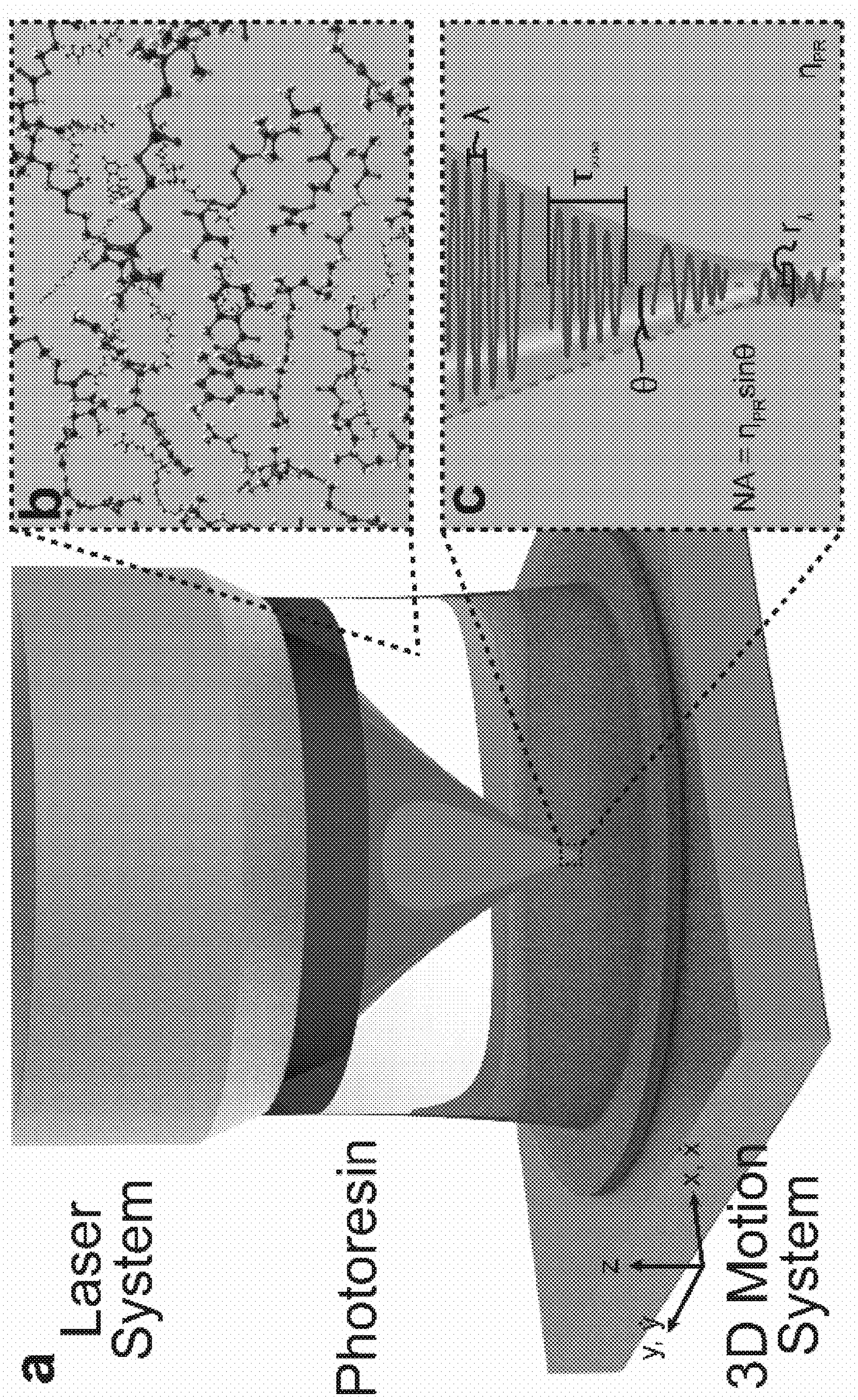
FIG. 18 shows the two photon polymerization processing parameters.
Figure 26:
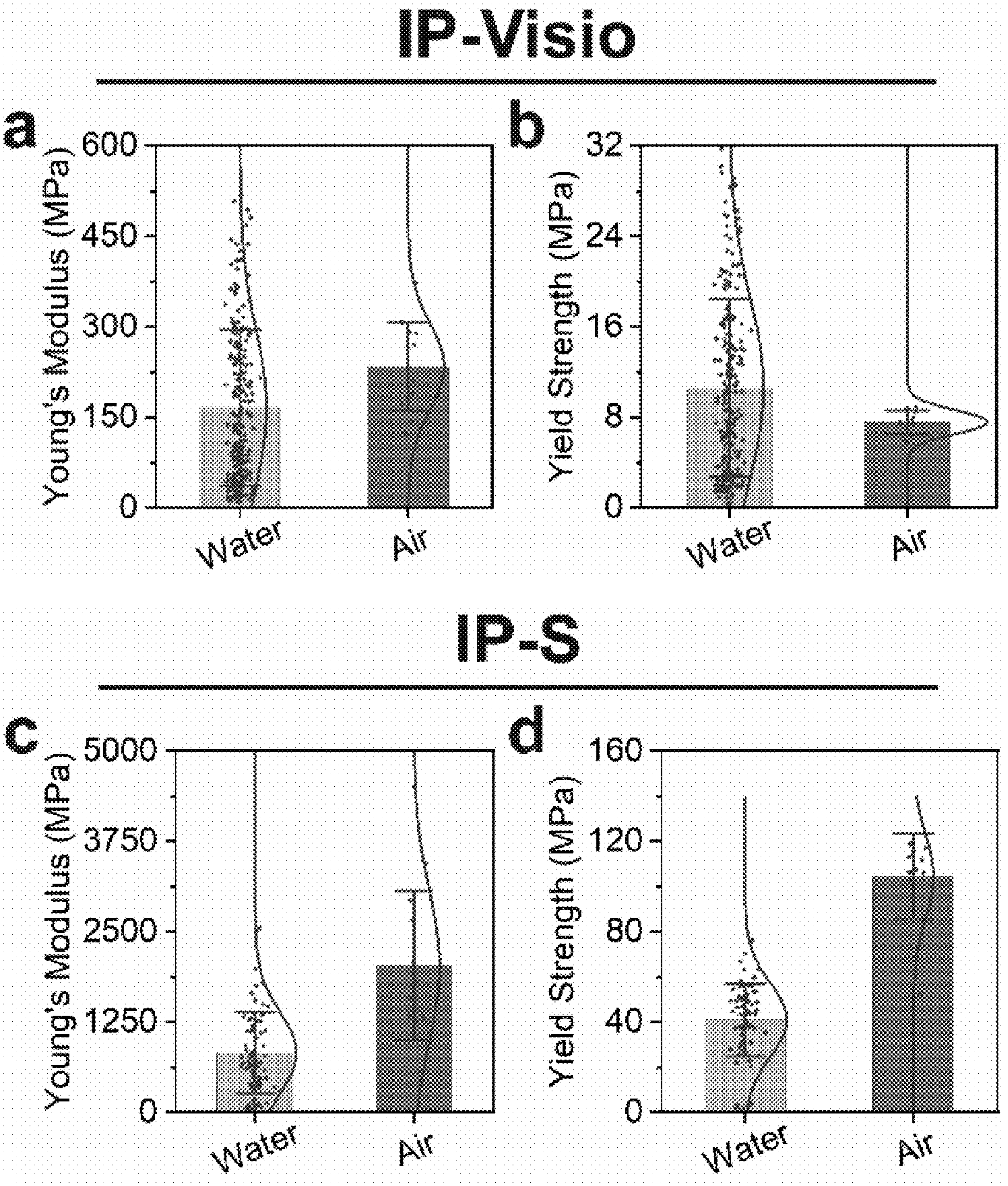
FIG. 26 shows comprehensive averaging of experiments.
Figure 26:
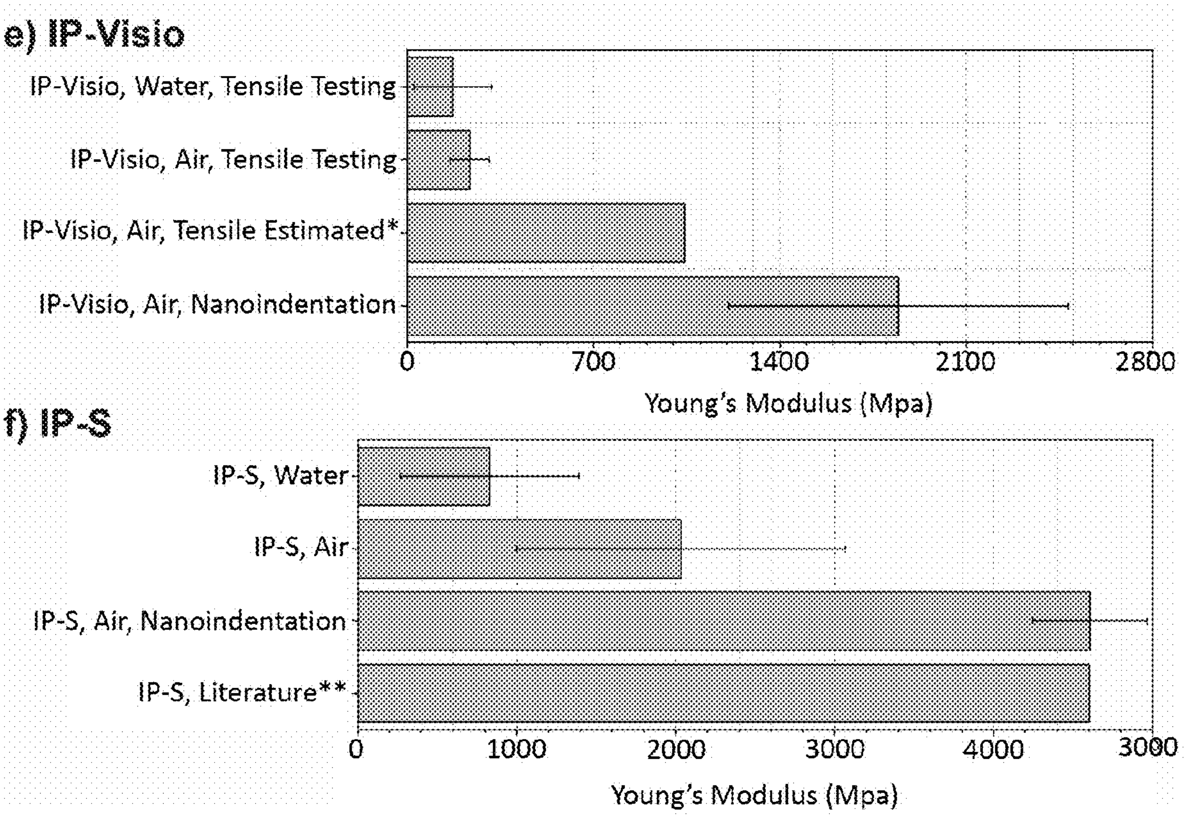

The TPP fabrication process is highly complex and dynamic. The mechanisms and processes have been explored both theoretically and experimentally. As illustrated in FIG. 18, the intense laser pulse initiates a radical which induces local polymerization within the photoresist. A list of printing parameters that may affect the mechanical behavior of TPP printed structures is shown in FIG. 18. In this study, we only focused on two key parameters: laser power and writing speed and studied their effects on the mechanical behavior of the microfibers. In this section, we show that the mechanical properties of microfibers tested under water are dramatically different from those tested in air, and more importantly the properties can be tuned by controlling 3D printing parameters. To validate our method, we first performed tensile tests on a microfiber made of IP-S resin which has a known modulus from literature. In addition, we also measured the modulus of the same IP-S resin using nanoindentation. The average modulus value of IP-S in air is 2.0±1.0 GPa (FIG. 19*a*, FIG. 26), which is in the same order as values obtained from our nanoindentation experiment using a conical tip (FIG. 26) and the value reported in the literature. We expect the tensile testing method to yield more accurate mechanical property data.

Figure 19:
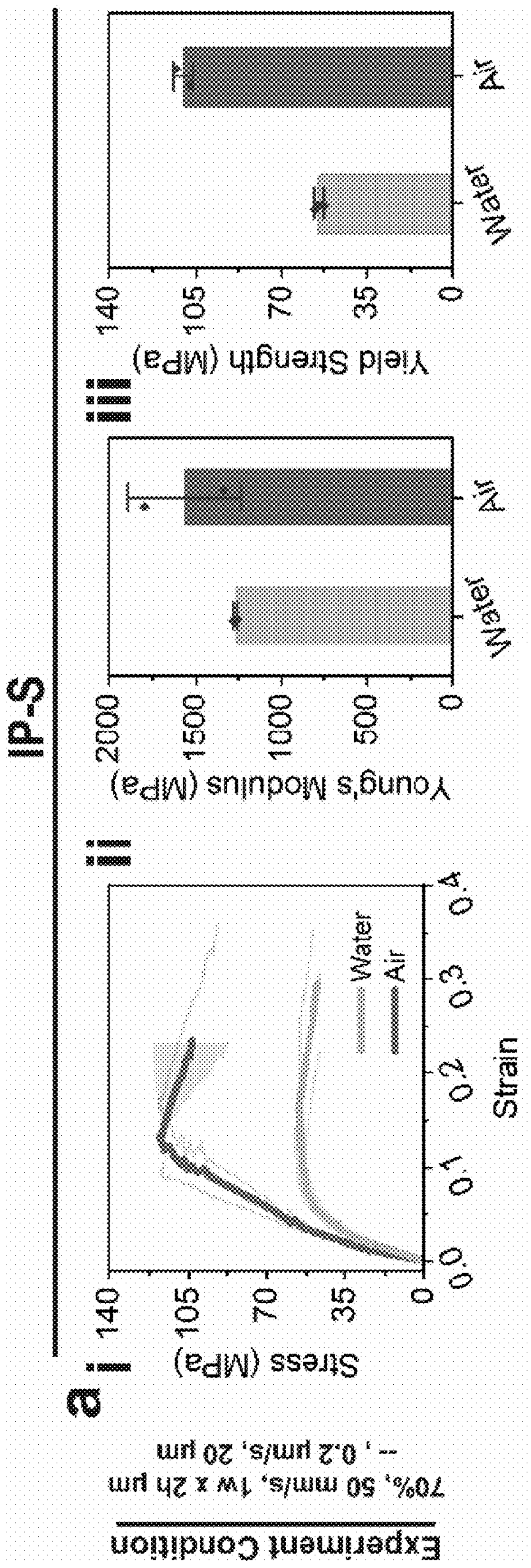
FIG. 19 shows tensile tests and Young's moduli of IP-S and IP-Visio microfibers with different writing parameters in air and water show tunability of their mechanical properties. For each experiment: Stress-strain curves (i), Young's modulus (ii), and yield strength (iii). Labels: Writing Power, Writing Speed, Design Dimension, Condition, Displacement Rate, Displacement Distance.
Figure 19:
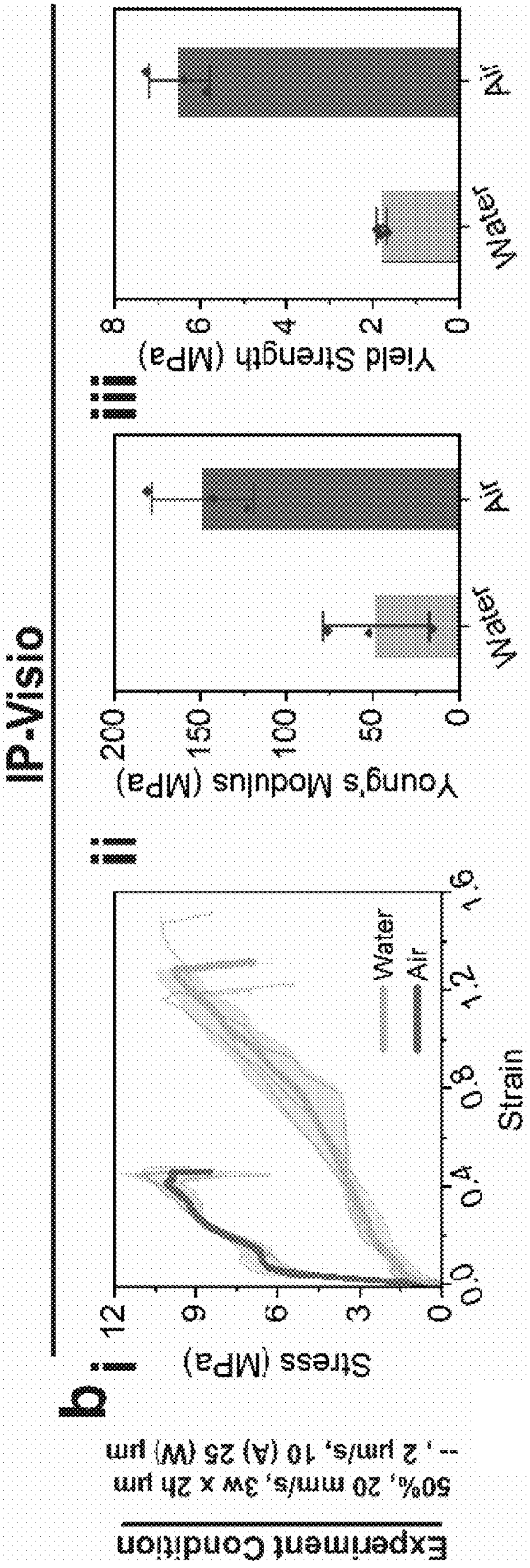
Figure 19:
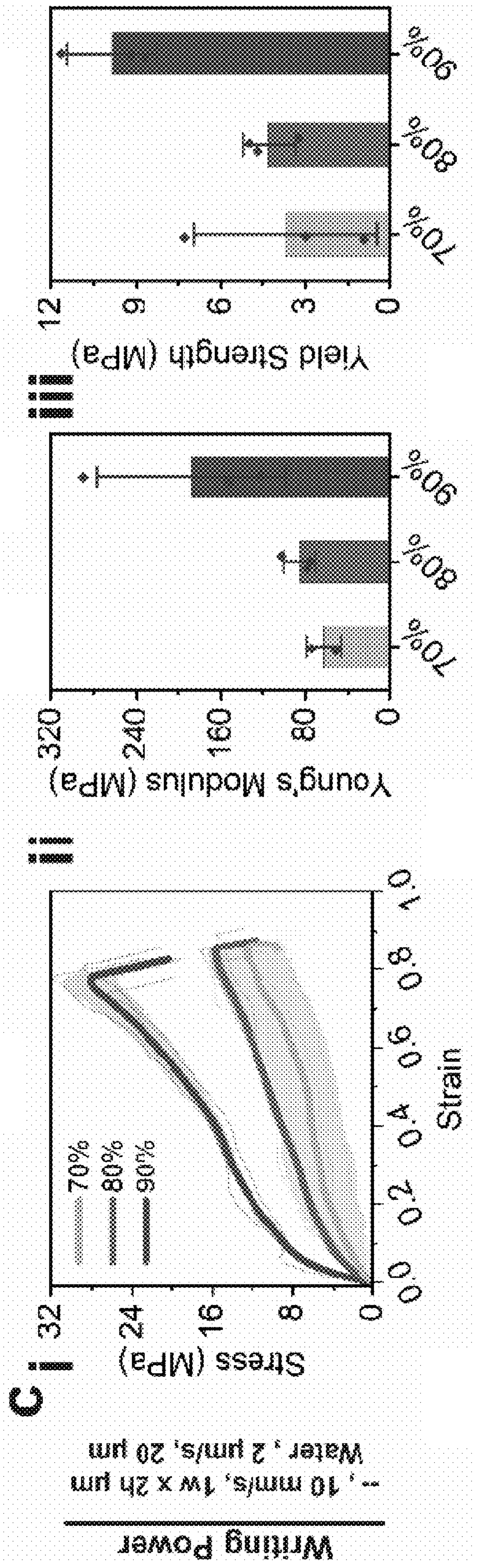
Figure 19:
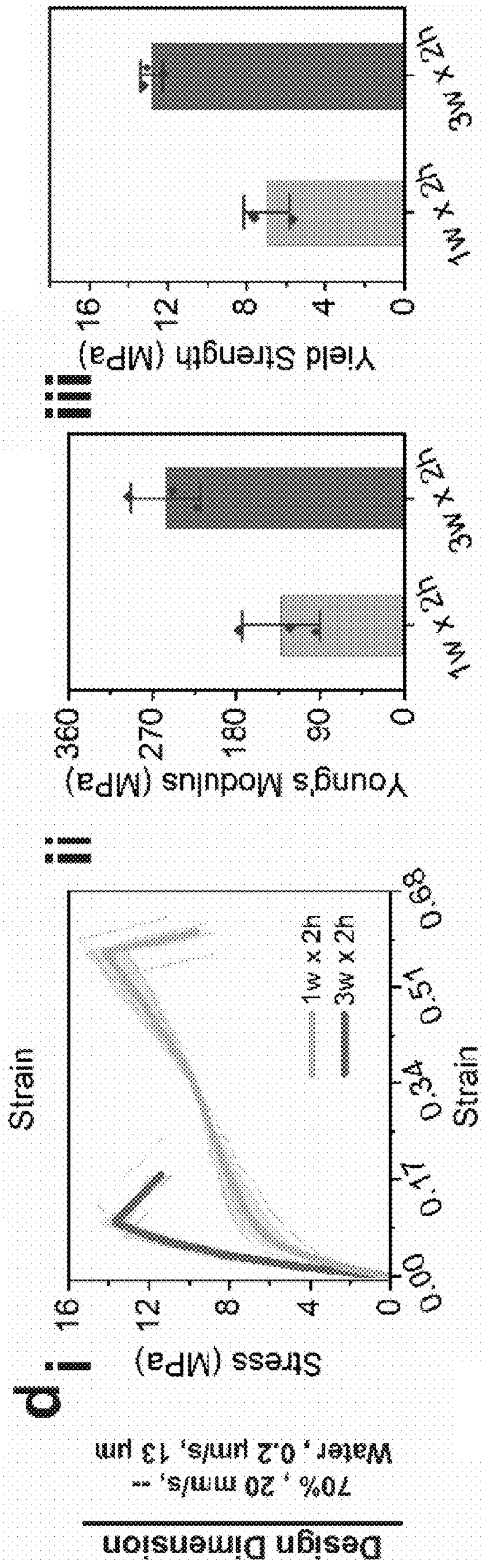
Figure 19:
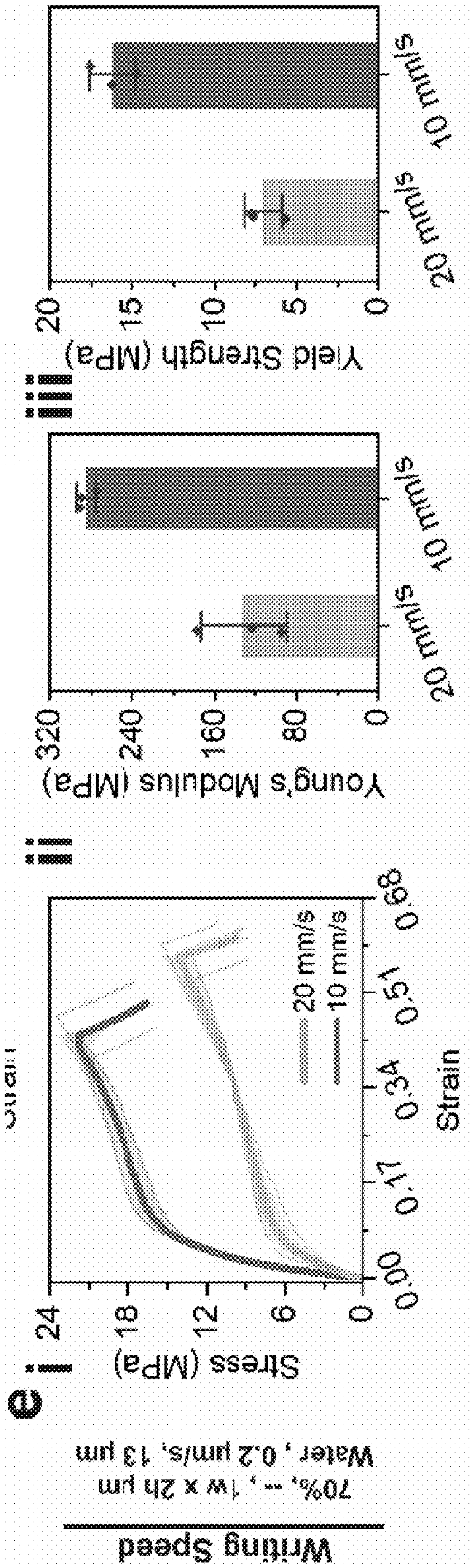

With fixed printing parameters, we first compared the mechanical properties tested in air to those tested in water. As shown in FIGS. 19*a* and 19*b*, the Young's moduli and yield strengths measured in water are significantly smaller than those measured in air for both IP-S and IP-Visio. The average reductions for IP-S and IP-Visio are respectively 38% and 67% in Young's moduli and 48% and 73% in yield strength.

We then conducted the tensile tests on microfibers printed with IP-Visio resin at different laser powers, writing speeds, and designed cross section dimensions. The experimental data shows that the Young's moduli can be tuned over a range of a few hundred MPa by controlling the printing parameters, indicating a high degree of tunability. A higher laser writing power results in increased Young's modulus and yield strength (FIG. 19*c*). It is noted that microfibers with larger cross-sections (3 μm×2 μm compared with 2 μm×1 μm) show both higher stiffness and yield strength (FIG. 19*d*), indicating a denser crosslinking on the larger samples. As writing speed increases from 10 mm/s to 20 mm/s, the modulus value is found to be nearly halved, and a similar trend is found for yield strength (FIG. 19*e*).

Figure 20:
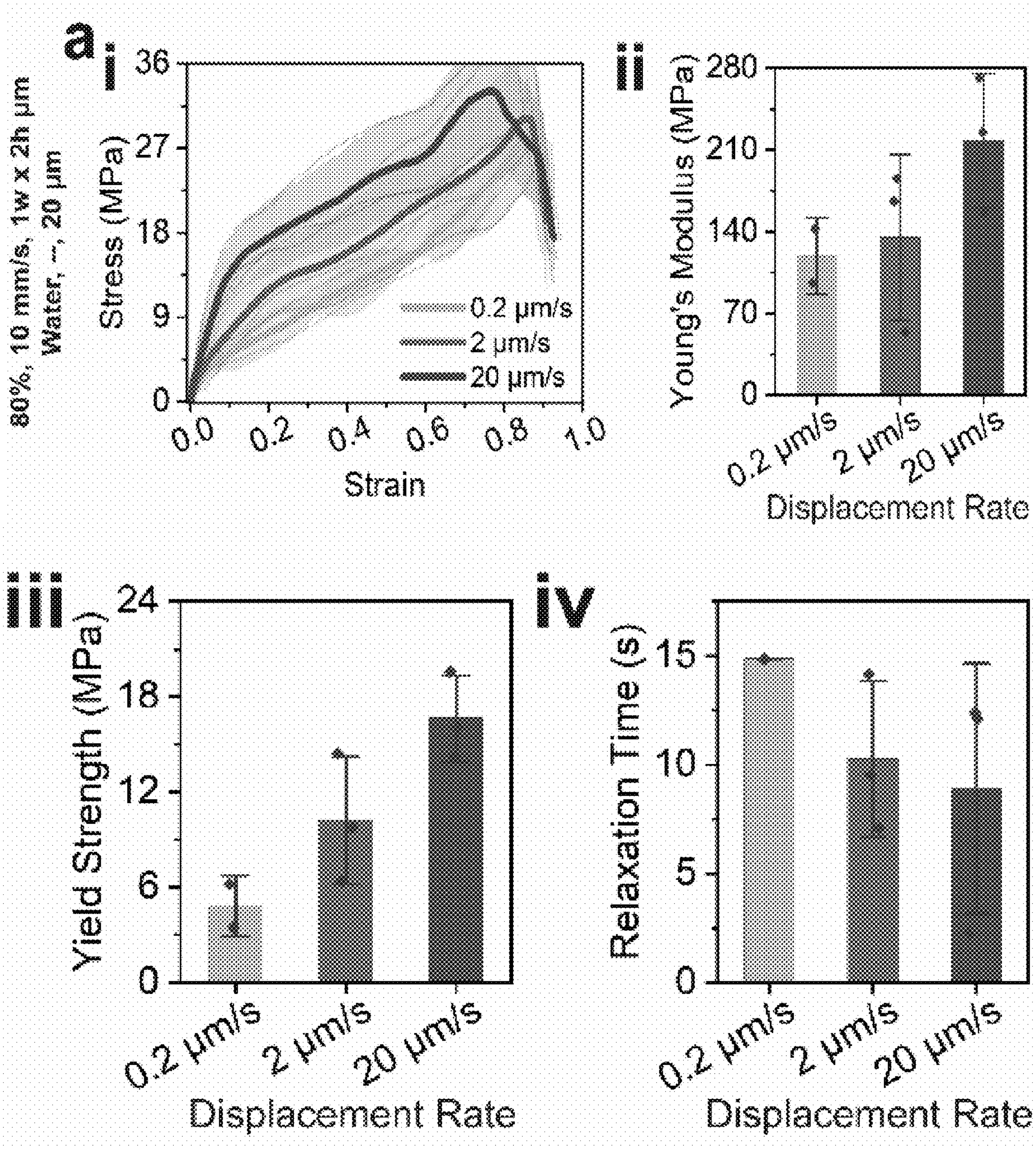
FIG. 20 shows strain rate effect on measured stress-strain curves and mechanical properties of the fiber.
Figure 20:
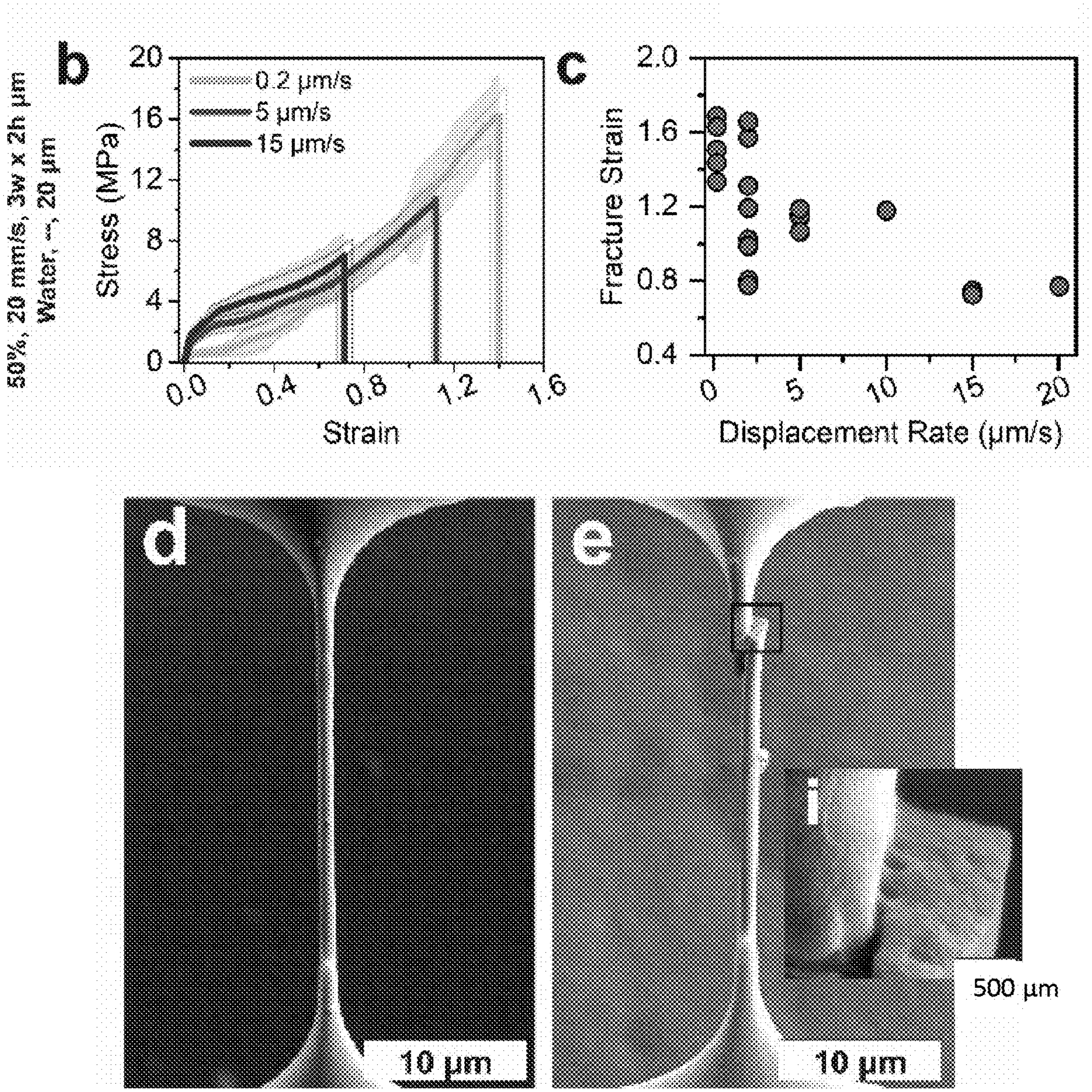

The viscoelastic behavior of the microfibers has been illustrated from the stress relaxation shown in FIG. 17*c*. Here, the viscoelasticity is further characterized using the tensile experiments conducted at three different displacement rates: 0.2, 2 and 20 μm/s in water, corresponding to a strain rate of 0.01, 0.1, and 1 $s^{-1}$, respectively. A strong strain rate dependency is observed and shown in FIG. 20*a*. Both Young's modulus and yield strength increase at higher strain rate, accompanied by a decrease in relaxation time, showing typical polymer viscoelastic behavior. To study strain-rate dependent fracture, we next conducted a set of tensile experiments with varying displacement rates on fibers fabricated with a lower laser power and higher writing speed (FIG. 20*b*). Here, we saw a strong relationship between strain rate and fracture behavior of the microfiber, with higher strain rates leading to fiber fracture at lower strain levels (FIG. 20*c*). It is noted that the difference in crosslinking is supported by the SEM imaging of fractured microfiber cross-sections: IP-Visio exhibited a porous fracture surface, as compared to a smoother surface of IP-S (FIG. 20*d-e*, FIG. S32). Based on these characterization results, a constitutive model for the TPP polymer can be developed and used for mechanics simulations of TPP structures in the future. In the conventional polymer models, the parameters related to fabrication or processing polymers are not considered as model variables. However, given the high sensitivity and tunability of TPP polymers to the printing parameters, more advanced constitutive models that involve the key printing parameters are expected for the convenience of applications.

Figure 27:
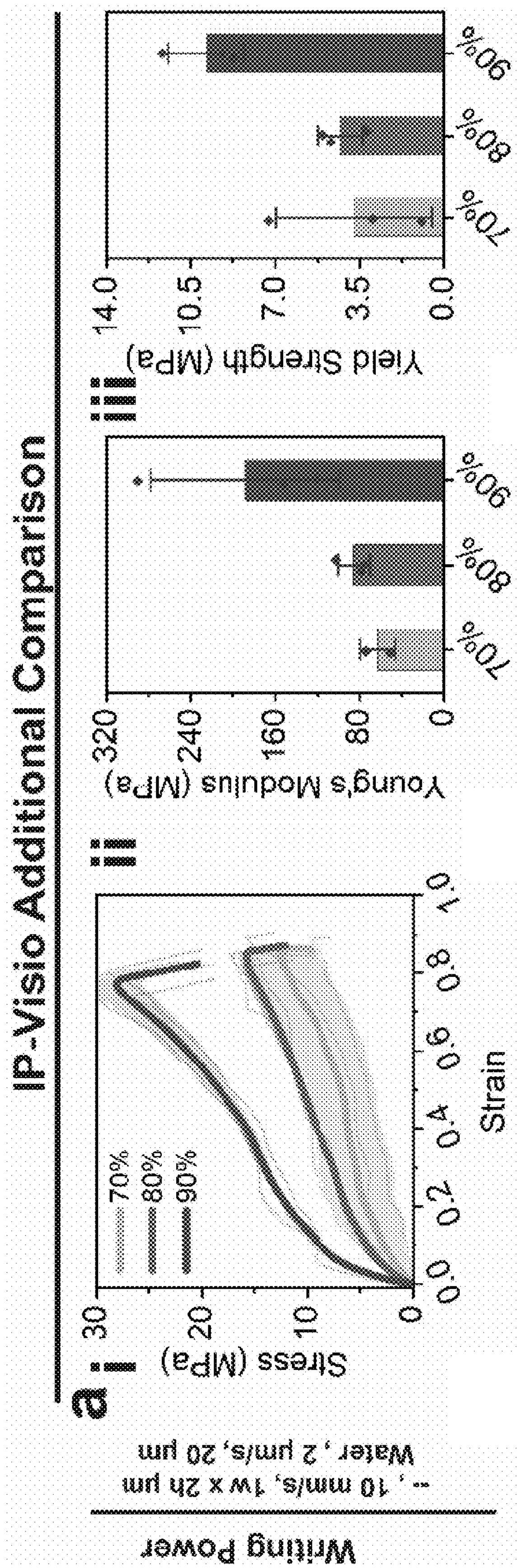
FIG. 27 shows IP-Visio Experiments: Additional Writing Power Comparisons.
Figure 27:
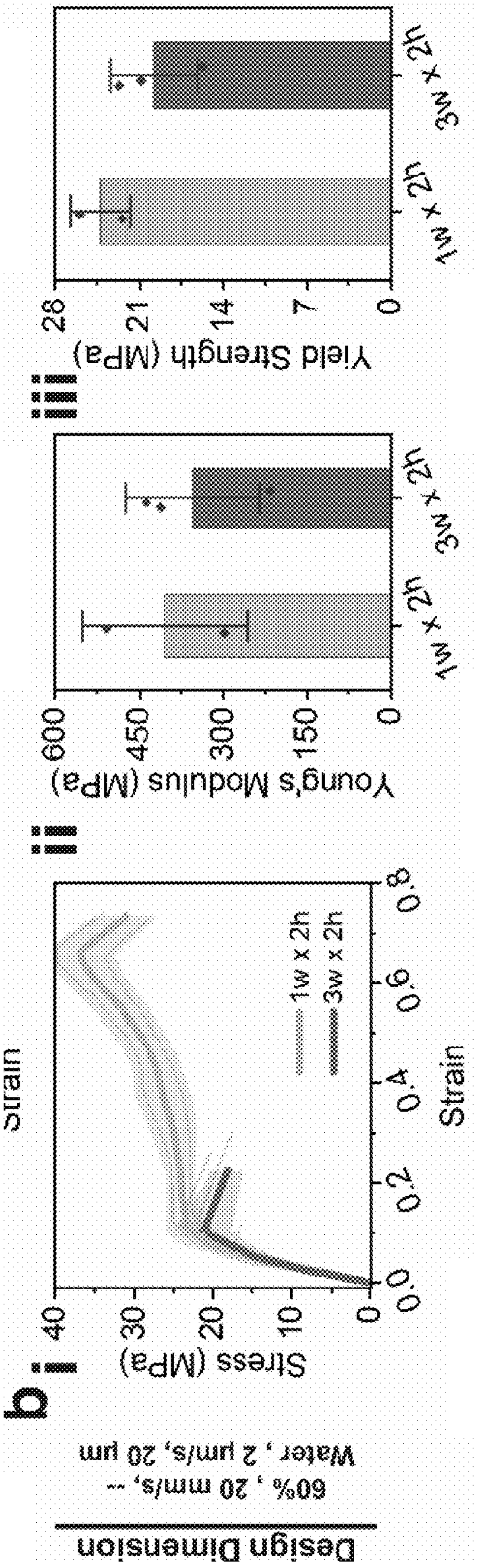
Figure 27:
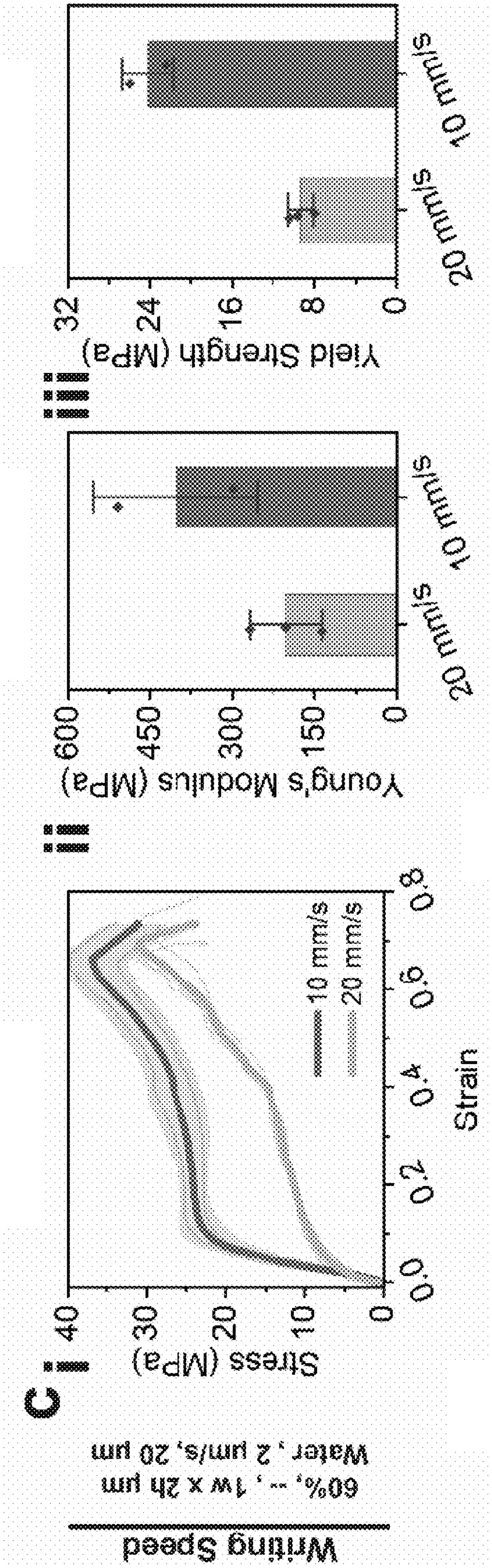
Figure 28:
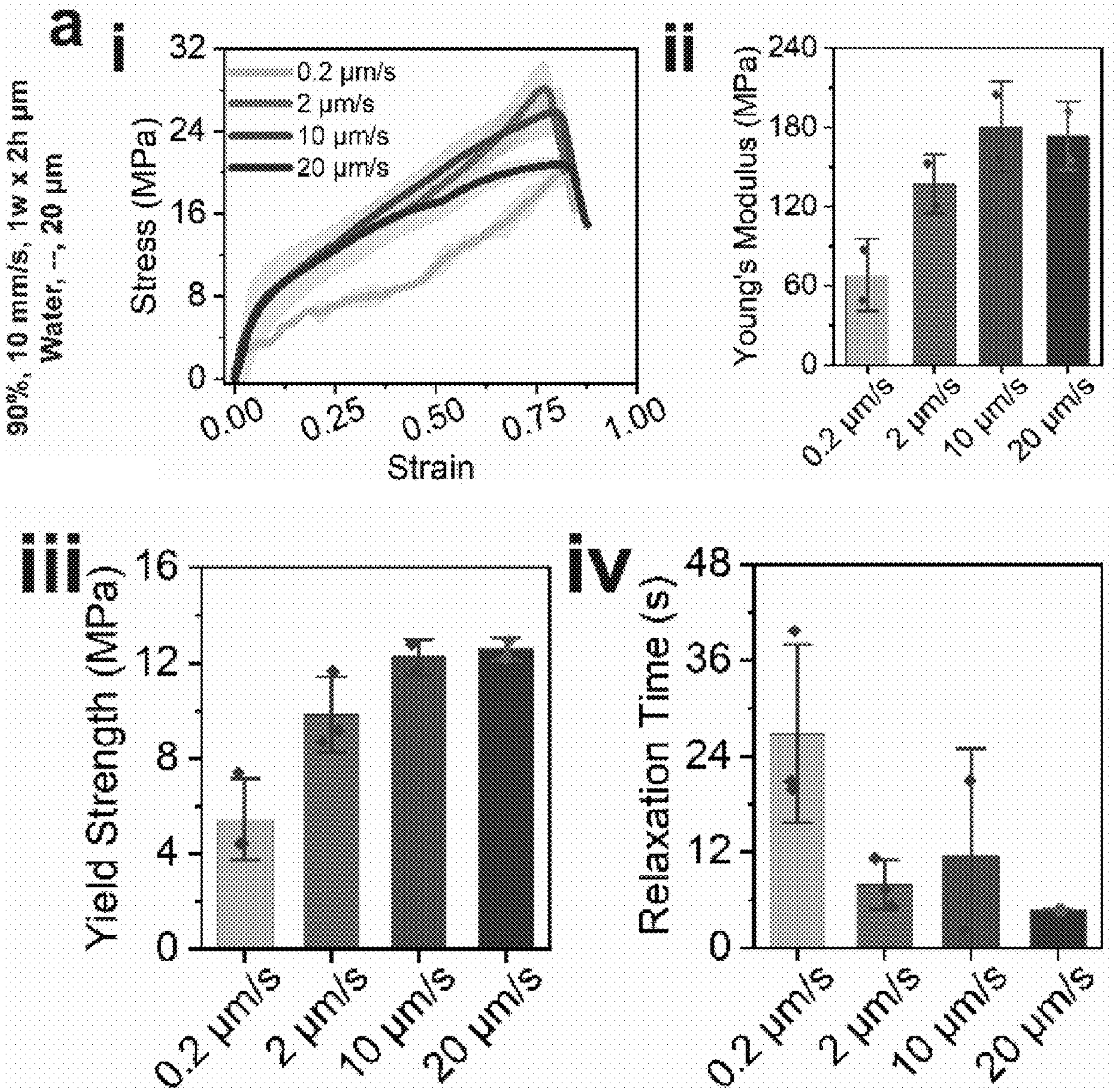
FIG. 28, panels A-C show comparisons of various displacement rates of tensile testing experiments: Stress-strain curves (i), Young's modulus (ii), yield strength (iii), relaxation time (iv), and recovery time (v). Labels: Writing Power, Writing Speed, Design Dimension, Condition, Displacement Rate, Displacement Distance.
Figure 28:
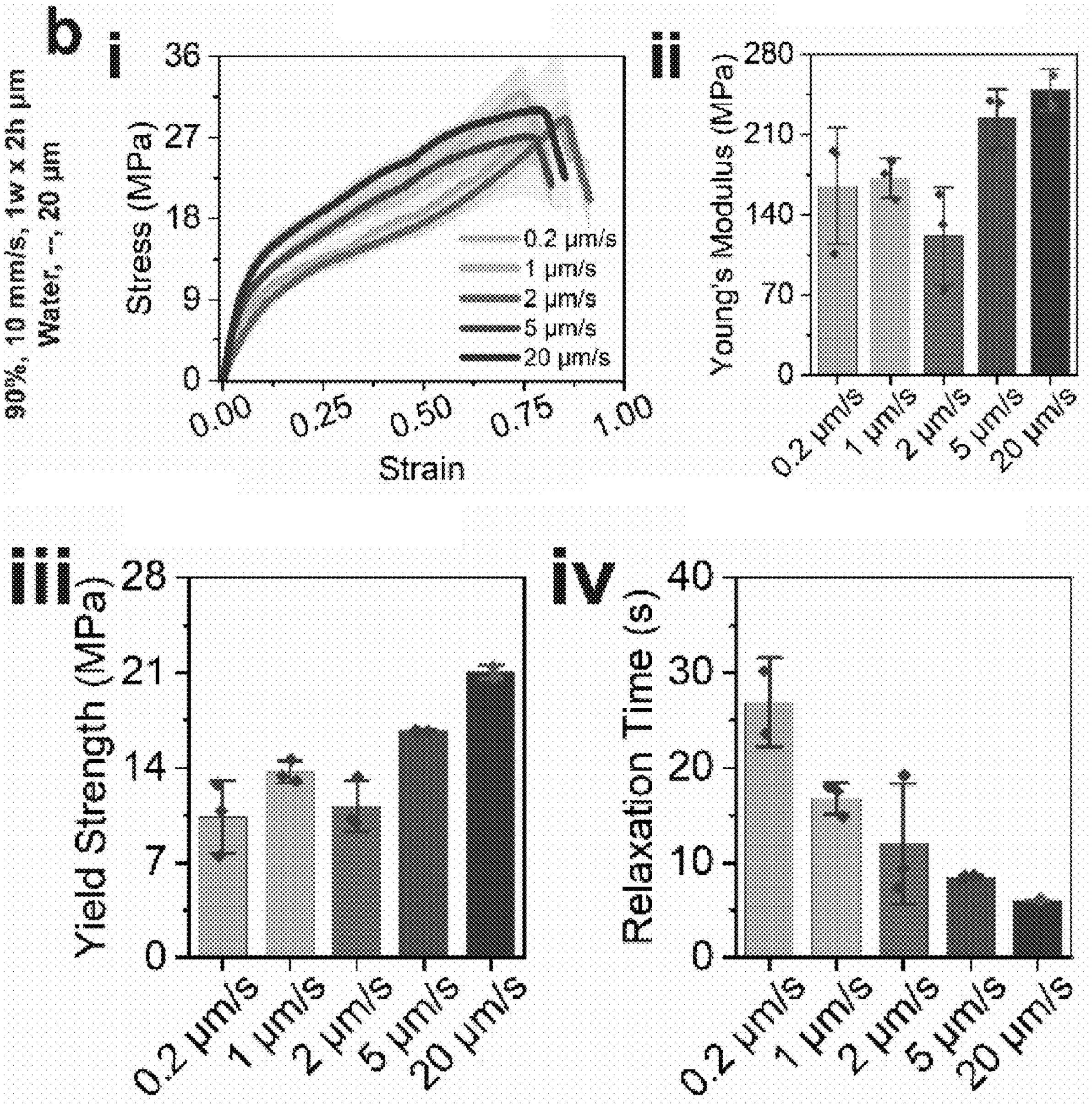
Figure 28:
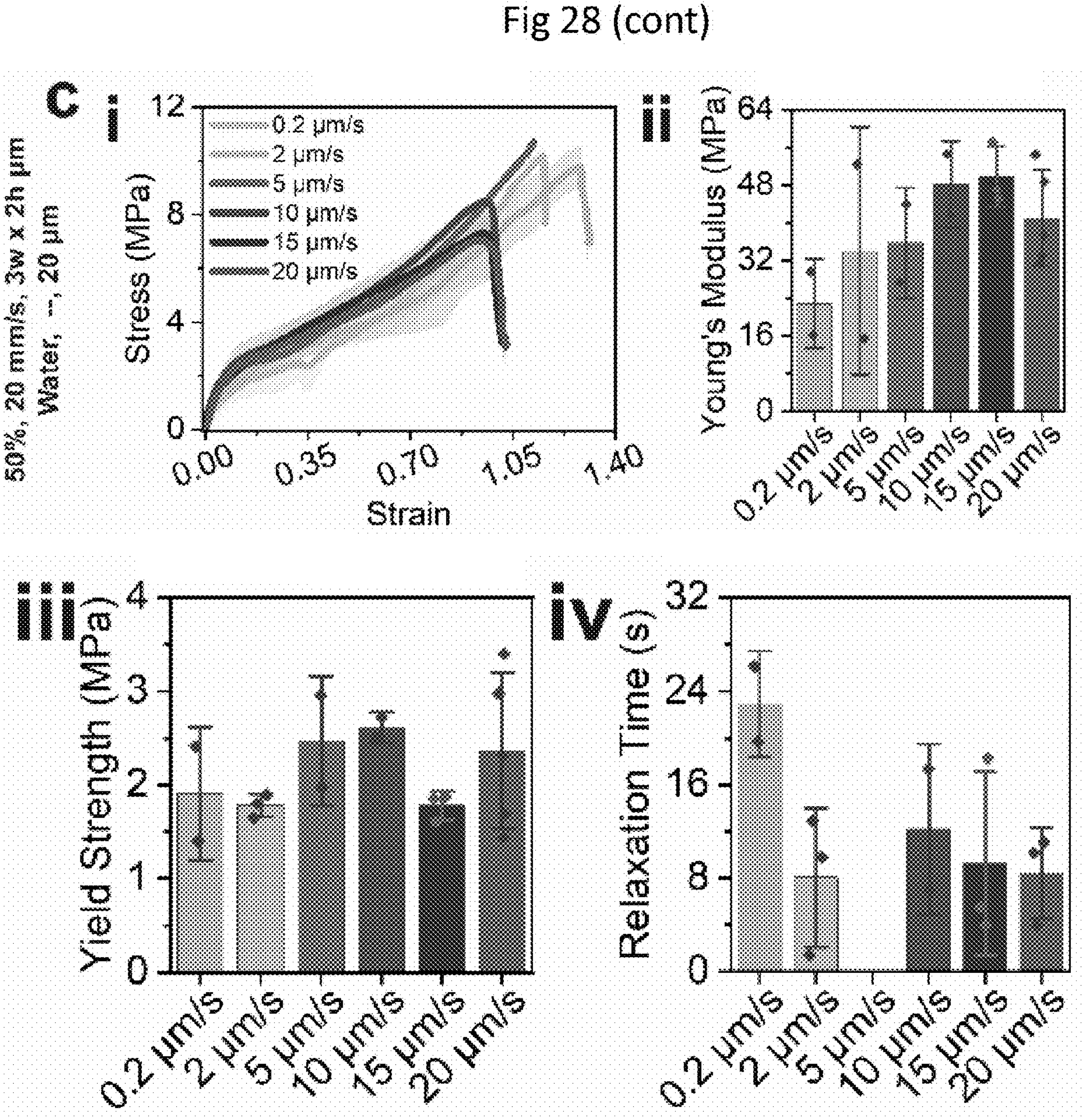
Figure 29:
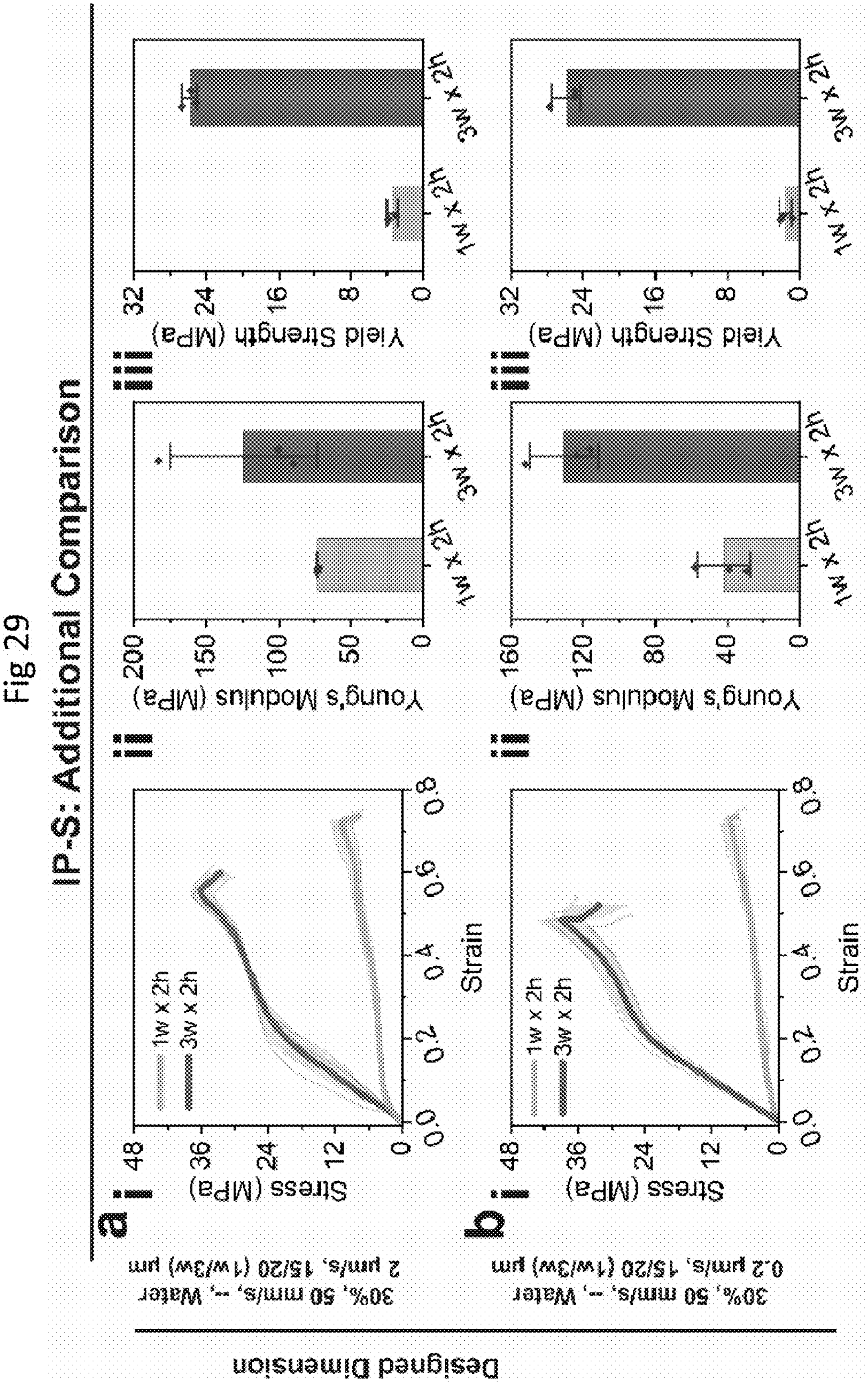
FIG. 29 shows IP-S Experiments.
Figure 30:
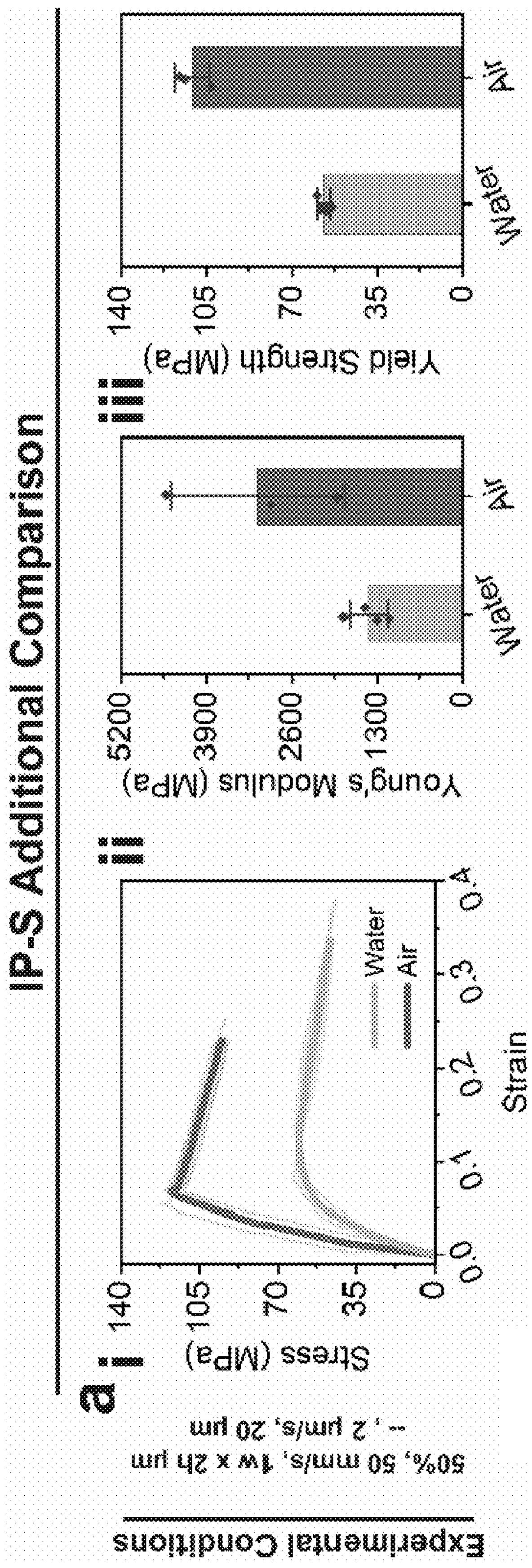
FIG. 30 shows IP-S Experiments: a. Experimental Conditions, water vs. air. b, c, d. Writing Power Comparisons, (% max Power). For all experiments, Stress-strain curves (i), Young's modulus (ii), and yield strength (iii). Labels: Writing Power, Writing Speed, Design Dimension, Condition, Displacement Rate, Displacement Distance.
Figure 30:
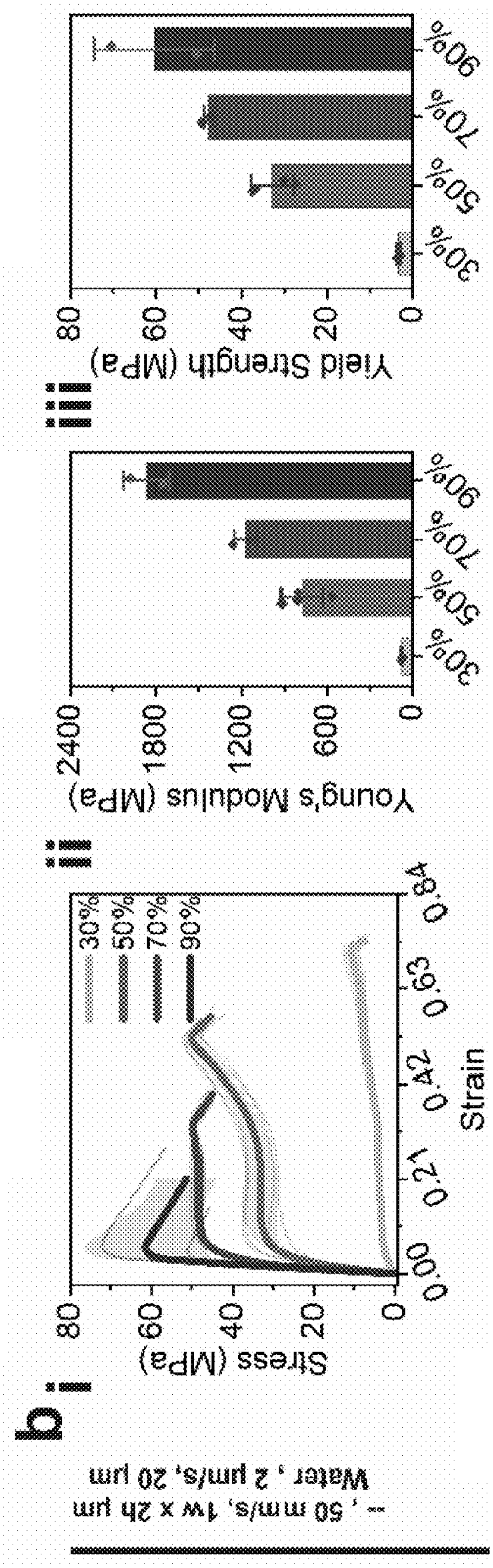
Figure 30:
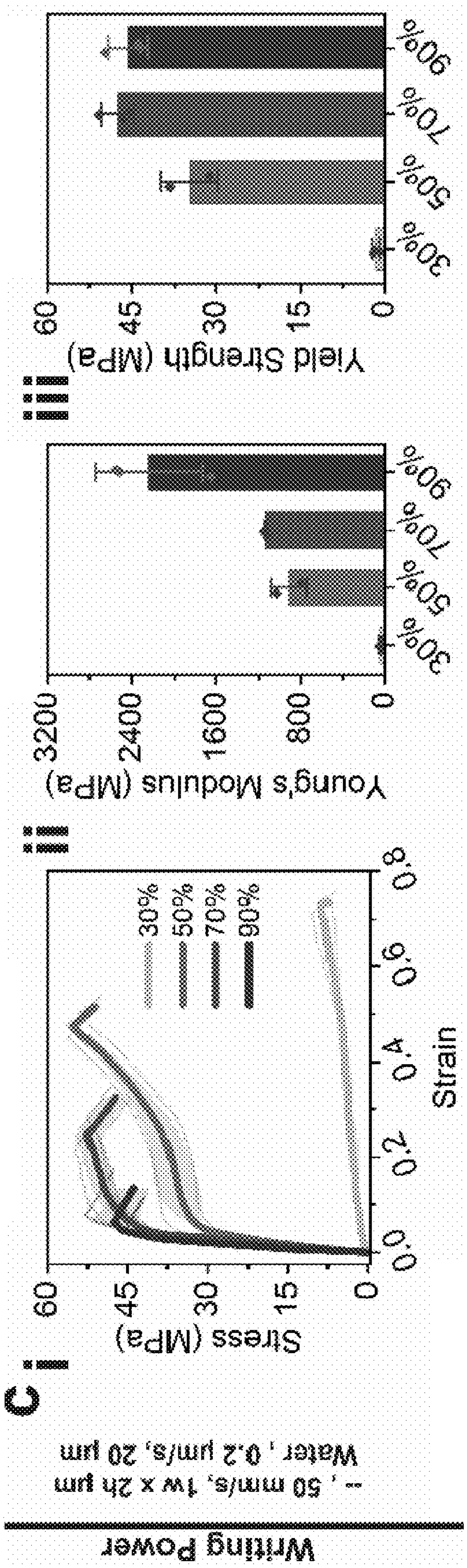
Figure 30:
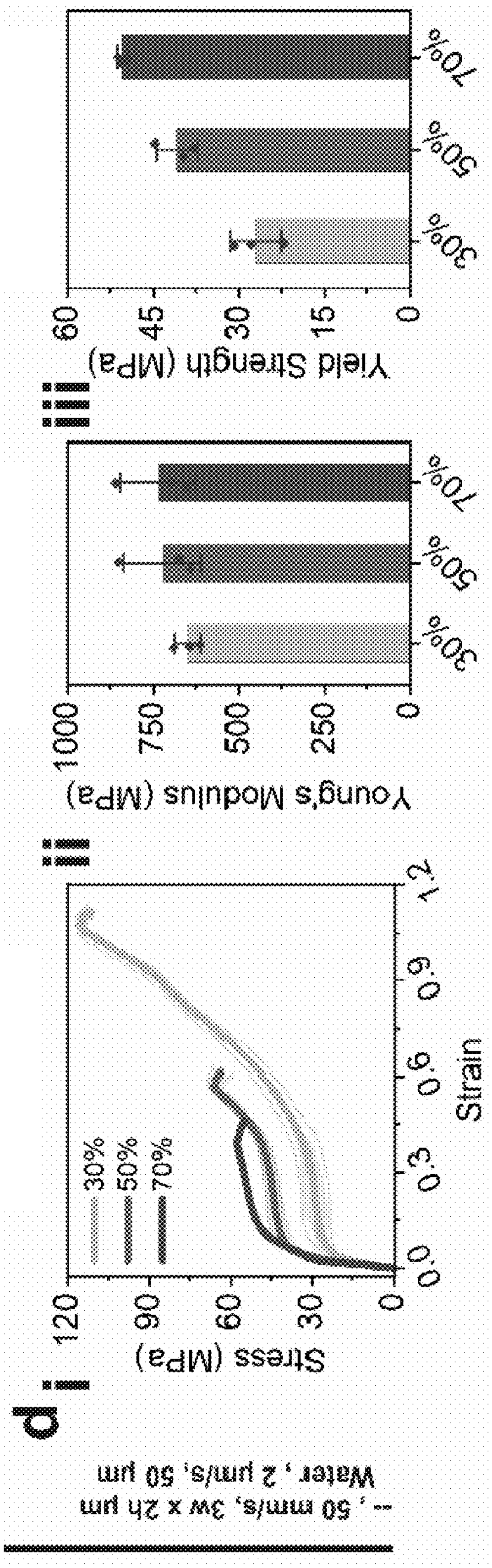

The observed trend in mechanical properties of microfibers consistently hold for other different combinations of writing parameters and strain rates (FIGS. 27, 28). The same can be said for IP-S (FIG. 29, 30). It is noted that IP-S and IP-Visio have the same monomer structure but were cross-linked by different photo-initiators, which result in different degrees of conversion and thus different mechanical properties. IP-Visio, with lower degrees of conversion, yields smaller modulus and yield strength. Furthermore, the fabrication process for IP-Visio was sensitive to parameters that were not necessary to consider in the IP-S prints. This resulted in larger batch-to-batch variations of the IP-Visio fibers compared with IP-S fibers.

There have been reports showing mechanical properties of TPP materials tested in air correlate with printing parameters. For example, a previous study showed a linear relationship between the measured Young's modulus and the laser writing power. By contrast, our tests conducted in water shows that such correlation is stronger than a linear relationship (FIG. 19*c*, ii), indicating that this correlation may be amplified by ionic interactions between the polymer and water. This degree of tunability gives researchers a wide range of control over the mechanics of materials used for cellular scaffolds, which can be tuned to mimic the mechanics of target cells or tissues. For instance, the study of neurons requires a scaffold with a Young's modulus of less than a few MPa, while the study of epithelial cells may need a scaffold with a Young's modulus of a few GPa. Using our testing platform, more nuanced changes due to different levels of crosslinking conversion during TPP can be quantified in future works.

Shape Recovery of TPP-Printed Microfibers During Tensile Testing

Figure 21:
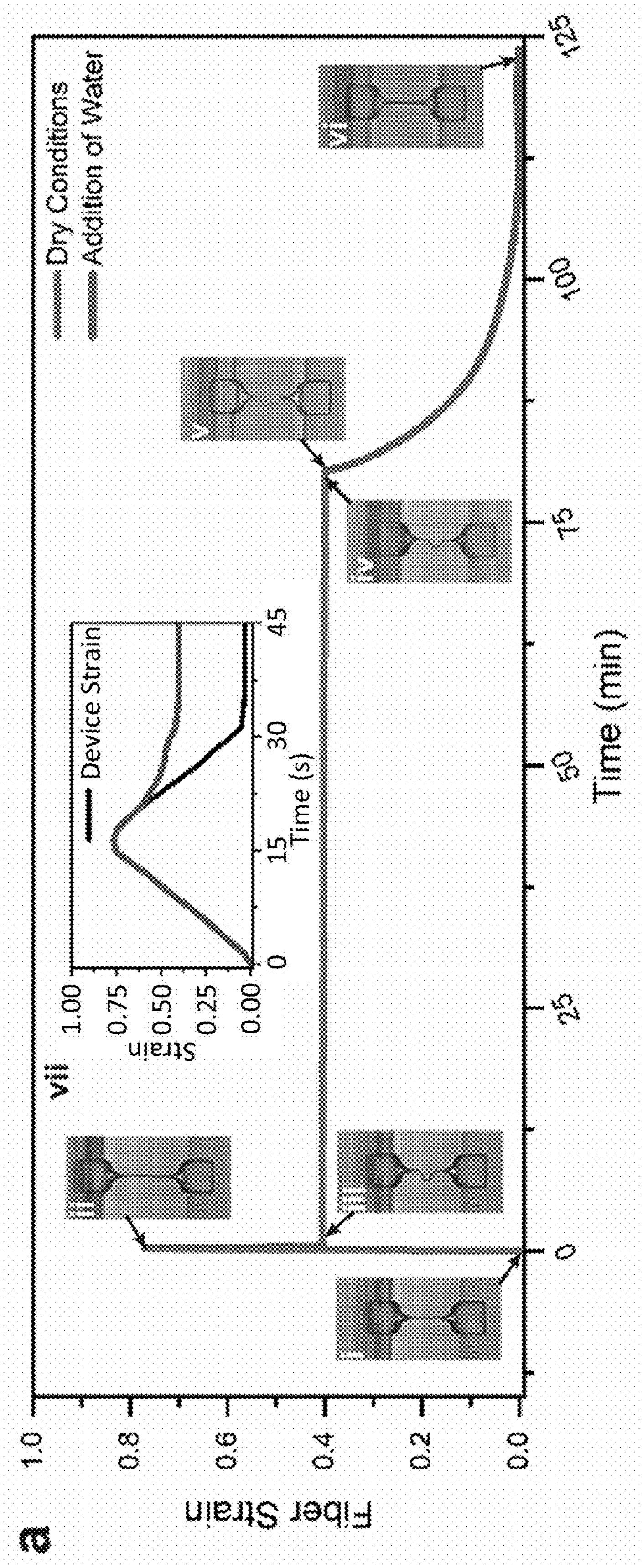
FIG. 21 shows shape recovery of IP-Visio microfibers after strains are applied and released.
Figure 21:
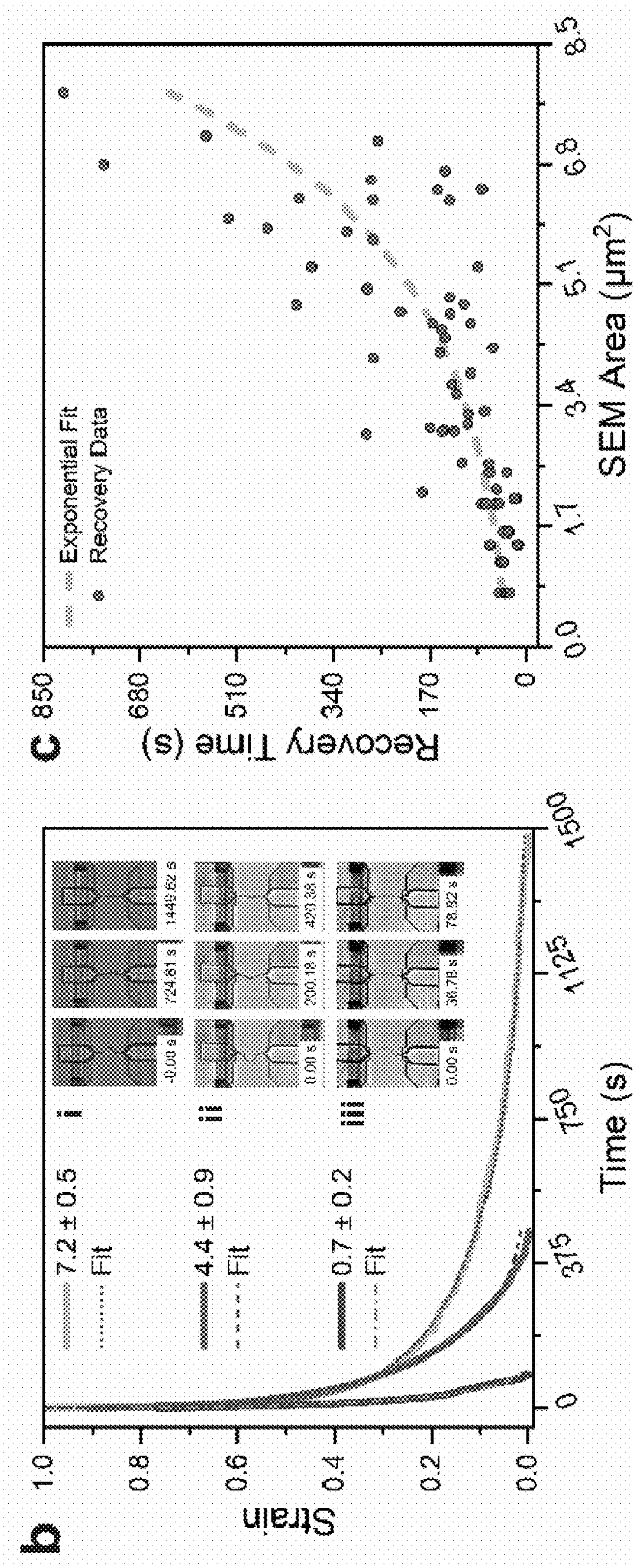
Figure 21:
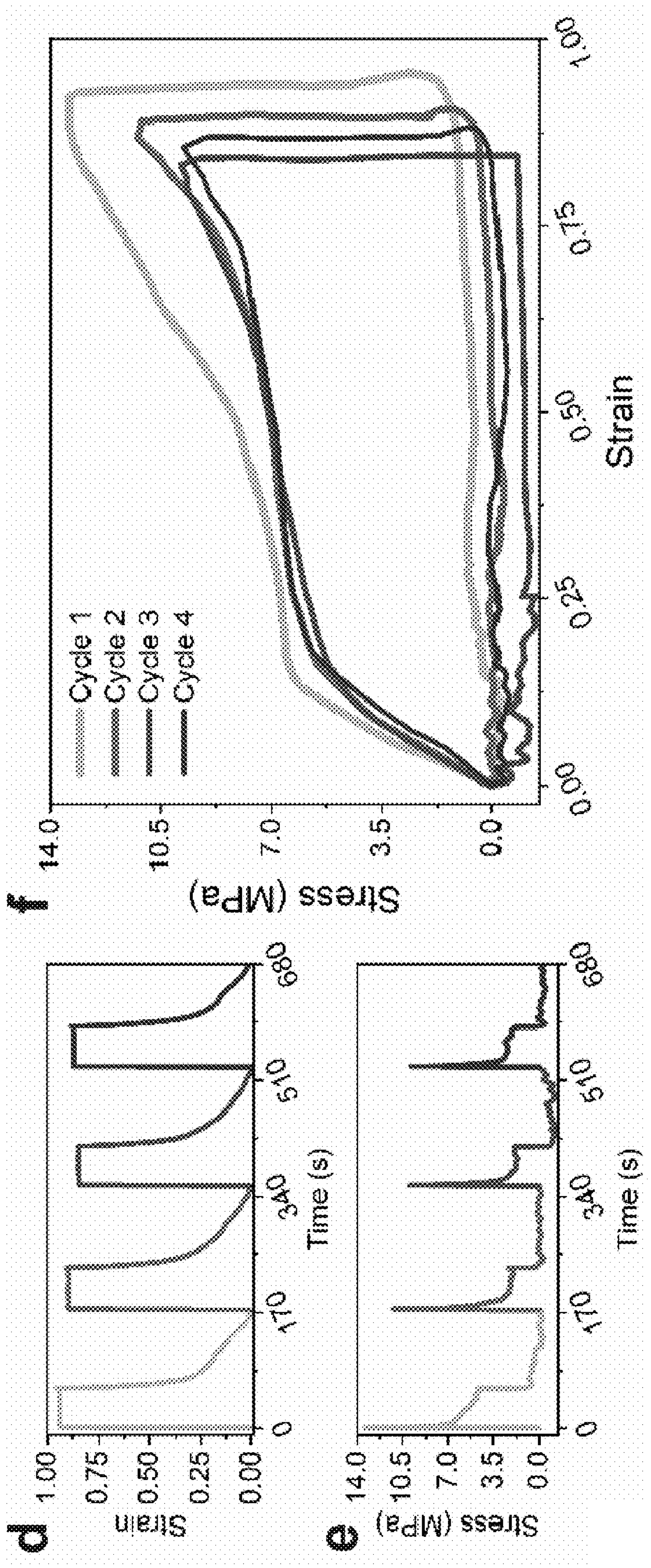
Figure 21:
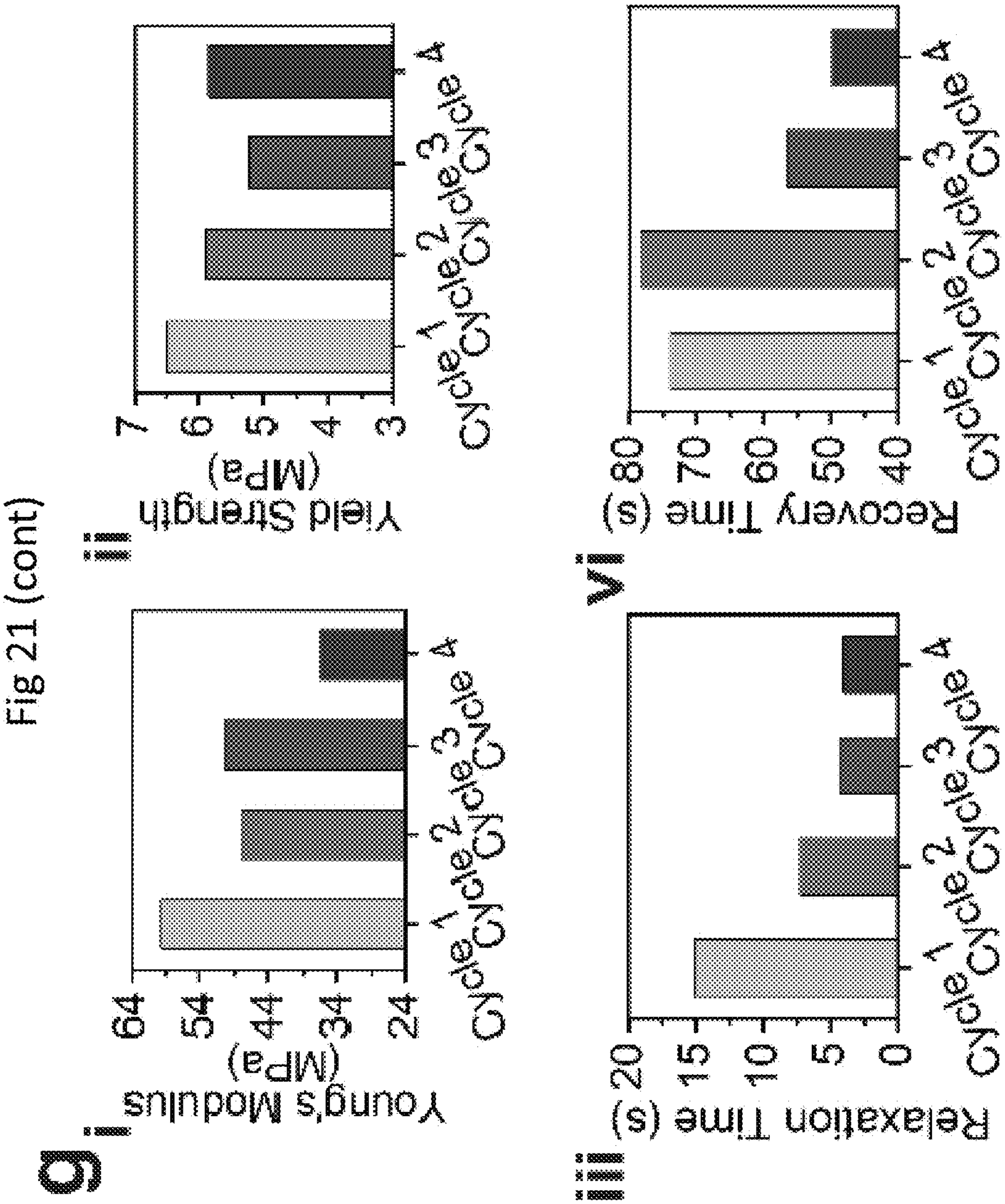

The microfiber tested in water can recover its original shape from a buckled state. This shape memory effect is further explored in this section. First, we show that the microfiber tested in air does not exhibit shape recovery. Like the previous experiment, the microfibers are first stretched in air by pulling the actuation stage to a set displacement of 20 m, followed by an immediate retraction to its initial position (FIG. 21*a*, inset i, ii). Upon return, the microfiber is buckled (FIG. 21*a*, inset iii). The deformation resulted in a fiber strain of ~0.45, while device strain returned to be close to 0 (FIG. 21*a*, inset vii). After 1 hour in air, the fiber maintained a constant buckled shape and strain (FIG. 21*a*, inset iv). Water was then introduced to the dish containing the fiber specimen and the structure substrate. Interestingly, the introduction of water initiated a fiber shape recovery, where the fiber returned to its original straight shape (FIG. 21*a*, inset v and vi). This is consistent with the experimental observation described above and confirmed the effect of water on the shape recovery. Moreover, it is found that the shape recovery time is dependent on the cross-section of the microfibers. The microfibers with a cross-section of ~0.7 $\mu m^2$ showed a recovery time of less than 120 seconds. In contrast, fibers with a cross section of ~7.2 $\mu m^2$ exhibited a recovery time of 25 minutes (FIG. 21*b*). Fitting the strain data with a time-constant equation, we show that the time constant increases monotonically with fiber cross-section following roughly an exponential relationship (FIG. 21*c*).

Figure 31:
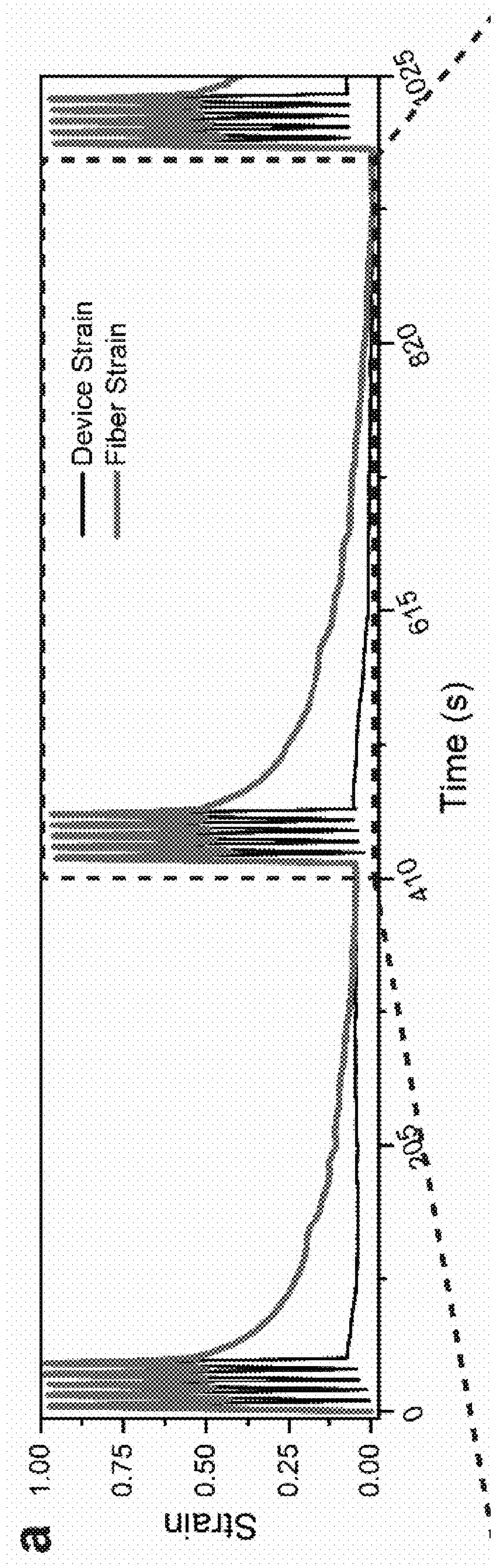
FIG. 31 shows Multi-Pull and Recovery Experiments.
Figure 31:
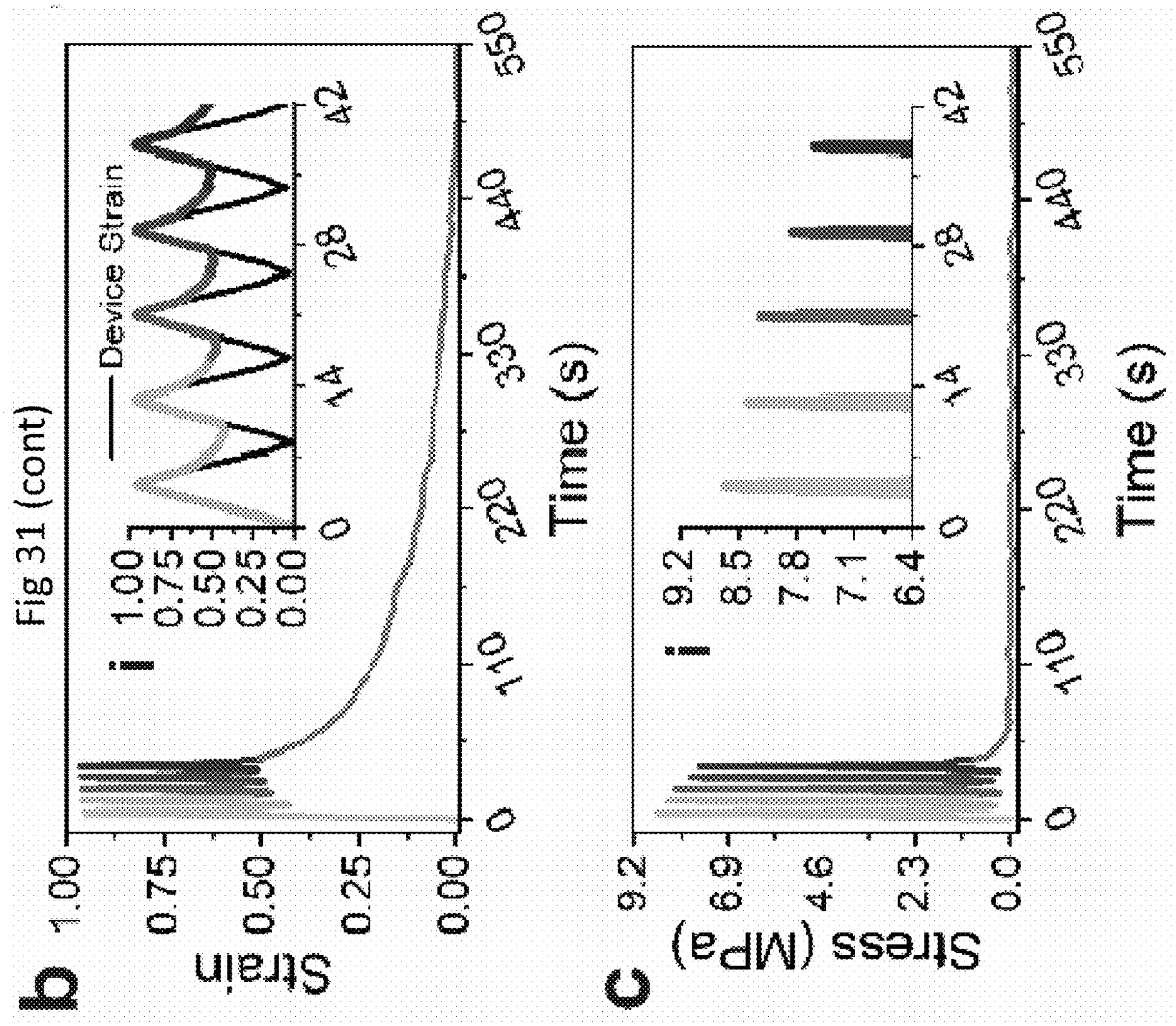
Figure 31:
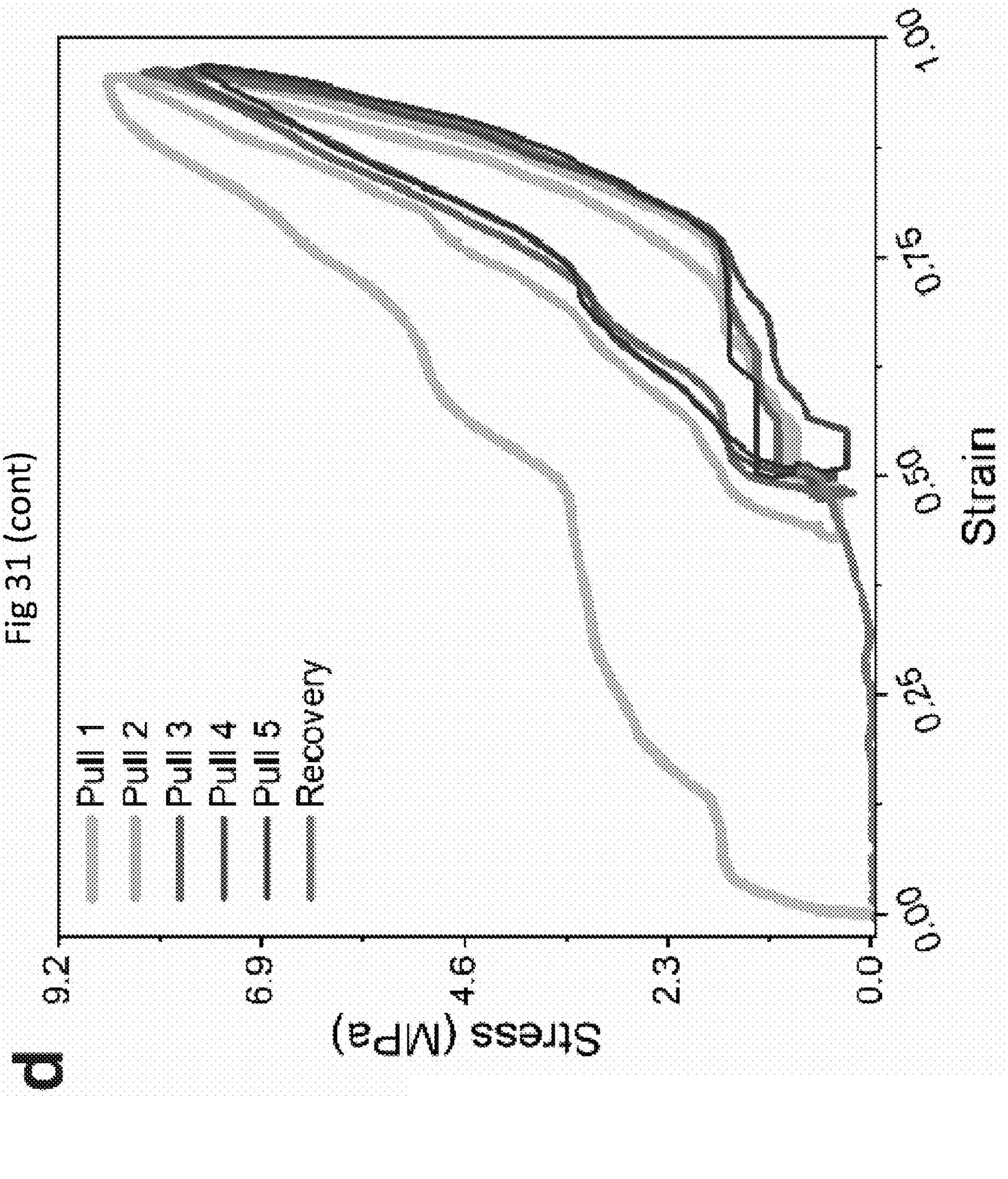
Figure 32:
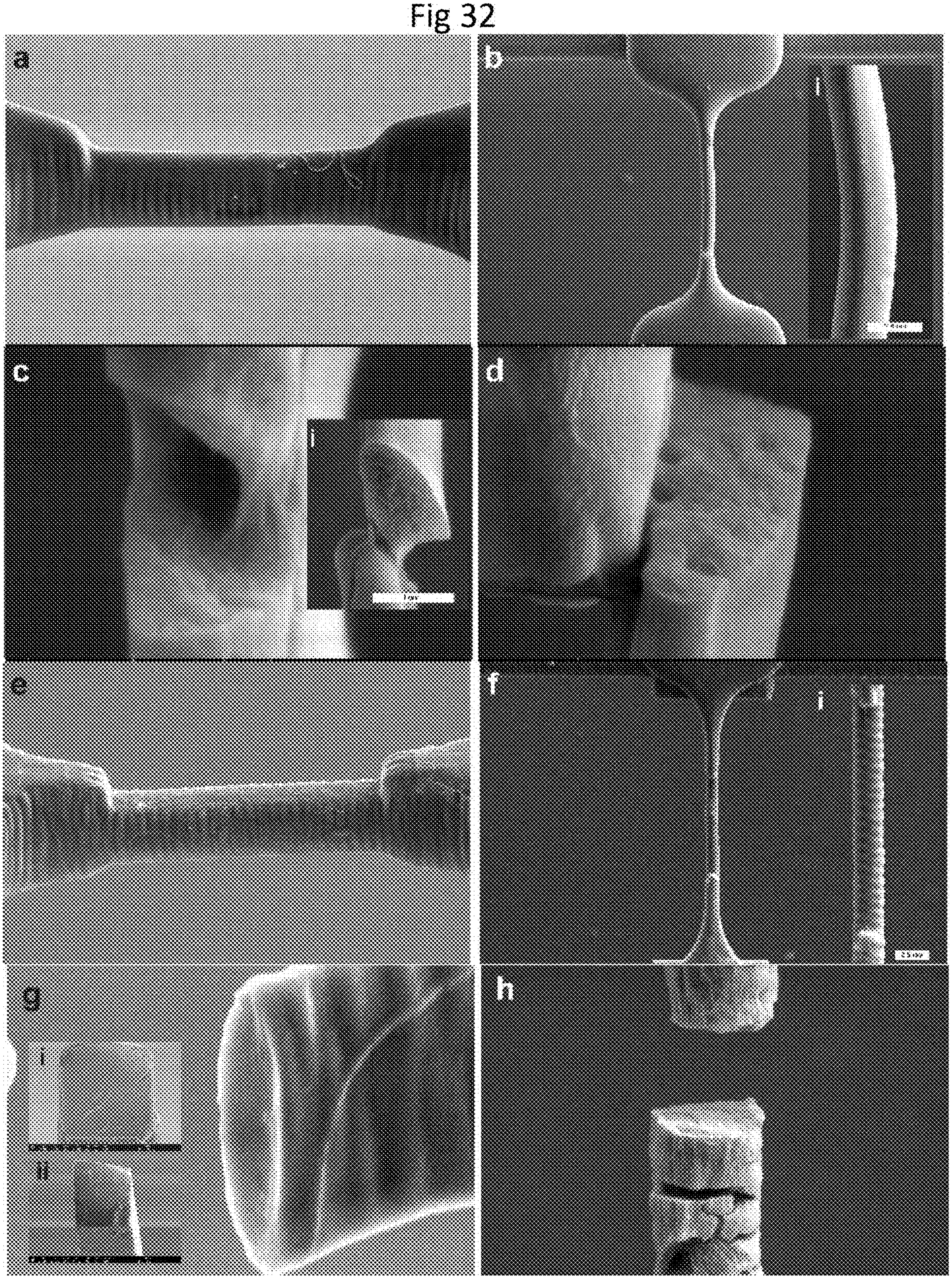
FIG. 32 shows SEM Observations. IP-Visio (panels A-D), IP-S (panels E-H). Comparison of side views (panels A and E scale bars: 10 μm), and top views (panels B and F, scale bars: 30 μm), panel B.i, and panel F.i show zoomed images of IP-Visio and IP-S beams respectively (inset scale bars: 2.5 μm). IP-Visio appears smoother, while IP-S appears more ridged and rougher. Fracture observations (panels C, D, G, and H). In general, IP-Visio fractures appear rougher on the surface, while IP-S fractures appeared smoother. Panel G (i and ii) shows fracture of the IP-S testing structure beams. (Scale Bars: 500 nm, 1 μm (panel C.i), 1 μm (panel D), 2 μm, 10 μm (panel G.i and ii), 4 μm (panel H)).

To further demonstrate the smaller fiber's ability to rapidly recover, the fiber was stretched, allowed to recover, and stretched again. FIG. 21*d* shows the fiber strain evolution during the repeated tensile test on a fiber with 0.74 $\mu m^2$ cross-section. The fiber was first stretched to over 90% strain and the strain was held for 60 seconds to allow stress relaxation (FIG. 21*e*). The device strain was then returned to 0%, creating a buckle in the fiber. This process was repeated four times and repeated strain recovery was observed following each stretch test. A recovery time of about 74 seconds was observed for the first cycle and was reduced to about 50 seconds in the fourth cycle (FIG. 21*g*, vi). The peak stress level decreased from 14 MPa in the first stretch to about 10.5 MPa at the fourth stretch (FIG. 21*e*). Energy dissipation was also observed for the consecutive straining from the stress-strain relationship (FIG. 21*f*). As expected, calculated Young's modulus and yield strength also decreased from the deformation-induced fiber damage (FIG. 21*g*, *i* and ii). Interestingly, the relaxation time during consecutive holding periods also showed a decreasing trend (FIG. 21*g*, iii). The experiment was repeated for multiple pulling and recovery cycles and the result for the mechanical characteristics stands (FIG. 31).

Shape memory in polymers has been extensively studied in literature, and most recently in TPP printed polymers. In general, the cross-linked shape memory polymer network consists of two segregated components: netpoints and molecular switches. The netpoints are the hard segments such as the covalent bonds between polymer chains, which hold the shape of the polymer, while the molecular switches are the switchable segments. At ground state, the switchable segments are polymer chains relaxed around the netpoints. When external load is applied, the switchable segments are elongated and can be settled at a different morphology, resulting in a shape change. Beyond a critical transition temperature, the switchable segments become flexible and provide entropic elastic behavior, which can drive the polymer to its original relaxed state. This critical transition temperature is usually higher than room temperature, such as recently demonstrated in TPP printed microstructure. However, it is possible to lower the temperature to room temperature by diffusion of low molecular weight molecules into the polymer, such as water in our case, which works as a plasticizer. In our experiments, water molecules diffuse into the microfiber, forming hydrogen bonds with the polymer chains, which increases the chain dynamics and results in the shape recovery. Understanding these recovery dynamics is crucial for the design of 4D printed materials for probing cellular behaviors.

Conclusion

TPP-printed polymeric structures offer unique properties as cellular scaffolds that enable a wide spectrum of biological studies. In this paper, a new experimental method is developed for the characterization of the mechanical behavior of TPP-printed structures in a liquid, a more physiologically relevant environment. The method is demonstrated on TPP printed microfibers as a model study. It is found that the Young's moduli and yield strength of the microfibers are significantly reduced in liquid as compared to values obtained in air, and the mechanical behavior can be tailored over a wide range by controlling the TPP printing parameters. In addition, a size-dependent shape memory effect on the microfiber is found in liquid but not in air. It is envisioned that both the tunable mechanical behavior and shape memory effect could have great potential in mechanobiology applications. Further, the experimental method presented here represents a significant advancement in mechanical testing of TPP fabricated structures and can be used to determine mechanical properties of 3D scaffolds in mechanobiology studies.

Experimental Section

TPP fabrication. For this study μTT devices are 3D printed using a Photonic Professional GT tool (Nanoscribe GmbH). The μTT device is produced using commercially available photo resin IP-S monomer: (7,7,9 (or 7,9,9)-trimethyl-4,13-dioxo-3,14-dioxa-5,12-diazahexadecane-1,16-diyl bismethacrylate; photo initiator: 4,4'-bis(diethylamino) benzophenone) (Nanoscribe GmbH). Once an array of structures is produced, the substrate is removed from the tool, developed in SU-8 developer (1-Methoxy-2-propyl acetate), rinsed with isopropanol and blow dried with a gentle stream of filtered nitrogen. Next, the material resin of interest (IP-Visio, monomer: 7,7,9 (or 7,9,9)-trimethyl-4,13-dioxo-3,14-dioxa-5,12-diazahexadecane-1,16-diyl bismethacrylate; photo initiator: phenyl bis(2,4,6-trimethylbenzoyl)-phosphine oxide) is applied to the substrate and the microscope objective of the TPP tool is again dipped into and focused within the resin. The previously printed structures are found and aligned, then the dumb-bell shaped fiber structures are printed on top of the existing structures. Both resins are acrylate based and bonding the IP-Visio dumbbell to the existing IP-S structure worked well. In the fabrication process, the laser power, the laser writing speed, and the CAD dimension of the fiber were varied.

AFM stiffness calibration. The TPP μTT device stiffness was calibrated using AFM. To calibrate the μTT device, the structures were printed onto a silicon chip mounted vertically in the sample holder of the TPP tool. The silicon chip was then flipped on its side and secured to another substrate, which produced horizontal structures compatible with AFM probes for force analysis. AFM force-displacement curves were then collected on the horizontal structures in air and in water. The detailed calibration process is described in the SI, Section 2.

SEM imaging to measure fiber dimension. The fiber structures for tensile testing were designed with a square shape and specified width and height parameters. Additionally, the laser writing speed and laser writing power were varied parameters in the writing of the tensile fiber structures. All the mentioned parameters proved to influence the cross-section size of the fiber. To measure the beam cross section, control sets of prints were fabricated to evaluate the effect of the printing parameters. Furthermore, the final row of each testing column of the structure arrays were left un-stretched and used as control measurements for the tensile beams. SEM images were taken of the top view, and a side view with 45° angle of the beams. From here, the corrected height of the beam was then calculated, and the cross section of the beam was found.

Figure 25:
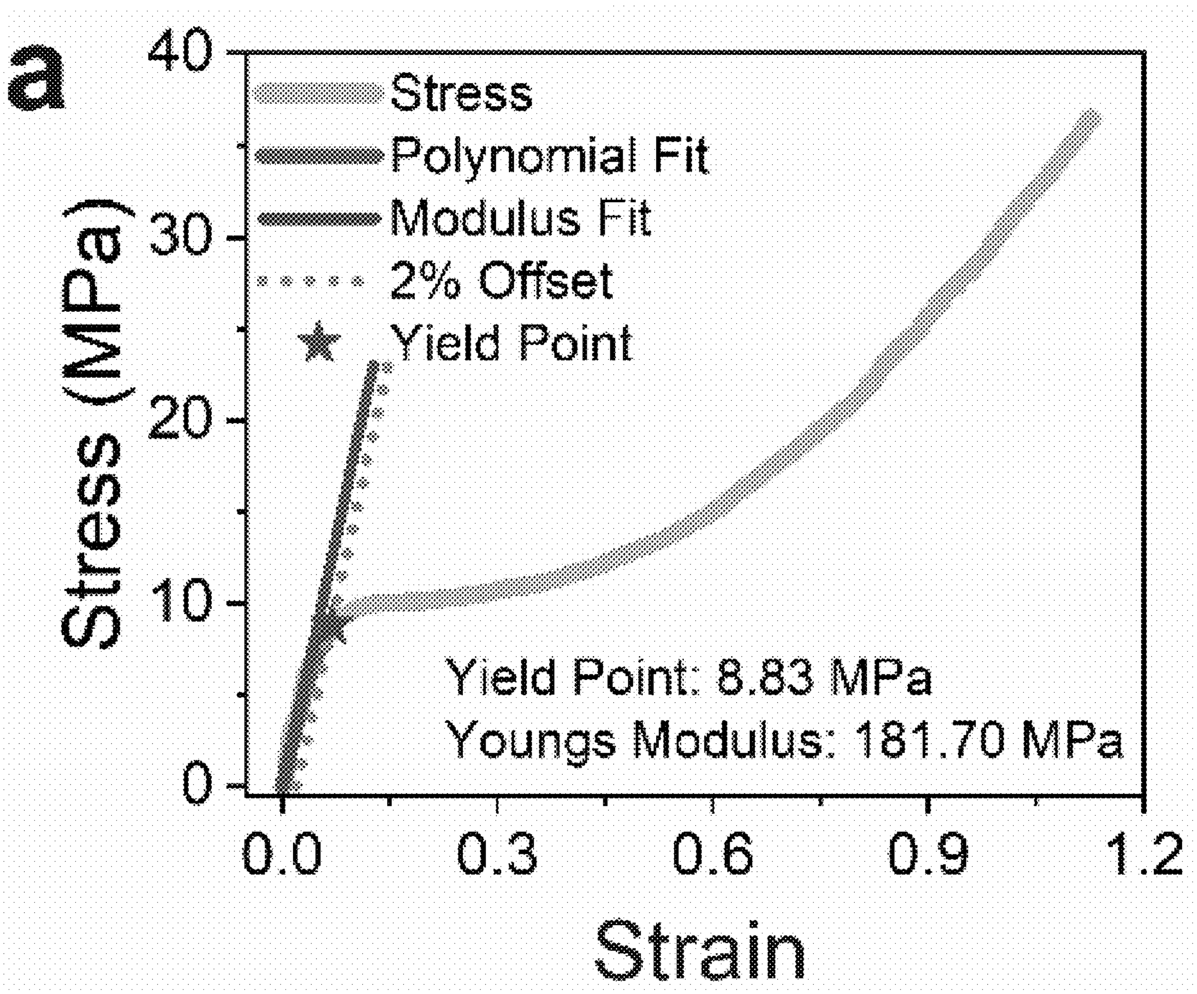
FIG. 25 shows results of finding fits for Yield Strength, Modulus, stress relaxation, and recovery.
Figure 25:
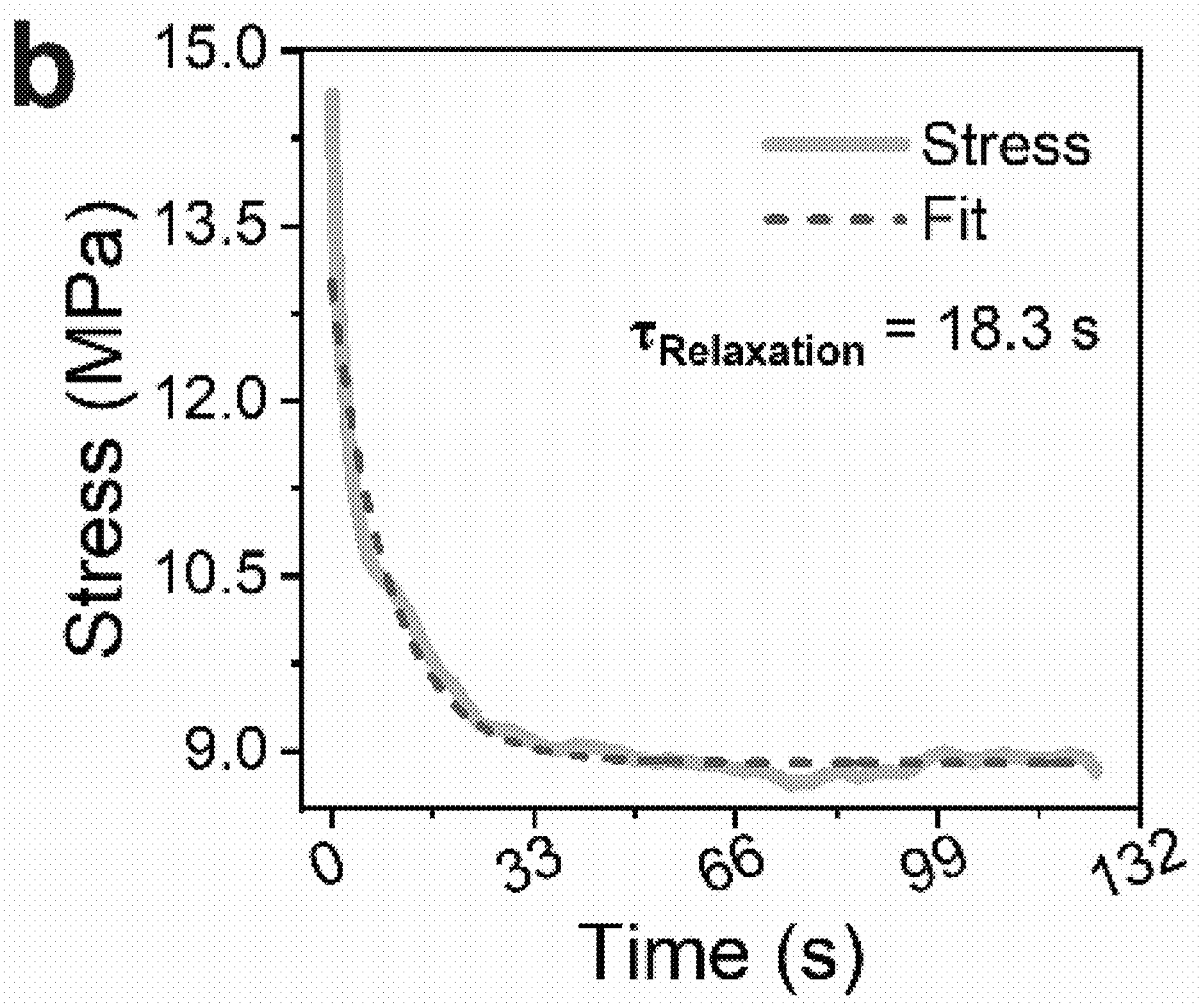
Figure 25:
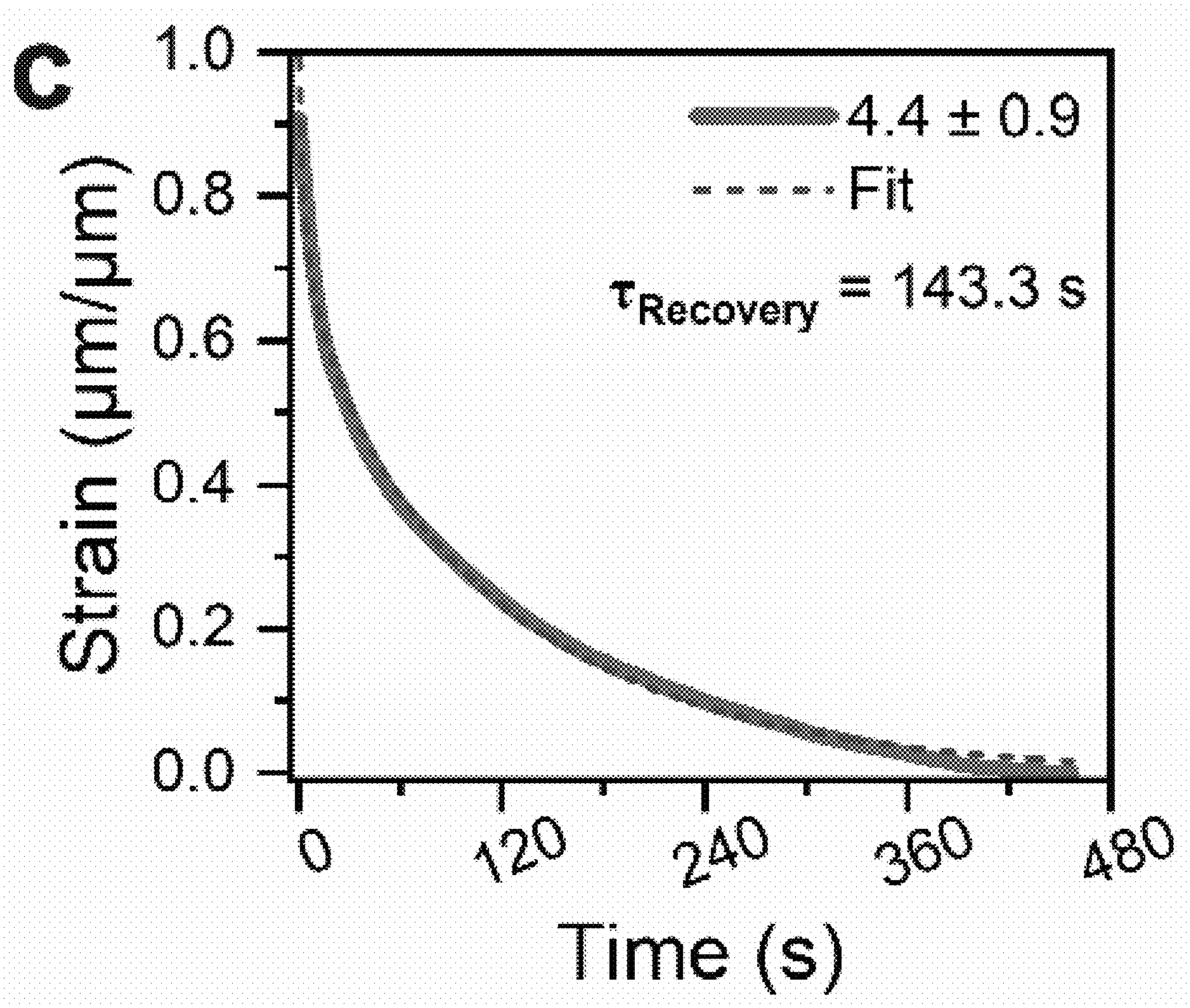

Tensile testing experiments. Experiments were conducted under an optical microscope and AFM set-up. The view was in the plane of the structure platform, allowing for precise measurement of the structure displacements. An AFM cantilever probe was milled to have a hole using focused ion beam (FEI Helios FIB/SEM 660). The micro-structure substrate was place onto a piezo-actuated nano-manipulator stage, and then the AFM is mounted on top of it. The AFM probe was then moved into place and hooked onto the peg of the platform. A horizontal displacement d and a displacement rate $\dot{d}$ were set, and the experiment was then initiated and recorded. Analysis was performed using DIC. It is worth mentioning that the Young's modulus data is calculated by taking the first-order derivative of the linear portions of the stress-strain curves and yield strength is calculated as the 2% yield offset of the corresponding stress-strain curve (FIG. 25).

Digital image correlation for data processing. From the DIC, the set AFM displacement was used to calibrate the measurement through a pixel to micron conversion constant ratio. This was a found and averaged value used for all experiments (Table 4). After finding the micron displacement, the force could then be extracted. Further, using the SEM fiber measurements, the associated stress could then be found. For strain, by strategically setting the grids, the difference between the bottom line of the top grid, and the top line of the bottom grid was used to find the length and the strain of the fiber. The DIC tracks three main features: 1) the dumbbell pattern, represented by the cyan box, 2) the edge of the structure, represented by the red line, and 3) the fiber, represented by the green line (FIG. 17*a*). Initially, grids were selected on top of the dumbbells and the edge of the structure. Then, during analysis, pixel manipulation and pattern detection was used to first find and match the top and bottom dumbbell shapes and reset the grids. Next, the edge of the structure was found, and its relative position was compared to the grid. This allowed for the sub-pixel resolution with analysis speeds of under a frame per second. Lastly, the fiber pattern was found. A fiber length calculation was produced for finding the deformations on the return of the structures to their initial positions. The discretized points of the beam were vectored into an absolute length measurement. The complete code for DIC calculations to obtain the stress-strain relationship from recorded tensile testing images can be found at github.com/YangLabUNL.

TABLE 2

Beam Calibration, Experimental Condition Comparison

| Beam Thickness | Experiment Condition | Average Stiffness (μN/μm) | Standard Deviation % | Measurement Count |
|---|---|---|---|---|
| 2 μm | Air | 0.21 | 9.5 | 120 |
| | Water | 0.05 | 16.5 | 75 |
| 10 μm | Air | 37.4 | 13.3 | 16 |
| | Water | 18.7 | 9.4 | 21 |
| 15 μm | Air | 77.5 | 13.1 | 13 |
| | Water | 42.1 | 14.7 | 15 |

TABLE 3

Beam Calibration, Beam Aging Comparison

| Beam Thickness | Experiment Timing | Average Stiffness (μN/μm) | Standard Deviation % | Measurement Count |
|---|---|---|---|---|
| 10 μm | Initial | 18.5 | 10.8 | 9 |
| 15 μm | | 37.3 | 16.4 | 9 |
| 10 μm | One Week | 18.5 | 10.0 | 13 |
| 15 μm | | 45.9 | 11.6 | 7 |

TABLE 4

| Pixel to Micron Conversion Factor | | | |
|---|---|---|---|
| Zoom | Average Micron/Pixel | Factor, Standard Deviation % | Measurement Count |
| 10× | 0.32 | 7.5 | 283 |
| 20× | 0.18 | 9.8 | 49 |

Example 2 References

Each of the following references is incorporated by reference in its entirety for all purposes:

[1] M. H. Olsen, G. M. Hjortø, M. Hansen, Ö. Met, I. M. Svane, N. B. Larsen, *Lab Chip* 2013, 13, 4800.
[2] D. Wu, L.-G. Niu, S.-Z. Wu, J. Xu, K. Midorikawa, K. Sugioka, *Lab Chip* 2015, 15, 1515.
[3] B. Spagnolo, V. Brunetti, G. Lemenager, E. De Luca, L. Sileo, T. Pellegrino, P. Paolo Pompa, M. De Vittorio, F. Pisanello, *Sci. Rep.* 2015, 5, 10531.
[4] E. D. Lemma, B. Spagnolo, F. Rizzi, S. Corvaglia, M. Pisanello, M. De Vittorio, F. Pisanello, *Advanced healthcare materials* 2017, 6, 1700888.
[5] A. Accardo, M. C. Blatché, R. Courson, I. Loubinoux, C. Thibault, L. Malaquin, C. Vieu, *Small* 2017, 13, 1700621.
[6] J. K. Hohmann, G. von Freymann, *Advanced functional materials* 2014, 24, 6573.
[7] S. Turunen, T. Joki, M. L. Hiltunen, T. O. Ihalainen, S. Narkilahti, M. Kellomaki, *ACS applied materials & interfaces* 2017, 9, 25717.
[8] A. Ovsianikov, M. Malinauskas, S. Schlie, B. Chichkov, S. Gittard, R. Narayan, M. Löbler, K. Sternberg, K.-P. Schmitz, A. Haverich, *Acta biomaterialia* 2011, 7, 967.
[9] A. M. Esfahani, J. Rosenbohm, B. T. Safa, N. V. Lavrik, G. Minnick, Q. Zhou, F. Kong, X. Jin, E. Kim, Y. Liu, Y. Lu, J. Y. Lim, J. K. Wahl, M. Dao, C. Huang, R. Yang, *Proceedings of the National Academy of Sciences* 2021, 118.
[10] F. Klein, T. Striebel, J. Fischer, Z. Jiang, C. M. Franz, G. von Freymann, M. Wegener, M. Bastmeyer, *Adv Mater* 2010, 22, 868.
[11] A. Marino, G. Ciofani, C. Filippeschi, M. Pellegrino, M. Pellegrini, P. Orsini, M. Pasqualetti, V. Mattoli, B. Mazzolai, *ACS applied materials & interfaces* 2013, 5, 13012.
[12] I. Silvestro, I. Francolini, V. Di Lisio, A. Martinelli, L. Pietrelli, A. Scotto d'Abusco, A. Scoppio, A. Piozzi, *Materials* 2020, 13, 3577.
[13] E. D. Lemma, B. Spagnolo, M. De Vittorio, F. Pisanello, *Trends Biotechnol.* 2019, 37, 358.
[14] D. Tan, Y. Li, F. Qi, H. Yang, Q. Gong, X. Dong, X. Duan, *Applied physics letters* 2007, 90, 071106.
[15] A. K. Nguyen, R. J. Narayan, *Mater. Today* 2017, 20, 314.
[16] F. Klein, B. Richter, T. Striebel, C. M. Franz, G. v. Freymann, M. Wegener, M. Bastmeyer, *Adv. Mater.* (Weinheim, Ger.) 2011, 23, 1341.
[17] E. D. Lemma, S. Sergio, B. Spagnolo, M. Pisanello, L. Algieri, M. A. Coluccia, M. Maffia, M. De Vittorio, F. Pisanello, *Microelectron. Eng.* 2018, 190, 11.
[18] G. Weisgrab, O. Guillaume, Z. Guo, P. Heimel, P. Slezak, A. Poot, D. Grijpma, A. Ovsianikov, *Biofabrication* 2020, 12, 045036.
[19] B. Richter, V. Hahn, S. Bertels, T. K. Claus, M. Wegener, G. Delaittre, C. Barner-Kowollik, M. Bastmeyer, *Adv. Mater.* (Weinheim, Ger.) 2017, 29, 1604342.
[20] F. Klein, B. Richter, T. Striebel, C. M. Franz, G. von Freymann, M. Wegener, M. Bastmeyer, *Adv Mater* 2011, 23, 1341.
[21] M. T. Raimondi, S. M. Eaton, M. Laganá, V. Aprile, M. M. Nava, G. Cerullo, R. Osellame, *Acta biomaterialia* 2013, 9, 4579.
[22] K. S. Worthington, L. A. Wiley, E. E. Kaalberg, M. M. Collins, R. F. Mullins, E. M. Stone, B. A. Tucker, *Acta Biomaterialia* 2017, 55, 385.
[23] K. S. Worthington, A. V. Do, R. Smith, B. A. Tucker, A. K. Salem, *Macromol. Biosci.* 2019, 19, 1800370.
[24] K. Cicha, T. Koch, J. Torgersen, Z. Li, R. Liska, J. Stampfl, *J. Appl. Phys.* 2012, 112, 094906.
[25] D. Jang, L. R. Meza, F. Greer, J. R. Greer, *Nat. Mater.* 2013, 12, 893.
[26] I S. Ladner, M. A. Cullinan, S. K. Saha, *RSC Advances* 2019, 9, 28808.
[27] C. N. LaFratta, T. Baldacchini, *Micromachines* 2017, 8, 101.
[28] J. S. Oakdale, J. Ye, W. L. Smith, J. Biener, *Opt. Express* 2016, 24, 27077.
[29] S.-J. Zhang, Y. Li, Y.-K. Wang, L.-P. Liu, H.-D. Wang, Y.-F. Xiao, H. Yang, Q. Gong, *Appl. Phys. A* 2015, 118, 437.
[30] J. Bauer, A. Guell Izard, Y. Zhang, T. Baldacchini, L. Valdevit, *Advanced Materials Technologies* 2019, 4, 1900146.
[31] A. M. Greiner, B. Richter, M. Bastmeyer, *Macromol. Biosci.* 2012, 12, 1301.
[32] X. Gou, M. Zheng, Y. Zhao, X. Dong, F. Jin, J. Xing, X. Duan, *Applied Surface Science* 2017, 416, 273.
[33] J. Torgersen, X. H. Qin, Z. Li, A. Ovsianikov, R. Liska, J. Stampfl, *Advanced Functional Materials* 2013, 23, 4542.
[34] J. Xing, L. Liu, X. Song, Y. Zhao, L. Zhang, X. Dong, F. Jin, M. Zheng, X. Duan, *Journal of Materials Chemistry B* 2015, 3, 8486.
[35] Y. Liu, J. H. Campbell, O. Stein, L. Jiang, J. Hund, Y. Lu, *Nanomaterials* 2018, 8, 498.
[36] A. S. Gladman, E. A. Matsumoto, R. G. Nuzzo, L. Mahadevan, J. A. Lewis, *Nat. Mater.* 2016, 15, 413.
[37] S. Miao, N. Castro, M. Nowicki, L. Xia, H. Cui, X. Zhou, W. Zhu, S.-j. Lee, K. Sarkar, G. Vozzi, *Mater. Today* 2017, 20, 577.
[38] M. Schmid, D. Ludescher, H. Giessen, OpticalMaterials Express 2019, 9, 4564.
[39] T. Baldacchini, *Three-dimensional microfabrication using two-photon polymerization: fundamentals, technology, and applications*, William Andrew, 2015.
[40] X. Zhou, Y. Hou, J. Lin, *Aip Advances* 2015, 5, 030701.
[41] E. D. Lemma, F. Rizzi, T. Dattoma, B. Spagnolo, L. Sileo, A. Qualtieri, M. De Vittorio, F. Pisanello, *IEEE transactions on nanotechnology* 2016, 16, 23.
[42] M. Behl, A. Lendlein, *Mater. Today* 2007, 10, 20.
[43] A. Lendlein, S. Kelch, *Angew. Chem. Int. Ed.* 2002, 41, 2034.
[44] M. P. Jeske, W. Zhang, M. Anthamatten, *Advanced Materials Technologies* 2022, 2101725.
[45] C. A. Spiegel, M. Hackner, V. P. Bothe, J. P. Spatz, E. Blasco, *Advanced Functional Materials* 2022, 2110580.
[46] W. Huang, B. Yang, L. An, C. Li, Y. Chan, *Applied Physics Letters* 2005, 86, 114105.
[47] S. Talebian, M. Mehrali, N. Taebnia, C. P. Pennisi, F. B. Kadumudi, J. Foroughi, M. Hasany, M. Nikkhah, M. Akbari, G. Orive, A. Dolatshahi-Pirouz, *Adv Sci* (*Weinh*) 2019, 6, 1801664.

Example 3

The study of mechanical properties of cell-cell junctions has seen increased interest in recent years due to advanced technologies that allow for precise cell manipulation and complex microstructures with fine resolution to interact with cells. For studying cell-cell junction mechanics, two common approaches are dual micropipette aspiration (DPA) and single cell force spectroscopy (SCFS). In DPA, two cells are suctioned onto the tip of two micropipettes, are brought into contact and subsequently pulled apart, and the force within the junction is determined based on the deflection of the micropipette tips. A major limitation of this experimental setup is that cells are not given time to form mature focal adhesions, which play a critical role in adhesion-mediated mechanotransduction. In addition, this platform has difficulty in combining mechanical measurements with fluorescence microscopy. In SCFS, one cell is attached to an atomic force microscopy (AFM) probe and brought into contact with another cell on a petri dish, and then the cells are pulled apart while force is read with the AFM. While this technique allows for a high force sensing resolution, a major limitation is the difficulty in continuously observing the cell-cell junction during stretching due to the orientation of the stretching direction with respect to the imaging plane. In addition, like with DPA, mature cell-cell junctions cannot be given time to form without sacrificing throughput.

To address these limitations, our group designed a single-cell adhesion micro tensile tester (SCAμTT) platform, which allows for stretching a single pair of cells connected by a junction while imaging it and recording stress and strain. In addition, cells are allowed for prolonged growth on the platform to form mature cell-cell junctions and focal adhesions, and since an array of these platforms are fabricated on one substrate, parallel operation and high throughput is achieved. However, a major limitation of this platform for studying mechanotransduction is the optical properties of IP-S, the photoresin it was originally designed to be fabricated with, which produces high autofluorescence during fluorescent imaging. Fluorescent imaging is critical in investigating mechanotransduction, as it allows for real-time visualization of the expression and organization of proteins tagged with fluorescent markers as well as investigation of force-induced protein unfolding with fluorescence resonant energy transfer (FRET). The high background signal produced by IP-S makes imaging these fluorescent tags difficult and makes FRET studies nearly impossible due to its inherently weak signal.

In this report we detail the design and fabrication of a new multi-material based SCAμTT platform compatible with fluorescent imaging. The platform takes advantage of IP-Visio, a new photoresin developed by Nanoscribe with reduced autofluorescence, and IP-S, which was found to have superior mechanical properties and produce more stable platforms than IP-Visio alone. In addition, we incorporated integrated apertures made by evaporating gold on to the substrate to prevent the illumination of IP-S, further reducing background noise and improving signal-to-noise ratio during imaging. With this design, we demonstrated the ability to image F-actin and the nucleus in a pair of keratinocytes as they are stretched up to 250% strain, allowing us to observe junction rupture and F-actin retraction while simultaneously recording the accumulation of up to 80 kPa of stress in the junction. The platform presented here will enable potential studies on mechanotransduction at the cell-cell junction through monitoring the expression and organization of fluorescently tagged proteins and tension levels in mechanosensitive networks using FRET, and the fabrication techniques can be integrated into other TPP-printed platforms for use in cell mechanics studies.

Materials and Methods

TPP Fabrication

TPP processing was carried out using a Photonic Professional GT (Nanoscribe GmbH) instrument and two proprietary photoresins, IP-S and IP-visio supplied by the vendor. The 3D computer assisted designs (CAD) of SCAμTT platforms were compiled using the 3D graphic editor built into COMSOL Multiphysics software. Subsequently, STL files of 3D CAD designs were exported and converted into job files using DeScribe software. When printing IP-S parts of SCAμTT platforms, the laser beam scanning velocity and laser power were set to 55 mm/s and 65%, respectively. The interlayer and raster distances (commonly referred to as "slicing" and "hatching" distances, respectively) were set to be 0.5 μm and 0.4 μm. For printing IP-Visio parts, scanning velocity, laser power, slicing distance and hatching distance were 30 mm/s, 90%, 0.4 μm and 0.3 μm, respectively. These small slicing and hatching distances provide sufficiently high resolution and surface smoothness the while printing time was reasonably short. After printing arrays of the main (bottom) parts of SCAμTT platforms, the substrates were successively soaked in SU-8 developer for 30 minutes, rinsed with isopropanol, dried and loaded into the TPP tool. A similar development and drying procedures were used after printing the top IP-Visio platforms. Before printing the top IP-Visio platforms alignment of the substrate with already printed IP-S printed structures was done manually by centering each IP-S structure in the field of view of the tool's optical camera.

Cell Culture and Staining

A431 cells were cultured in Dulbecco's modified Eagle's medium (DMEM) (Thermo Fisher) supplemented with 10% fetal bovine serum (FBS) (Thermo Fisher) and 1% penicillin-streptomycin (P/S) (Thermo Fisher). HaCaT cells were cultured in DMEM with low calcium concentration (Thermo Fisher) and supplemented with 10% FBS, 1% P/S, and 1% GlutaMAX (Thermo Fisher). For experiments, cells were grown in $CO_2$ independent DMEM (Thermo Fisher) supplemented with 10% FBS and 1% P/S.

A431 cells were first fixed with 4% paraformaldehyde diluted from 16% paraformaldehyde (Thermo Fisher) in PBS for 10 minutes. Then, cells were permeabilized with 0.1% Triton X-100 (Sigma-Aldrich) for 5 minutes. To stain zyxin, anti-zyxin antibody (Sigma) was diluted to a ratio of 1:250 in PBS, added to the sample, refrigerated for 24 hours, and finally washed twice with PBS. Then, goat anti-rabbit IgG (H+L), Superclonal Recombinant Secondary Antibody, Alexa Fluor 647 (Thermo Fisher) was incubated with the sample for 1 hour at 37° C. To stain F-actin, Alexa Fluor 488 Phalloidin (Invitrogen) diluted in to a 1× concentration in PBS and incubated in the sample at room temperature for 30. Finally, to stain the nucleus, DAPI (Thermo Fisher) was diluted 1:1000 in PBS and incubated with the sample for 10 minutes at room temperature and then filled with PBS for imaging. Between each of the above steps, the sample was washed twice with PBS. HaCaT cells were fixed, permeabilized, and stained for F-actin and the nucleus with the same parameters as A431 cells. Between each step, cells were washed two times by incubating in PBS at room temperature for 4 minutes.

Cell Deposition and Stretching

Prior to cell deposition, SCAμTT platform arrays were placed in a glass bottom petri dish and sterilized with 70% ethanol for 1 minute and then soaked in phosphate-buffered saline (PBS) (Thermo Fisher) for 1 hour to dissolve any remaining ethanol. Then, the platforms were coated with Geltrex (Thermo Fisher) for 1 hour to promote adhesion of cells onto the platform. In preparation for cell deposition, 2 mL of $CO_2$-independent DMEM was placed in the petri dish. After cells were passaged, 100 μL of cells suspended in DMEM after passaging was dropped on top of the platforms. For depositing cells on the platforms, an Eppendorf single-cell isolation setup was used. The setup consists of a pressure controller (CellTram 4r Air/Oil, Eppendorf) which controls the pressure inside a microcapillary (Piezo Drill Tip ICSI, Eppendorf) with a tip inner diameter of 6 μm. The pressure controller is positioned with a 3D manipulator (TransferMan 4r, Eppendorf), which is on Nikon Eclipse Ti—S microscope within a temperature-controlled chamber at 37° C. To deposit cells, the tip of the microcapillary is brought into contact with a cell on the substrate. Subsequently, a negative pressure is applied to suction the cell to the tip. The cell is brought into one side of the bowtie confinement on top of the SCAμTT platform and the pressure is released to place the cell. The same procedure is then repeated to place another cell on the other side of the confinement, and this process is repeated for each platform in the array.

The cell stretching setup consists of an AFM (Nanosurf AG, Switzerland) on a Zeiss Axio Observer 7 microscope. A hole is drilled in the tip of the AFM probe with FIB etching in a FEI Helios NanoLab 660. For stretching cells on the hybrid design, first the islands are separated by breaking the tethers using the microneedle tip used for cell deposition. The sample is placed under the AFM and the AFM tip with a through hole is lowered to the device to capture the pin on the forcing island. The cell pair was stretched in increments of 5 μm by moving the AFM with the AFM software and imaged at each point from 0 μm to 50 μm.

Signal Quantification

To quantify the signal intensity from images of disks in the initial comparison of autofluorescence between IP-S and IP-Visio, a circular region of interest was drawn on each disk and the intensity for each channel was calculated with Zeiss software. An average of these values for all disks was then calculated. For quantifying the intensity of stains of zyxin, F-actin, and DAPI, small regions of interest were defined in areas with high signal with well-defined features of the proteins, and the average intensity of these regions of interest was calculated.

To quantify the signal intensity from images of the original SCAμTT platform as well as the hybrid SCAμTT platform without and with integrated apertures, a small rectangular region of interest (FIG. 4A) was defined within the bowtie confinement area of each device imaged, and the average intensity within the region of interest was calculated with Zeiss software. Then, the average of each of these values for the same type of platform was calculated.

To quantify the intensity of stained nuclei on the platforms, a custom CellProfiler (Broad Institute) pipeline was created to identify the nuclei and calculate their average intensity. To calculate the background signal for each nucleus, images of the platforms without stained cells were taken with the same image acquisition parameters. Then, based on the border of each nuclei identified by CellProfiler, the intensity within the regions that the nuclei contain were calculated. The intensity of an individual nucleus is then calculated by subtracting this value from the original intensity, which would include signal from both the nucleus and background. To calculate signal to noise ratio, this value was divided by the background value for each nucleus, and then these values were averaged. To calculate the adjusted nucleus intensity, which takes into account the potential for variability of staining between samples, the average nucleus intensity in cells growing on the petri dish within which the platforms are placed was calculated, and the nucleus intensity of cells on the platform was divided by this value. This allows us to gauge accurately the effect SCAμTT platforms have on inhibiting signal excitation and collection.

Stress-Strain Curve Calculation

Top plate displacement assumed to match input, used to find relationship between pixels and distance in um. Bottom plate displacement found by tracking bright spots on edge of bowtie with a MATLAB code. To convert bottom plate displacement to force, the stiffness of the vertical beams of the bottom island was calculated based on its dimensions and the dimensions and stiffness of the vertical beams of the original platform. The effective stiffness of the vertical beams supporting the sensing island in the original design was 0.11 N/m. Based on beam bending theory, the stiffness of the beams of the hybrid design with a height of 125 μm and thickness of 4.5 μm was calculated to be 4.85 N/m. From here, stress and strain were calculated as described previously.

Microscopy and SEM Imaging.

Imaging was done on a Zeiss LSM800 Confocal laser scanning microscope and a Zeiss Axio Observer 7 microscope. Images for the initial comparison of autofluorescence between IP-S and IP-Visio were done on the confocal microscope, and all other images were taken on the Observer 7 unless specified otherwise. Imaging parameters such as laser power, master gain, and objective pinhole diameter were kept consistent between experiments to ensure consistency, except for experiments to determine the effect of changing these parameters in the supplemental information. SEM images were taken on a FEI Helios NanoLab 660 SEM.

Nanoindentation

To calculate the Young's modulus of IP-S and IP-Visio, a Hysitron TI 950 Triboindenter was used to indent disks of IP-S and IP-Visio. First, the reduced modulus $E_r$ was calculated through the indention experiment for each material. The Young's modulus was then calculated based on the following equation: $E=E_r(1-v^2)$, assuming $v=0.4$.

Results

Fluorescent Properties of IP-S and IP-Visio

Figure 33:
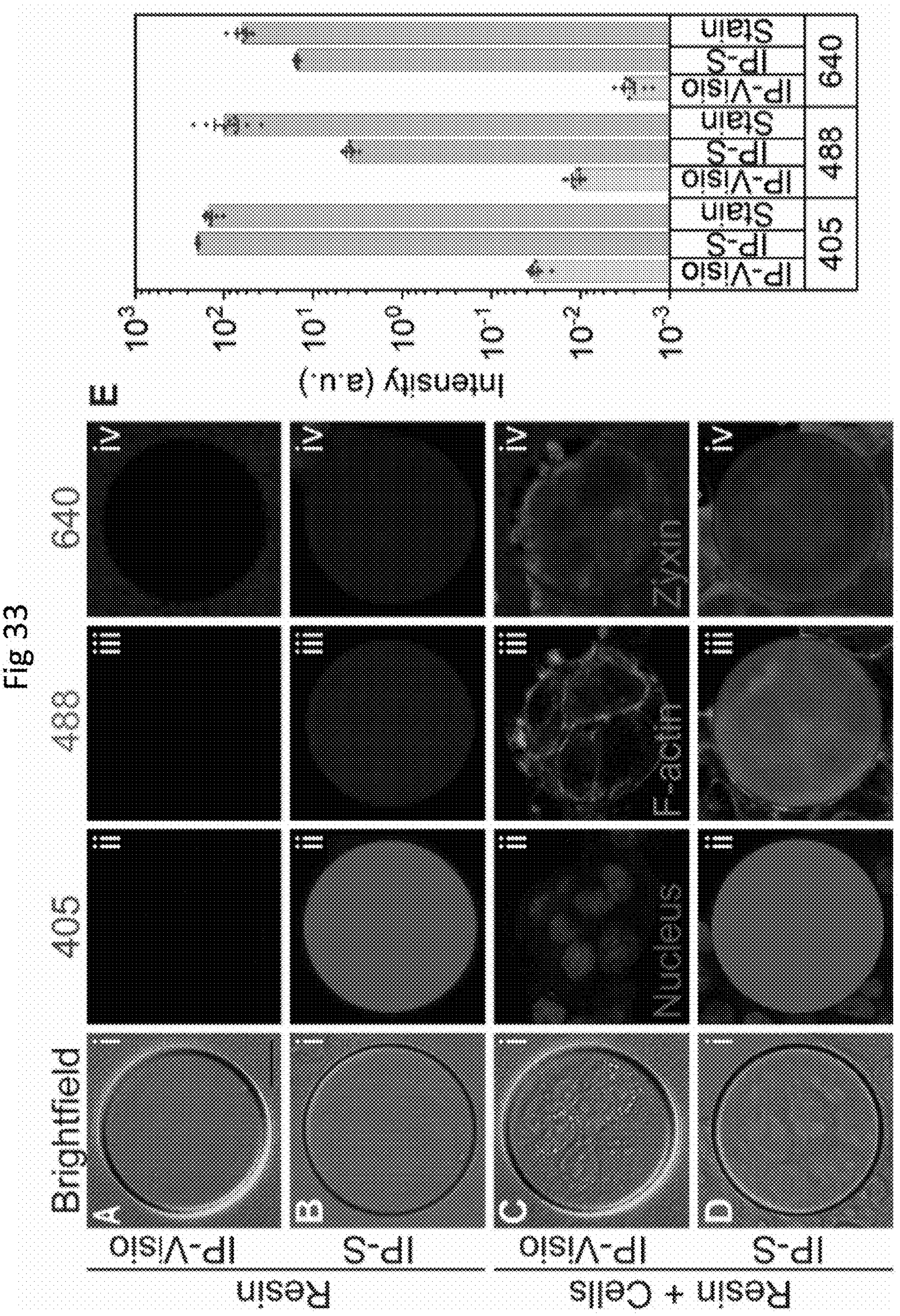
FIG. 33 shows fluorescent properties of IP-S and IP-Visio. For each image set: brightfield image (i) and fluorescent image with 405 nm laser (ii), 488 nm laser (iii), and 640 nm laser (iv).

As a first test to gauge the fluorescent properties of IP-Visio, disks were fabricated from IP-S and IP-Visio and imaged with laser wavelengths of 405 nm, 488 nm, and 640 nm to measure their fluorescence across a range of possible imaging wavelengths. Compared with IP-S, IP-Visio produces far less fluorescence in all channels (FIG. 33A, B). Next, A431 cells were cultured on the disks and stained for the nucleus, F-actin, and zyxin. As a result of the lower autofluorescence of IP-Visio compared to IP-S, more signal and details in the stains can be observed (FIG. 33C, D). The difference is most distinct in the 405 nm channel, in which the nucleus of individual cells can be clearly seen on IP-Visio but are completely blocked when imaged on IP-S due to its high autofluorescence in this channel (FIG. 33C, D ii). In the 488 nm channel, more defined features of F-actin around the cell-cell junctions can be seen on IP-Visio, whereas these features are blurred when imaged on IP-S (FIG. 33C, D iii). Zyxin stained in the 640 nm channel follows a similar trend, in which more details can be seen on IP-Visio and are blurred on IP-S (FIG. 33C, D iv). To quantitatively evaluate and compare the fluorescence of IP-S and IP-Visio, the average intensity of the disks in each channel were calculated, along with the average intensity of prominent features of the nucleus, F-actin, and zyxin in A431 cells stained on a petri dish to compare these signals to autofluorescence produced by the TPP materials. These results shows that the fluorescence of IP-S is many orders of magnitude greater than IP-Visio in the three channels tested, and additionally is within an order of magnitude of the fluorescence of the stains selected (FIG. 33E). These results demonstrate the potential of IP-Visio as a material component to be used in fluorescent imaging of cells on the SCAμTT platform.

Fabrication of SCAμTT Platform with IP-Visio

Figure 34:
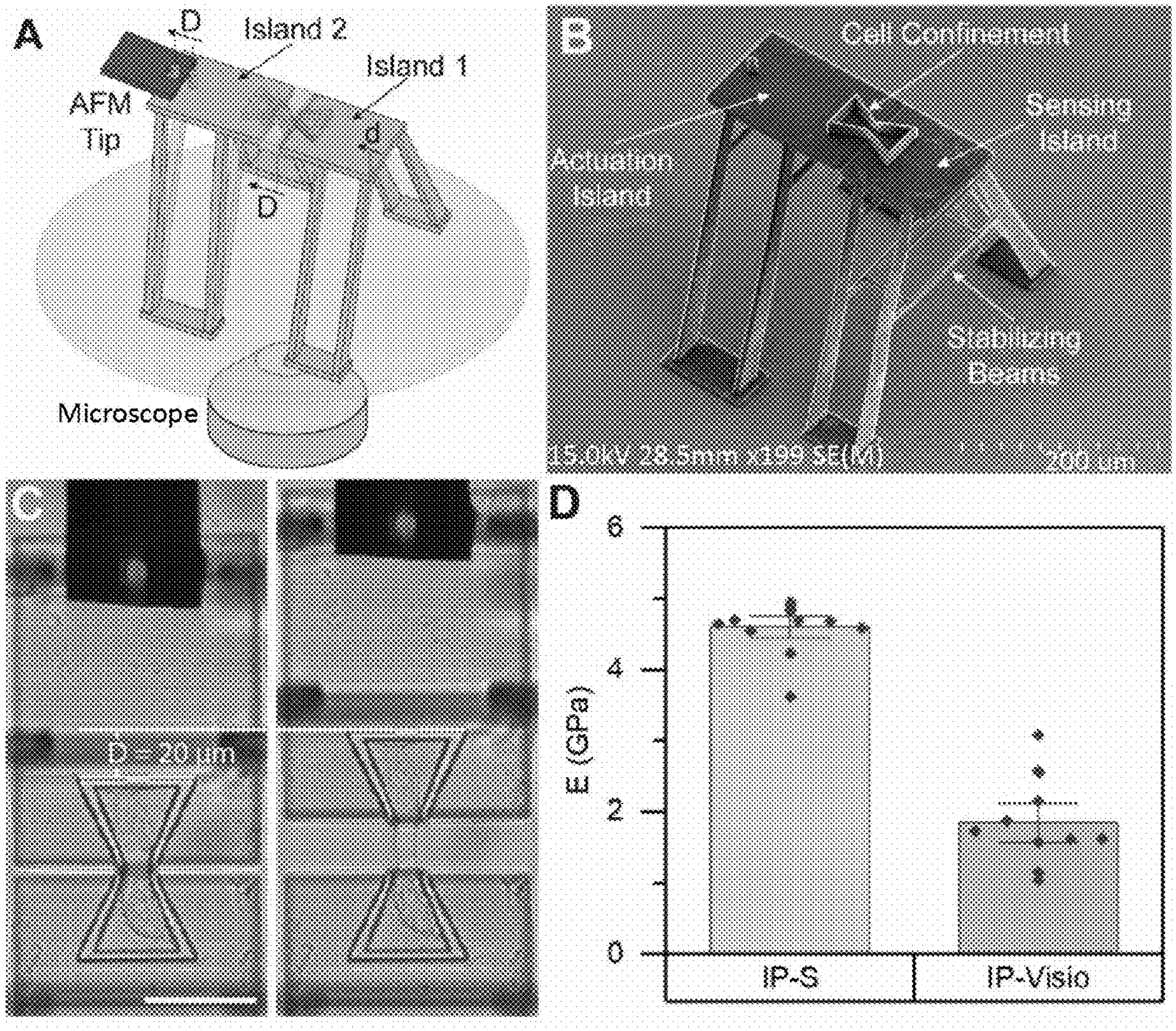
FIG. 34 shows the design of SCAμTT platform.

After demonstrating the potential of IP-Visio for use in fluorescent imaging of cells, we next sought to fabricate our SCAμTT platform with this material. The platform features two moveable islands supported by vertical beams of known stiffness, on which two cells are placed within the bowtie confinement area on each island. After cells adhere to the islands and form a mutual junction, one island is displaced with an AFM probe, stretching the cells and deflecting the second island, the displacement of which is tracked to determine junctional stress based on the stiffness of the vertical beams (FIG. 34A). An SEM image of the platform fabricated with IP-S reveals a stable structure that is dimensionally accurate with the nominal design (FIG. 34B). This platform can be used for stretching experiments, such as stretching a pair of A431 cells to 20 μm to observe failure mechanics of the junction (FIG. 34C). However, when fabricated with IP-Visio, the thin vertical beams collapse after fabrication. After characterizing the mechanical properties of IP-S and IP-Visio with a nanoindenter, the Young's modulus of IP-S and IP-Visio were found to be 4.6±0.75 GPa and 1.8±0.64 GPa, respectively, indicating that the platform is unstable when fabricated with IP-Visio due to its relatively lower stiffness (FIG. 34D). In addition, we observed that IP-Visio parts tend to shrink significantly after development, leading to dimensional inaccuracies and making it not an ideal candidate for fabricating the platform.

Fabrication of Hybrid SCAμTT Platform and Integrated Apertures

Figure 35:
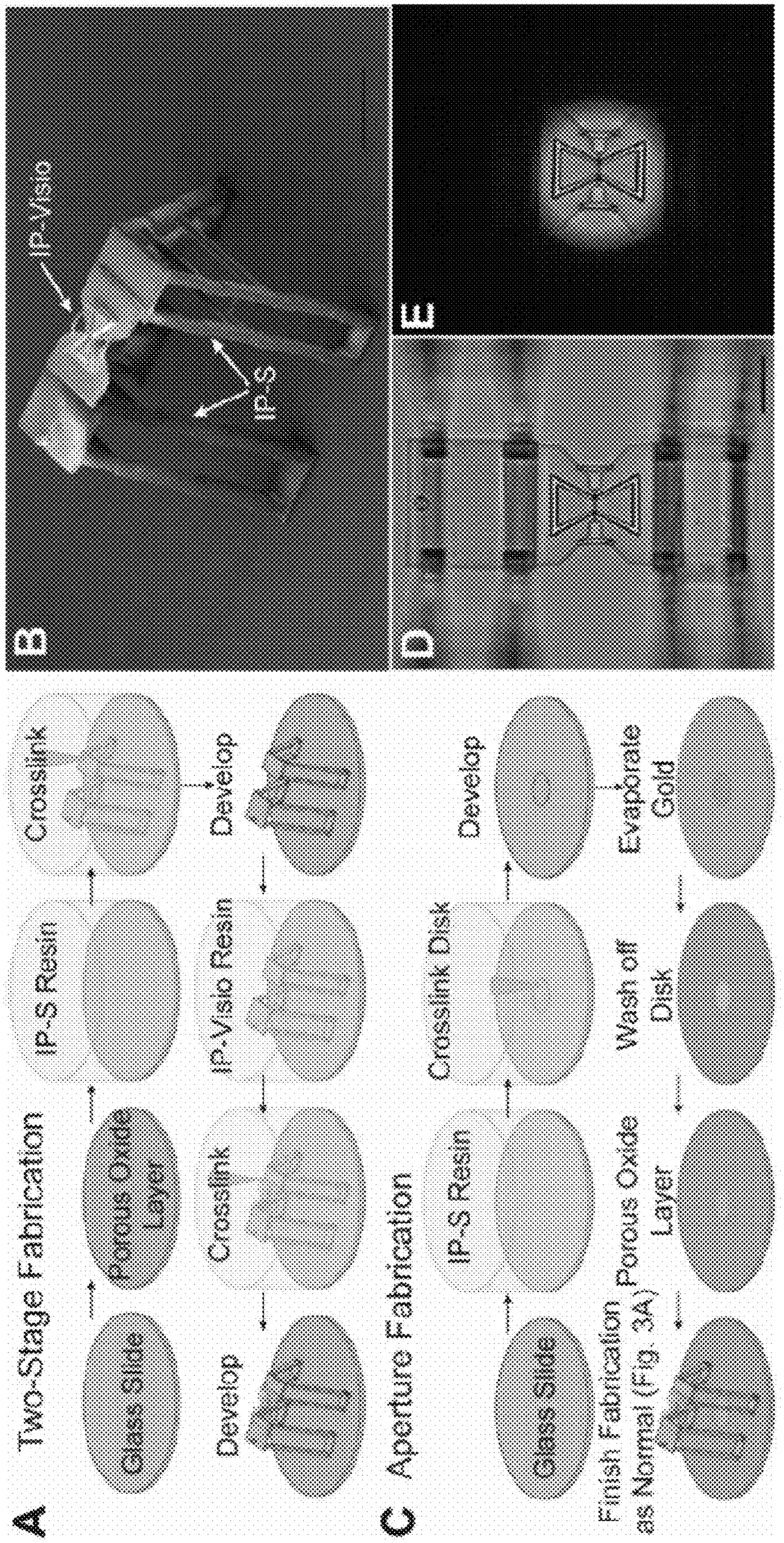
FIG. 35 shows the fabrication of hybrid tensile tester and integrated apertures.

To produce a stable platform that can be used in experiments, a new design of our SCAμTT platform that incorporates both IP-S and IP-Visio was made. The design uses IP-S for the vertical beams due to its superior strength and crosslink stability, and IP-Visio for the top island where cells are cultured and grow to allow for imaging with reduced background from autofluorescence. In this two-stage fabrication process, IP-S resin is cast on a glass slide coated in a porous silicon oxide layer and is crosslinked to yield the vertical beams. Next, IP-Visio resin is cast on the slide and crosslinked to yield the islands with bowtie confinements (FIG. 35A). In the first attempts at fabricating this design, the islands would bend away from each other after fabrication, making it impossible for cells to form a junction with each other. To prevent this, links fabricated with IP-Visio were added between the islands and the thickness of the vertical beams was increased. With these changes, a gap size between the islands that allows cells to form a junction with each other could be maintained (FIG. 35B). In addition, the islands can easily be separated by breaking the IP-Visio tethers using the same deposition microneedle used to place cells on the device.

After preliminary images showed that the illumination of IP-S beams still caused increased background signal projected onto the cell confinement area, we developed a fabrication procedure to integrate apertures made with a gold coating into the porous silicon oxide layer, which can block illumination of the IP-S component. To fabricate the apertures, a disk of IP-S with a diameter matching the desired aperture diameter is crosslinked onto the glass slide before adding the porous silicon oxide layer. Next, a layer of gold is evaporated on the glass slide. As the porous silicon oxide layer helps promote adhesion between TPP printed parts and the glass slide, in its absence the disks can be easily washed off, leaving behind a pinhole in the gold coating layer through which light can pass. After adding the porous silicon oxide layer, the hybrid device can be fabricated as normal after carefully aligning the apertures on the substrate with the TPP printer (FIG. 35C). A brightfield image of this device without and with the integrated aperture demonstrates how light can pass through the aperture to illuminate the bowtie confinement fabricated from IP-Visio, while casting a shadow on the vertical beams fabricated from IP-S (FIG. 35D, E).

Background Signal Quantification

Figure 36:
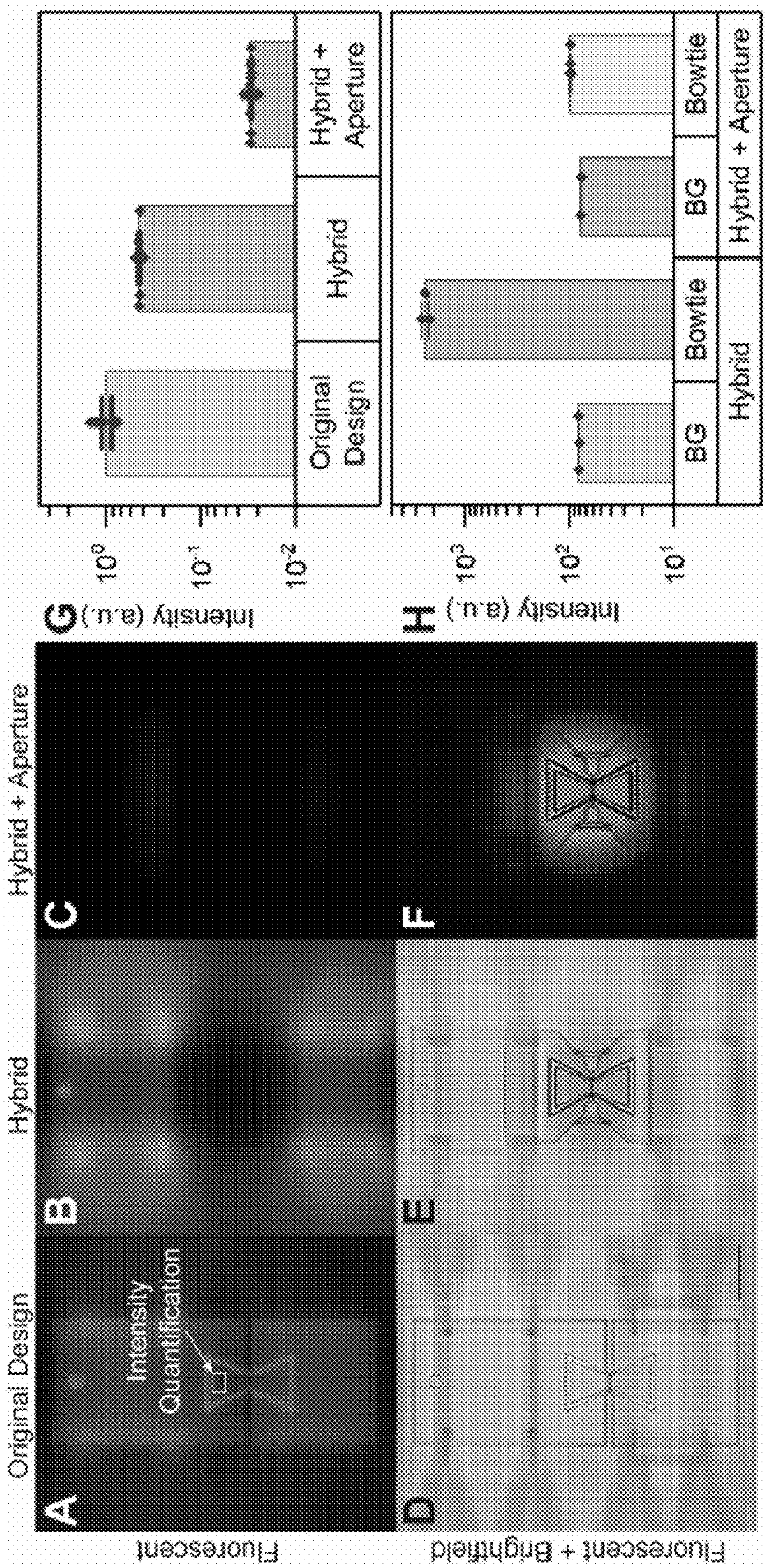
FIG. 36 shows that background noise is reduced in hybrid SCAμTT platform.

To compare the suppression of background signal generated by autofluorescence with these two new designs and the original design fabricated from IP-S, each platform was imaged and the background signal inside of the bowtie confinement, where cells would be during an experiment, was measured with input laser wavelengths of 353 nm, 488 nm, 545 nm, and 650 nm. For instance, in the 488 nm channel, the original design fabricated with IP-S has a much higher background signal compared to the hybrid design both without and with an optical blocking aperture (FIG. 36A-F). Quantifying the background intensity within the bowtie confinement shows that, while the background is suppressed in the hybrid design, it is almost two orders of magnitude smaller with the addition of the optical blocking aperture (FIG. 36G). To further understand the degree to which the integrated apertures can suppress background signal, we compared the background signal within the hybrid design without and with integrated apertures to background signal quantified in an image taken far away from the SCAμTT platform, which would not be influenced by autofluorescence from IP-S or IP-Visio and can be considered the absolute background noise from image collection. We found that, without an optical blocking aperture, background signal on the hybrid platform without an integrated aperture is an order of magnitude greater than background far away from the SCA μTT platform, but when an integrated aperture is used, the background signal is almost identical to background far away from the SCAμTT platform (FIG. 36H).

Signal Collection and Stretching of Stained Keratinocyte Cells

Figure 37:
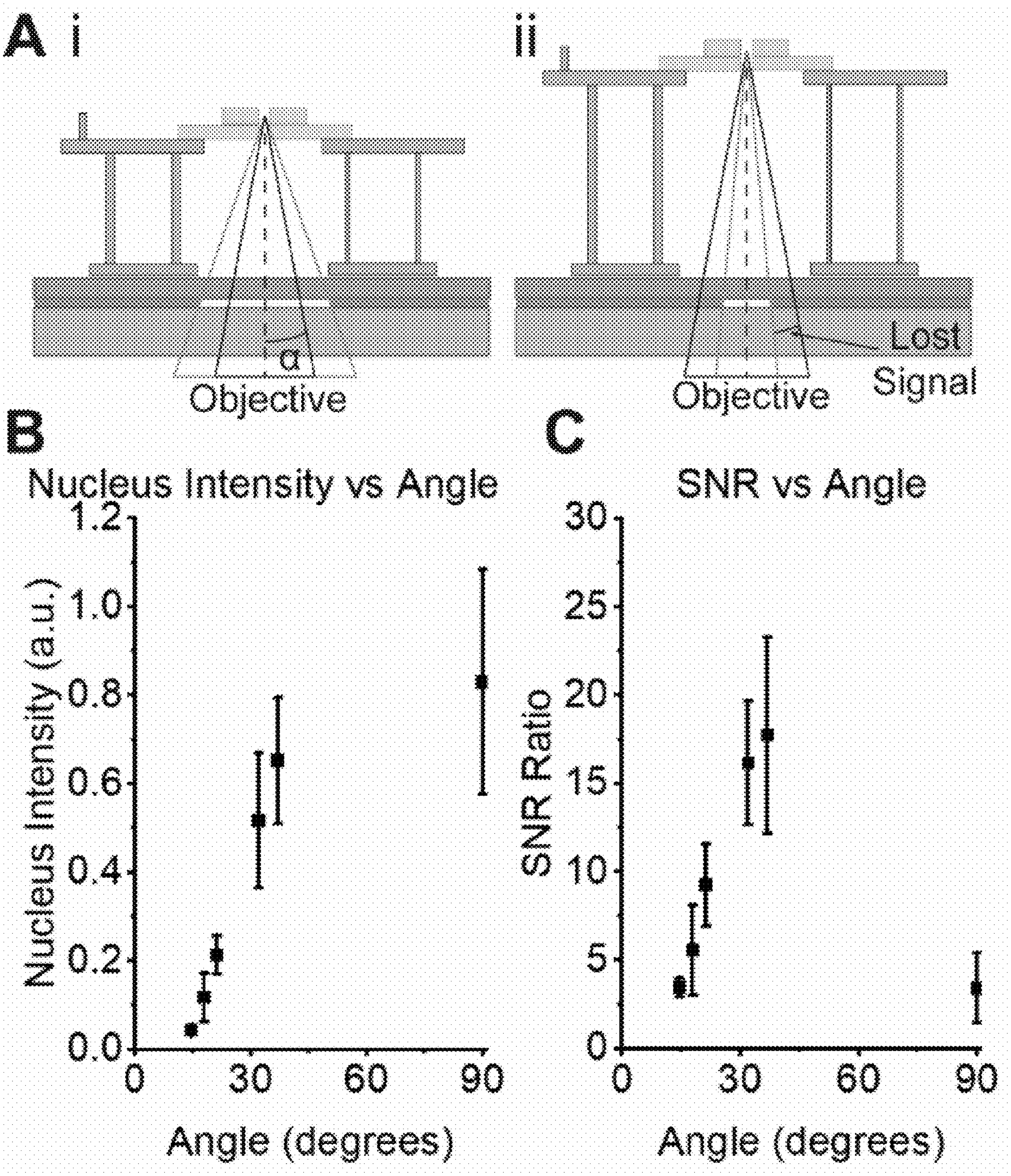
FIG. 37 shows integrated apertures can increase signal-to-noise ratio without inhibiting signal stimulation and collection.
Figure 37:
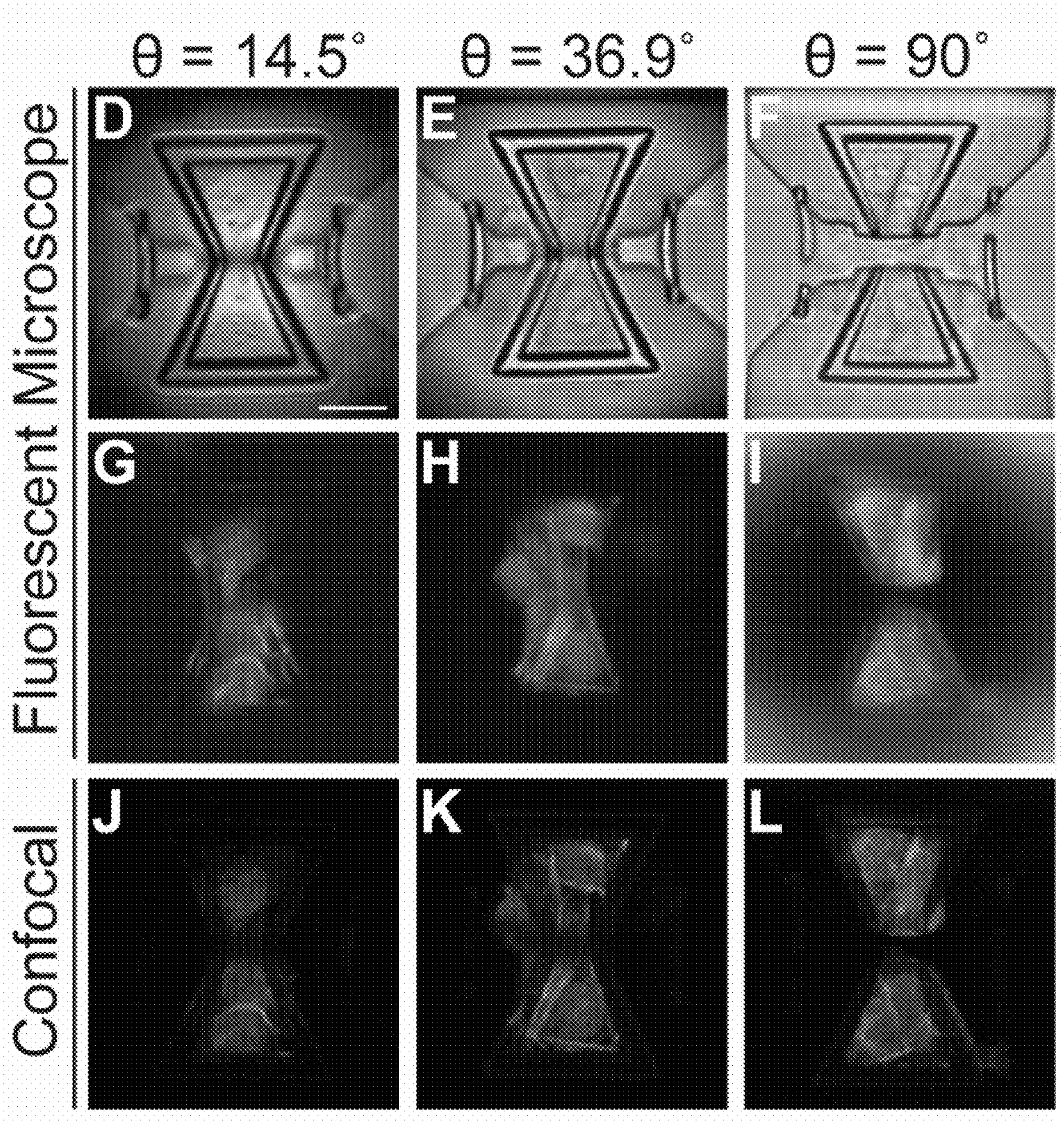
Figure 37:
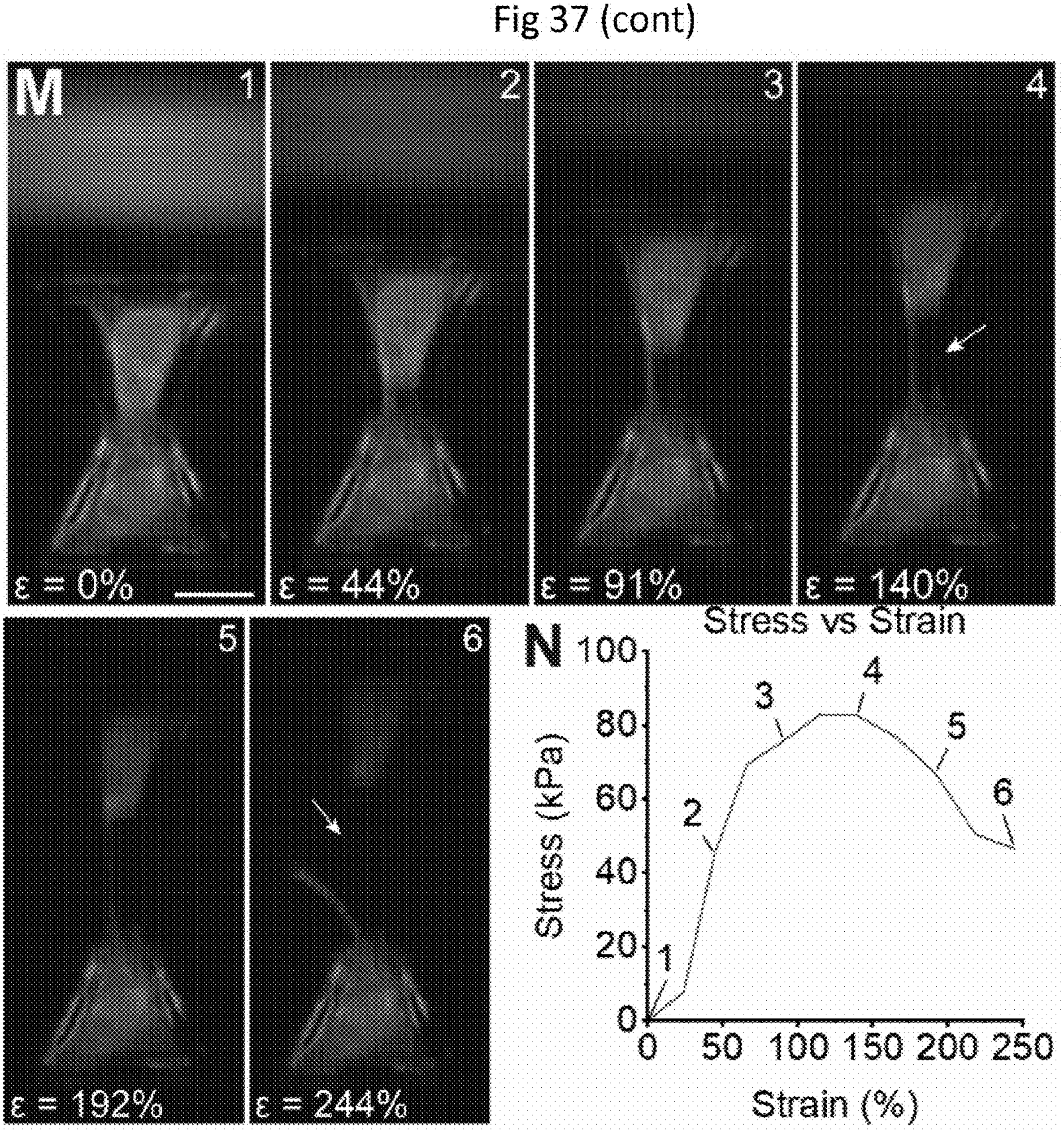

While the optical blocking apertures can suppress background signal produced by the platform, it is important to consider their effect on exciting and collecting signal from cells on the device. Based on the objective and immersion liquid used in imaging, there is a cone of light defined by an angle α within which signal can be collected by the objective. Based on the height of the stretcher and aperture diameter, another cone of light (β) is defined that determines the maximum cone of light produced by signal from the cells that can be seen from underneath. If β is larger than α, signal collection is not impacted (FIG. 37Ai), but if β is smaller than α, then signal will be blocked (FIG. 37Aii). To study the effect of the apertures blocking signal from cells on the platform, keratinocyte cells (HaCaT) were deposited on platforms with various combinations of vertical beam height and aperture diameter, as well as platforms with no optical blocking aperture, and stained for their nucleus and F-actin. After imaging, the average intensity of each nucleus was quantified and compared with background signal generated by the platform in the same spot as the nucleus. The intensity of each nucleus was divided by the average nucleus intensity of cells on the petri dish far away from the platform to account for variability in staining efficiency between samples. By comparing this adjusted nucleus intensity to the angle formed by the platform height and aperture diameter, the signal collected was found to linearly increase for angles below 45 degrees. However, the intensity of nuclei on the device with no apertures, which have an effective angle of 90 degrees, does not follow this trend and is less than the intensity expected based on the linear trend (FIG. 37B). Similarly, the signal-to-noise ratio, calculated as the adjusted nucleus intensity divided by the background signal, can be seen to increase as the angle increases up to 45 degrees, but does not increase linearly and instead curves down. At an angle of 90 degrees, the signal-to-noise ratio decreases to a similar level as an angle of around 15 degrees (FIG. 37C).

Representative images of cells on a device with a small angle (14.5 degrees), an intermediate angle (36.9 degrees), and with no aperture (90 degrees) are shown in FIG. 37D-L. The images are scaled to have the same nucleus intensity in each image to see the clarity of the images. For a standard fluorescent microscope, the images on platforms with a low angle can be seen to have a low signal-to-noise ratio, due to the aperture blocking either the excitation or collection of signal from the cells (FIG. 37G). On the opposite end, a platform with no coating can also be seen to have a low signal-to-noise ratio, but this time due to an increase in background due to the illumination of IP-S (FIG. 37I). For an intermediate angle, noise produced from IP-S is blocked while not compromising signal stimulation and collection, resulting in a high signal-to-noise ratio (FIG. 37H). When imaged on a confocal microscope, images appear to have a similar signal-to-noise ratio between the three platforms with a slight loss of signal from the platform with a small angle. This is due to the image acquisition being done pixel-by-pixel on a confocal microscope, therefore minimizing the effect illumination of surrounding IP-S has on signal collection from cells within the confinement area (FIG. 37J-L).

We finally demonstrated the utility of the device by stretching a pair of HaCaT cells on the hybrid platform with an optical blocking aperture. After the cells were stained, the IP-Visio links were broken using the deposition microneedle to disconnect the islands and allow for stretching the stained pair of cells. The cells were stretched in increments of 5 μm and imaged for the nucleus and F-actin (FIG. 37M). The displacement of the bottom island was determined by tracking the location of the edge of the bowtie confinement in each image (cite PNAS paper). From the images, it can be seen that the cell pair is stretched to 20 μm without damage, and signs of damage to the cell pair begin around 30 μm. When the final stretching magnitude of 50 μm is reached, the cell junction fully ruptures. From displacement data and the stiffness of the sensing island vertical beams, a stress-strain curve for this cell pair is produced. Stress in the junction increases up to 80 kPa, at which point fracture in the junction is initiated. As the cell pair is stretched further, the stress in the junction decreases until it finally ruptures (FIG. 37N).

Discussion

We report the design, fabrication, and testing of a novel TPP-printed platform for investigating mechanotransduction in a pair of cells connected by a mutual junction. First, the fluorescent properties of IP-Visio, a new proprietary photoresist from Nanoscribe, were investigated and compared with IP-S, a photoresist from Nanoscribe that has been used extensively in research that utilizes TPP. Compared with IP-S, IP-Visio was found to be significantly less autoflourescent across a spectrum of tested excitation wavelengths and staining of cells on top of IP-S and IP-Visio showed the potential of stimulating and collecting signal from cells on IP-Visio. However, as revealed with a nanoindentation test, IP-Visio has a lower Young's modulus compared to IP-S, and therefore may not be able to be used in place of IP-S in TPP platforms with flexible components, such as our SCAμTT platform.

To address this shortcoming, we designed a new hybrid multi-material based SCAμTT platform that uses IP-S for the thin vertical beams and IP-Visio for part of the islands on which cells are imaged. To further combat increased background that results in illumination of IP-S during imaging, we developed a fabrication approach for integrating optical apertures with a gold coating on the glass slide on which SCAμTT platforms are printed. Our results showed that, compared to the original SCAμTT platform fabricated with IP-S, the hybrid design produces significantly lower background signal within the cell confinement region, and the integrated apertures further reduce background. Next, considering the potential for the integrated apertures to interfere with the stimulation and collection and signal from cells, we quantified the intensity of nuclei of cells stained on platforms with varying combinations of aperture diameter and height. We found that combinations of these parameters that result in a small characteristic angle α result in reduced signal stimulation and collection with a low signal-to-noise ratio, and platforms with no coating have a low signal-to-noise ratio due to illumination of IP-S increasing background signal. However, platforms with intermediate angles allow for stimulation and collection of almost all signal from cells on the platform while increasing signal-to-noise ratio by blocking the illumination of IP-S. Finally, we demonstrated the potential of the platform for imaging a pair of cells as they are stretched while simultaneously recording stress and strain in the junction. After staining the cells and disconnecting the islands by breaking the connecting tethers, the cells were stretched to almost 250% strain with a peak stress of around 80 kPa. Imaging of F-actin allowed for direct visualization of the cytoskeleton being deformed and the junction rupturing, which was initiated around a strain of 150% just before the peak stress was observed.

In other studies that use TPP platforms for studying cells, a variety of approaches have been used to either limit fluorescence of the TPP materials or to mitigate the effects of illuminating TPP materials on signal-to-noise ratio. To limit fluorescence of TPP materials, materials such as Sudan black have been used to quench autofluorescence in all channels, and dyes have been incorporated the TPP materials to induce high fluorescence in a specific channel and reduce autofluorescence in other channels. While this approach can reduce autofluorescence, these additives can be toxic and can influence the health of cells growing on the platforms. In addition, as the photoinitiator used for crosslinking in TPP is a significant contributor to autofluorescence, another approach is using photoinitiators with lower autofluorescence. However, this can result in a variety of changes to physical or chemical properties of the resulting device, and therefore is not always an option. Also, prolonged illumination of printed materials can reduce their autofluorescence, and can be used as a pretreatment step. However, this method cannot completely eliminate autofluorescence, and some autofluorescence recovers after time and is therefore not compatible for applications where cells are cultured for many hours. To avoid autofluorescence, infrared fluorophores can be used, as materials generally have lower autofluorescence at the excitation wavelength for these fluorophores. However, microscopes equipped with the appropriate filters and detectors for imaging these fluorophores are not common. In addition, image processing techniques can be used estimate autofluorescence by imaging at a slightly different excitation wavelength and subtracting it from the image. However, this assumes that autofluorescence will be the same at different wavelengths, which is not always true, and additionally requires extra images to be taken which can slow the image acquisition rate. Another approach is using microscopes with different methods of image acquisition that mitigate the autofluorescence of TPP materials. For example, in two-photon imaging, infra-red light is focused on the sample, where fluorescence is induced by the simultaneous absorption of two photons in a fluorophore. Infra-red light can pass through materials more easily compared to visible light, which limits exposure of these materials and mitigates autofluorescence. In addition, as we showed here (FIG. 37J-L), a confocal microscope, which creates images by scanning and capturing signal pixel-by-pixel, can avoid illumination of highly autofluorescent materials surrounding cells during stimulation and capturing of signal, reducing background noise. Despite these capabilities, it is less common for researchers to have access to these types of microscopes, and if they do, they are usually expensive to use.

The platform designed in this report, as well as the ideas and techniques used in its design, can be used for fluorescent imaging of cells on TPP platforms on standard fluorescent microscopes. The hybrid SCAμTT platform can be used to study mechanotransduction processes in relation to stress and strain in the junction. Signal from FRET is inherently weak, and the high signal-to-noise ratio of our SCAμTT platform with integrated apertures has potential to allow for the stimulation and capturing of this signal while stretching the cell-cell junction. For example, mechanosensitive proteins within cell-cell junctions can be probed with a pair of FRET fluorophores to study the transmission of forces in cell-cell junctions. Forces has been shown to be transmitted through desmosomes and adherens junctions using FRET sensors in desmoplakin and E-cadherin, respectively, under externally applied stretch, and the hybrid SCAμTT platform can be used to further investigate how forces within these individual junctions relate to stress within the entire cell-cell contact. In addition, FRET sensors have been integrated into mechanosensors such as α-catenin to study conformation changes that expose a cryptic binding cite for vinculin, and our platform can be used to investigate the levels of stress in the cell-cell junction that are required for its activation. In addition, the platform can be used for studying phenomena such as force-induced clustering of E-cadherin in the cell-cell junction under applied stress using cells expressing fluorescently tagged E-cadherin, which has been theorized to occur based on simulation studies of E-cadherin dynamics. Further, remodeling of the cytoskeleton has been observed in response to applied forces, such as force across VE-cadherin inducing F-actin polymerization, and can be investigated further on our platform using cells expressing fluorescent tags on cytoskeleton proteins such as F-actin or intermediate filaments. Finally, as the platform allows time for the formation of mature focal adhesions, the transmission of force from the cell-cell junction to cell-ECM junctions can be studied with a variety of techniques, including FRET, fluorescent tags, and cell-ECM force probes such as tension gauge tethers and DNA hairpin sensors. The approach detailed in this report of integrated apertures to block illumination of autofluorescent materials can also be used in other studies. For example, integrated apertures could be used in microfluidic devices fabricated with TPP to block illumination of the materials that make the microchannel, allowing for focusing on cells cultured within the channel.

Despite these promising results, there remain some limitations to our approach. First, we have observed that the hybrid fabrication approach with IP-S and IP-Visio results in residual stress accumulation and dimensional inaccuracies of IP-S components. We hypothesize that these observations are the result of interaction between crosslinked IP-S and uncrosslinked IP-Visio resin during the two-stage fabrication. Residual stress could lead to inaccuracies in calculating the stress in the junction due to the small length scale at which the sensing island deforms under forces tolerated by the cell-cell junction and will be investigated further.

Example 3 References

Each of the following references is incorporated by reference in its entirety for all purposes:

Accardo, Angelo, Marie-Charline Blatché, Rémi Courson, Isabelle Loubinoux, Christophe Thibault, Laurent Malaquin, and Christophe Vieu. 2017. 'Multiphoton direct laser writing and 3D imaging of polymeric freestanding architectures for cell colonization', *Small,* 13: 1700621.

Barry, Adrienne K, Ning Wang, and Deborah E Leckband. 2015. 'Local VE-cadherin mechanotransduction triggers long-ranged remodeling of endothelial monolayers', *Journal of cell science,* 128: 1341-51.

Borghi, Nicolas, Maria Sorokina, Olga G Shcherbakova, William I Weis, Beth L Pruitt, W James Nelson, and Alexander R Dunn. 2012. 'E-cadherin is under constitutive actomyosin-generated tension that is increased at cell-cell contacts upon externally applied stretch', *Proceedings of the National Academy of Sciences,* 109: 12568-73.

Chen, Yang, Julia Brasch, Oliver J Harrison, and Tamara C Bidone. 2021. 'Computational model of E-cadherin clustering under force', *Biophysical Journal,* 120: 4944-54.

Esfahani, Amir Monemian, Jordan Rosenbohm, Bahareh Tajvidi Safa, Nickolay V Lavrik, Grayson Minnick, Quan Zhou, Fang Kong, Xiaowei Jin, Eunju Kim, and Ying Liu. 2021. 'Characterization of the strain-rate-dependent mechanical response of single cell-cell junctions', *Proceedings of the National Academy of Sciences,* 118.

Flamourakis, George, Antonis Kordas, Georgios D Barmparis, Anthi Ranella, and Maria Farsari. 2021. 'Low-autofluorescence, transparent composite for multiphoton 3D printing', *Optical Materials Express,* 11: 801-13.

Friedrichs, Jens, Kyle R Legate, Rajib Schubert, Mitasha Bharadwaj, Carsten Werner, Daniel J Müller, and Martin Benoit. 2013. 'A practical guide to quantify cell adhesion using single-cell force spectroscopy', *Methods,* 60: 169-78.

González-Bermúdez, Blanca, Gustavo V Guinea, and Gustavo R Plaza. 2019. 'Advances in micropipette aspiration: applications in cell biomechanics, models, and extended studies', *Biophysical Journal,* 116: 587-94.

Hong, Guosong, Alexander L *Antaris*, and Hongjie Dai. 2017. 'Near-infrared fluorophores for biomedical imaging', *Nature biomedical engineering,* 1: 1-22.

Jaafar, Israd H, Courtney E LeBlon, Ming-Tzo Wei, Daniel Ou-Yang, John P Coulter, and Sabrina S Jedlicka. 2011. 'Improving fluorescence imaging of biological cells on biomedical polymers', *Acta biomaterialia,* 7: 1588-98.

Kim, Tae-Jin, Shuai Zheng, Jie Sun, Ismaeel Muhamed, Jun Wu, Lei Lei, Xinyu Kong, Deborah E Leckband, and Yingxiao Wang. 2015. 'Dynamic visualization of α-catenin reveals rapid, reversible conformation switching between tension states', *Current Biology,* 25: 218-24.

Li, Hongyun, Chen Zhang, Yuru Hu, Pengxiang Liu, Feng Sun, Wei Chen, Xinghua Zhang, Jie Ma, Wenxu Wang, and Liang Wang. 2021. 'A reversible shearing DNA probe for visualizing mechanically strong receptors in living cells', *Nature Cell Biology,* 23: 642-51.

Maggi, Alessandro, Hanqing Li, and Julia R Greer. 2017. 'Three-dimensional nano-architected scaffolds with tunable stiffness for efficient bone tissue growth', *Acta biomaterialia,* 63: 294-305.

Panorchan, Porntula, Jerry P George, and Denis Wirtz. 2006. 'Probing intercellular interactions between vascular endothelial cadherin pairs at single-molecule resolution and in living cells', *Journal of molecular biology,* 358: 665-74.

Piruska, Aigars, Irena Nikcevic, Se Hwan Lee, Chong Ahn, William R Heineman, Patrick A Limbach, and Carl J Seliskar. 2005. 'The autofluorescence of plastic materials and chips measured under laser irradiation', *Lab on a Chip,* 5: 1348-54.

Price, Andrew J, Anna-Lena Cost, Hanna UngewiB, Jens Waschke, Alexander R Dunn, and Carsten Grashoff. 2018. 'Mechanical loading of desmosomes depends on the magnitude and orientation of external stress', *Nature communications,* 9: 1-11.

Qi, Lin, Erin K Knapton, Xu Zhang, Tongwen Zhang, Chen Gu, and Yi Zhao. 2017. 'Pre-culture Sudan Black B treatment suppresses autofluorescence signals emitted from polymer tissue scaffolds', *Scientific reports,* 7: 1-12.

Raimondi, Manuela T, Michele M Nava, Shane M Eaton, Arianna Bernasconi, Krishna C Vishnubhatla, Giulio Cerullo, and Roberto Osellame. 2014. 'Optimization of femtosecond laser polymerized structural niches to control mesenchymal stromal cell fate in culture', *Micromachines,* 5: 341-58.

Rao, Tejeshwar C, Victor Pui-Yan Ma, Aaron Blanchard, Tara M Urner, Shreya Grandhi, Khalid Salaita, and Alexa L Mattheyses. 2020. 'EGFR activation attenuates the mechanical threshold for integrin tension and focal adhesion formation', *Journal of cell science,* 133: jcs238840.

Svoboda, Karel, and Ryohei Yasuda. 2006. 'Principles of two-photon excitation microscopy and its applications to neuroscience', *Neuron,* 50: 823-39.

Tabdili, Hamid, Matthew Langer, Quanming Shi, Yeh-Chuin Poh, Ning Wang, and Deborah Leckband. 2012. 'Cadherin-dependent mechanotransduction depends on ligand identity but not affinity', *Journal of Cell Science,* 125: 4362-71.

Tanhuanpää, Kimmo, Jorma Virtanen, and Pentti Somerharju. 2000. 'Fluorescence imaging of pyrene-labeled lipids in living cells', *Biochimica et Biophysica Acta (BBA)-Molecular Cell Research,* 1497: 308-20.

Thompson, Connor J, Zhaoqian Su, Vinh H Vu, Yinghao Wu, Deborah E Leckband, and Daniel K Schwartz. 2020. 'Cadherin clusters stabilized by a combination of specific and nonspecific cis-interactions', *Elife,* 9: e59035.

Vedula, S R K, TS Lim, P J Kausalya, E B Lane, G Rajagopal, W Hunziker, and CT Lim. 2009. 'Quantifying forces mediated by integral tight junction proteins in cell-cell adhesion', *Experimental mechanics,* 49: 3-9.

Yu, Qilin, William R Holmes, Jean P Thiery, Rodney B Luwor, and Vijay Rajagopal. 2022. 'Cortical Tension Initiates the Positive Feedback Loop between Cadherin and F-actin', *Biophysical Journal.*

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. A method of measuring a stress-strain curve in a sample, the method comprising:

providing a structure including a first movable island supported by a first beam, a second movable island supported by a second beam, and a gap therebetween connected by the sample, the sample comprising an initial length;

moving the second movable island with a defined displacement;

determining a displacement of the first movable island based on moving the second movable island;

calculating a difference between the displacement of the first movable island and the defined displacement of the second movable island based on moving the second movable island;

determining an applied strain in the sample based on the difference divided by the initial length of the sample;

calculating a force on the sample based on the displacement of the first movable island;

calculating a stress on the sample based on the force; and determining the stress-strain curve of the sample by plotting the calculated stress against the applied strain, wherein moving the second movable island comprises moving the second movable island using atomic force microscopy (AFM).

2. The method of claim 1, wherein moving the second movable island comprises moving the second movable island using a nanopositioner.

3. The method of claim 1, wherein the structure is developed based on a nanofabricated polymeric structure using two-photon polymerization.

4. The method of claim 1, wherein the first beam has a first defined stiffness and the second beam has a second defined stiffness.

5. The method of claim 4, wherein at least one of the first defined stiffness or the second defined stiffness is measured by deforming the first beam or the second beam using an AFM probe having a known stiffness.

6. The method of claim 1, wherein the structure further comprises a sample anchoring structure, wherein a first portion of the sample anchoring structure is attached to the first movable island and a second portion of the sample anchoring structure is attached to the second movable island, and wherein a first end of the sample is coupled to the first portion of the sample anchoring structure and a second end of the sample is coupled to the second portion of the sample anchoring structure such that the sample connects the two movable islands.

7. The method of claim 6, wherein the sample anchoring structure comprises a low autofluorescence resin, and wherein the method further comprises:

performing fluorescence imaging of the sample attached to the sample anchoring structure.

8. The method of claim 1, wherein moving the second movable island comprises:

moving the second movable island in a direction away from the first movable island.

9. The method of claim 1, wherein determining a displacement of the first movable island comprises:

determining a displacement of the first movable island using digital image correction (DIC).

10. The method of claim 1, wherein moving the second movable island with a defined displacement further comprises:

measuring the defined displacement using digital image correction (DIC).

11. The method of claim 1, wherein the sample comprises at least one of a cell-cell adhesion interface or a printed microfiber.

12. The method of claim 1, wherein at least a portion of the structure is made using a low autofluorescence resin.

13. A method of measuring a stress-strain curve in a sample, the method comprising:

providing a structure including a first movable island supported by a first beam, a second movable island supported by a second beam, and a gap therebetween connected by the sample, the sample comprising an initial length;

moving the second movable island with a defined displacement;

determining a displacement of the first movable island based on moving the second movable island;

calculating a difference between the displacement of the first movable island and the defined displacement of the second movable island based on moving the second movable island;

determining an applied strain in the sample based on the difference divided by the initial length of the sample;

calculating a force on the sample based on the displacement of the first movable island;

calculating a stress on the sample based on the force; and determining the stress-strain curve of the sample by plotting the calculated stress against the applied strain, wherein providing a sample comprises:

providing a sample in a liquid environment.

14. An apparatus for performing a displacement-controlled tensile test of a sample, the apparatus comprising:

a first movable island supported by a first supporting beam having a first defined stiffness; and a second movable island supported by a second supporting beam having a second defined stiffness, the first moveable island and the second moveable island defining a junction therebetween having an initial length, and wherein a structure including a first movable island supported by a first beam, a second movable island supported by a second beam, and a gap therebetween connected by the sample is developed based on a nanofabricated polymeric structure using two-photon polymerization, wherein the first moveable island and the second moveable island are attached to an optically transparent substrate.

15. The apparatus of claim 14, further comprising a first sample anchoring structure attached to the first moveable island and a second sample anchoring structure attached to the second movable island.

16. The apparatus of claim 15, further comprising a sample coupled to the first sample anchoring structure and the second sample anchoring structure, wherein the sample comprises a printed microfiber.

17. The apparatus of claim 16, wherein the optically transparent substrate is optically coupled to an inverted microscope configured to monitor movement of the first moveable island and the second moveable island using digital image correlation (DIC).

18. The apparatus of claim 14, wherein the apparatus is configured to stretch the junction at a controlled strain rate by applying force to the second moveable island using atomic force microscopy (AFM).

19. The apparatus of claim 14, wherein the apparatus is configured to stretch the junction at a controlled strain rate by applying force to the second moveable island using a nanopositioner.

20. The apparatus of claim 14, wherein at least a portion of the first movable island or the second moveable island is made using a low autofluorescence resin.

* * * * *